JOHN JOSEPH TORTORICI
JAROSLAV TERLECKYJ
CARL OLAVI MARKKANEN
INVENTORS

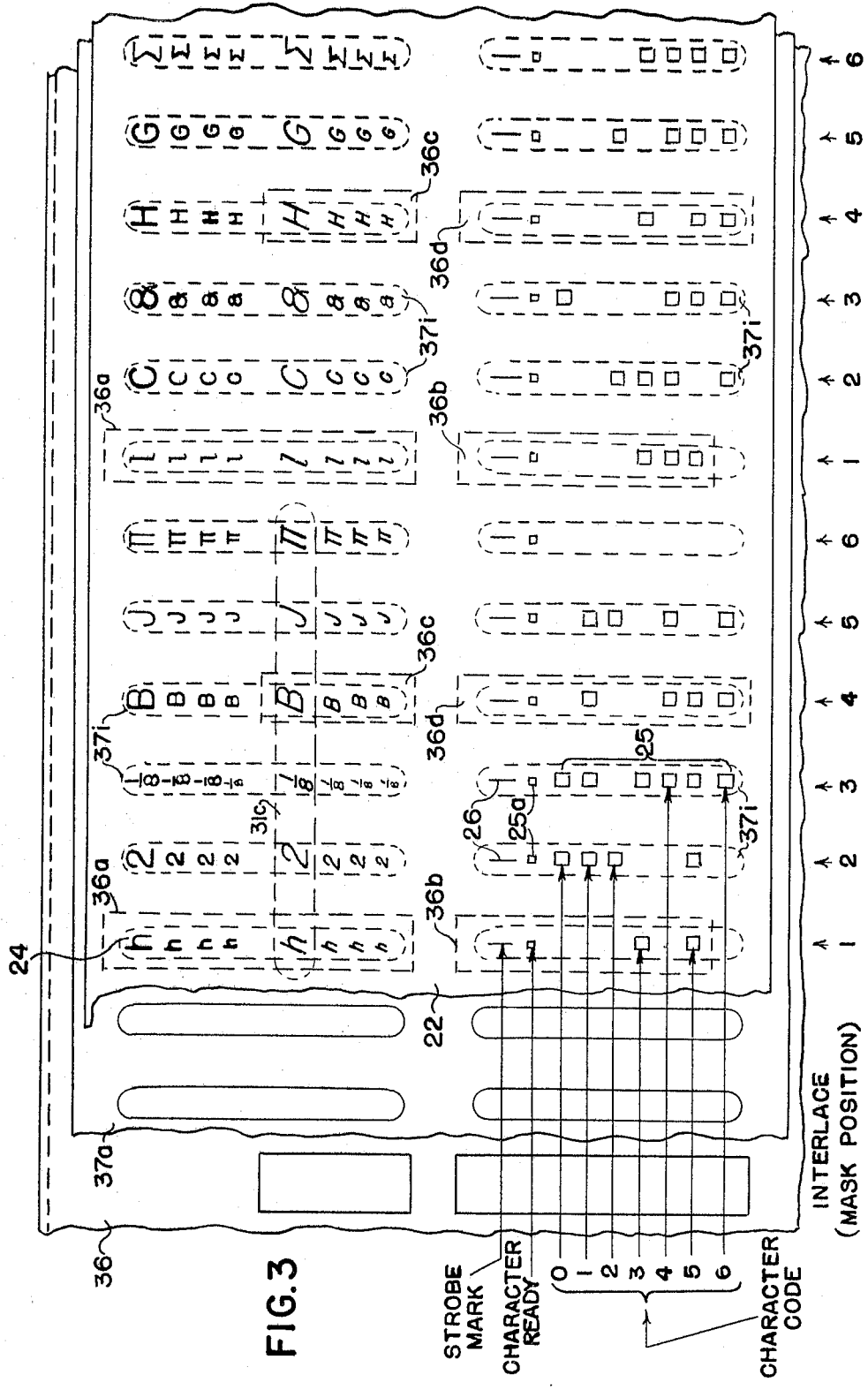

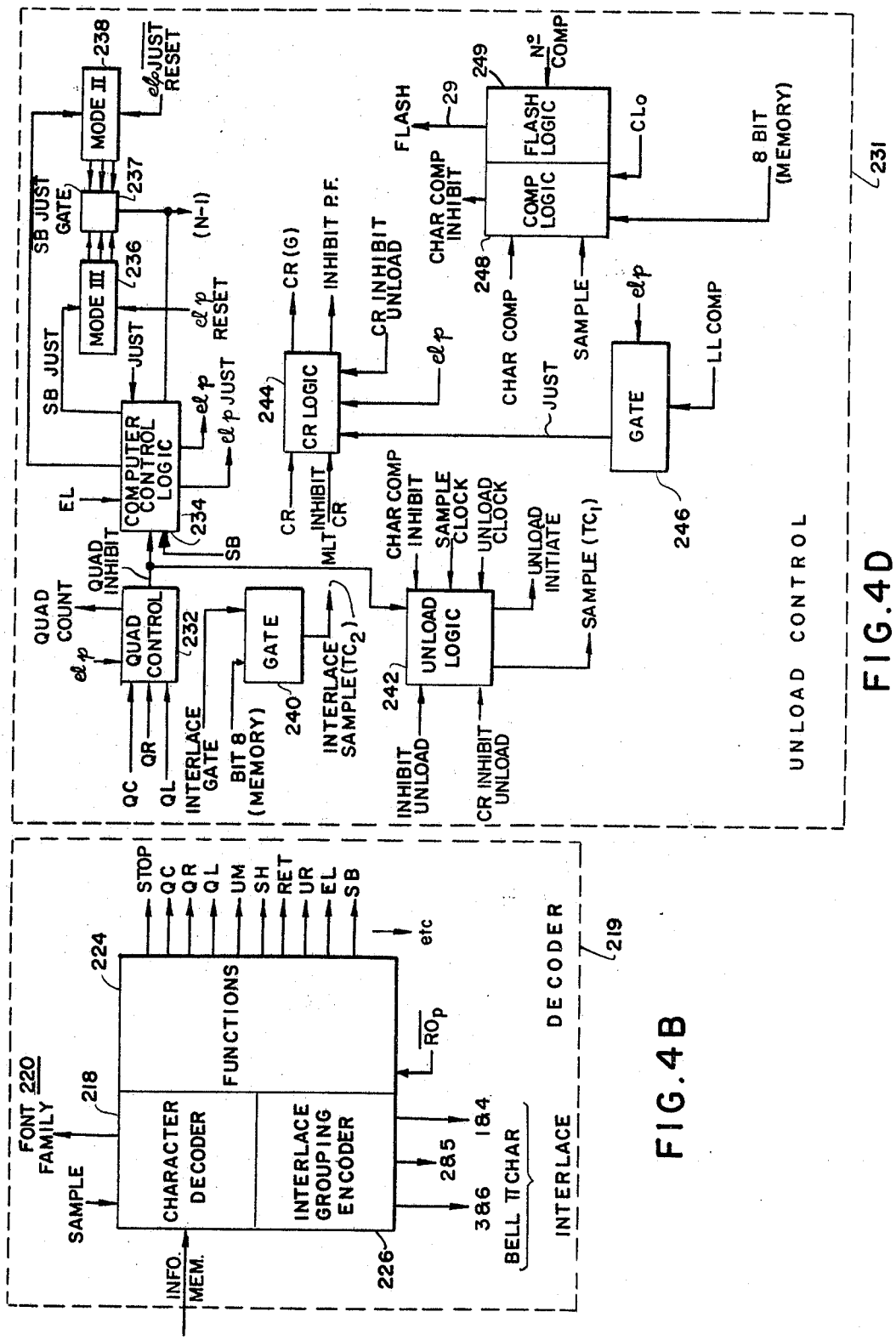

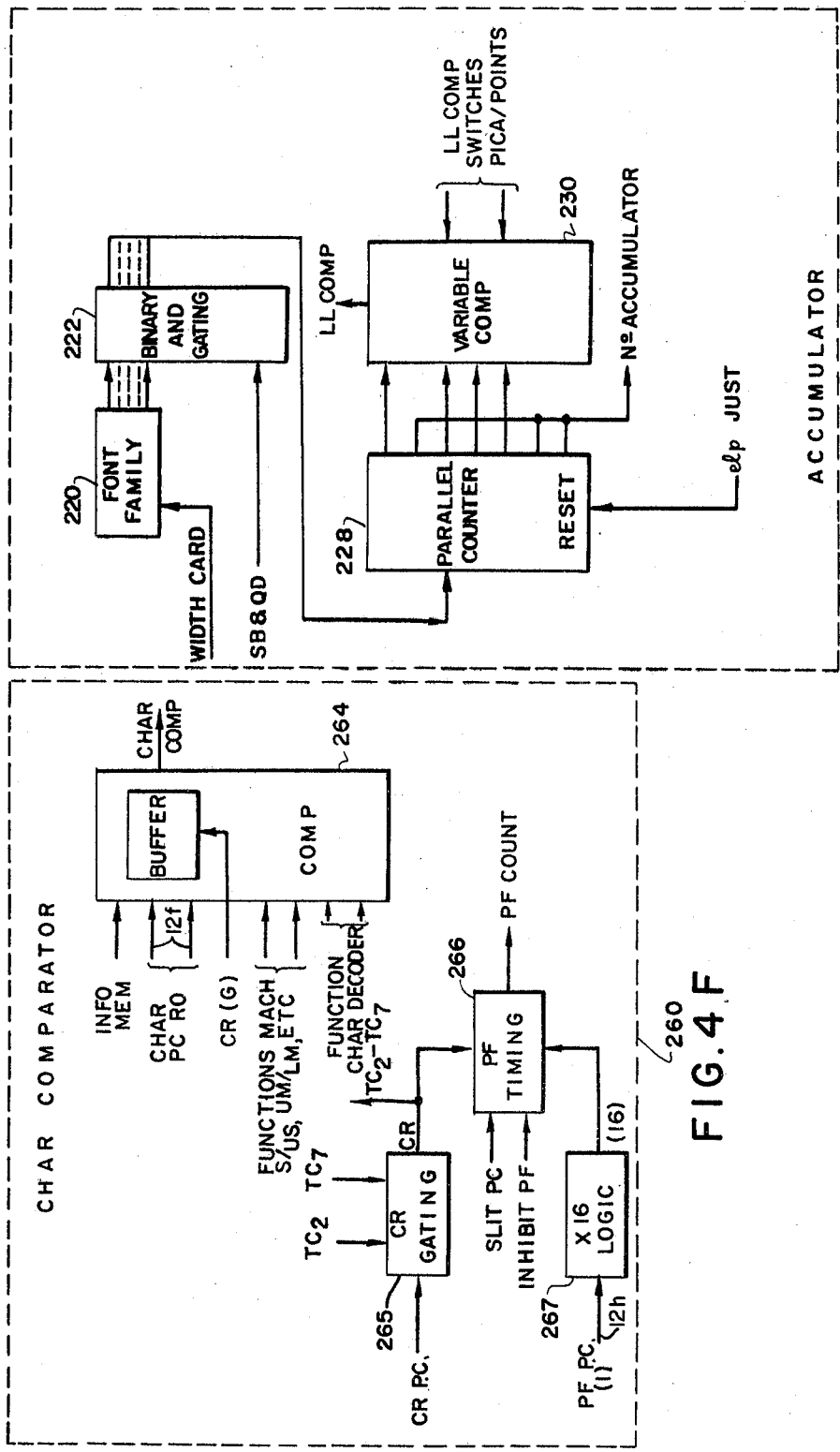

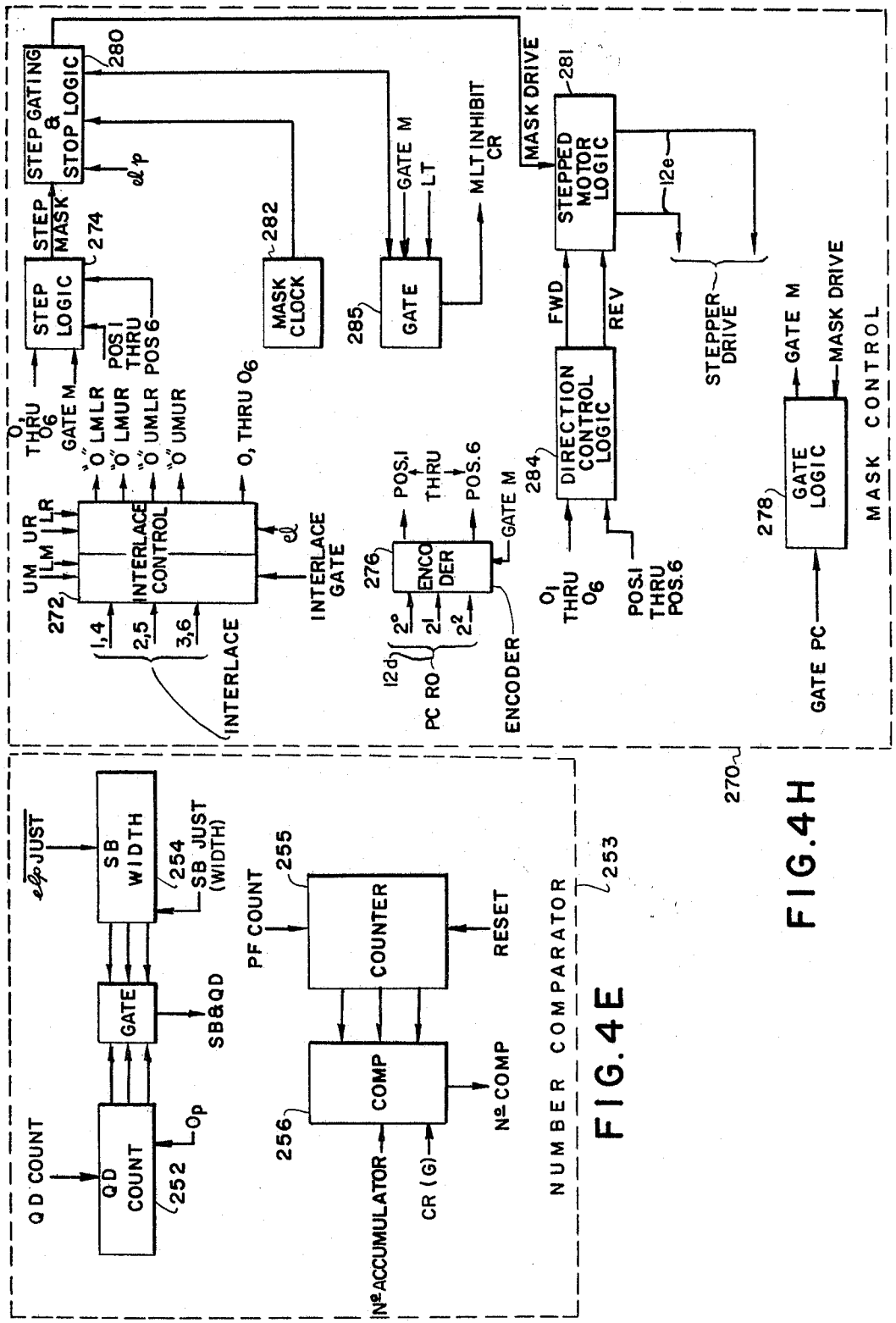

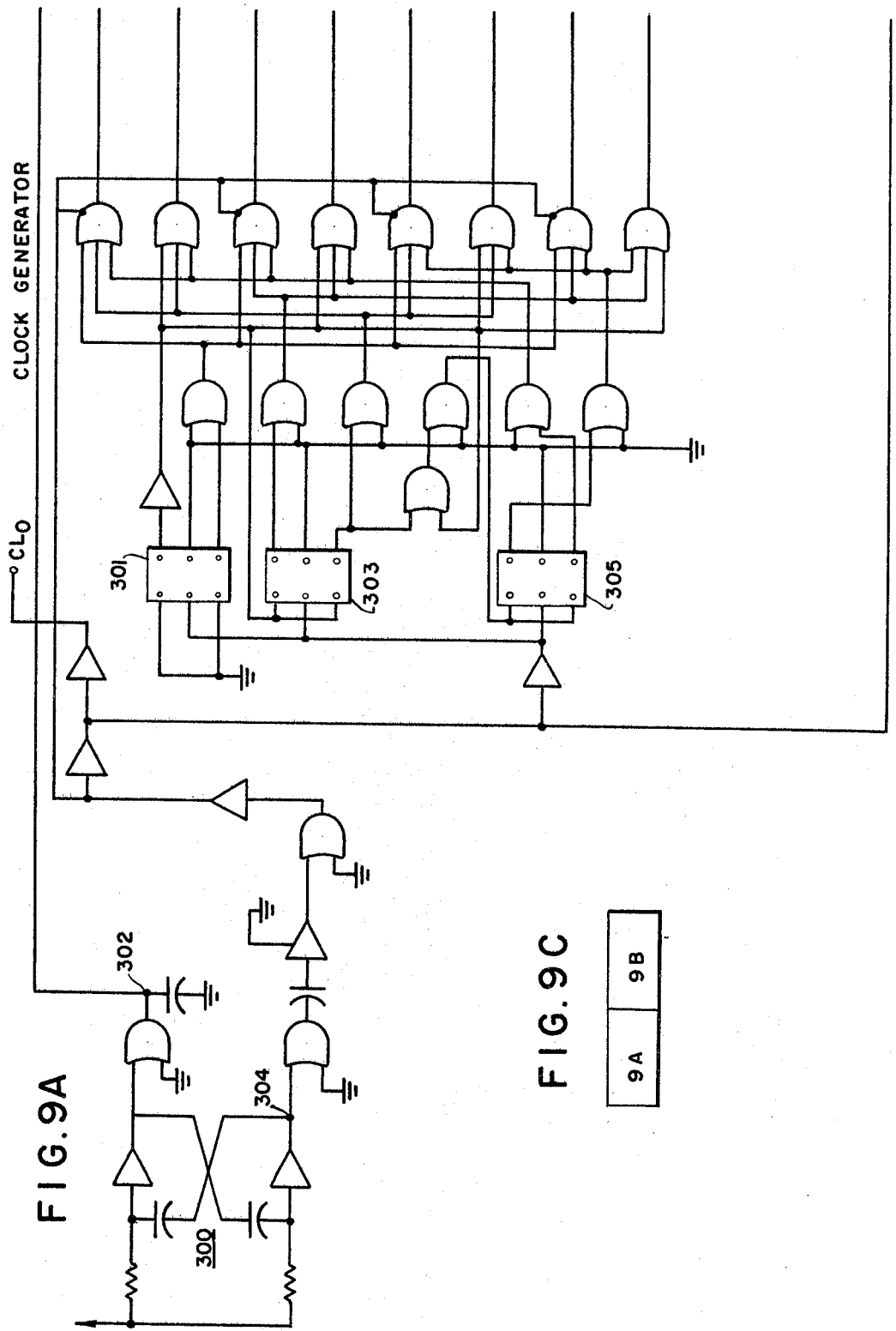

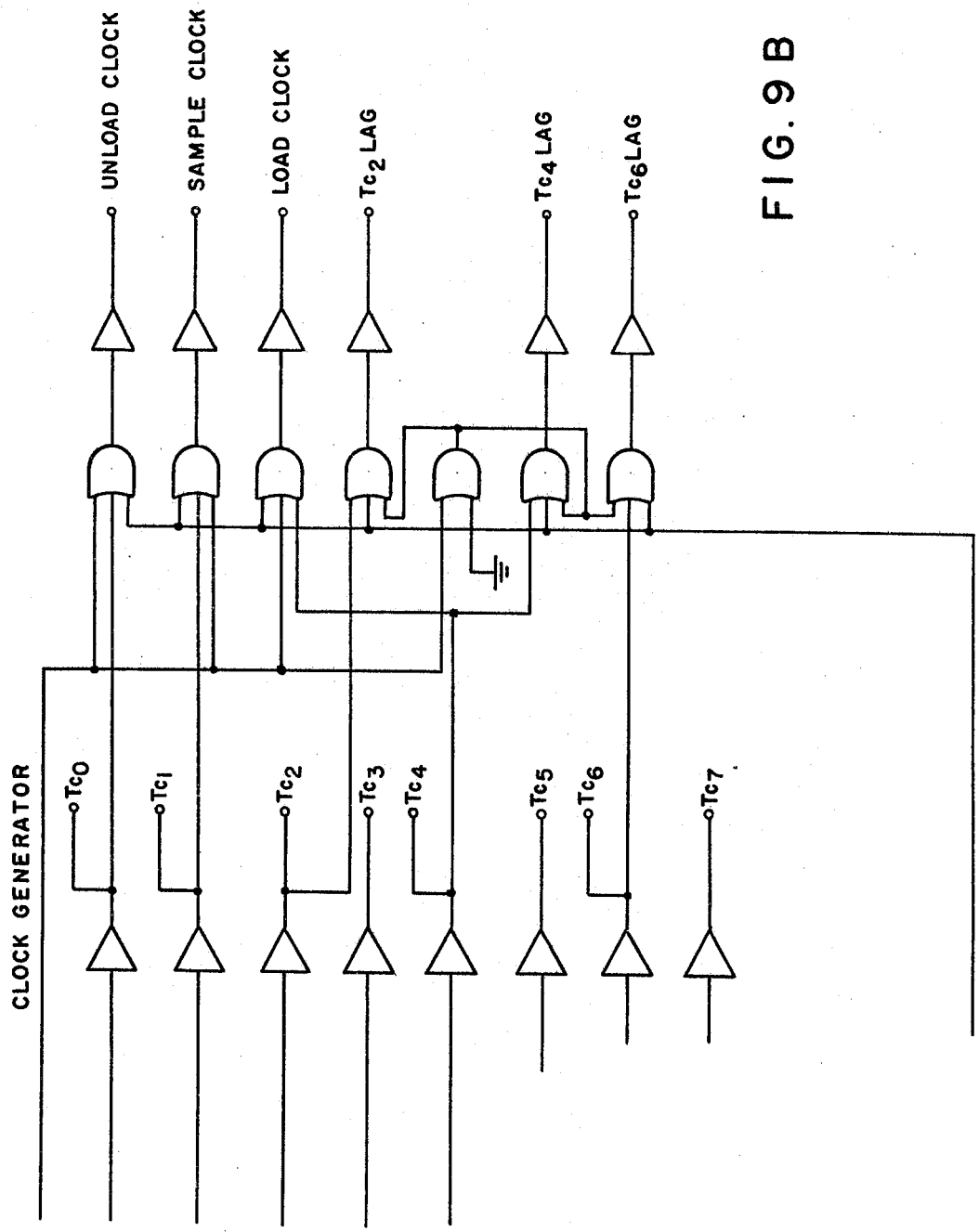

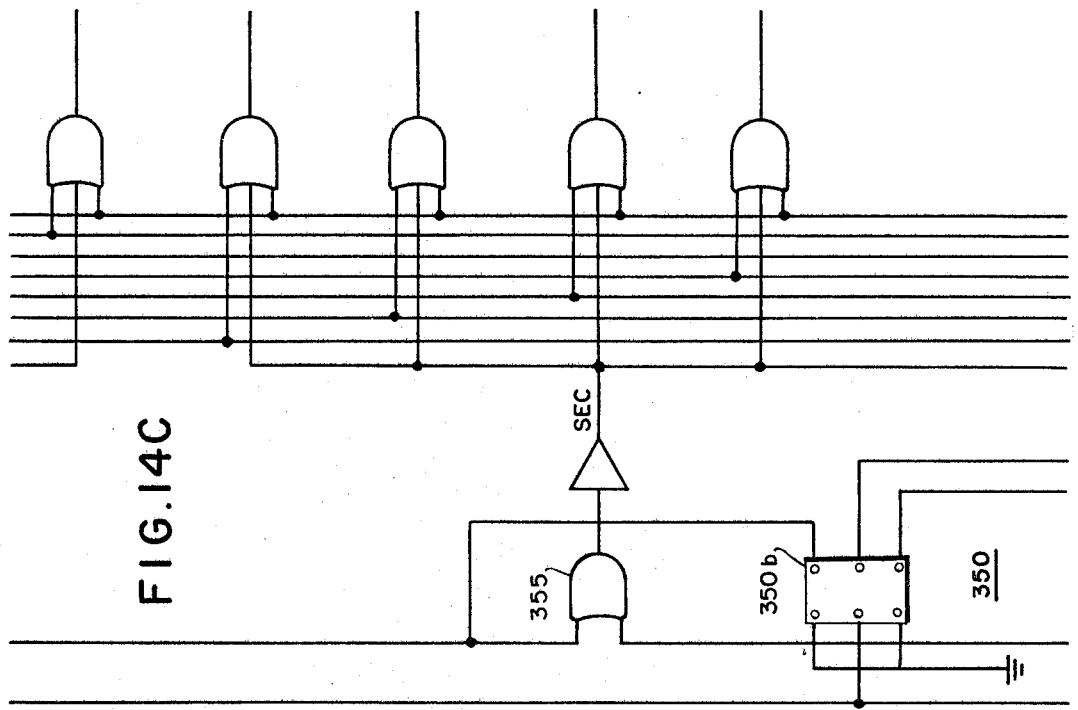
FIG.14C
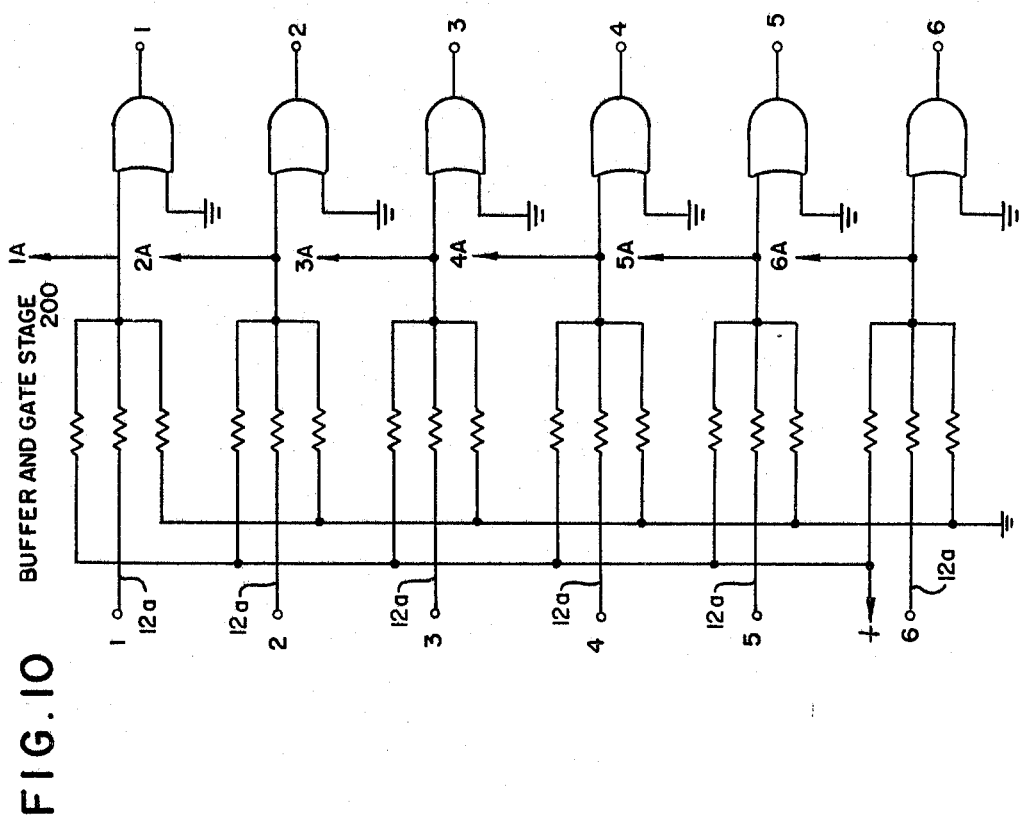
FIG.10 BUFFER AND GATE STAGE 200

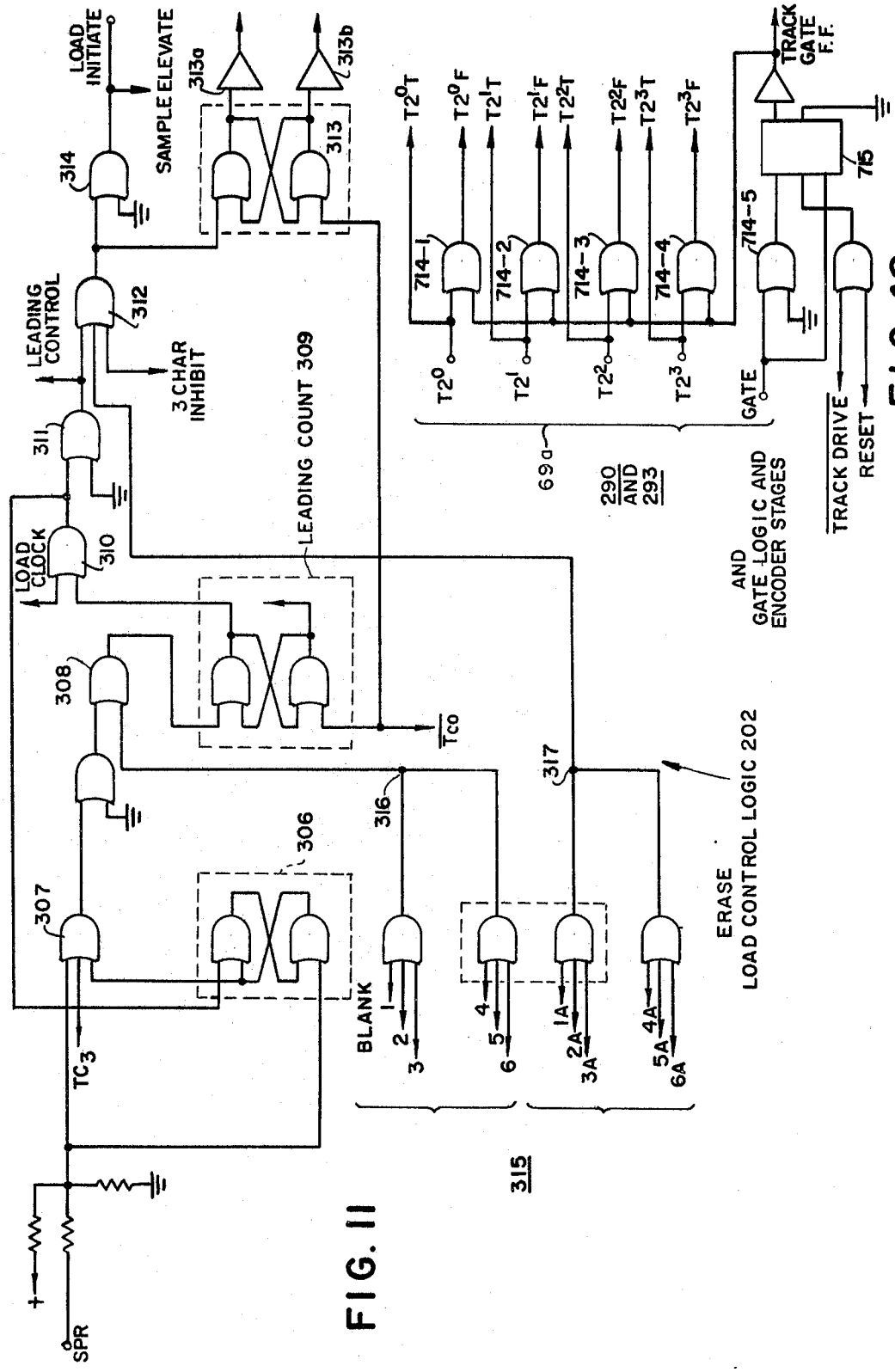

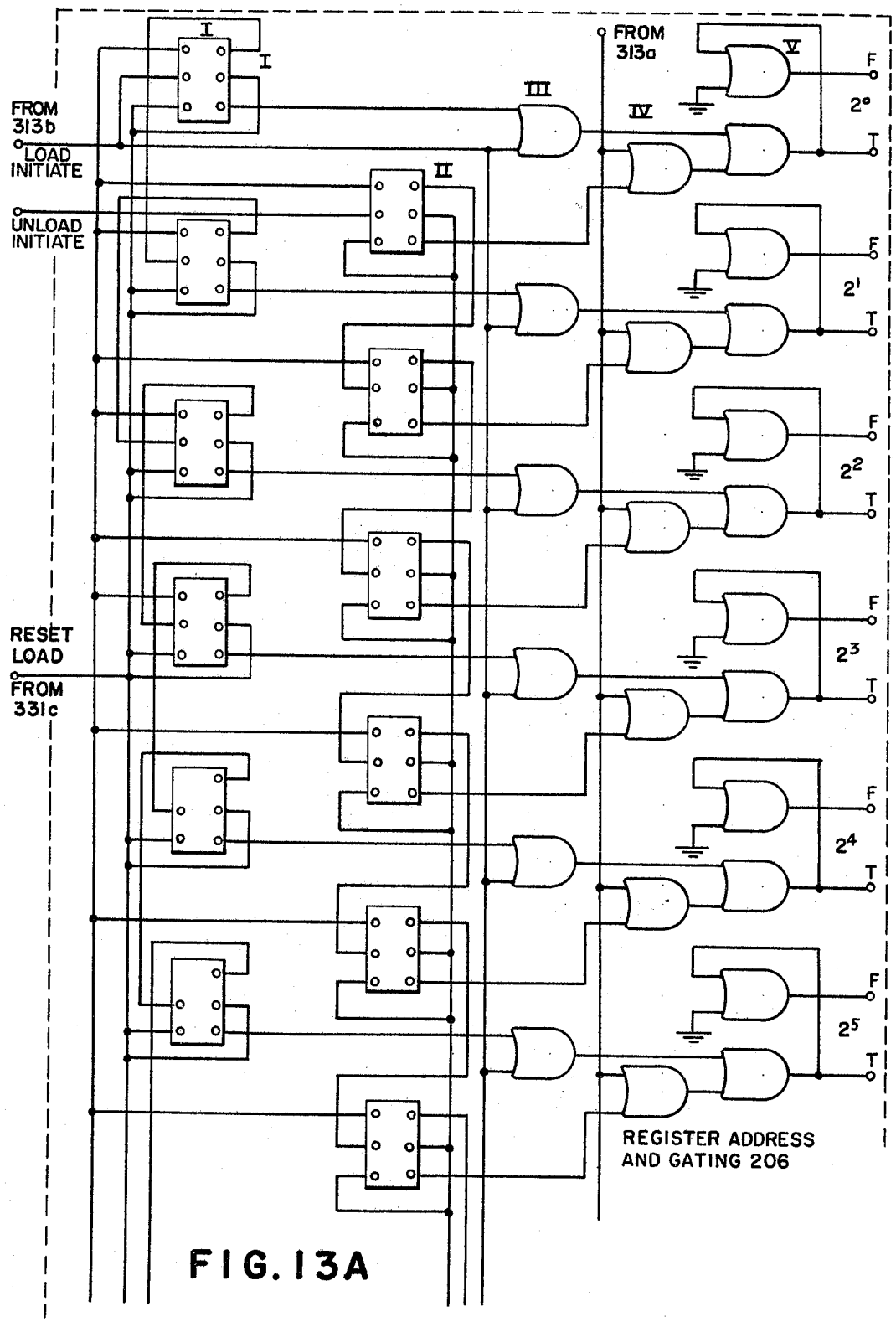

Dec. 23, 1969   J. J. TORTORICI ET AL   3,485,150
CONTROL FOR PHOTOCOMPOSING APPARATUS
Filed Dec. 29, 1966   63 Sheets-Sheet 16
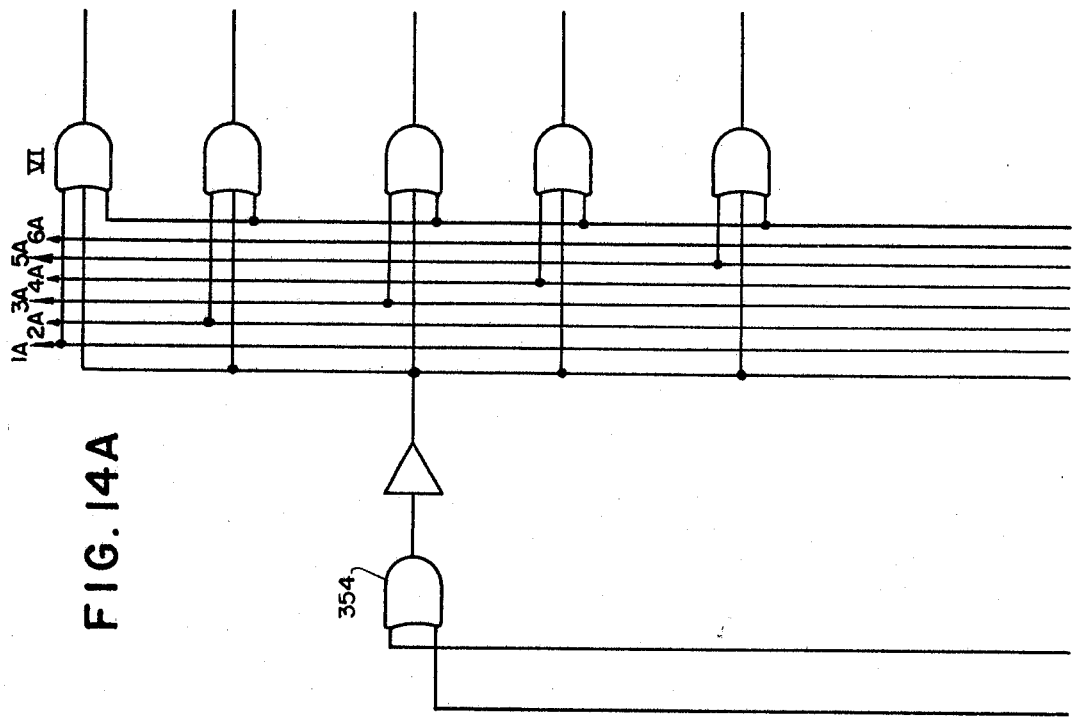
FIG.14A
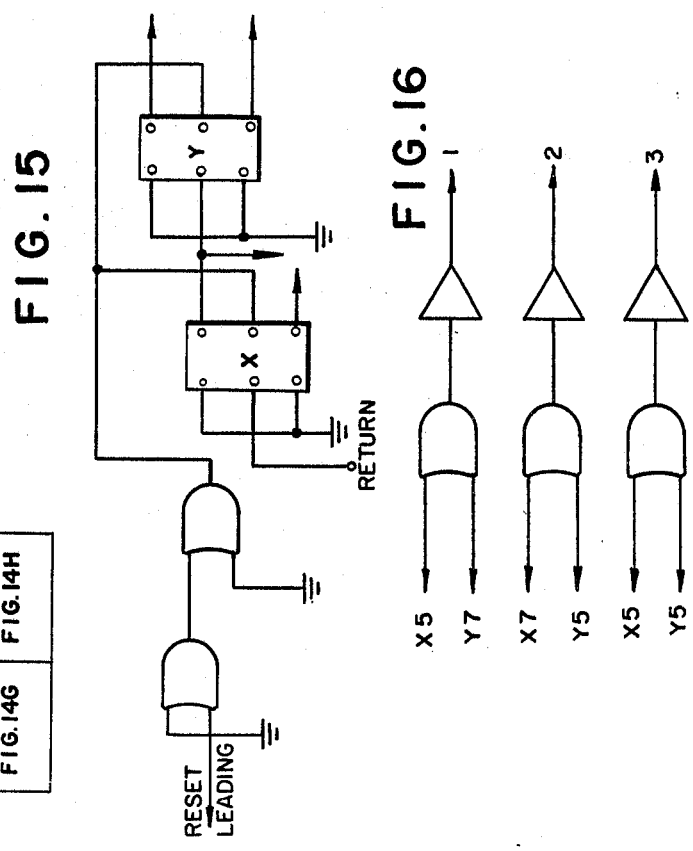
FIG.14I
| FIG.14A | FIG.14B |
| FIG.14C | FIG.14D |
| FIG.14E | FIG.14F |
| FIG.14G | FIG.14H |
FIG.15
FIG.16

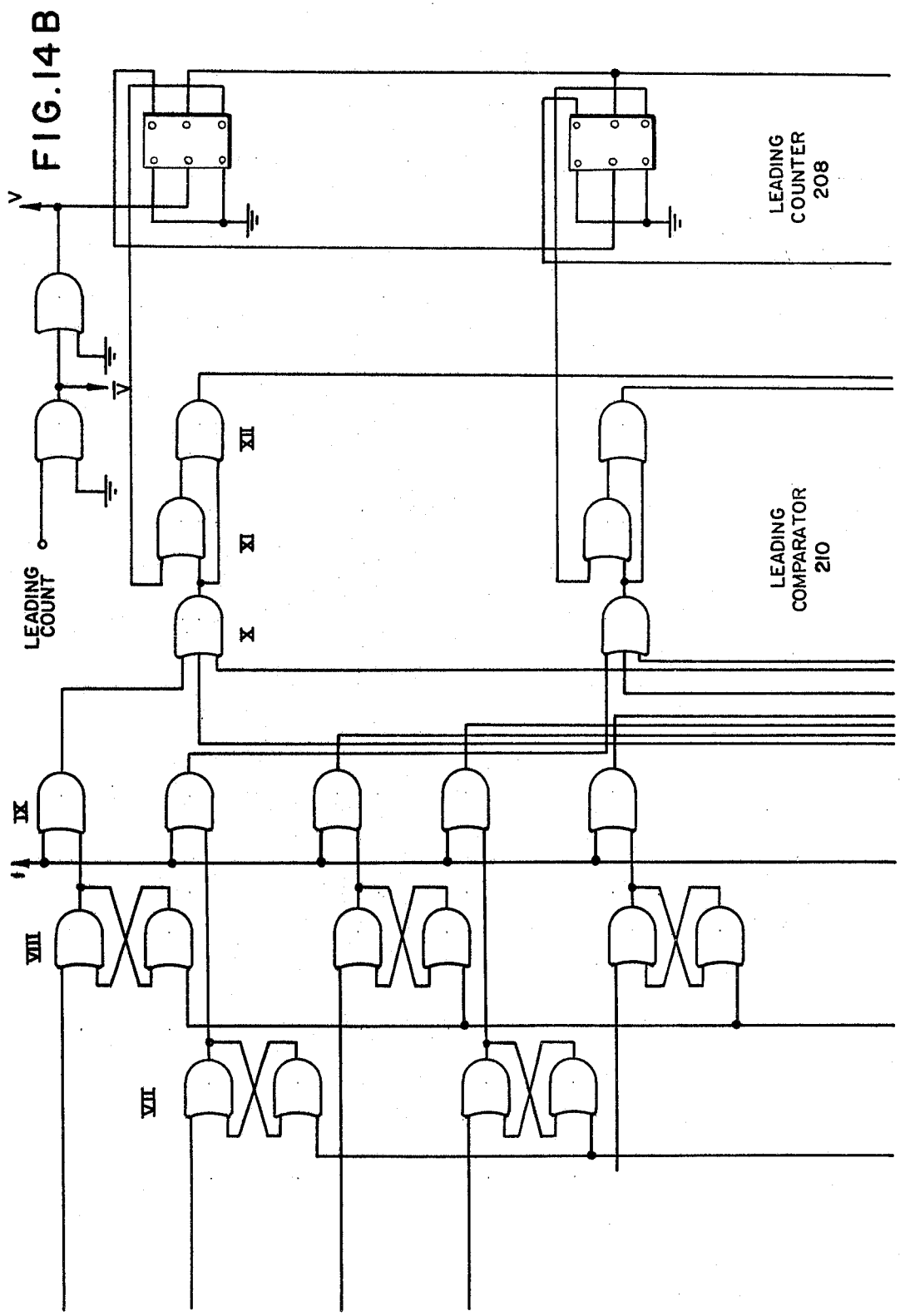

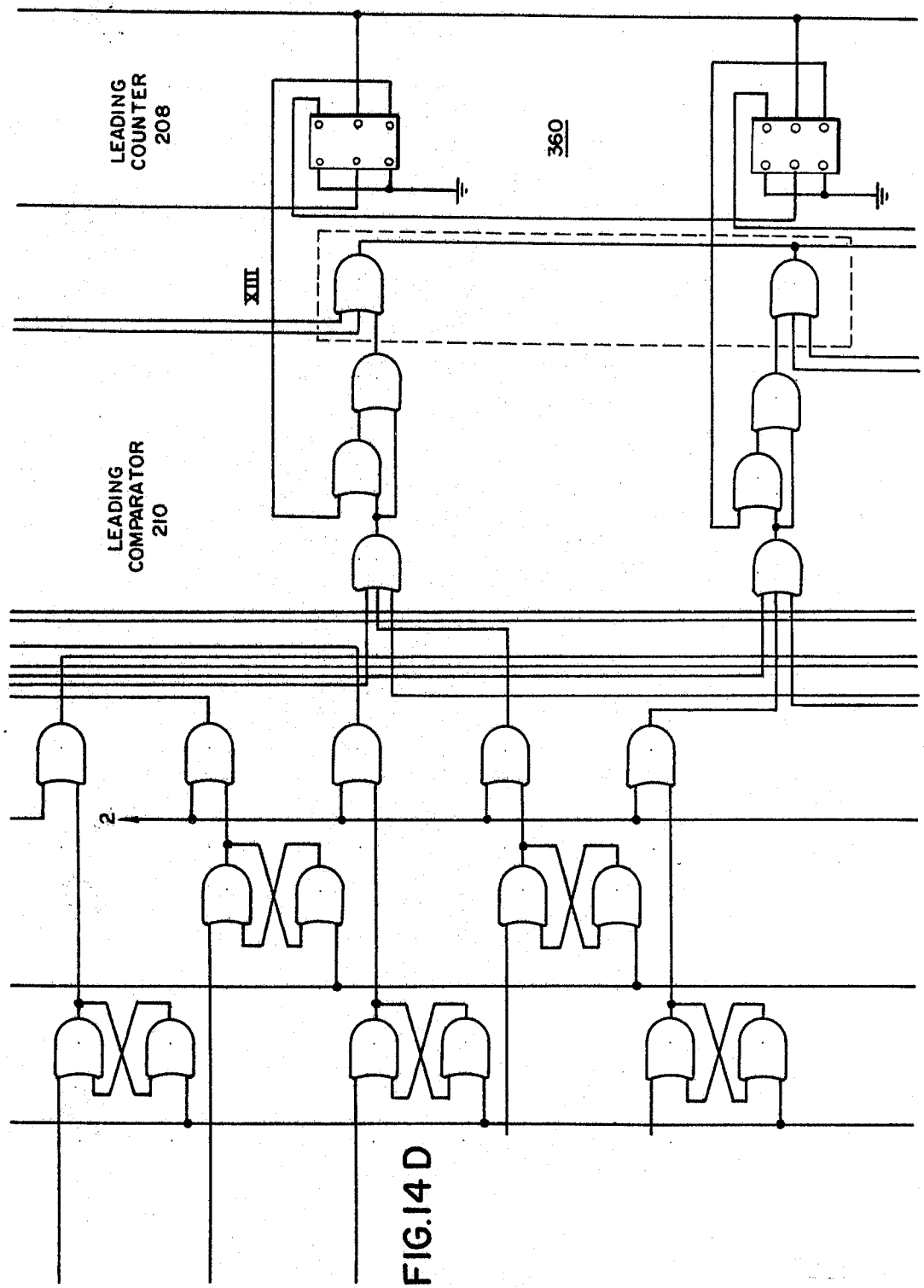

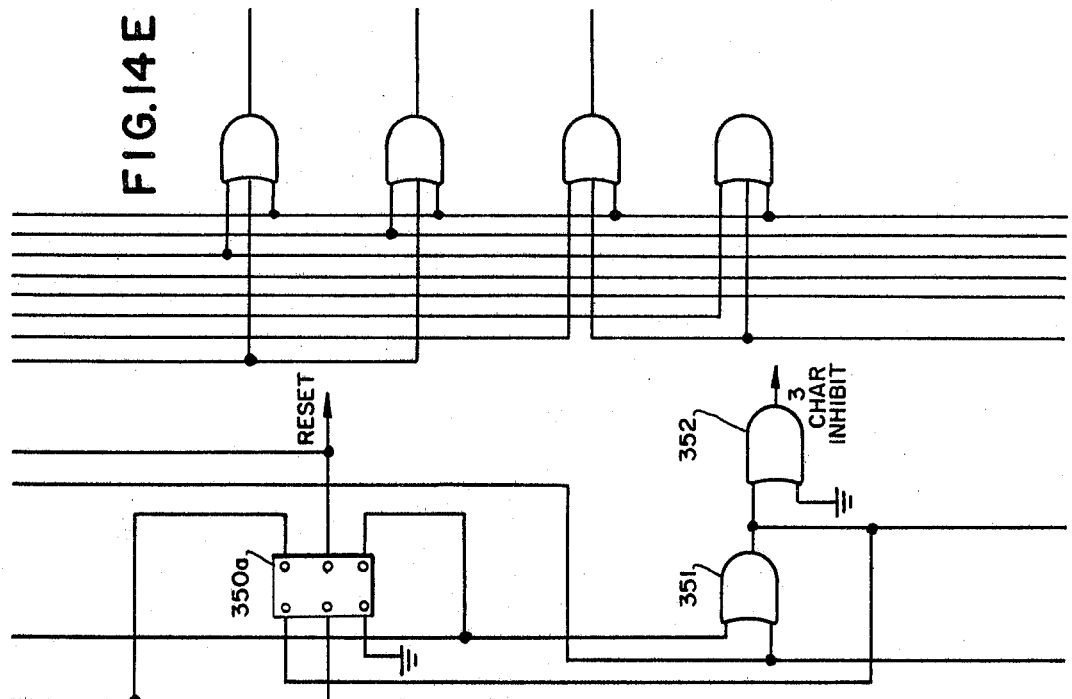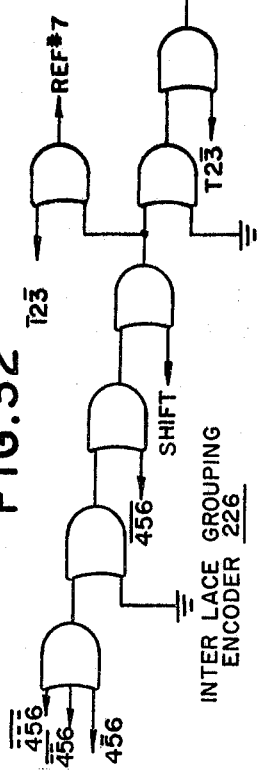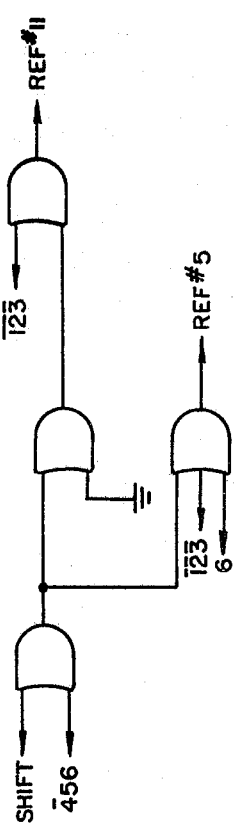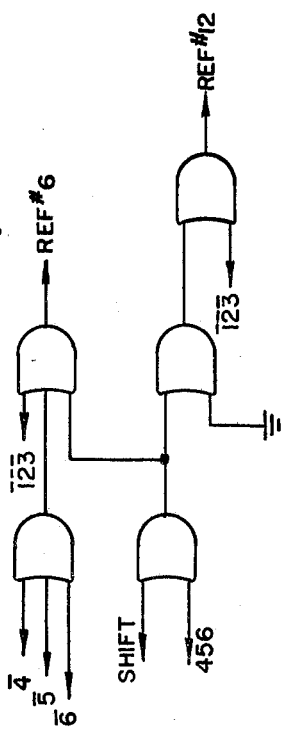

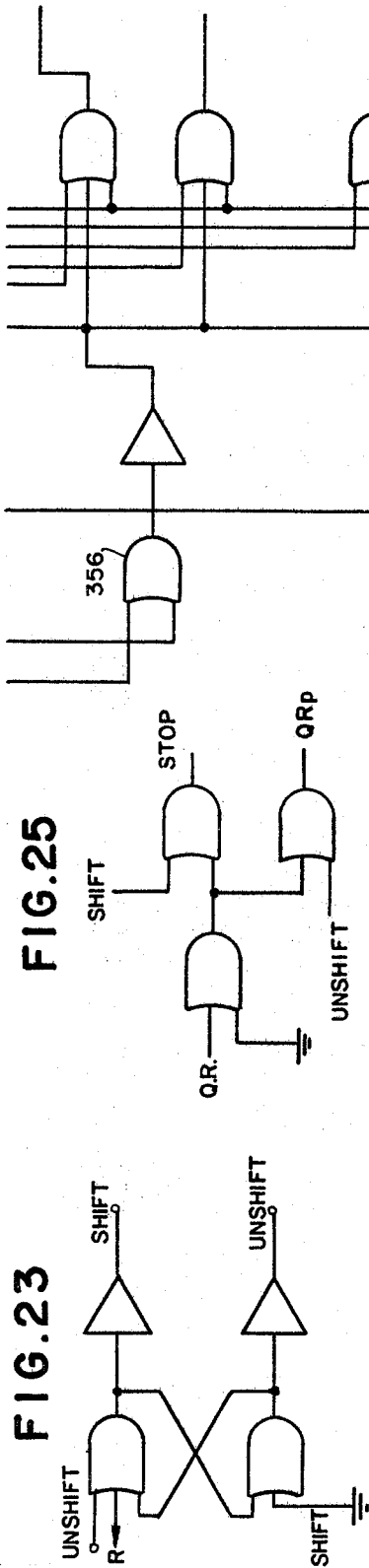

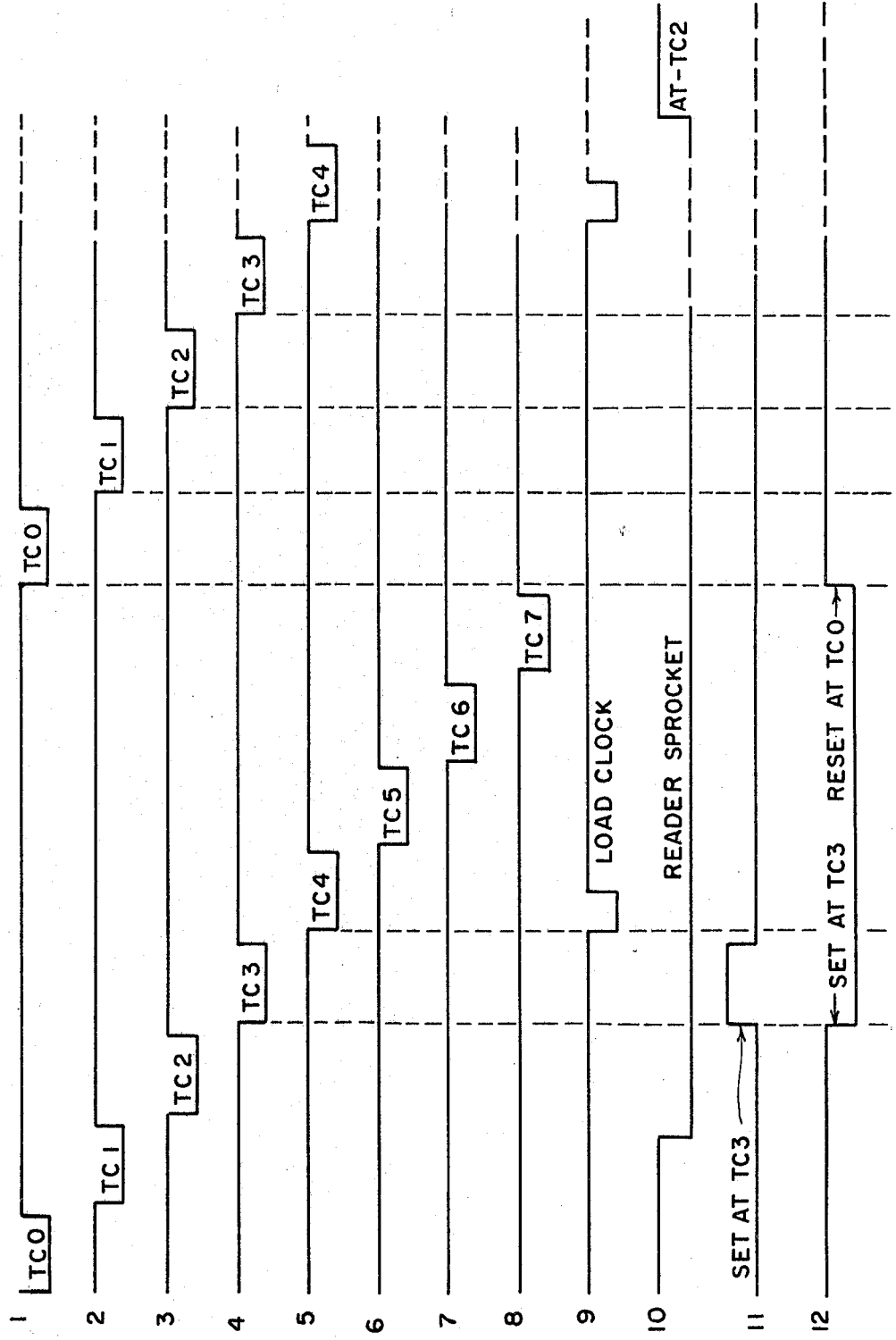

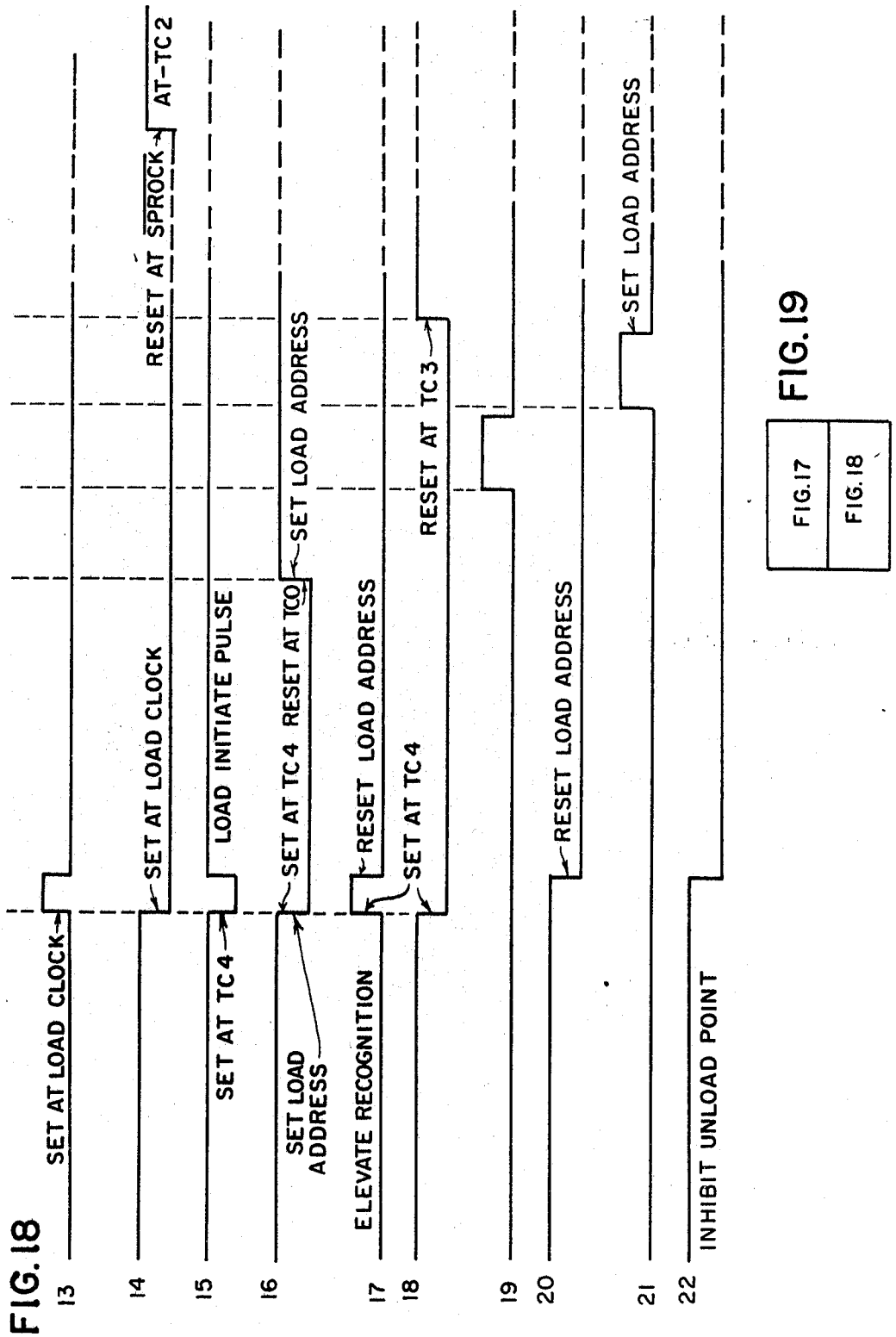

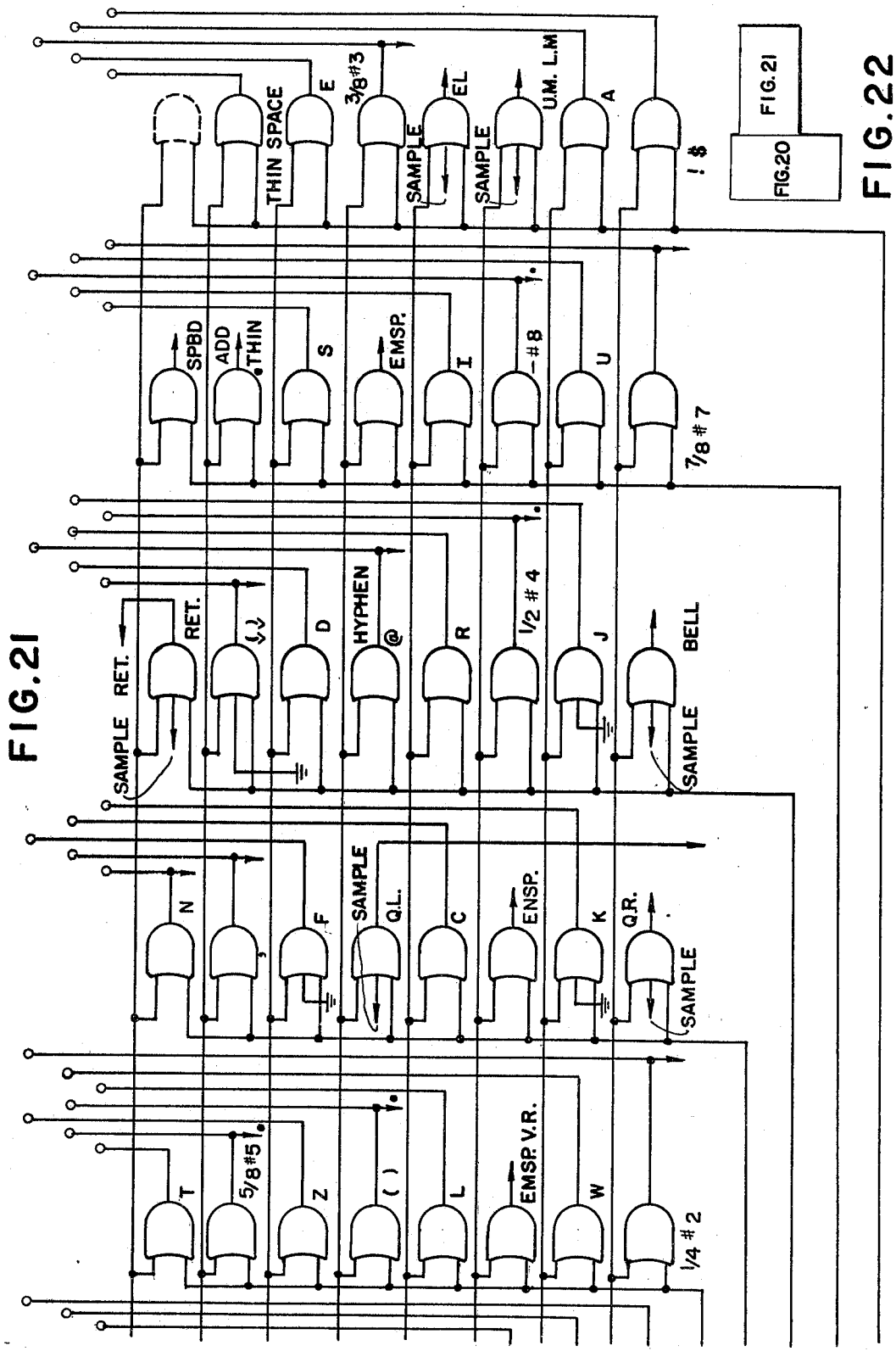

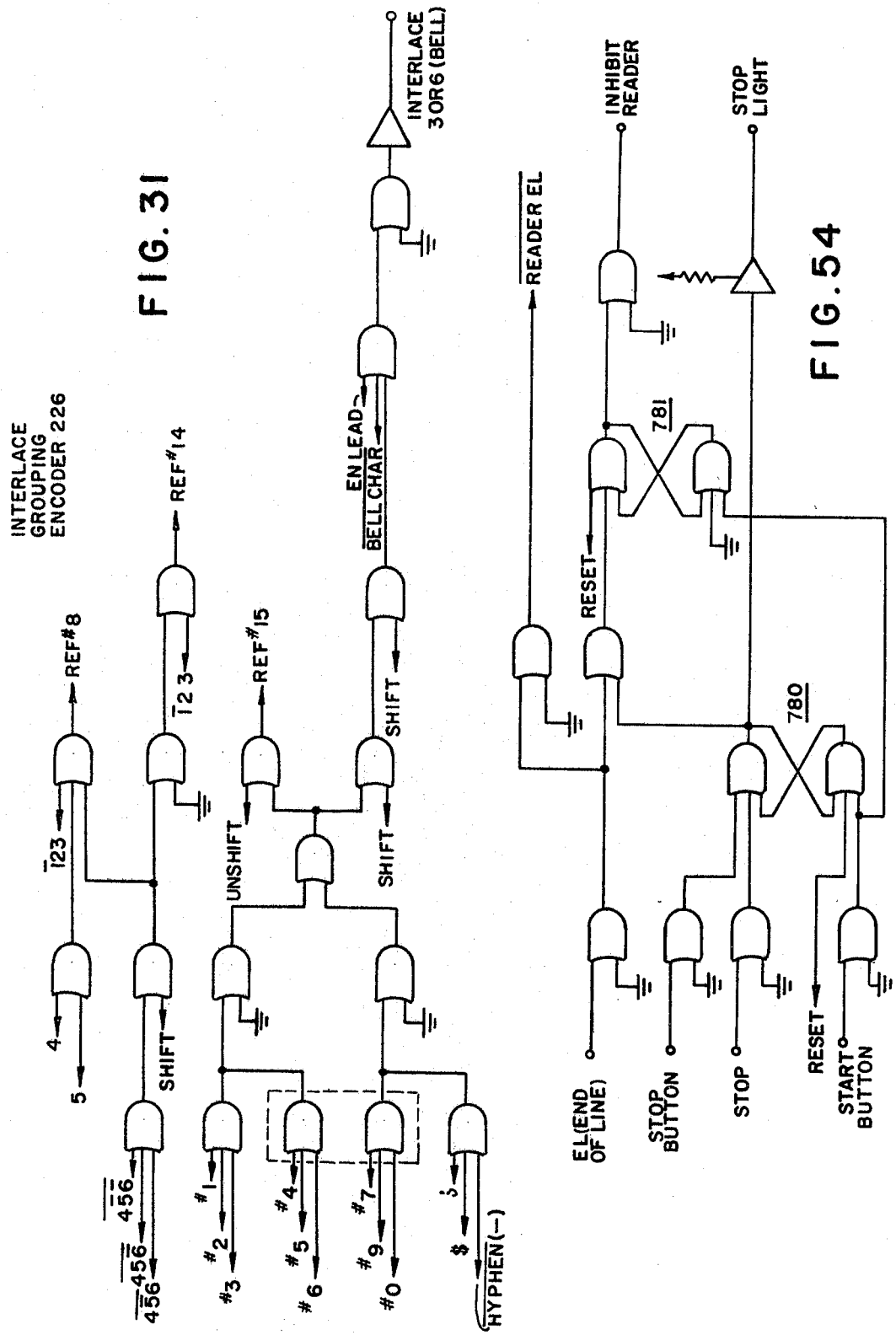

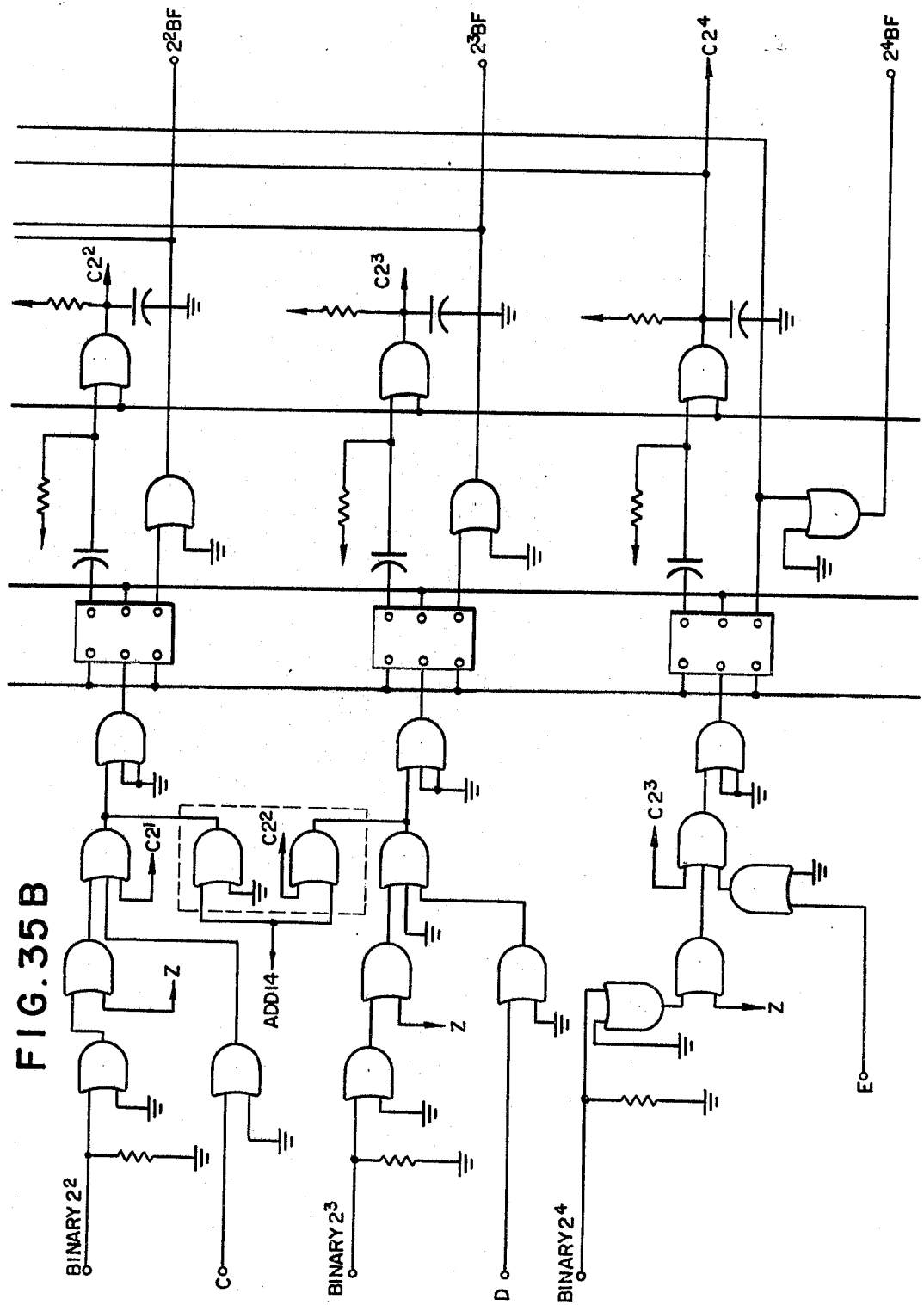

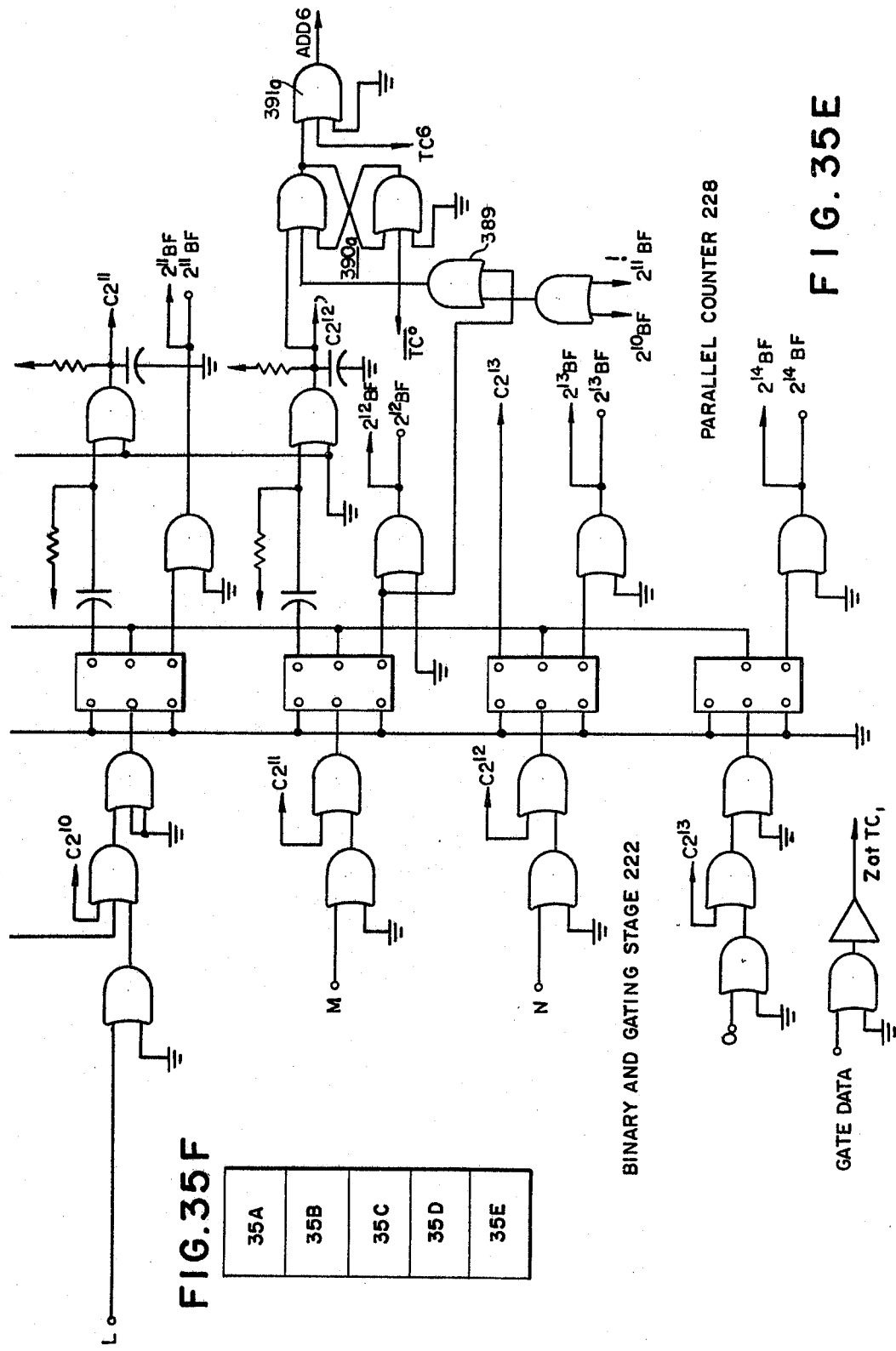

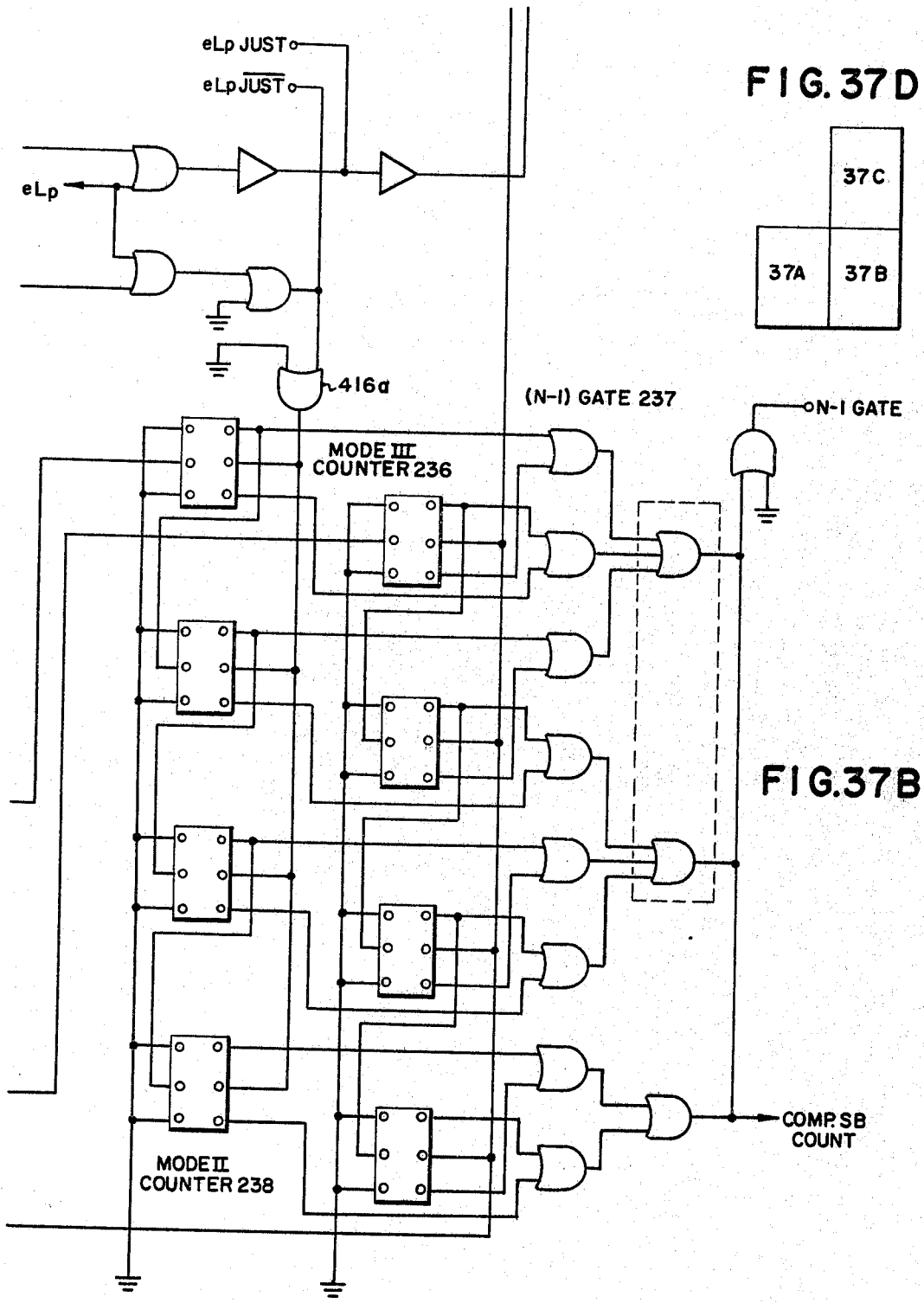

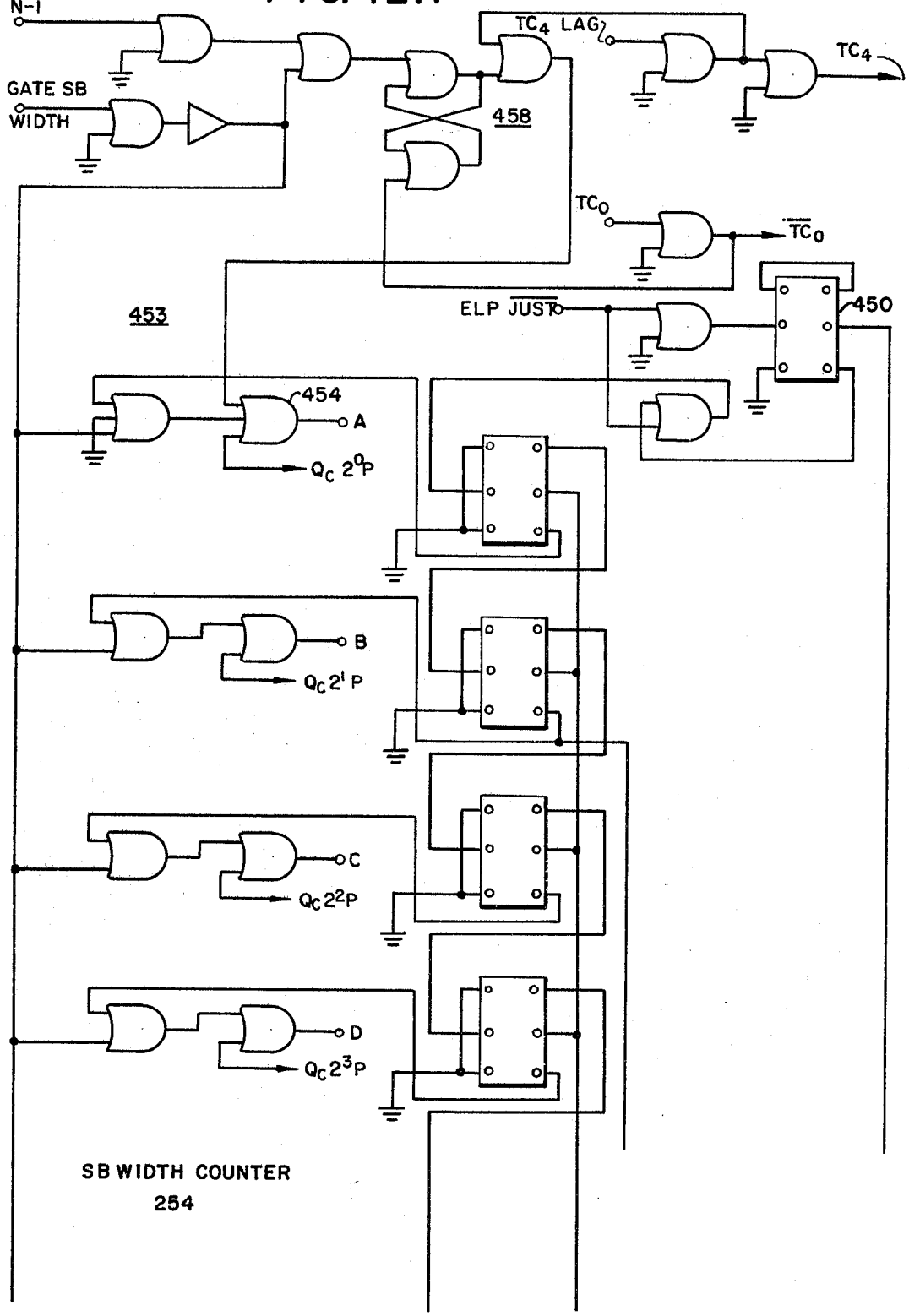

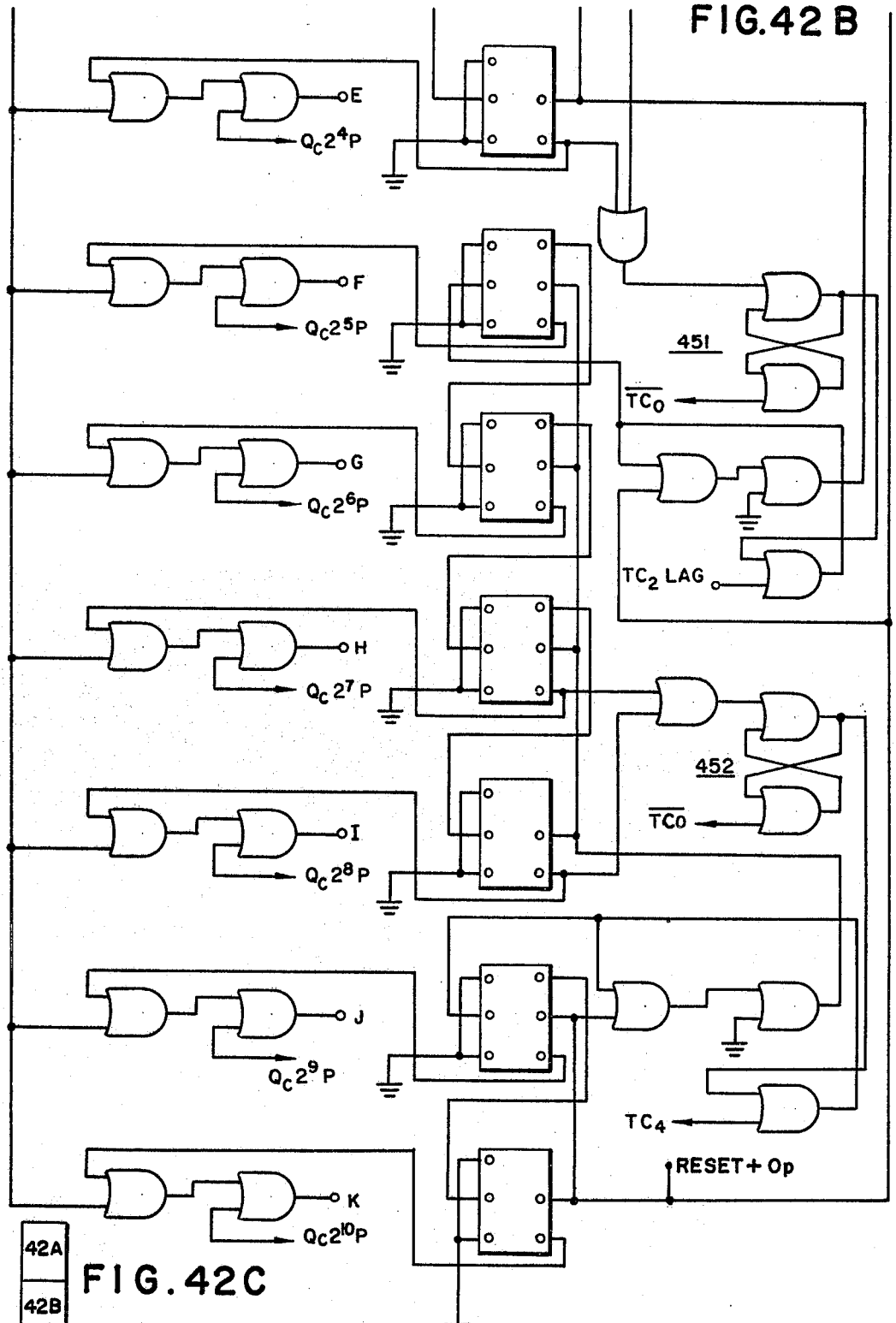

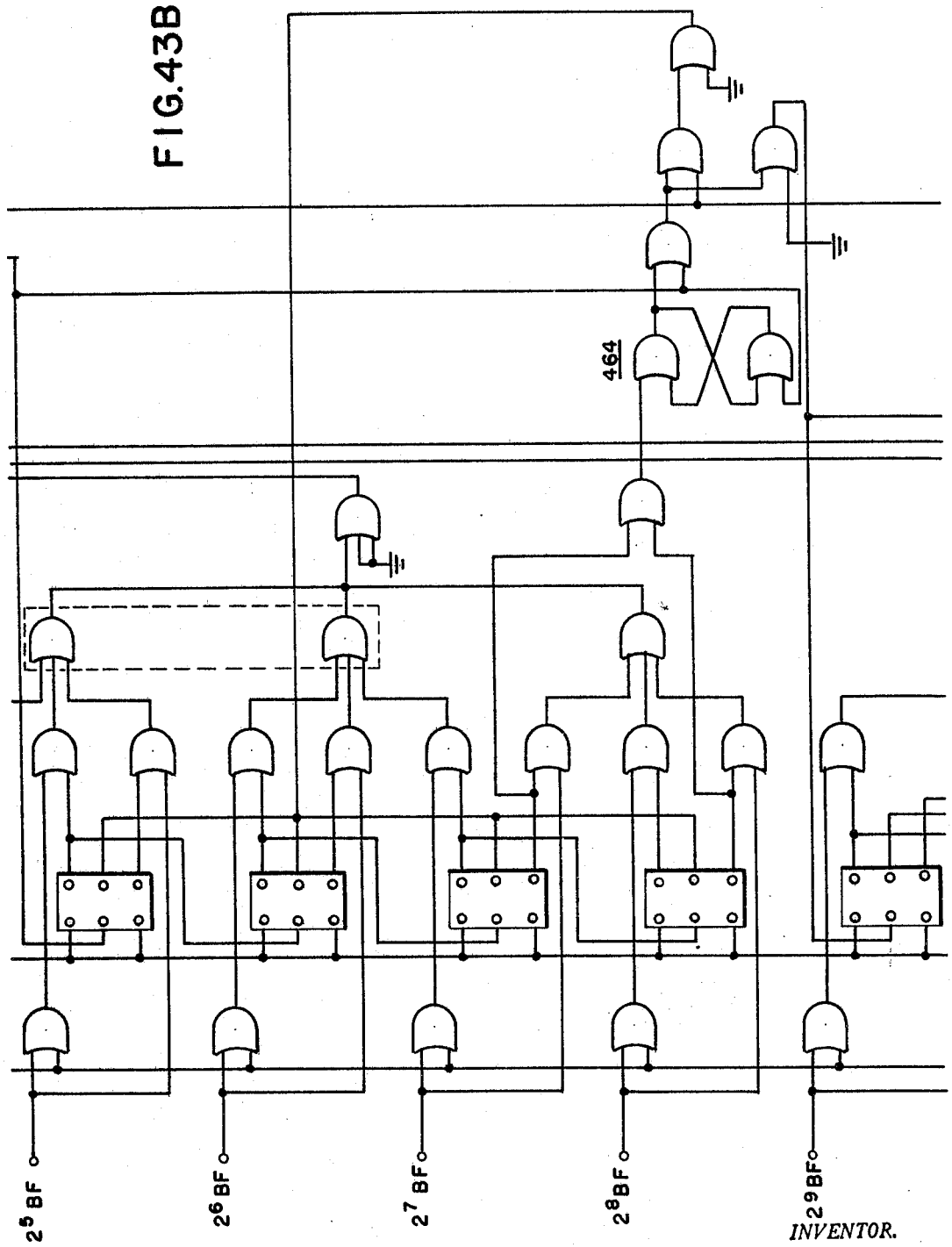

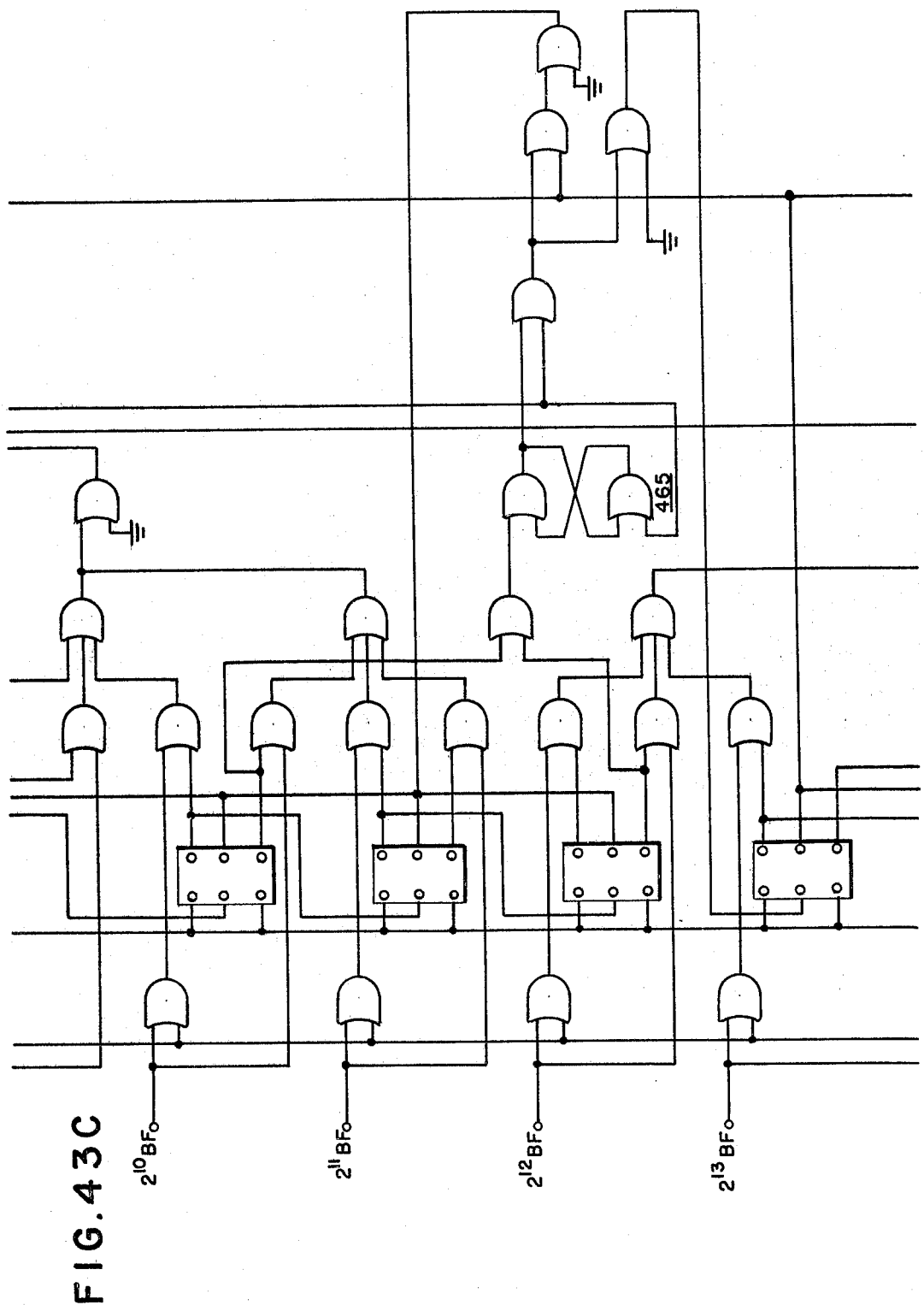

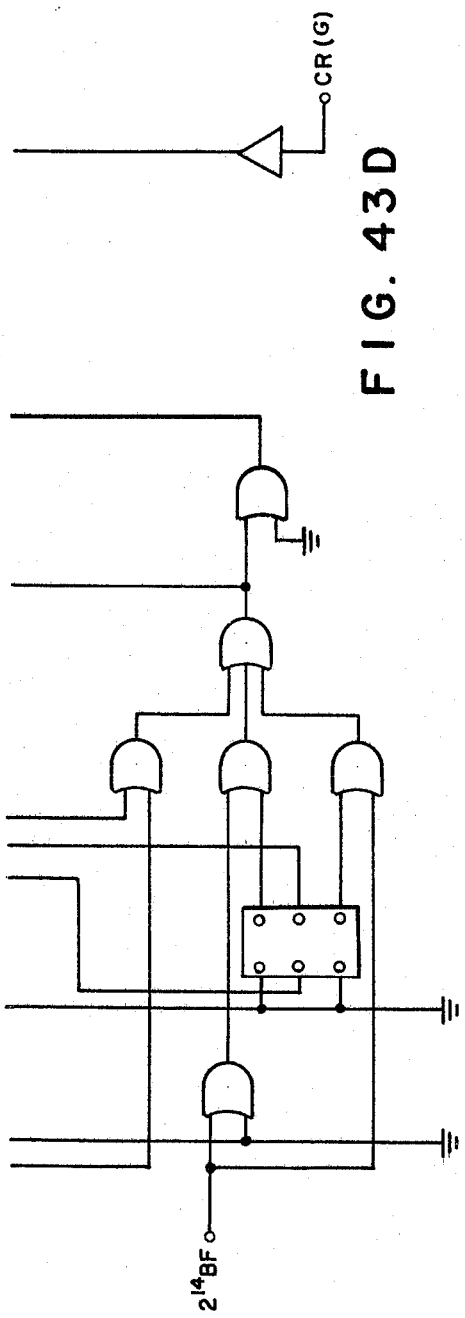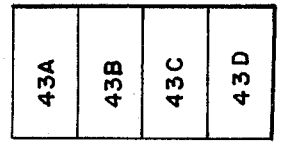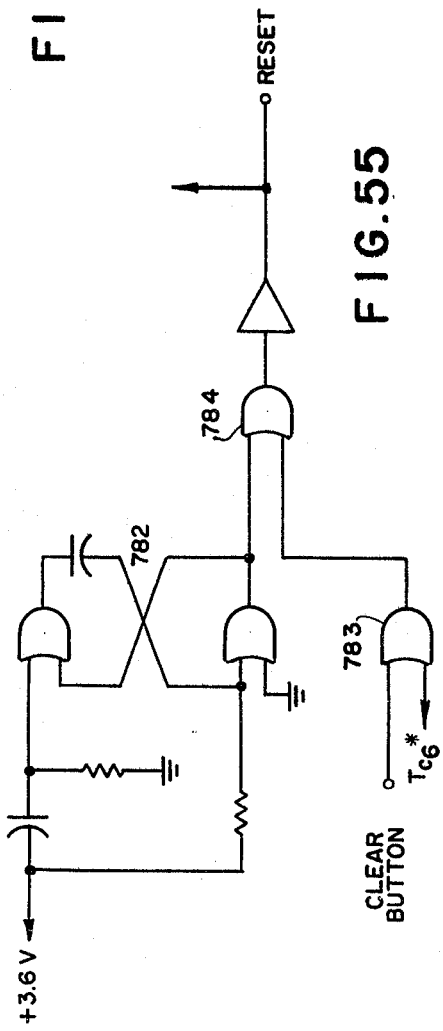

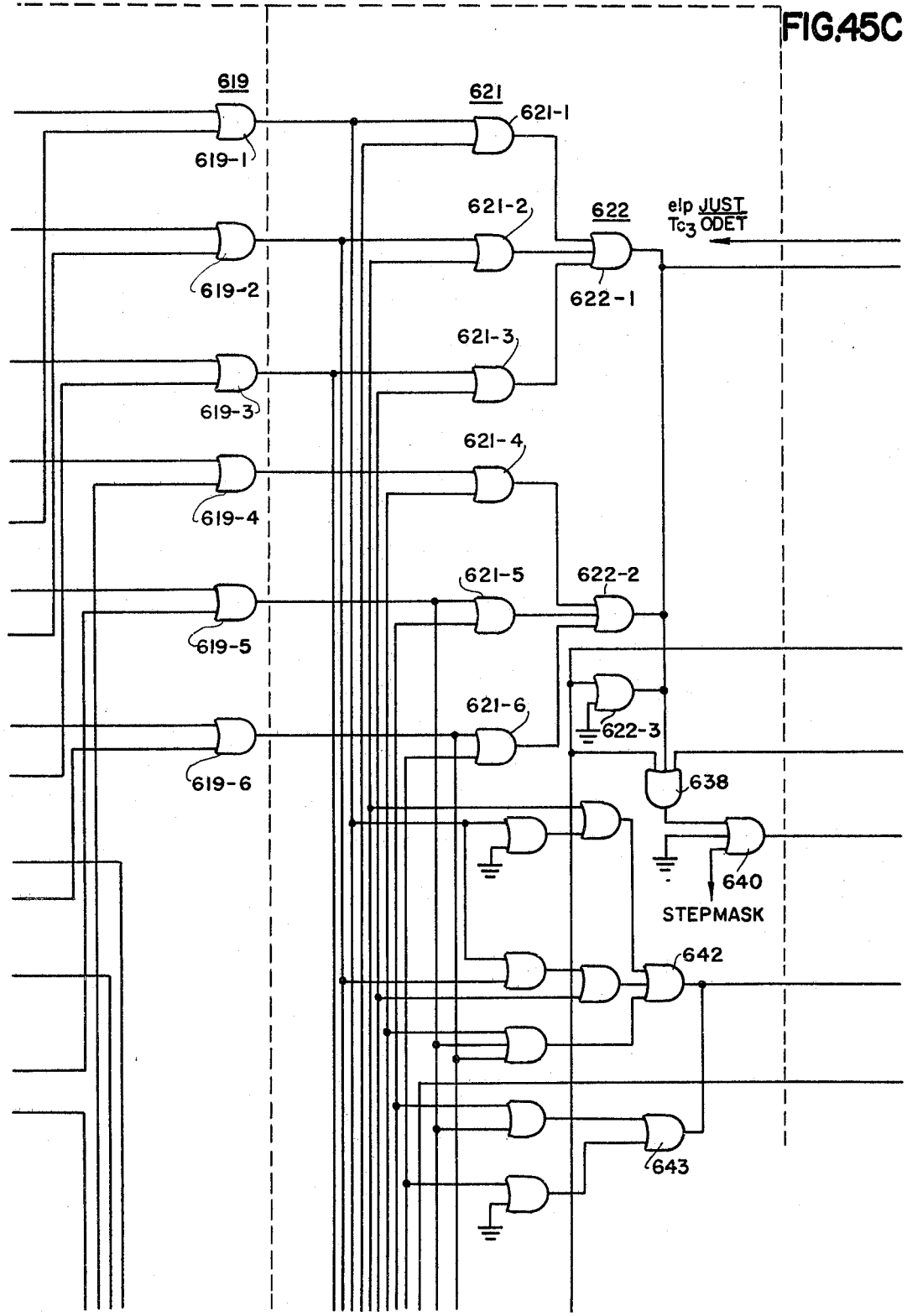

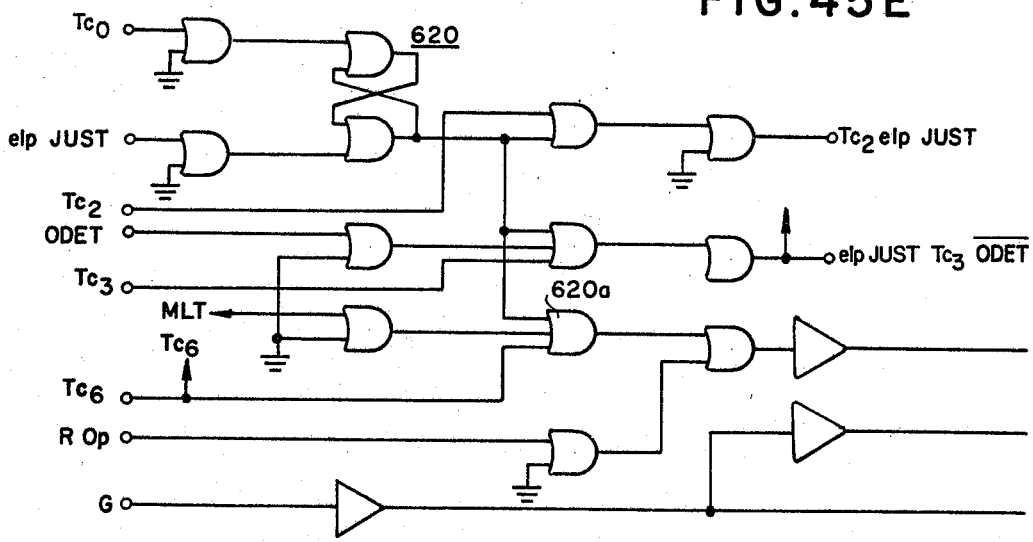
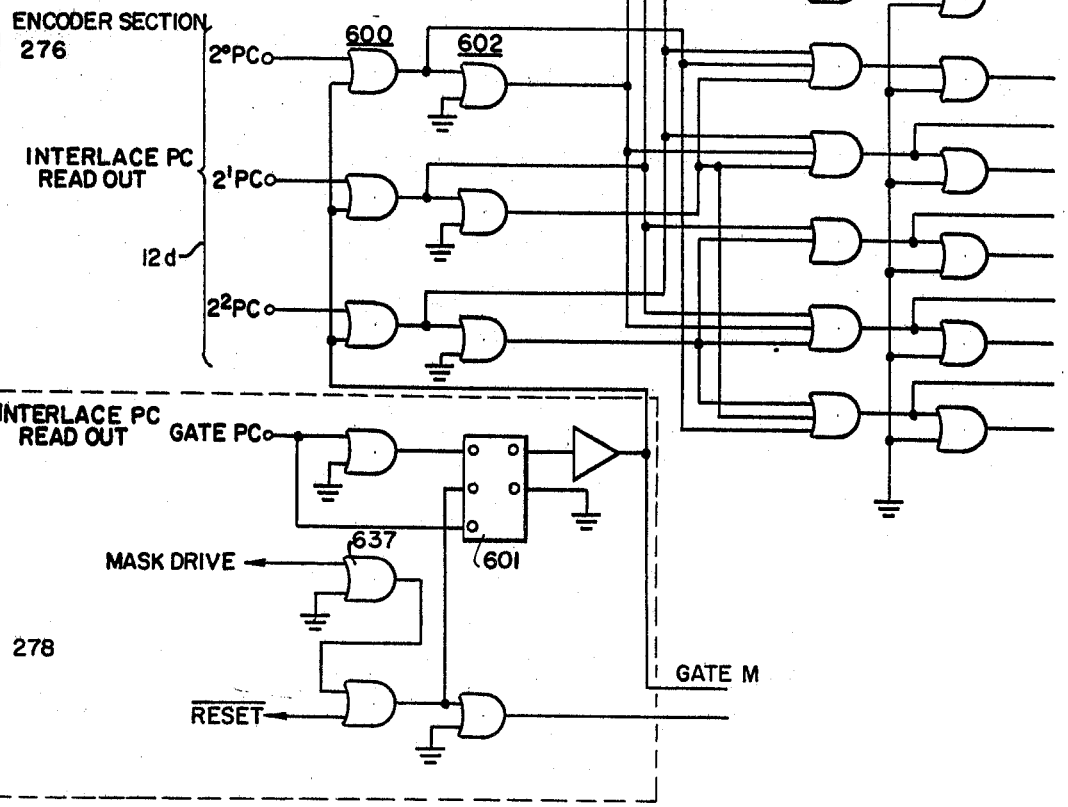
FIG. 45E

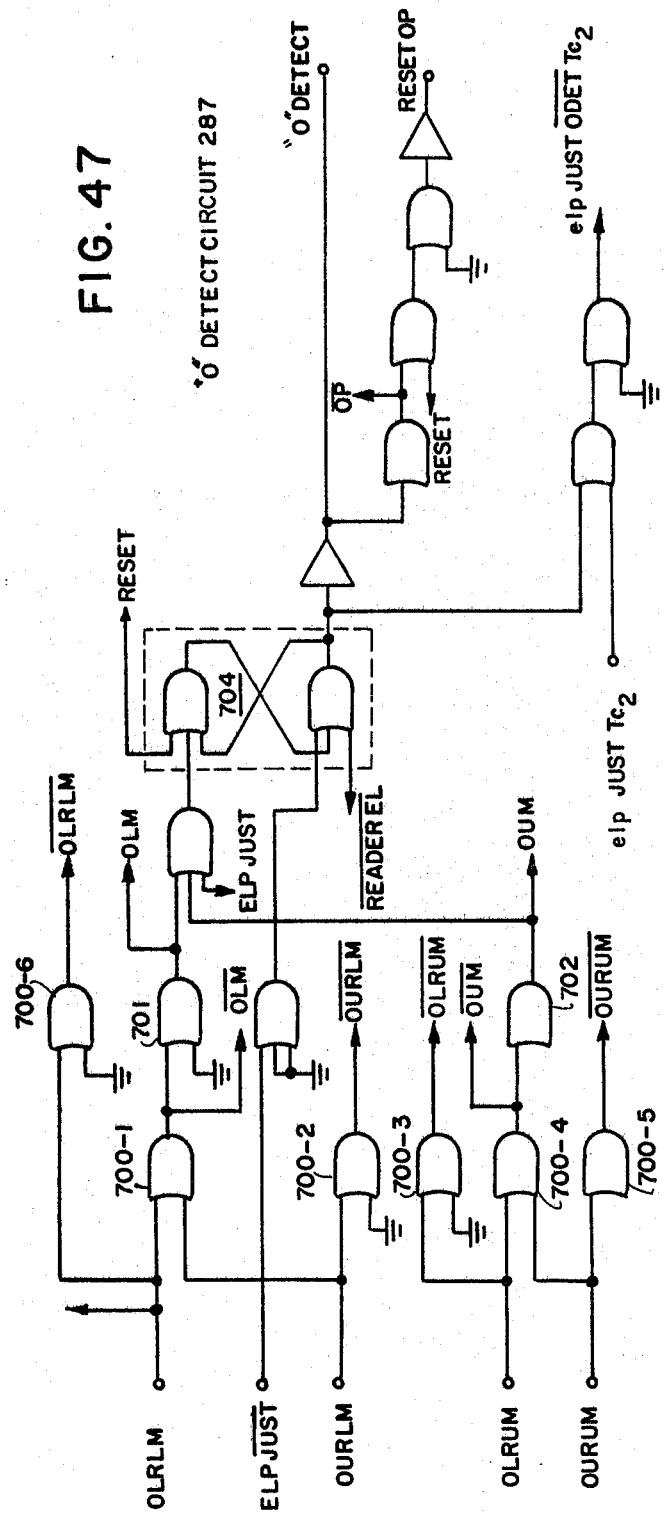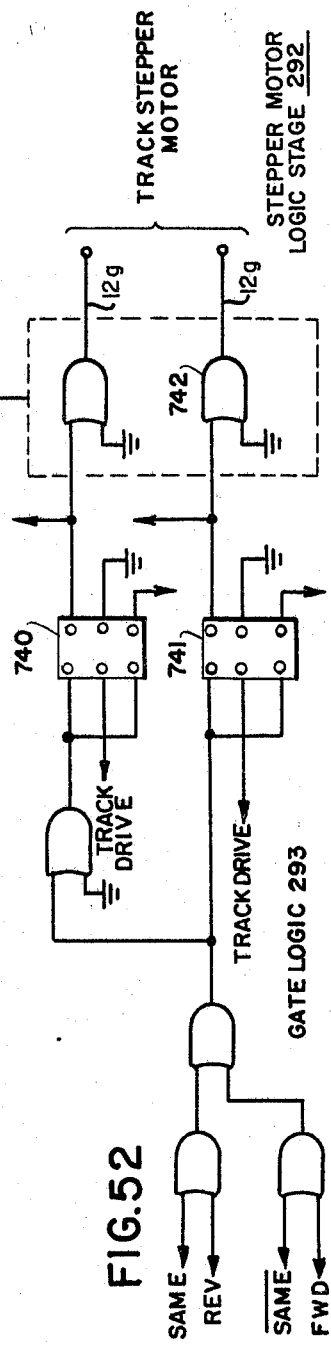
FIG. 47
FIG. 52

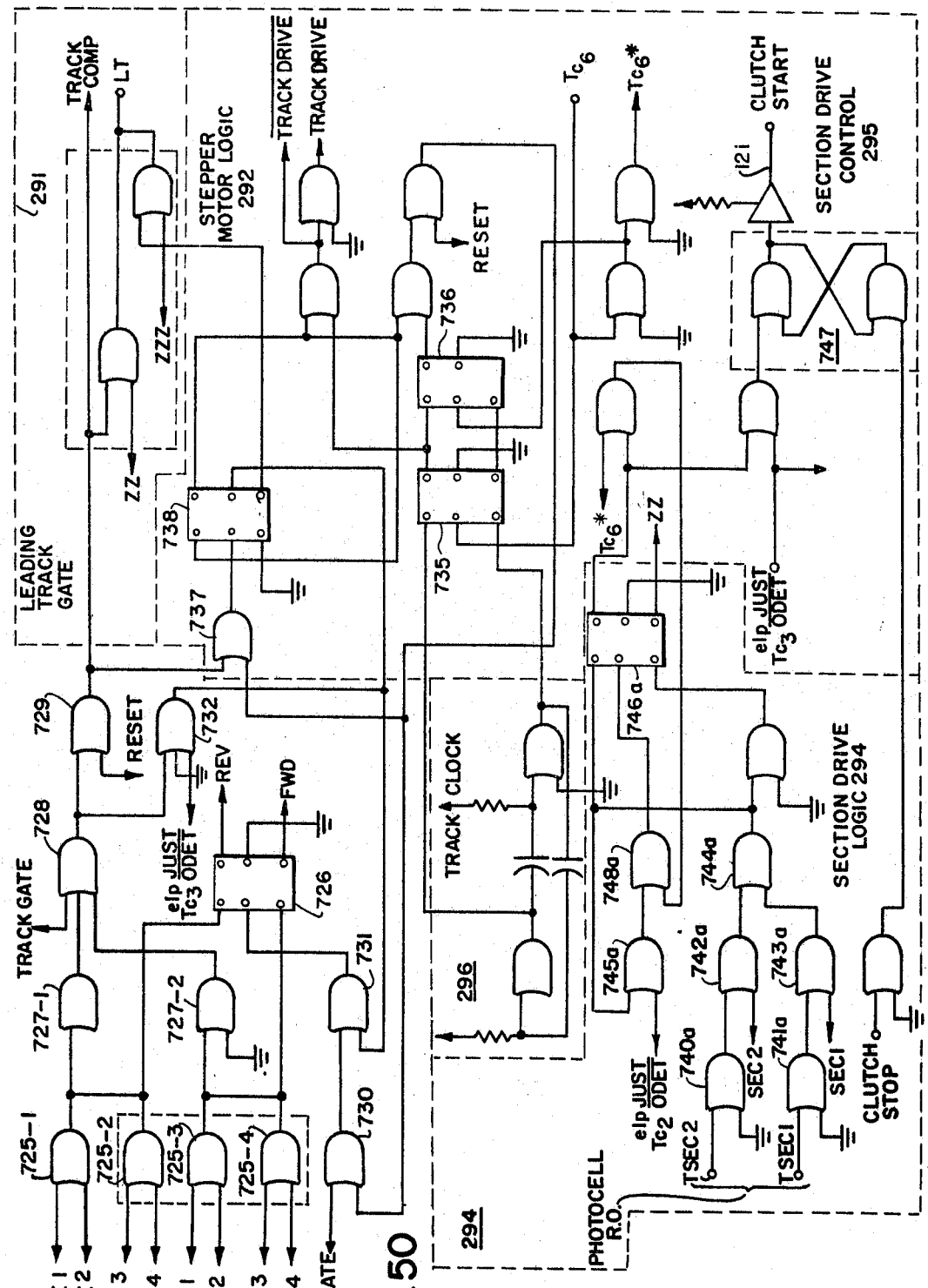

United States Patent Office 3,485,150
Patented Dec. 23, 1969

3,485,150
CONTROL FOR PHOTOCOMPOSING APPARATUS
John Joseph Tortorici, Plainview, Jaroslav Terleckyj, Bayside, N.Y., and Carl Olavi Markkanen, Hasbrouck Heights, N.J., assignors to The Fairchild Camera and Instrument Corporation, Syosset, N.Y., a corporation of Delaware
Filed Dec. 29, 1966, Ser. No. 605,887
Int. Cl. B41b *13/00, 15/00*
U.S. Cl. 95—4.5
21 Claims

ABSTRACT OF THE DISCLOSURE

Apparatus responsive to coded input signals for controlling the photocomposition of text line-by-line on film. A comparator for comparing, in turn, the assigned code of any single character, which the photocomposing apparatus has ready for projection onto the film, with the signals representing each character in the line of text being composed. Coincidence may occur one or more times, indicating that the ready character is required to be projected one or more times to compose the line in question. In such event, the control apparatus enables one or more discrete illuminations of the character at specific predetermined intervals whereby its image is sequentially projected onto the film in each assigned position wherein it occurs in the line being composed.

---

This invention relates to photocomposing apparatus. More particularly, it relates to digital computer means for controlling line composing in an apparatus for line-by-line text composing on a photosensitive medium from coded input electrical signals representative of the characters of text to be composed.

In heretofore proposed types of line-by-line photocomposing apparatus, one type of such apparatus has comprised a font drum or tape having a number of columns of characters equal in number to the number of character positions in the line to be composed, together with a large number of high-intensity flash lamps for individually illuminating a character in each column as selected by information processing equipment. The illuminated character is then projected directly onto a photosensitive film by a stationary optical system. An equipment of this type involving xerographic composing is described in Patent 2,726,940 to Buhler. This type of apparatus has presented the disadvantages of requiring an undesirably large type font for any reasonable variety of font characters, the high cost occasioned by the need for a great multiplicity of flash lamps and associated control circuits therefor, the relatively slow speed of composition, and the inability to justify the composed text.

Another type of heretofore proposed line-by-line photocomposing apparatus has been one which comprises a font in the form of a stationary plate having rows of characters individually illuminated by a series of flash lamps. In the operation of this apparatus, illuminated characters are projected onto a photosensitive film at a selected position by means of a movable optical system. A system of this type is exemplified in Patent 3,188,929 to Higonnet. As in the case of the previously described apparatus, the use of the latter apparatus also presents the disadvantages of requiring a large and bulky type font, a costly and complex illuminating system, and the requirement of a complex and costly computer.

In both of the above-described known apparatus, the successive different characters are projected either in the same order in which they appear in a line of text being composed as in the aforesaid Patent 2,726,940 or in the order in which the characters occur in the font. Moreover, in the system of Patent 2,726,940, only a single character is projected during each cycle of operation of the device while in the system of Patent 3,188,929, the entire font is scanned across the line in each cycle of apparatus, thereby materially limiting the speed of composing in both systems. Such speed limiting is readily appreciated when it is considered that, ordinarily, several characters will occur repeatedly in any given line of text.

In copending U.S. patent application, S.N. 605,749 of Samuel W. Levine for Photocomposing Apparatus, filed Dec. 29, 1966 and assigned to the assignee of this application, there is provided a new and improved photocomposing apparatus which overcomes the disadvantages of the hereinabove described known photocomposing apparatus. This new apparatus is one for composing in text line-in-line on a photosensitive medium from coded input electrical signals representative of the characters of text to be composed and the sequential position or positions of each character in a line. It comprises an endless strip of material having a longitudinally arranged font of characters effectively spaced by approximately the length of a composed line, such characters and their surrounding background being extremes respectively of optical densities. Means are included for continuously moving the font strip at a substantially constant velocity, and means are provided which are capable of illuminating a single given character during its travel effectively over approximately a length of a line, the light through such character when it is illuminated being effective to act upon a photosensitive medium cooperatively associated therewith. The apparatus further comprises sensing means for developing a position signal continuously representative of the instantaneous position of such given character during the movement of the font strip and means jointly responsive to the position signal and to signals derived from the coded input signals for momentarily exciting the illuminating means when the two signals are in time coincidence.

With this apparatus, the disadvantage of bulkiness of the type font and high cost of the complex illuminating system presented in the use of known photocomposing apparatus is substantially obviated. In addition, in the operation of the new apparatus, there is enabled the projection onto the photosensitive medium of each character as many times as it occurs in a given line of text within a single cycle of operation of the apparatus.

It is an object of this invention to provide data processing means for controlling the text composing in the above-described apparatus, disclosed in the aforementioned copending application, S.N. 605,749.

It is another object to provide data processing means in accordance with the preceding object which is relatively simple and flexibly adaptable to a great diversity of text-composing requirements.

According to the invention, there is provided in an apparatus for composing text line-by-line on a photosensitive medium from coded input electrical signals, representations respectively representative of the characters of said text to be composed wherein the apparatus comprises an endless strip of material having a longitudinally arranged font of characters and which is continuously moved at a substantially uniform velocity, means capable of illuminating a single given character during its travel effectively over approximately a length of line, the light through the given character when illuminated being effective to act upon the photosensitive medium which is cooperatively associated therewith, sensing means for developing a position signal continuously representative of the instantaneous position of the character during the movement of the font strip, means jointly responsive to a position comparison signal representative of an agreement between the aforesaid instantaneous position and the line position of a like character and a character comparison signal representative of an agreement of the given character with the like character for exciting the illuminating means, and means for providing comparison signals. The latter means includes memory means for receiving and storing the coded input electrical signals in the order that their respective characters occur on a line to be composed, means for storing the given character to produce its predetermined coded signal, means for comparing the last-named signal with the input coded signals to produce the character comparison signal, means for deriving a signal from the coded input signals representative of the position of the given character on the line, and means for comparing the instantaneous position representative signal with the derived signal to produce the position comparison signal whereby the given character is illuminated in each position wherein it occurs in the line.

For a better understanding of the invention, together with other and further objects thereof, reference is had to the following description taken in connection with the accompanying drawings, and its scope is pointed out in the appended claims.

In the drawing, FIG. 1 is a block diagram of a photocomposing apparatus controlled by the control constructed in accordance with the principles of the invention;

FIG. 3 is a detail view of a portion of one segment of the character fonts;

FIG. 4B is a block diagram of the decoder section;

FIG. 4C is a block diagram of the accumulator section;

FIG. 4D is a block diagram of the unload control section;

FIG. 4E is a block diagram of the number comparator section;

FIG. 4F is a block diagram of the character comparator section;

FIG. 4H is a block diagram of the mask control section;

Figure 13B:
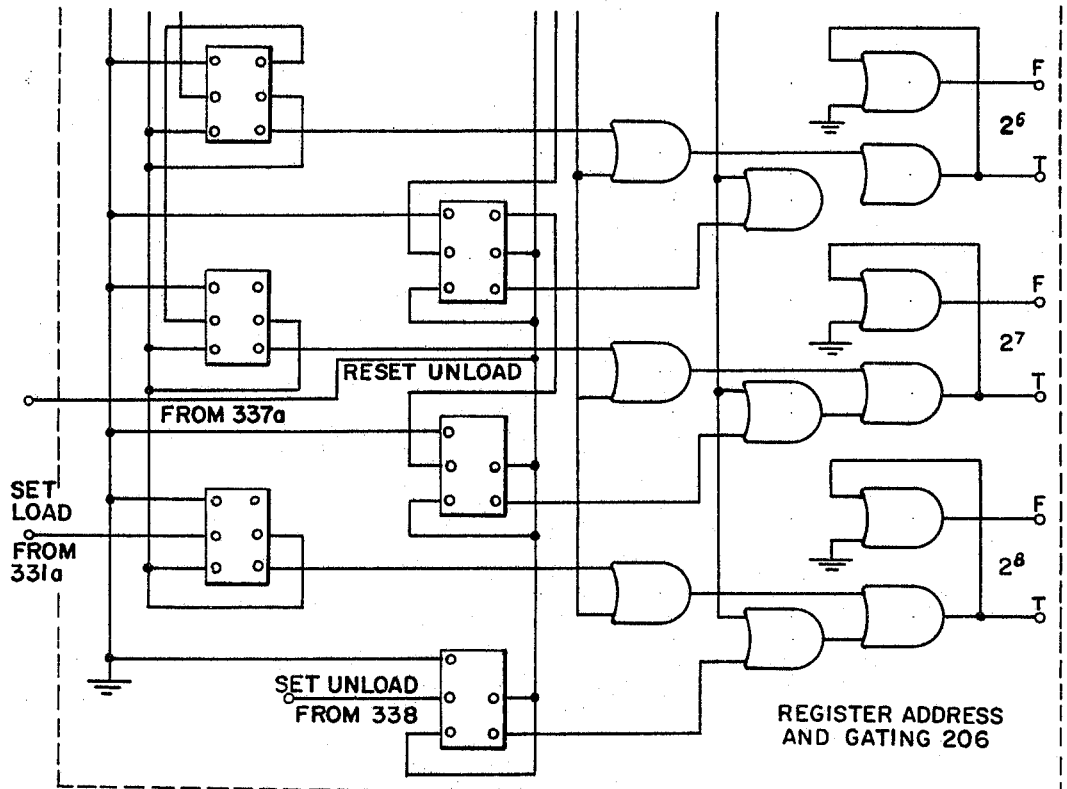
Figure 13C:
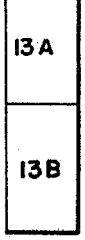
Figures 5A, 5B, 6:
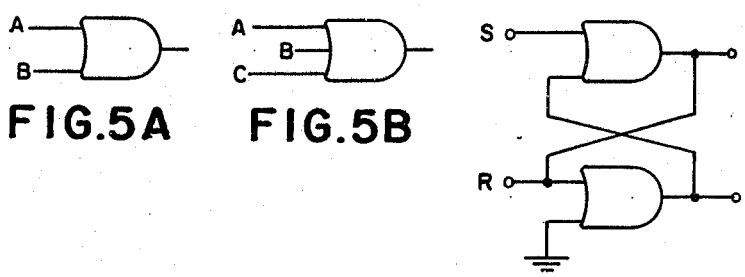
Figure 7:
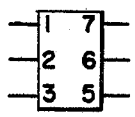
Figure 8:
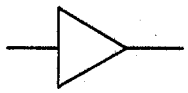
Figure 12:
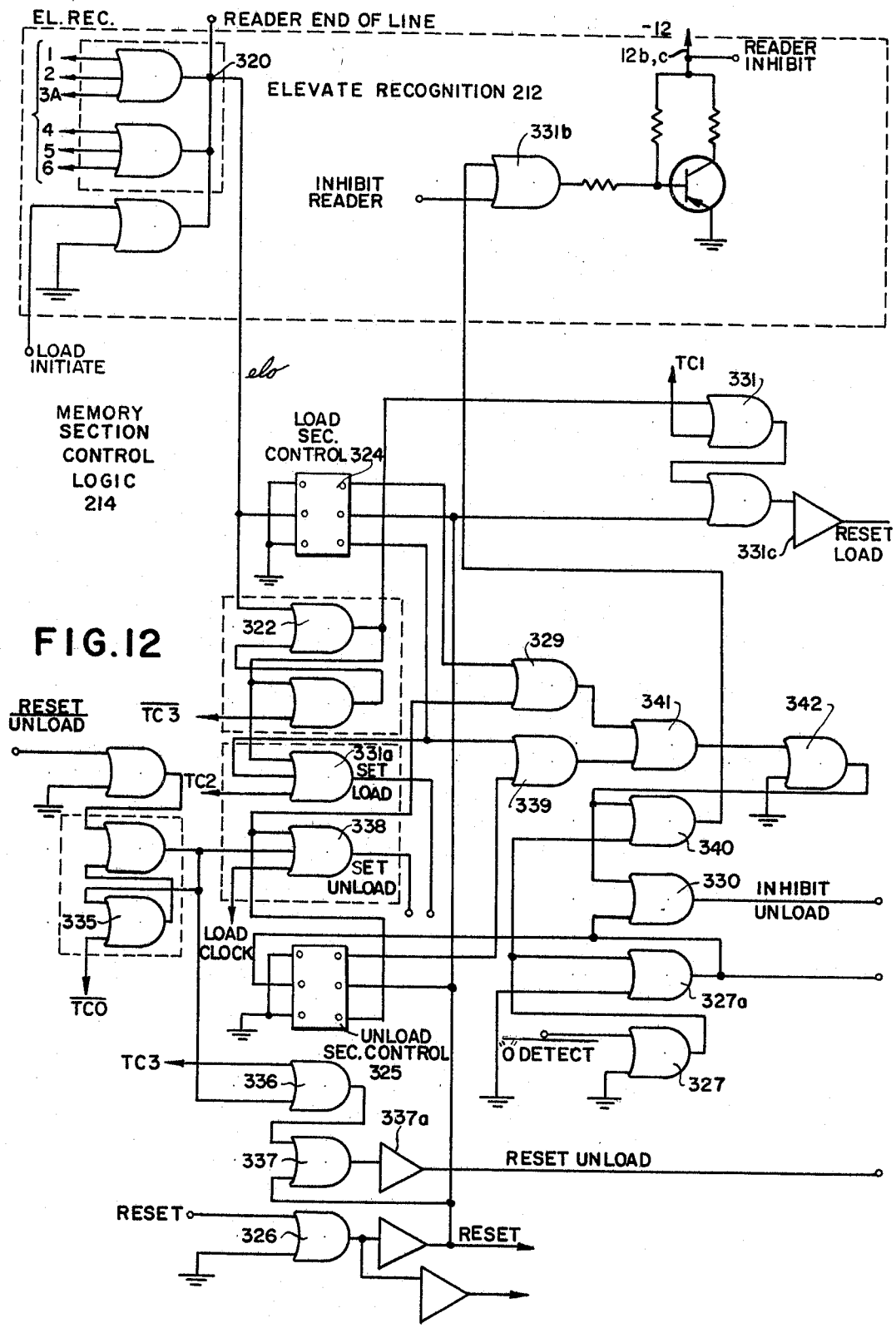
Figure 14F:
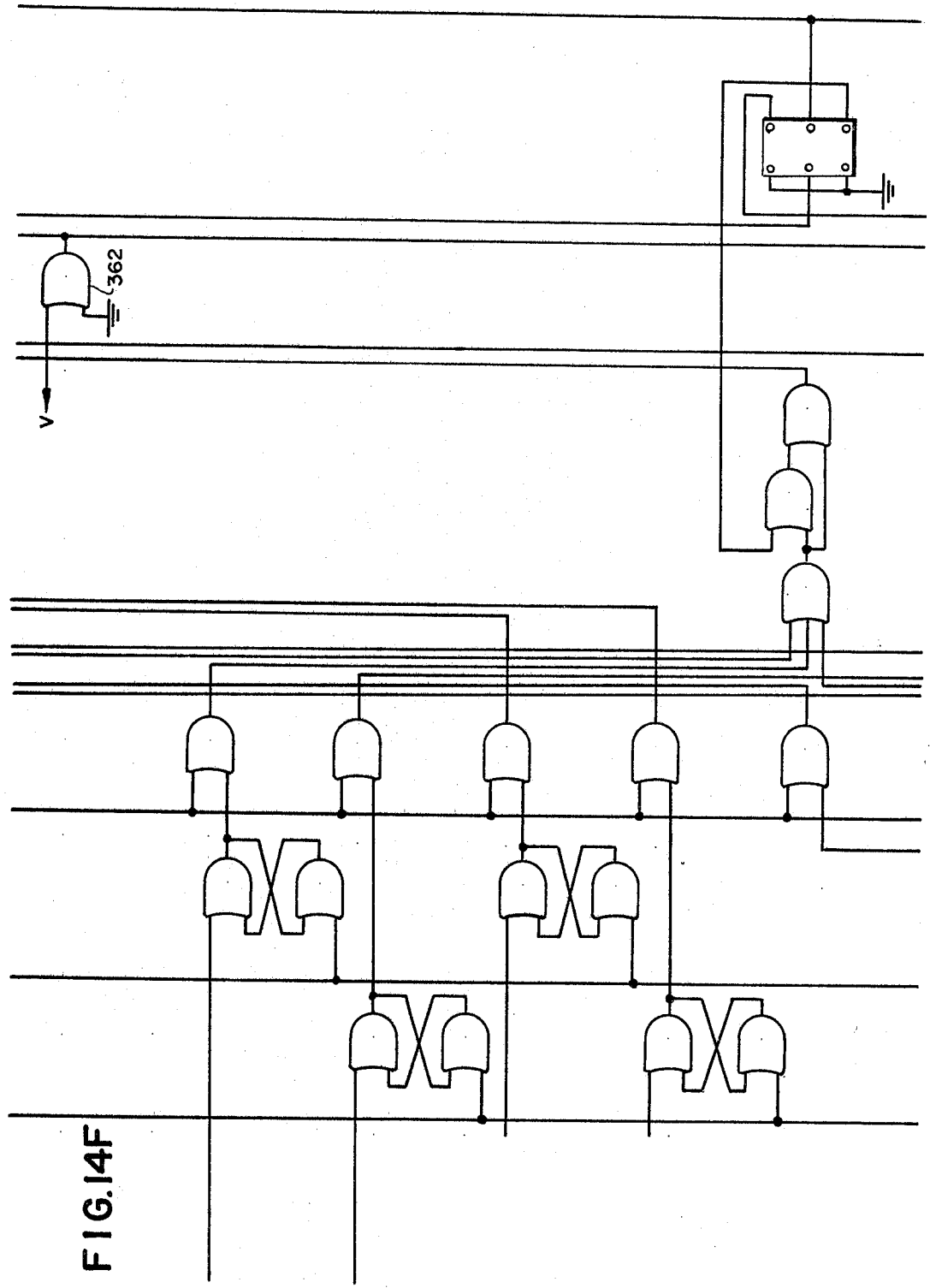
Figure 14H:
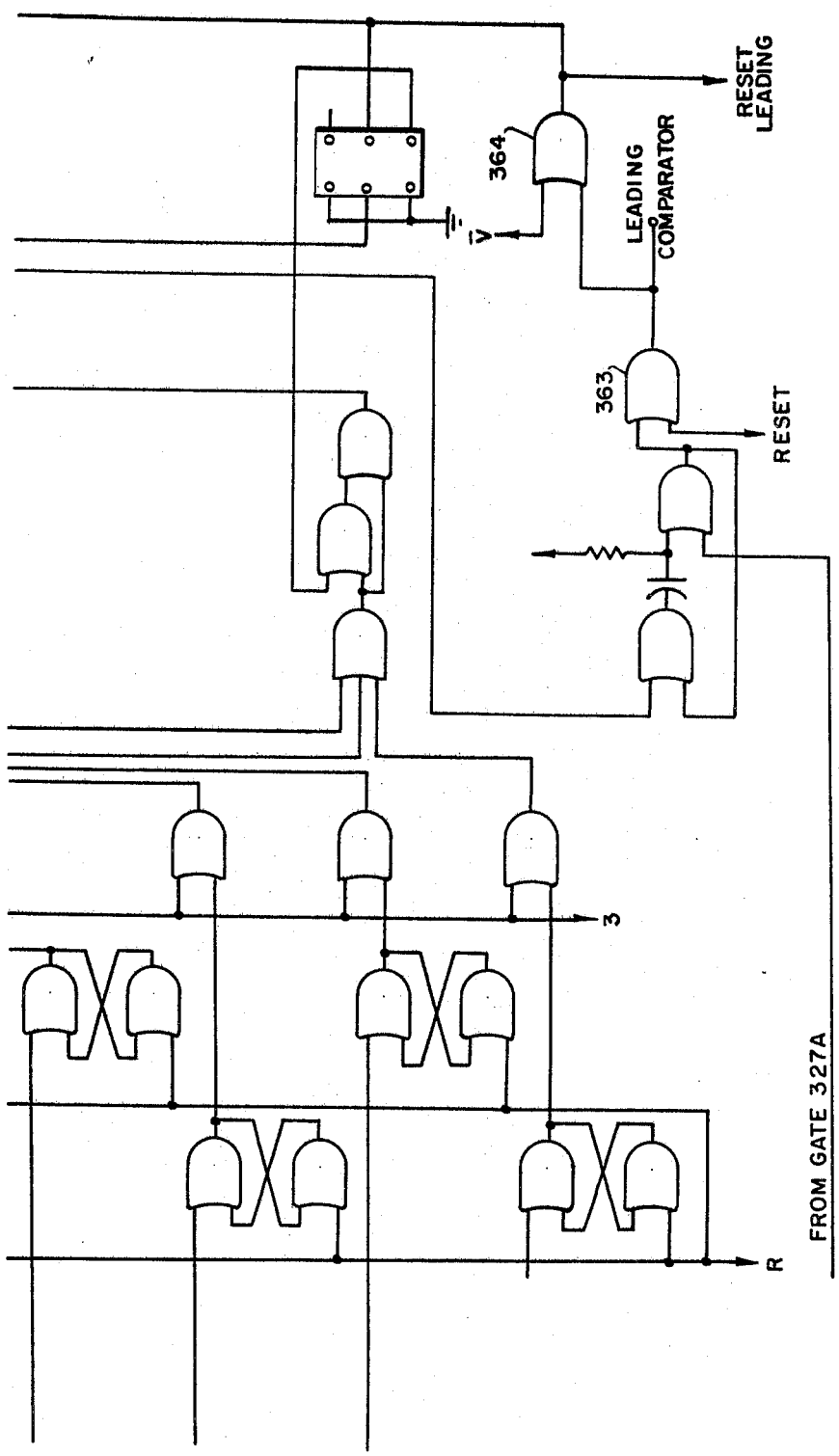
Figure 20:
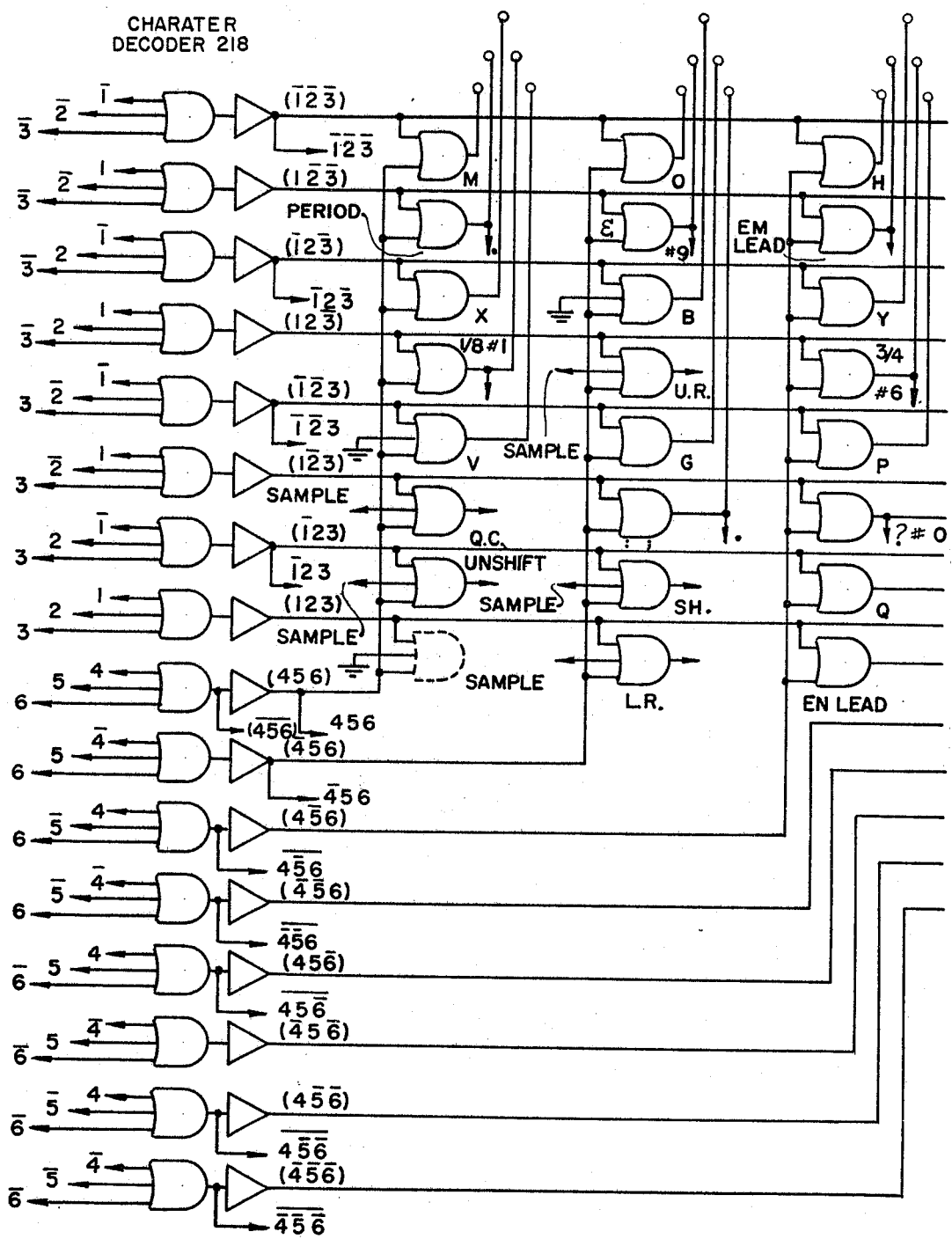
Figure 29:
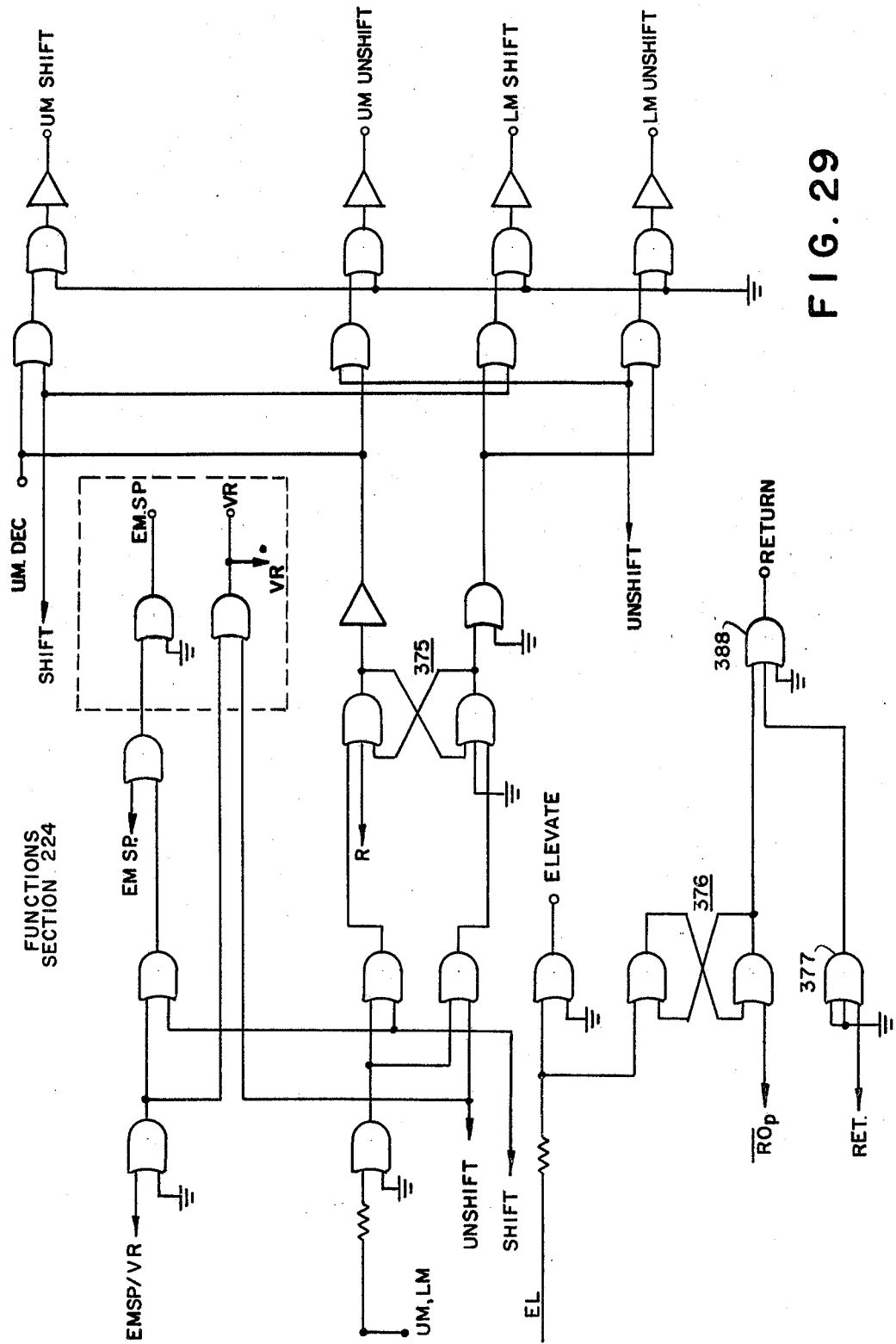
Figure 30:
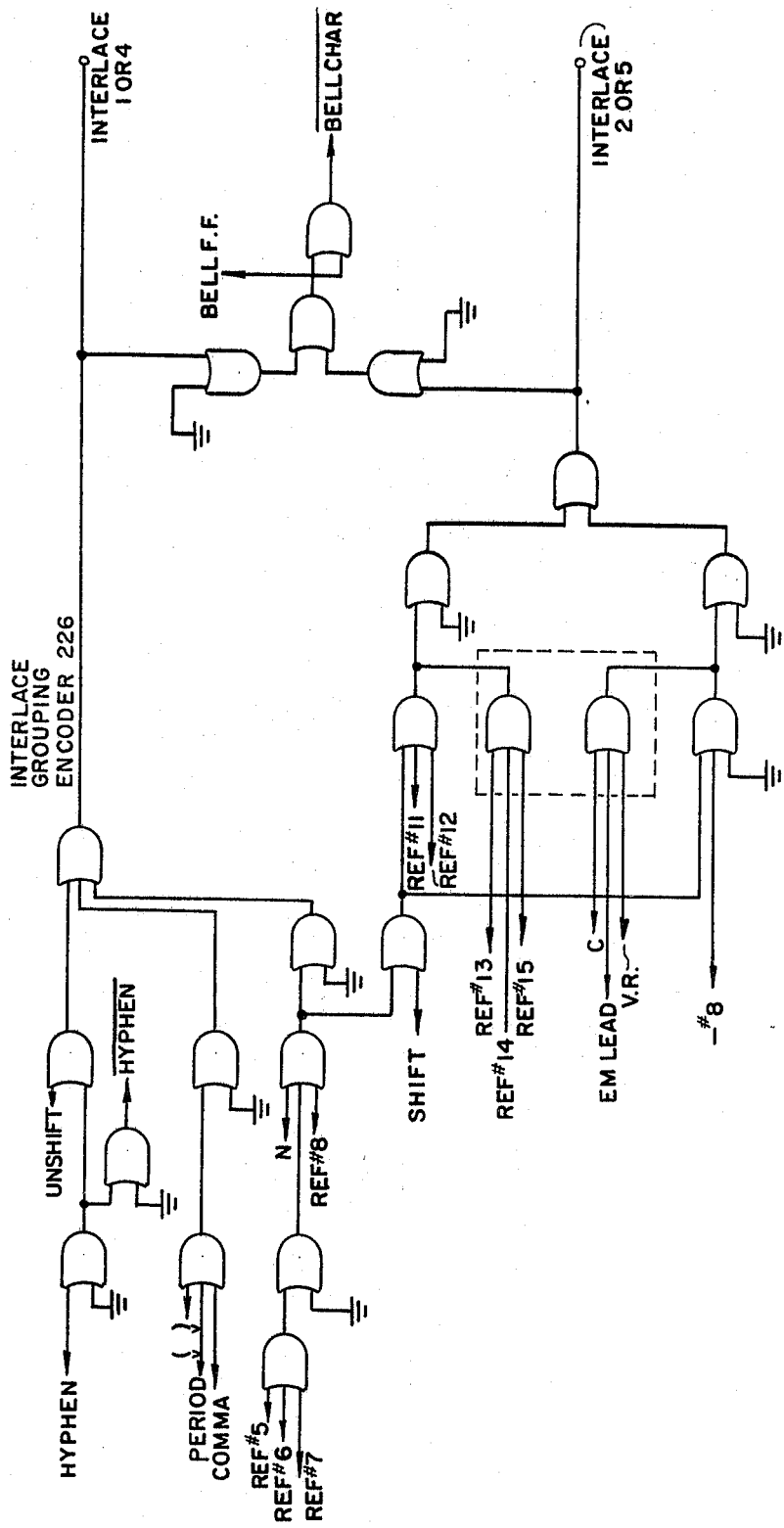
Figure 35A:
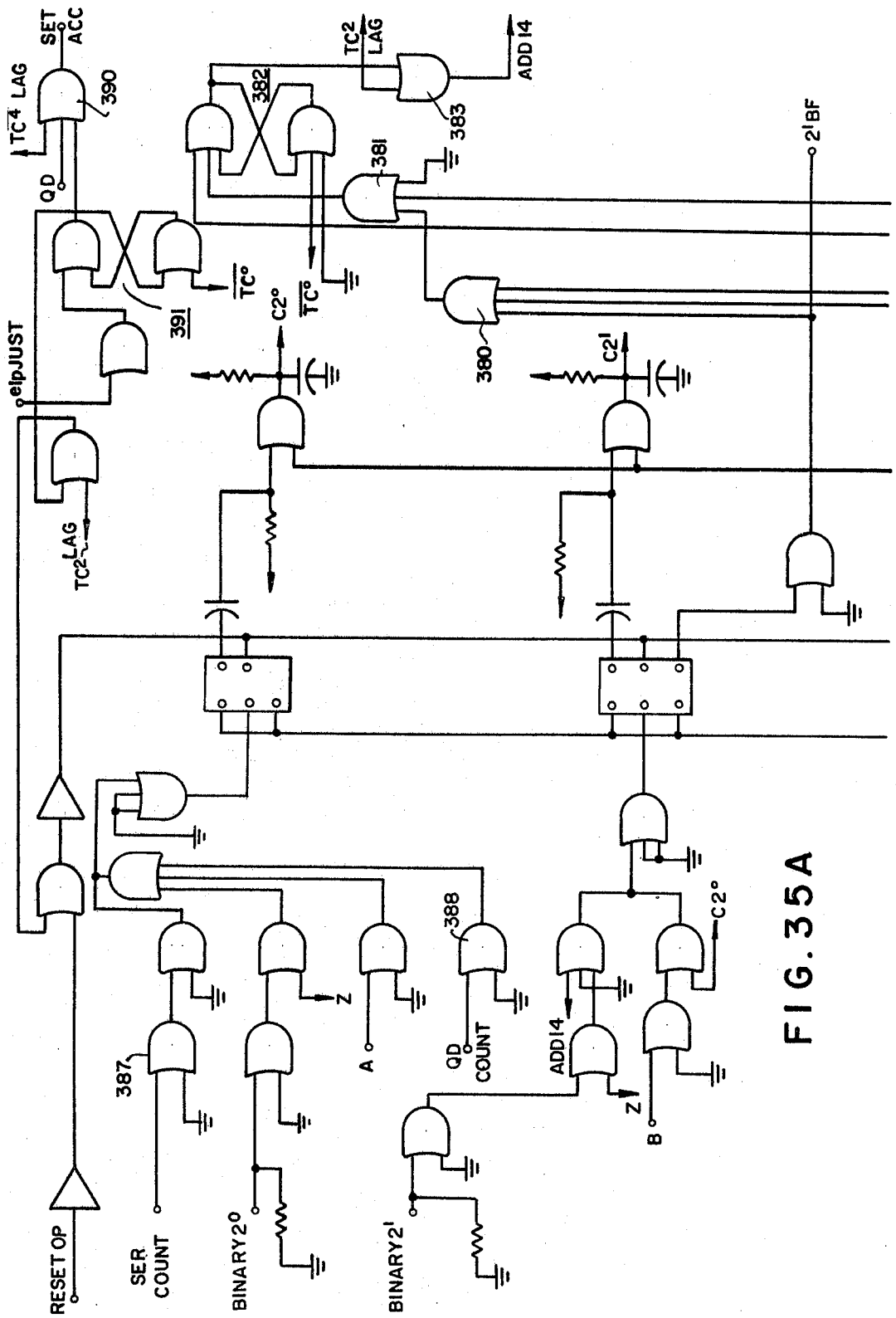
Figure 35C:
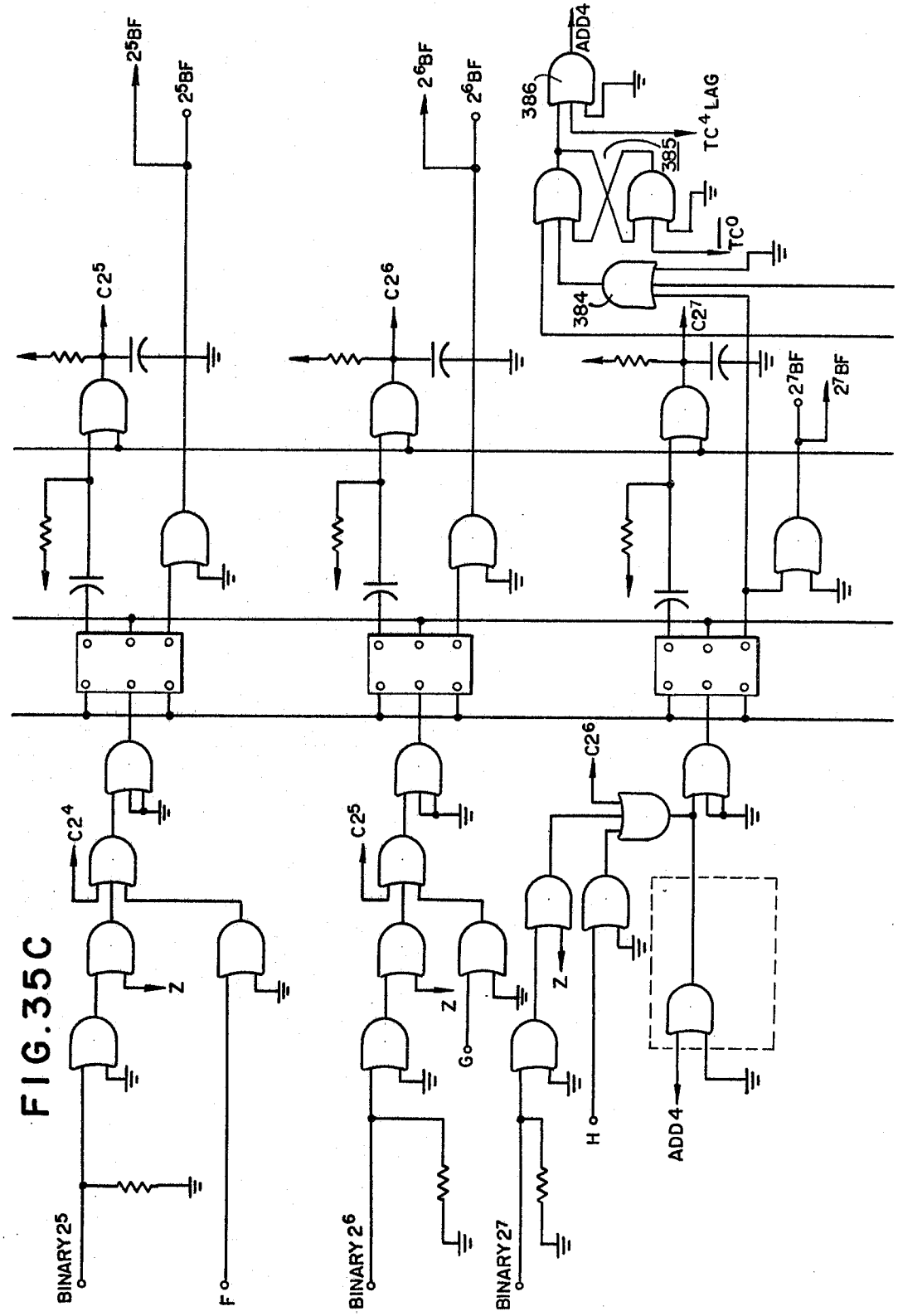
Figure 35D:
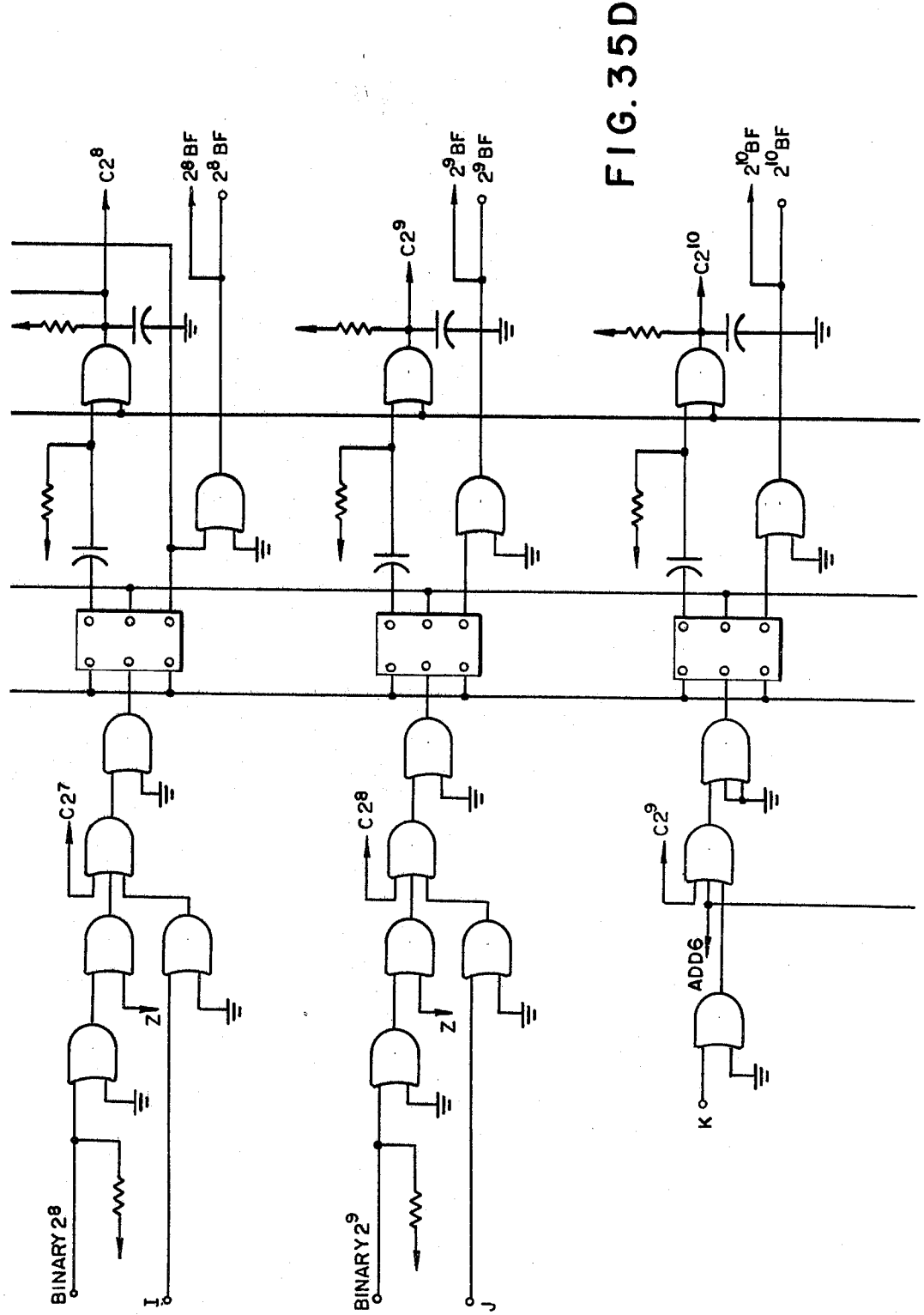

FIGS. 5A and 5B respectively show two-input and three-input NOR gates suitably employed in the system of the invention;

FIG. 6 is a diagram of a flip-flop used in the system;

FIG. 7 is a diagram of a JK type flip-flop used in the system;

FIG. 8 is a diagram of an inverter driver used in the system;

FIGS. 9A and 9B taken together as in FIG. 9C is an example of a clock generator suitably employed in the system;

FIG. 10 is a diagram of an arrangement suitable for use as the buffer and gate stage in the system;

FIG. 11 is a logic diagram of an arrangement suitable for use as the load control logic stage in the system;

FIG. 12 is a diagram of an arrangement suitable for use as the end-of-line recognition and memory section control logic stages of the load control section;

FIGS. 13A and 13B taken together as in FIG. 13C is a logic diagram of an arrangement suitable for use as the register address and gating stage of the load control section;

FIGS. 14A to 14H taken together as in FIG. 14I, is a logic diagram of an arrangement suitable for use as the leading control logic, the leading counter and comparator stages of the load control section;

FIG. 15 is a diagram of a circuit for counting and storing the leading increment return codes;

FIG. 16 is a diagram of a circuit for decoding the output of the circuit shown in FIG. 15;

FIGS. 17 and 18, taken together as in FIG. 19, is a timing diagram of waveforms occurring in the load control section of different points of its operation;

FIGS. 20 and 21, taken together as in FIG. 22, comprise a logic diagram of the character decoder stage of the decoder section of the system;

FIG. 23 is a diagram of a circuit for controlling the shift and unshift functions;

FIG. 24 is a diagram of a circuit for controlling the upper and lower rail functions;

FIG. 25 is a diagram of a circuit for providing the stop function and a quad right pulse;

FIG. 26 is a diagram for controlling the Bell character function;

FIG. 27 shows an arrangement for providing either the spaceboard or thin space function;

FIG. 28 shows an arrangement for providing either the en space or quad spaceband function;

FIG. 29 is a logic diagram depiction of an arrangement for decoding several other functions;

FIG. 30 is a logic diagram of an arrangement for decoding interlace groupings 1 or 4, and 2 or 5 in the decoder section of the system;

FIG. 31 is a diagram of an arrangement for decoding the interlace grouping 3 or 6 in the decoder section;

FIGS. 32 to 34 respectively are diagrams of circuits used for providing decoding signals for the interlace groupings decoders;

FIGS. 35A–35E, taken together as in FIG. 35F, is a diagram of an embodiment suitable for use as the gating and parallel counter stages of the accumulator section of the system.

Figure 36:
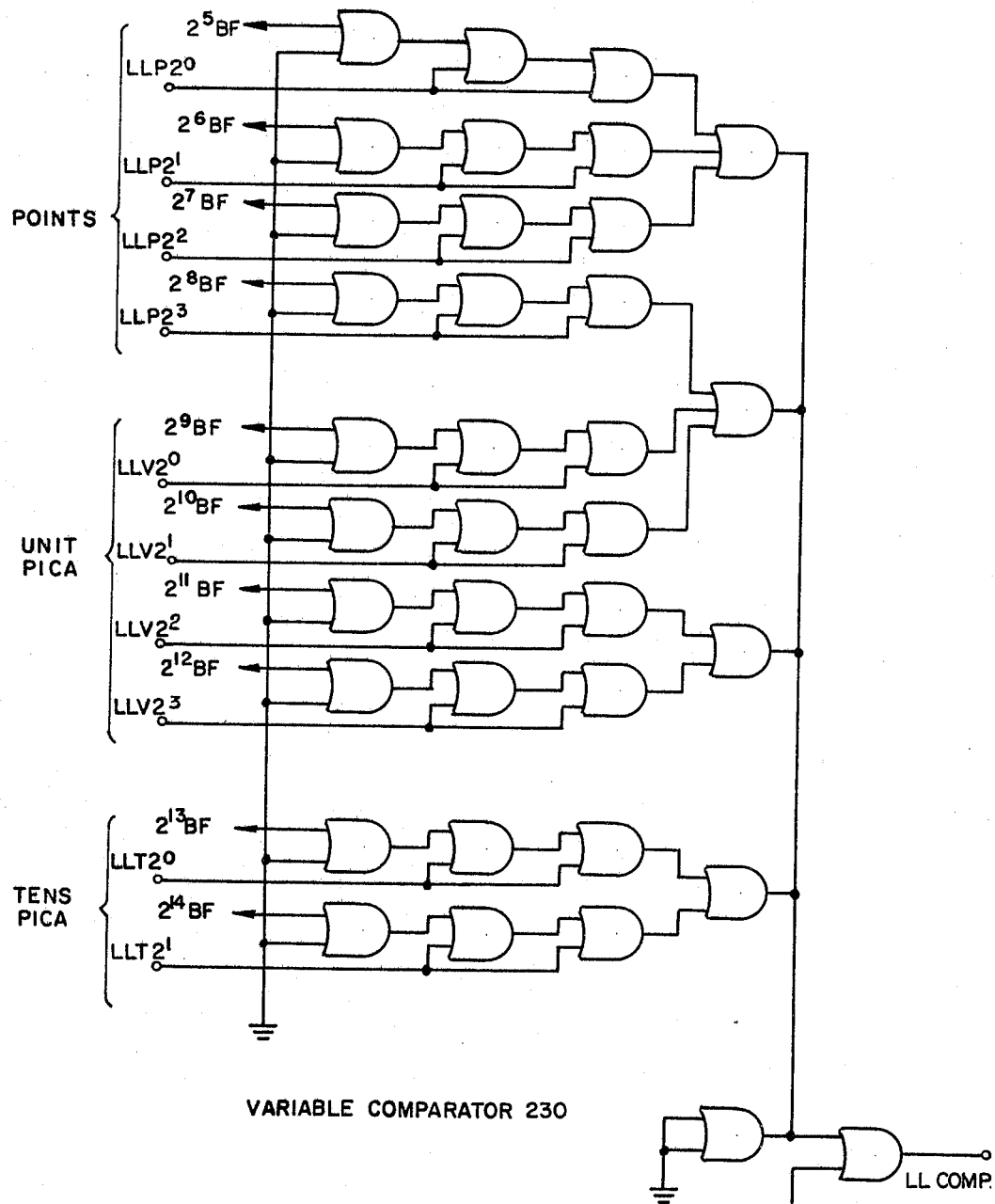
Figure 37A:
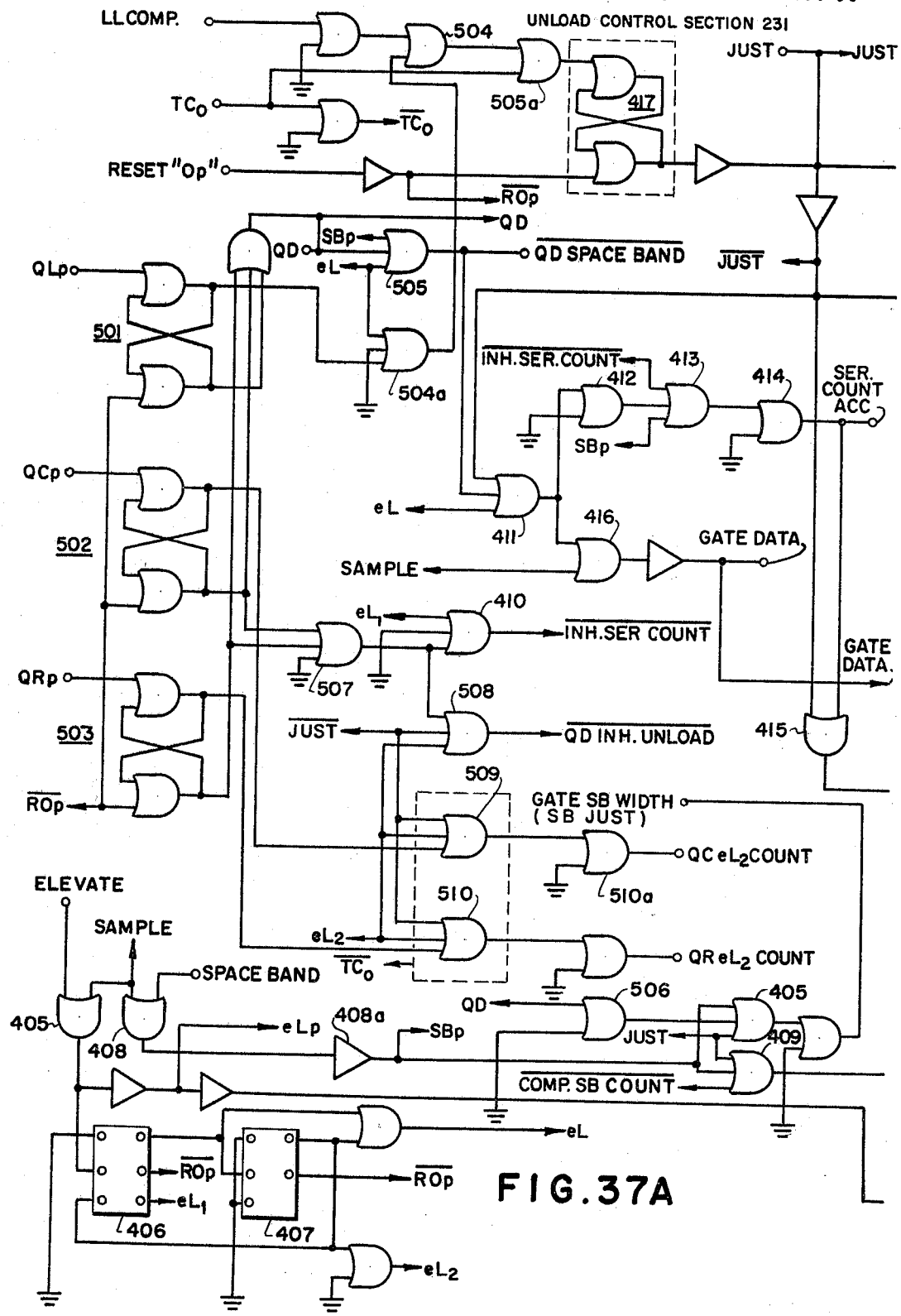
Figure 37C:
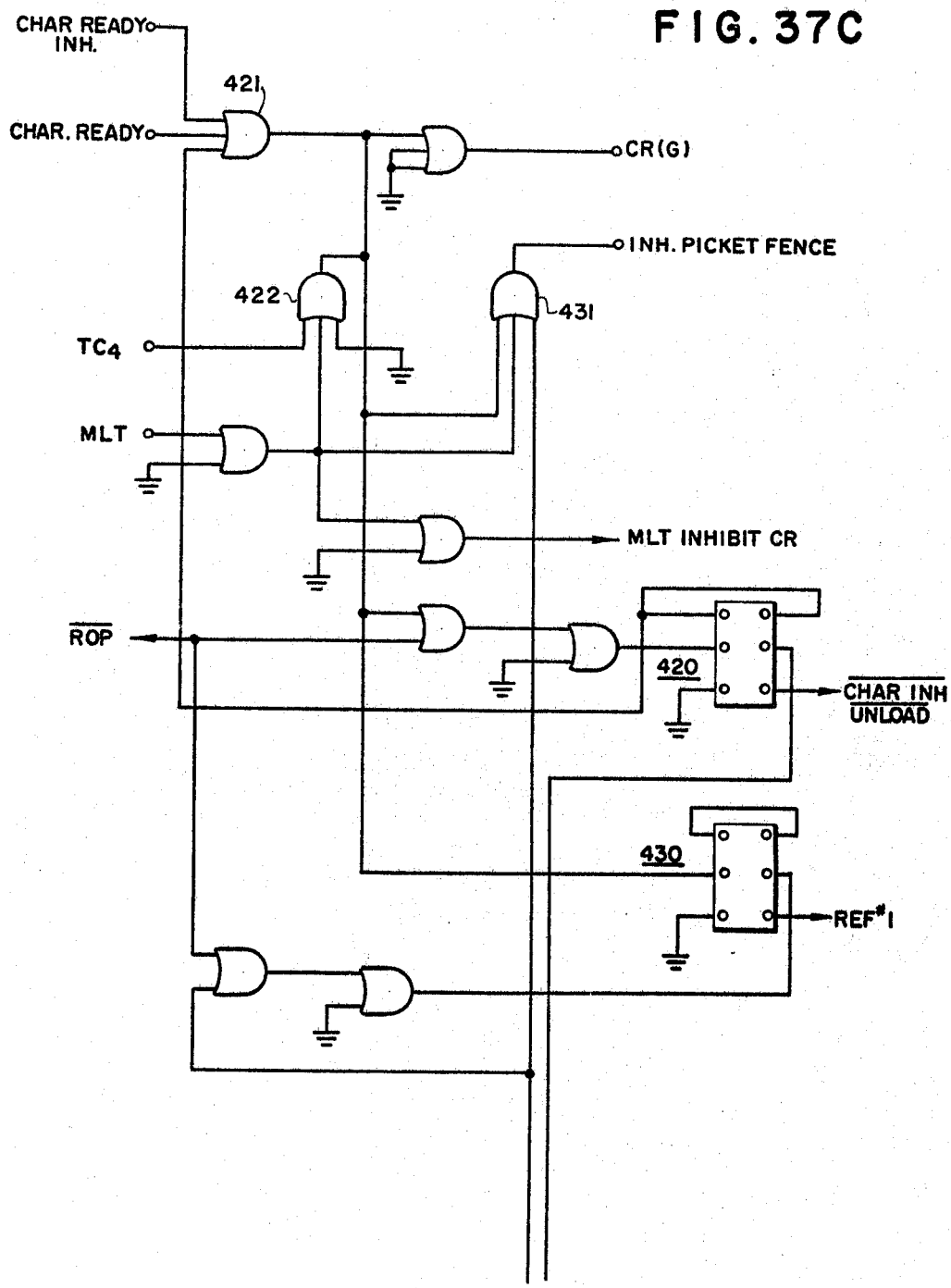
Figure 38A:
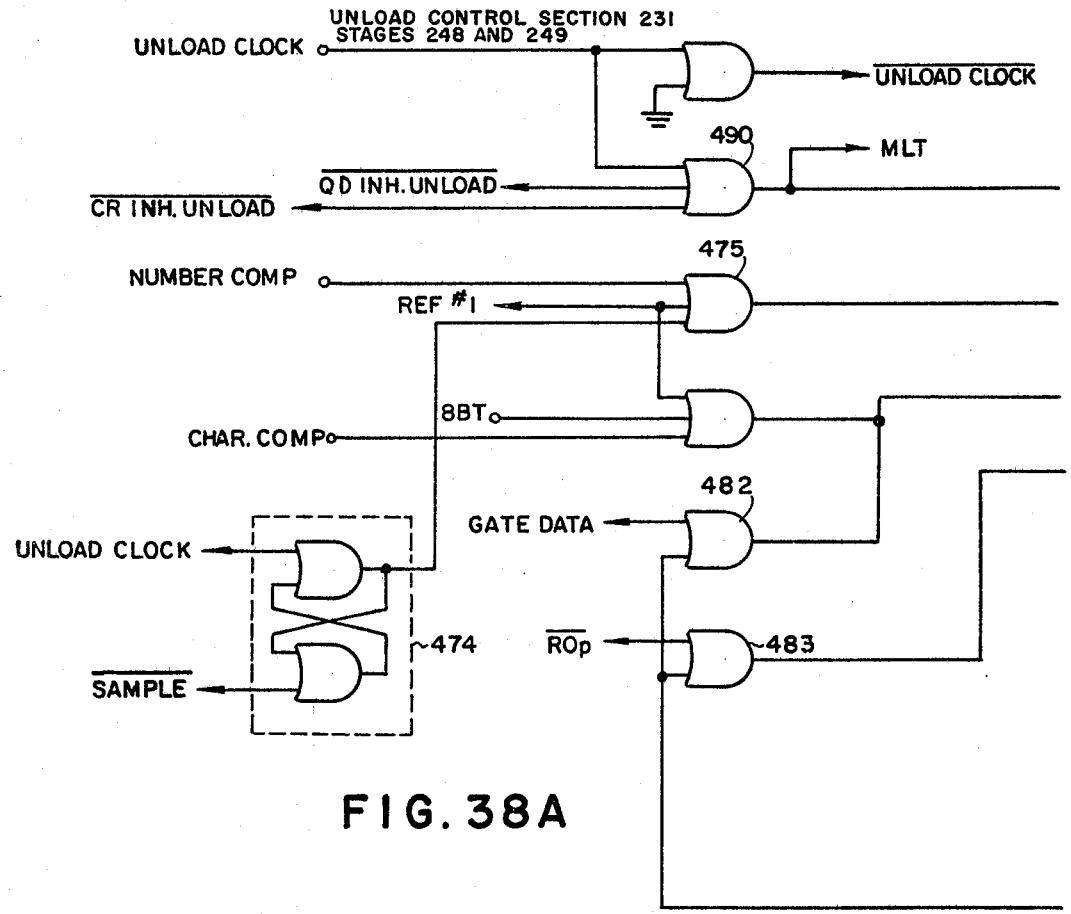
Figure 40:
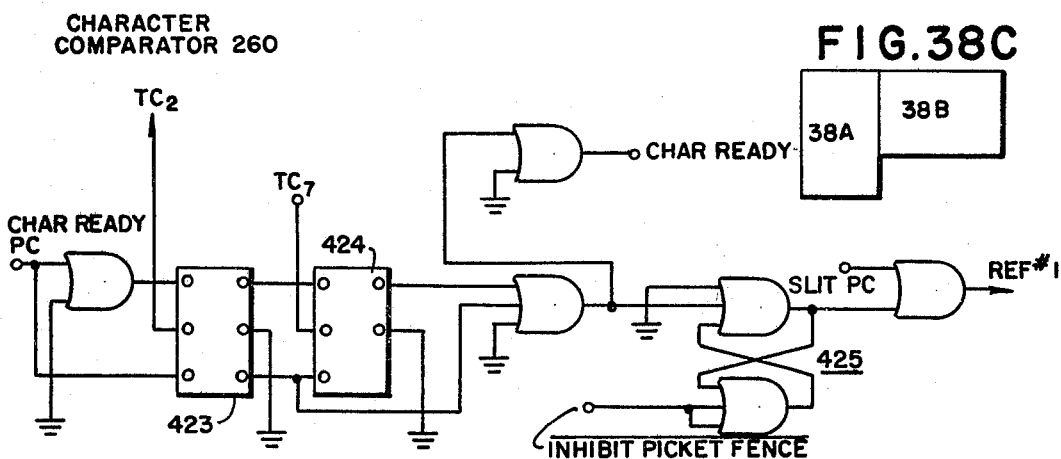
Figure 38:
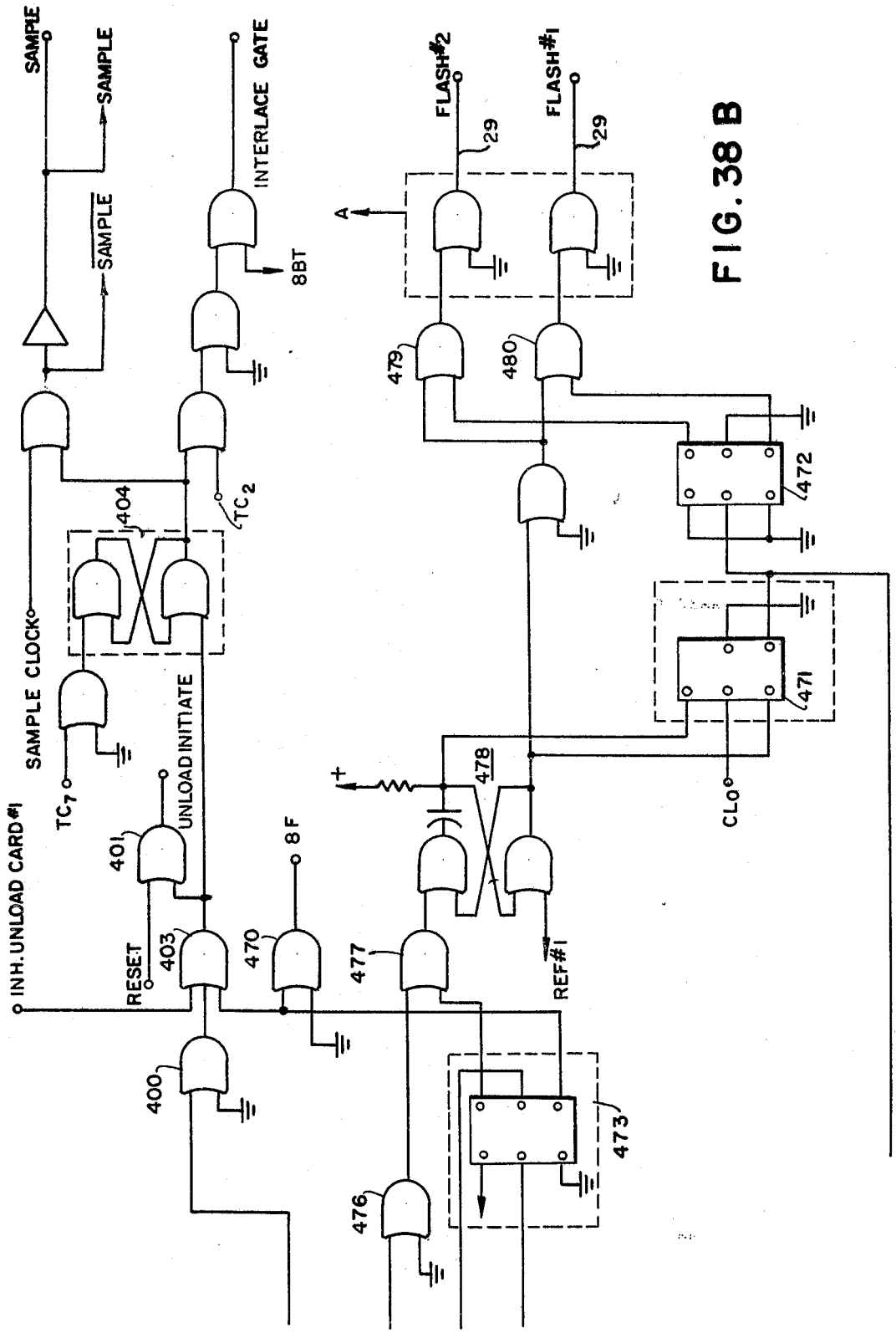
Figure 39A:
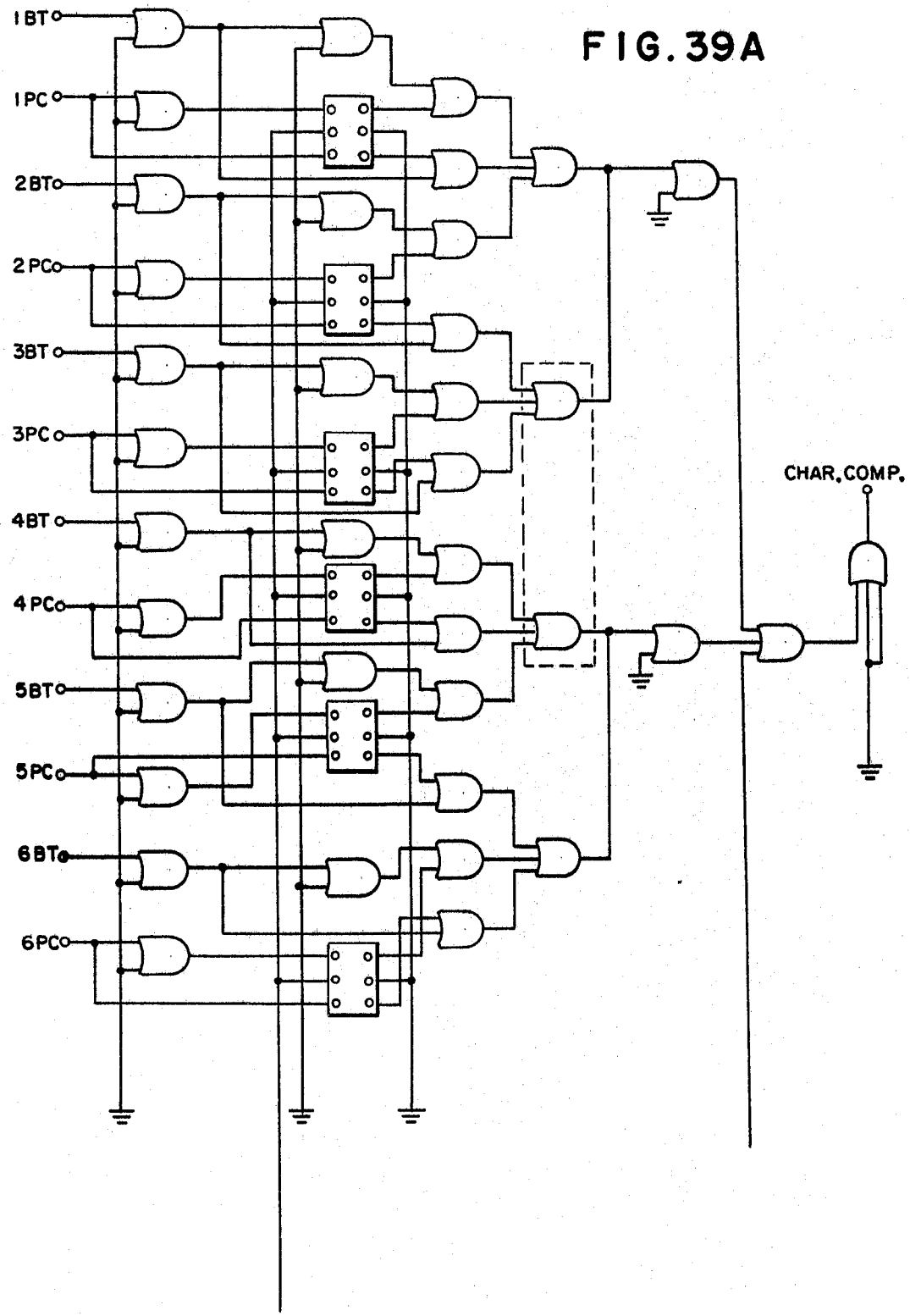
Figure 39B:
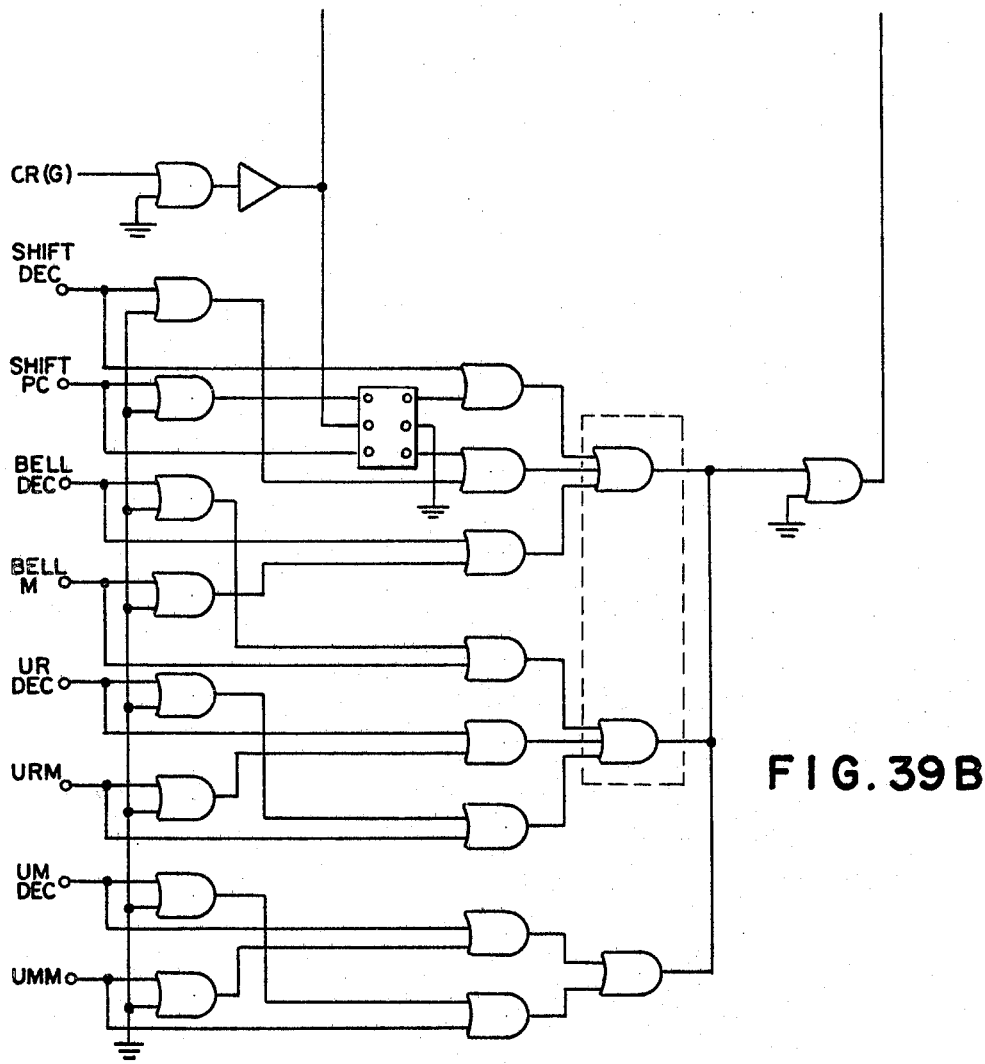
Figure 39C:
Figure 41:
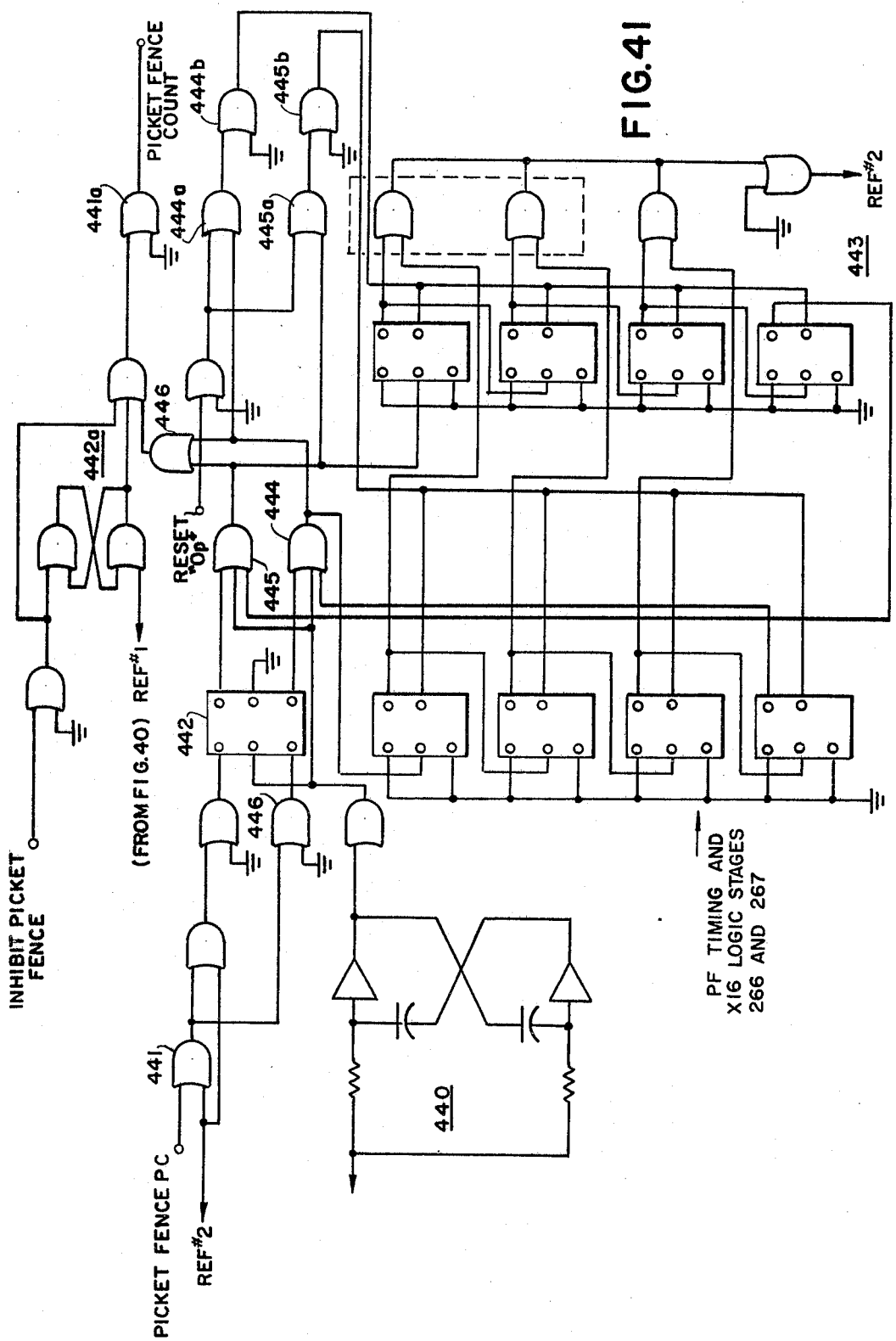
Figure 43A:
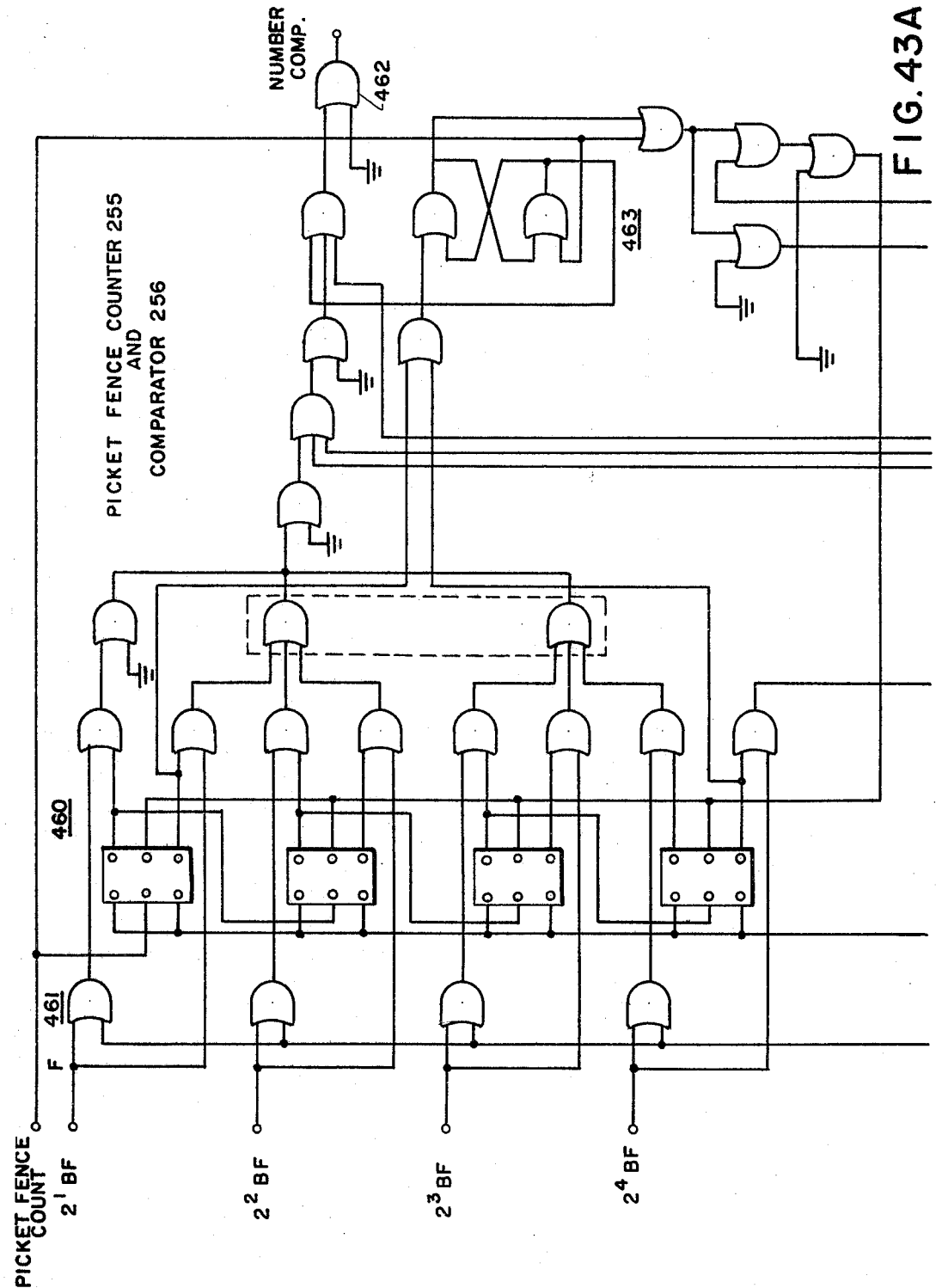
Figures 44A, 44C:
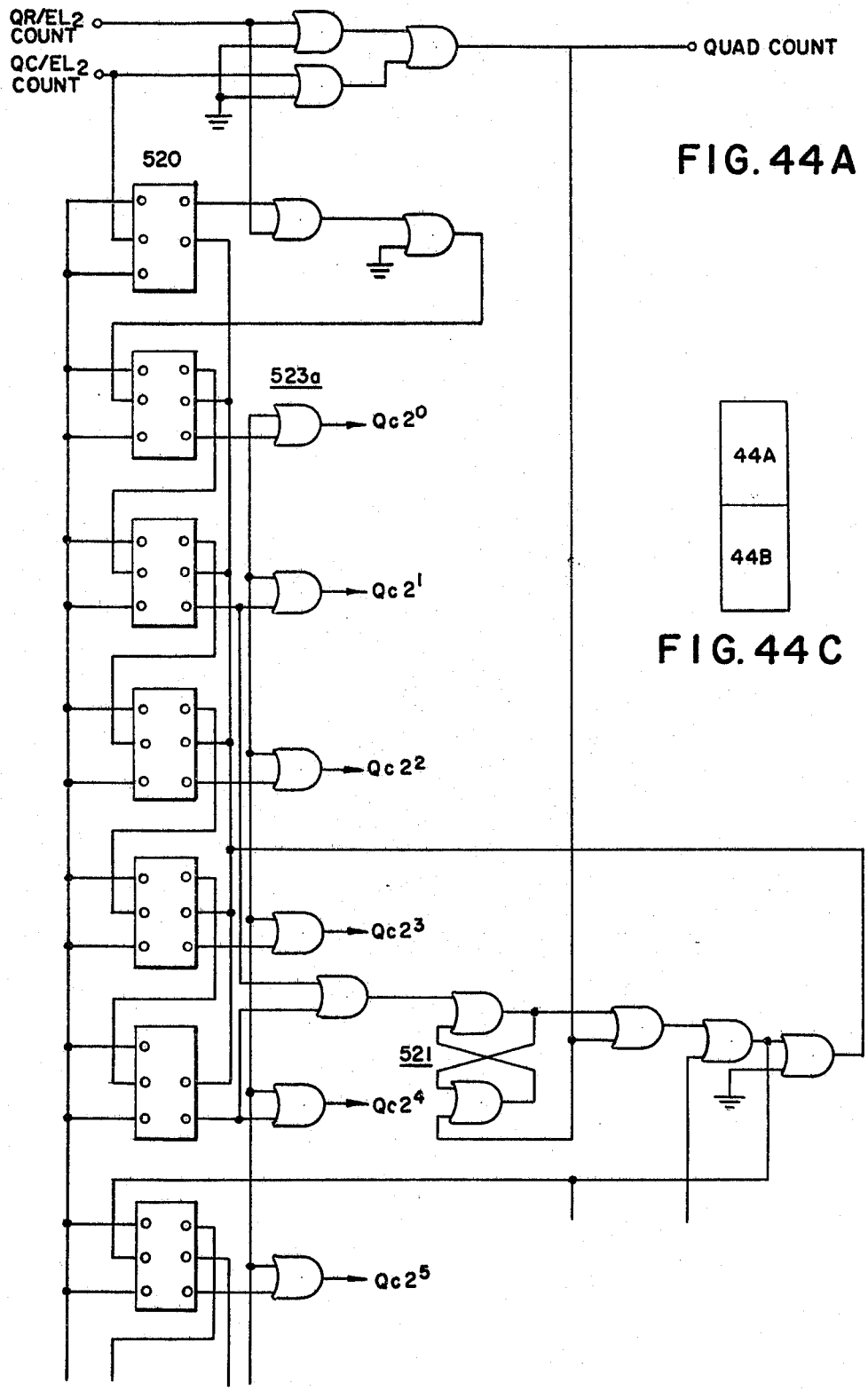
Figure 44B:
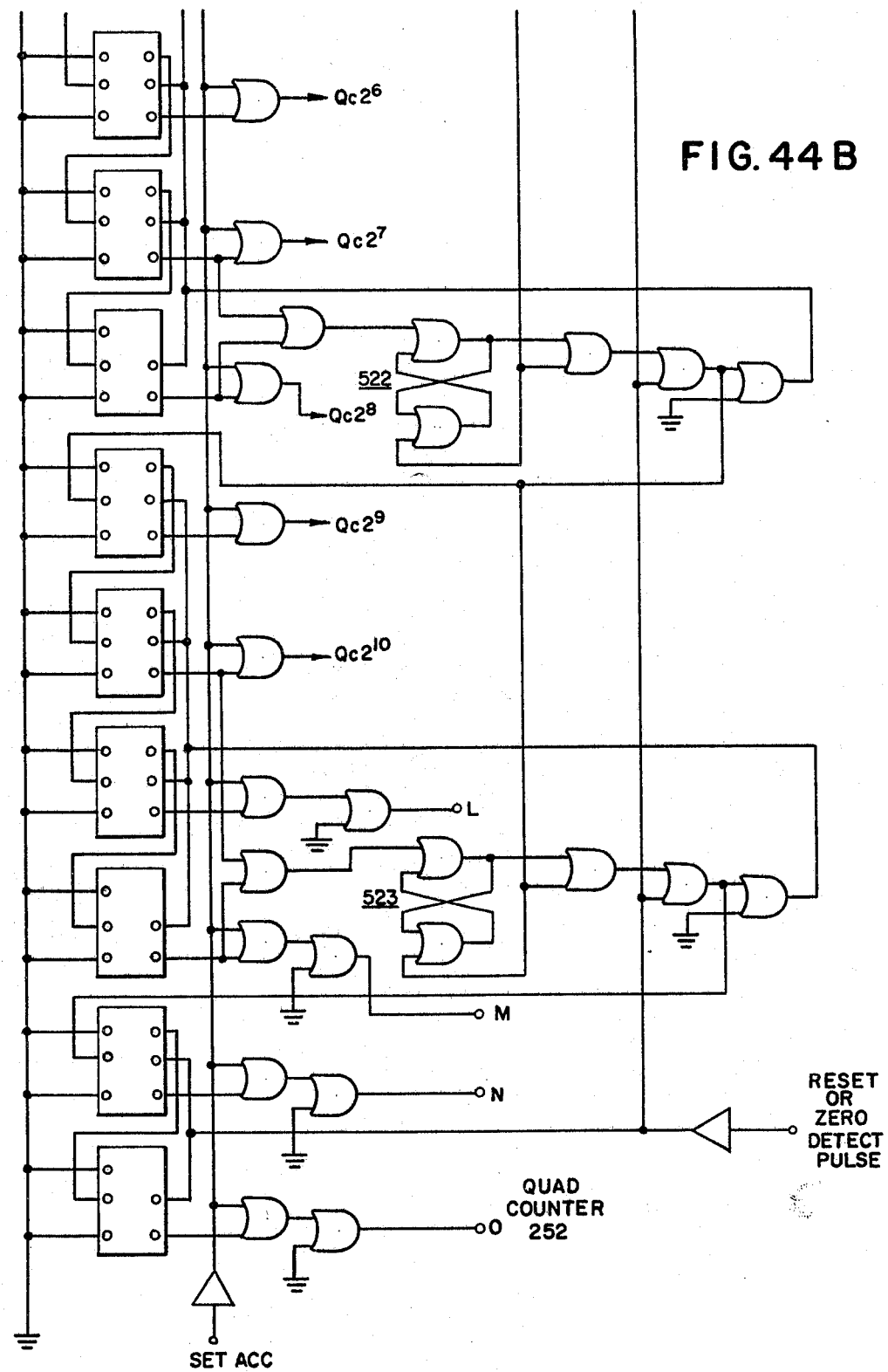
Figure 45A:
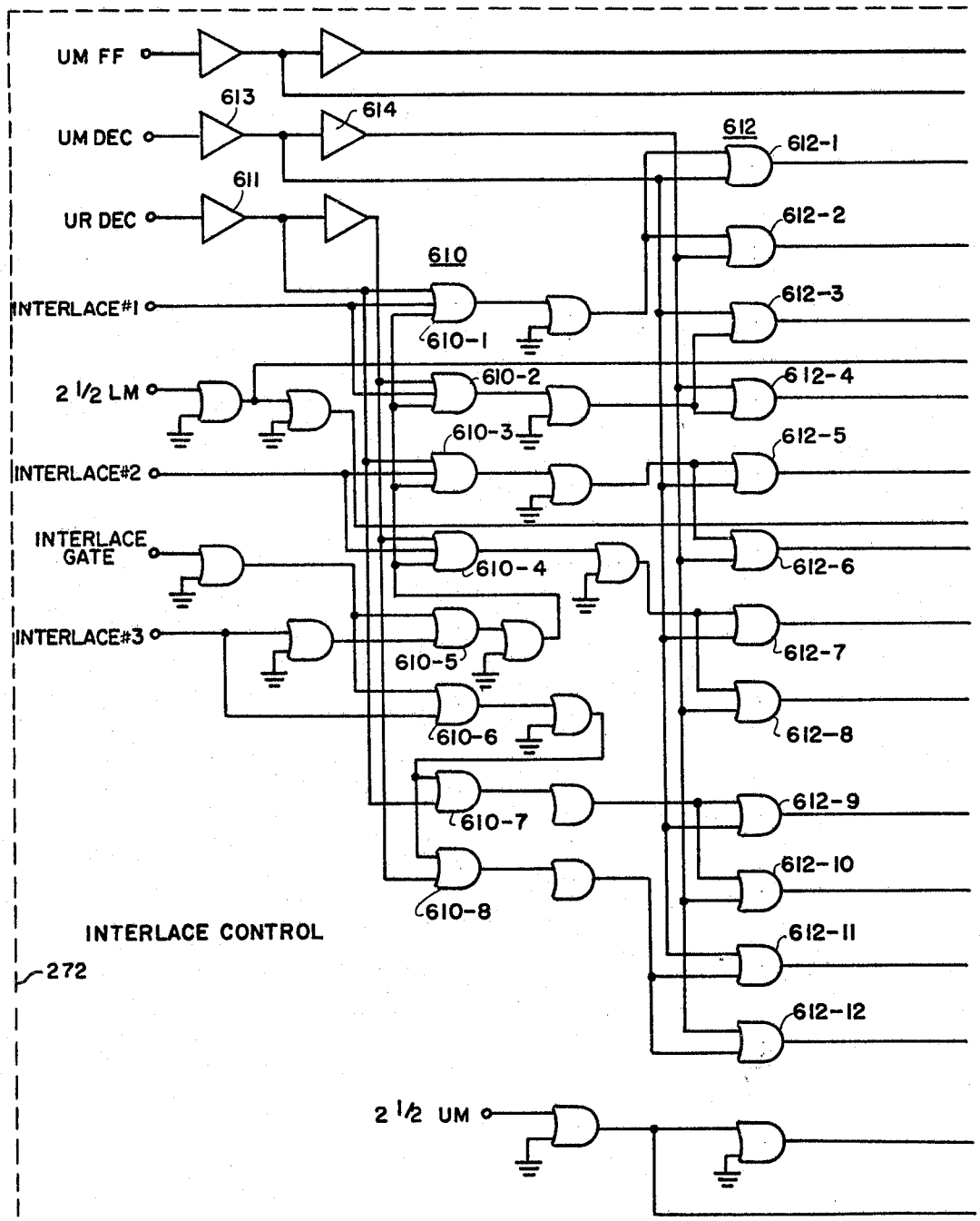
Figure 45B:
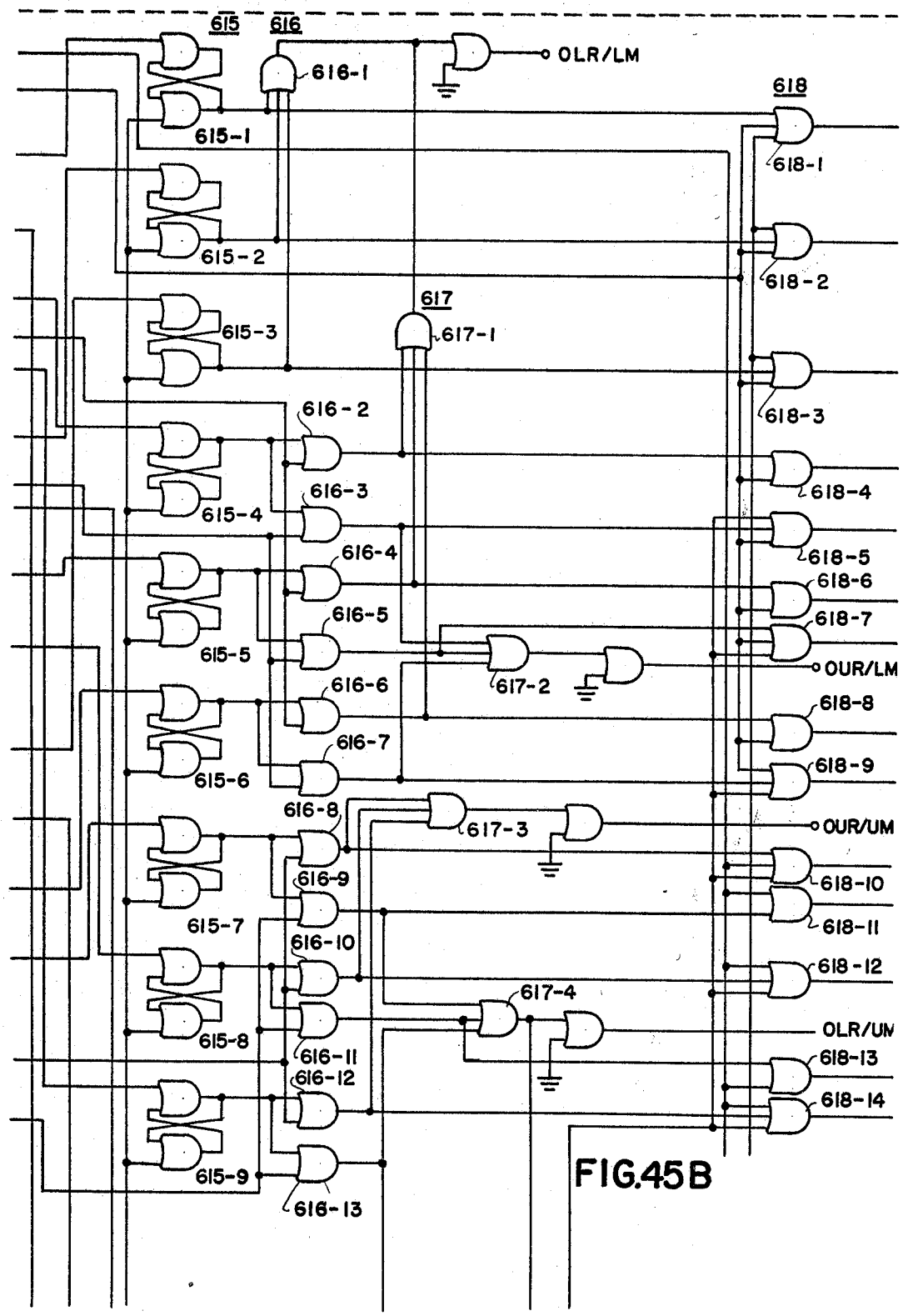
Figure 45D:
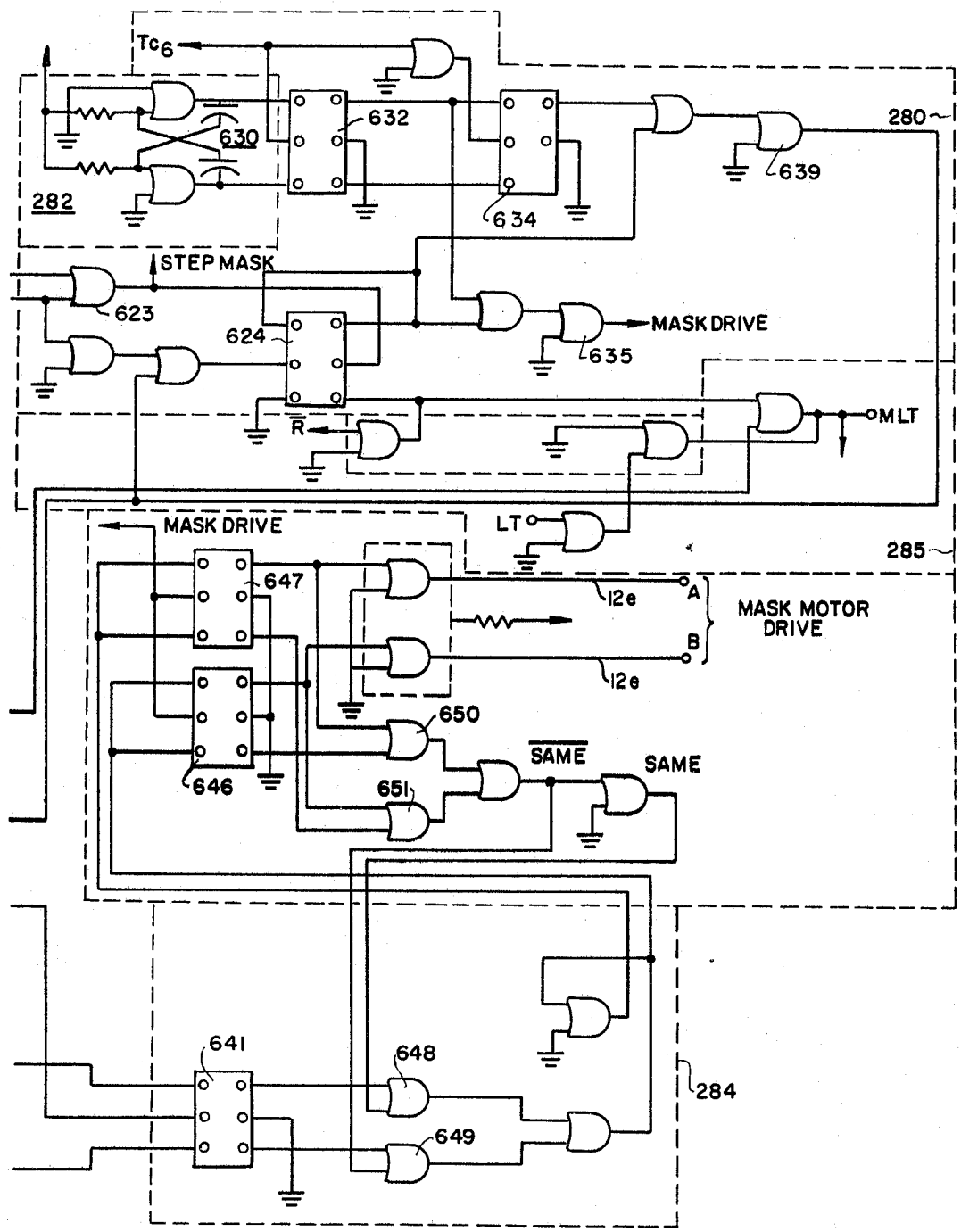
Figure 45F:
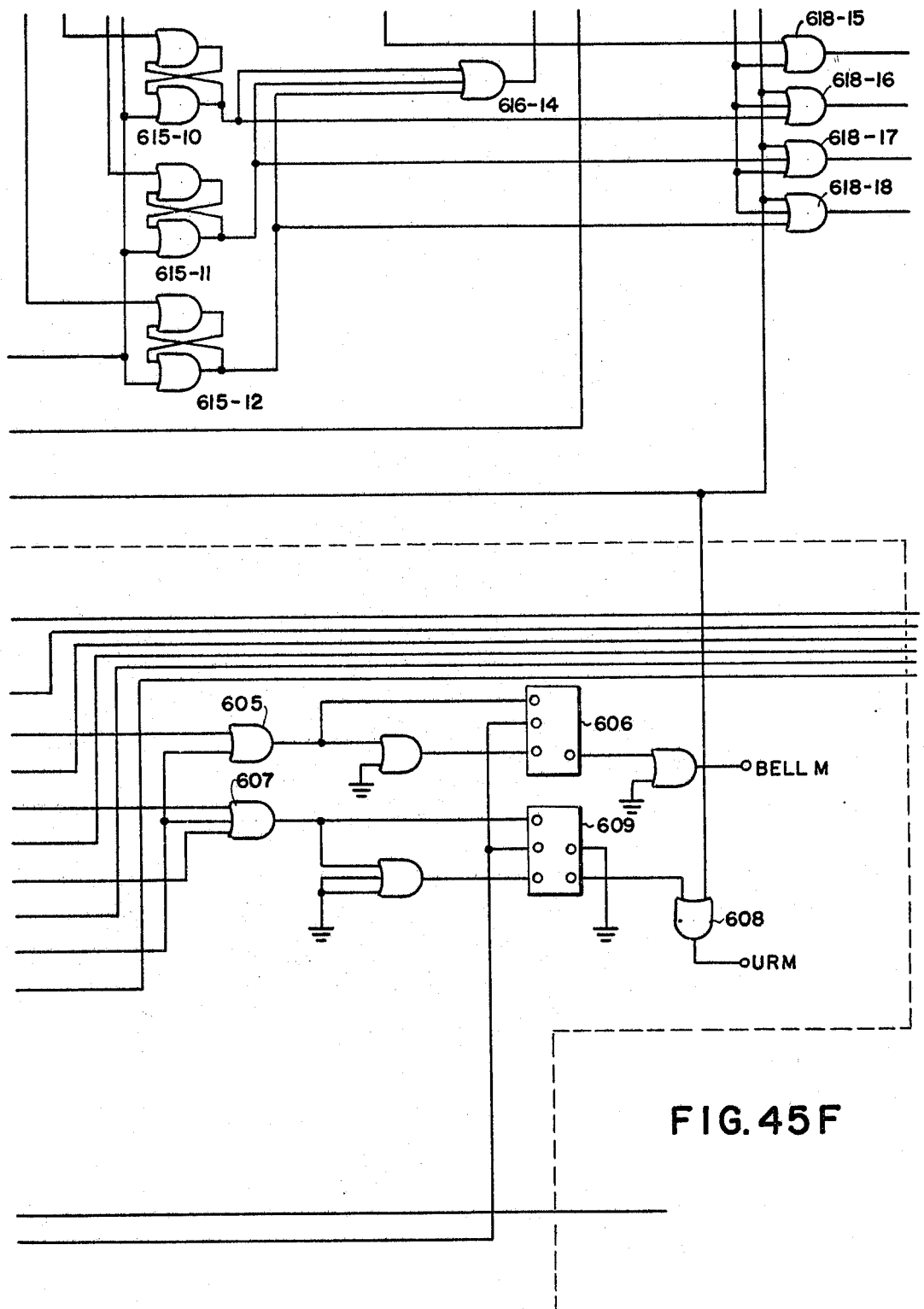
Figure 45G:
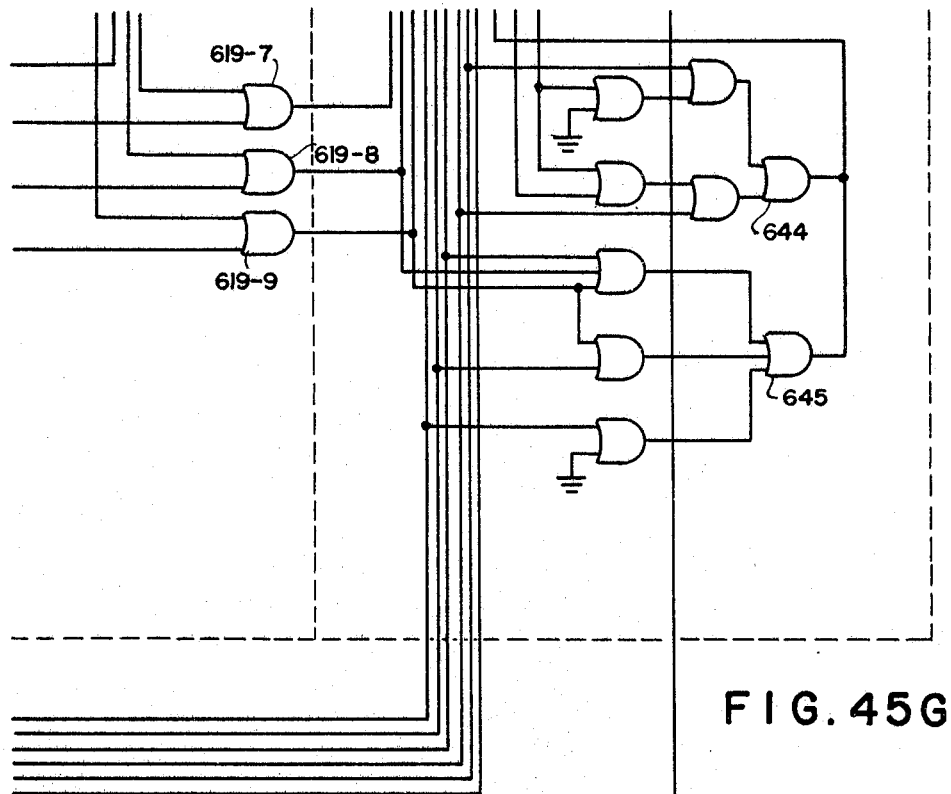
Figure 45H:
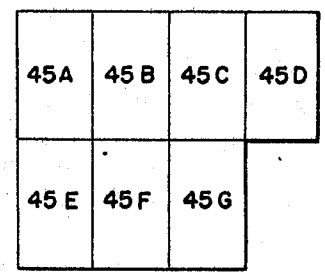
Figure 46:
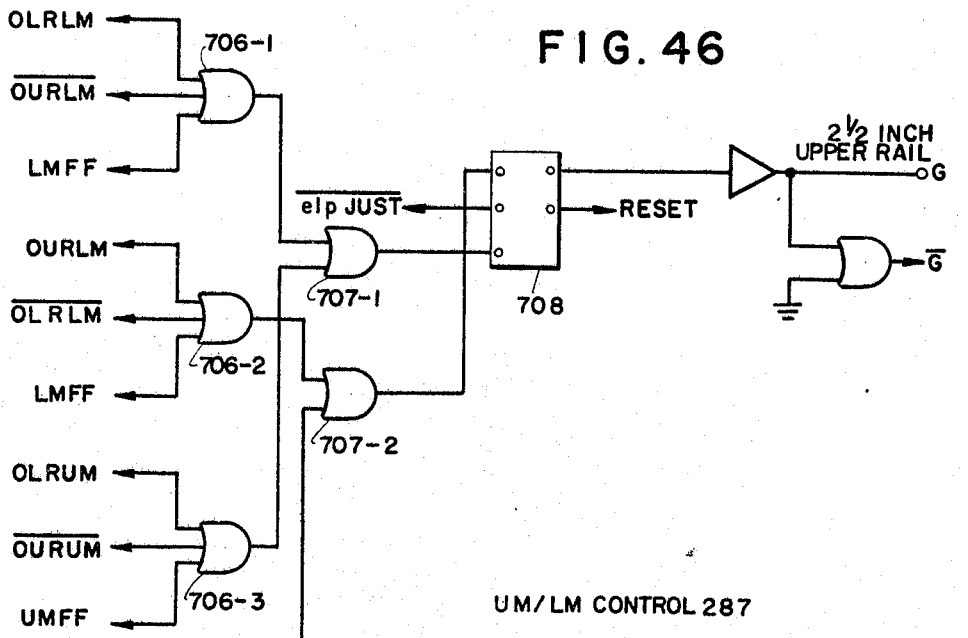
Figure 46A:
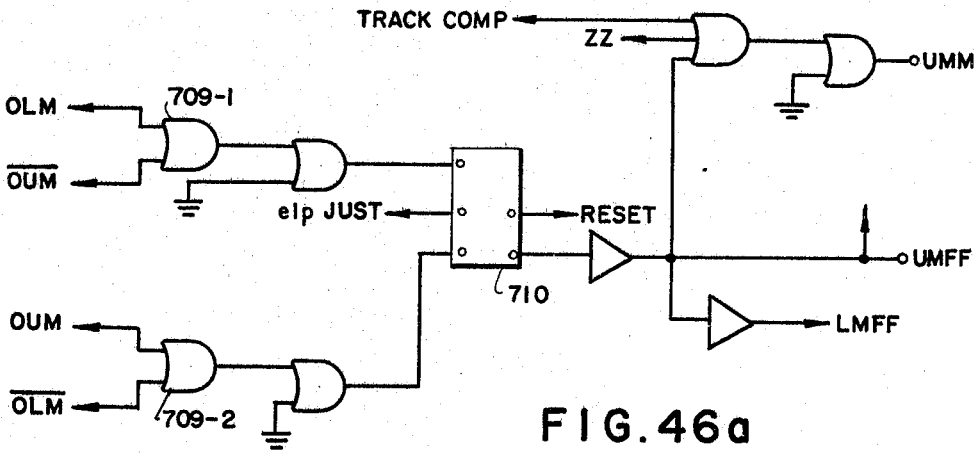
Figure 48:
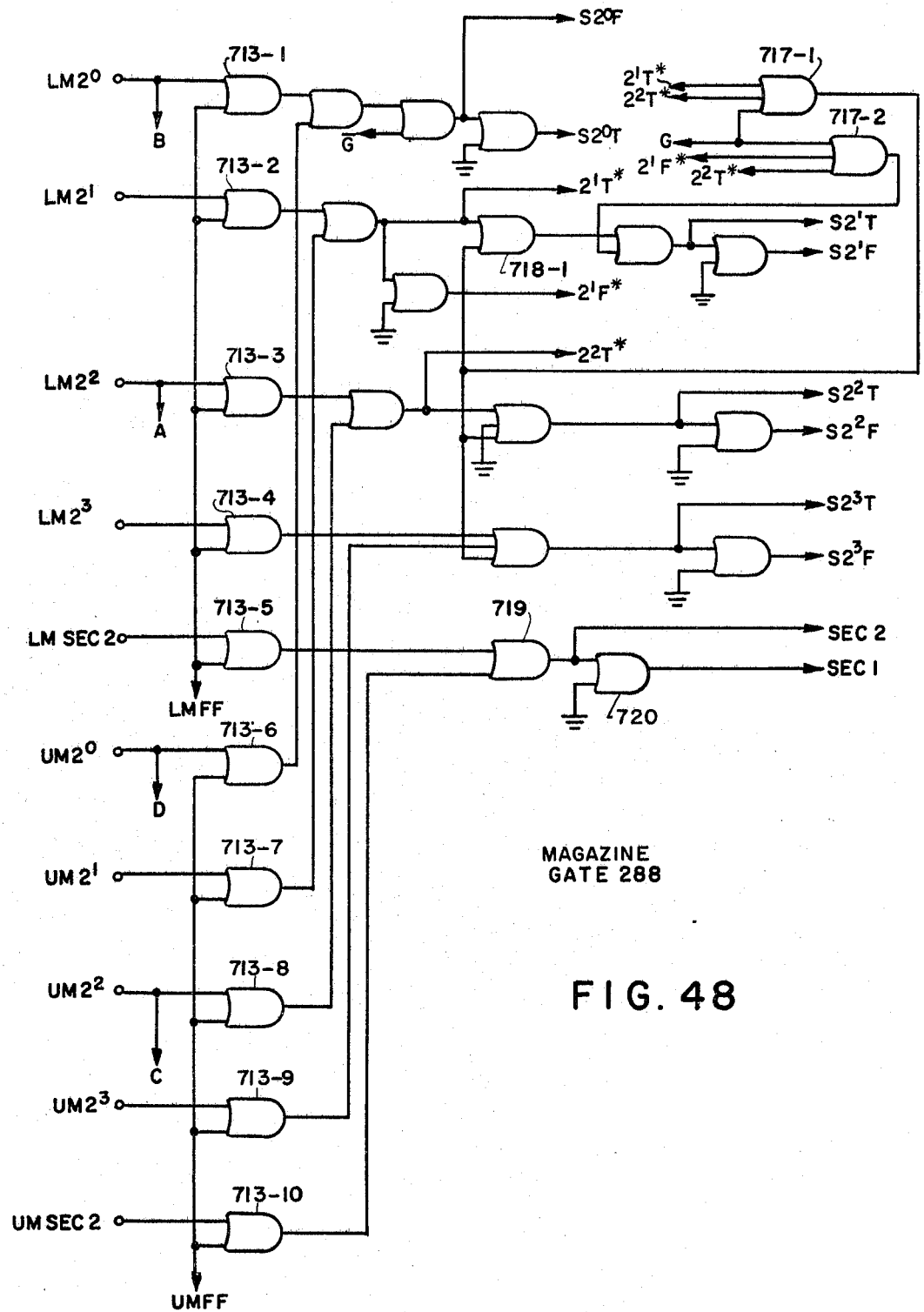
Figure 53:
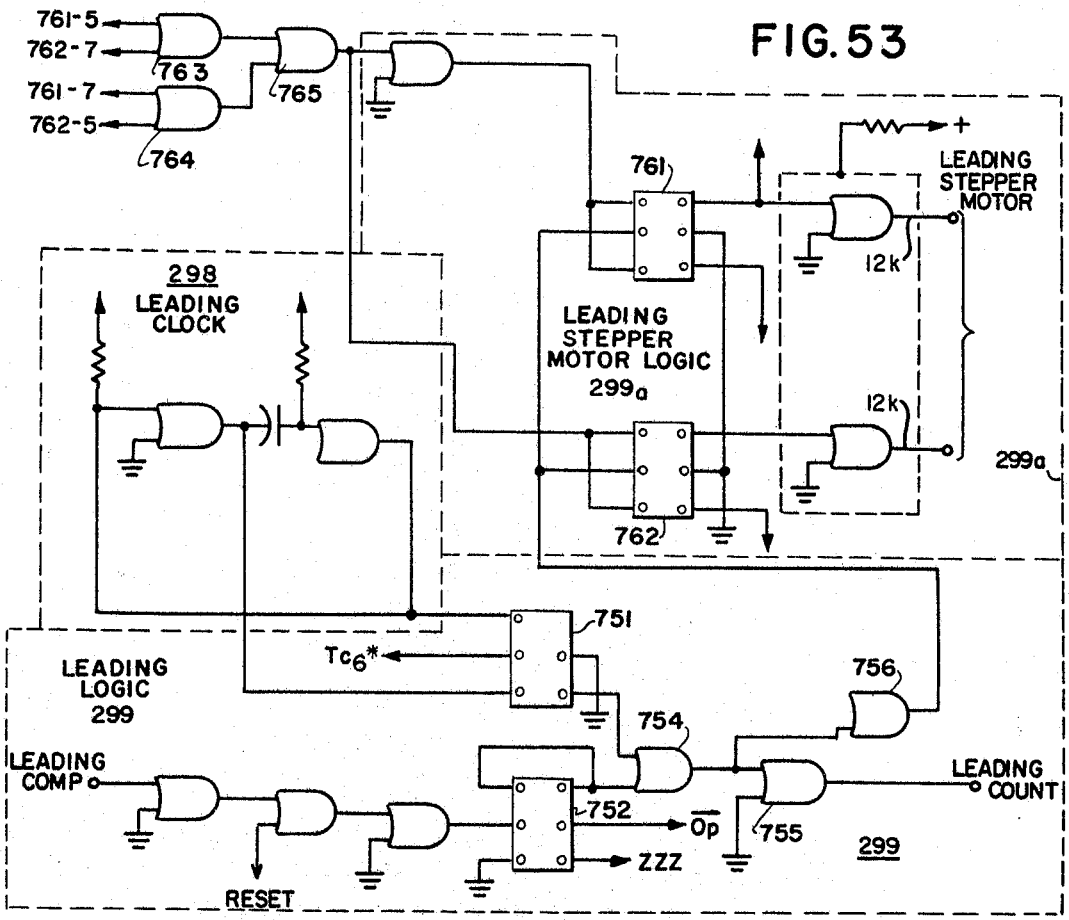
Figure 51:
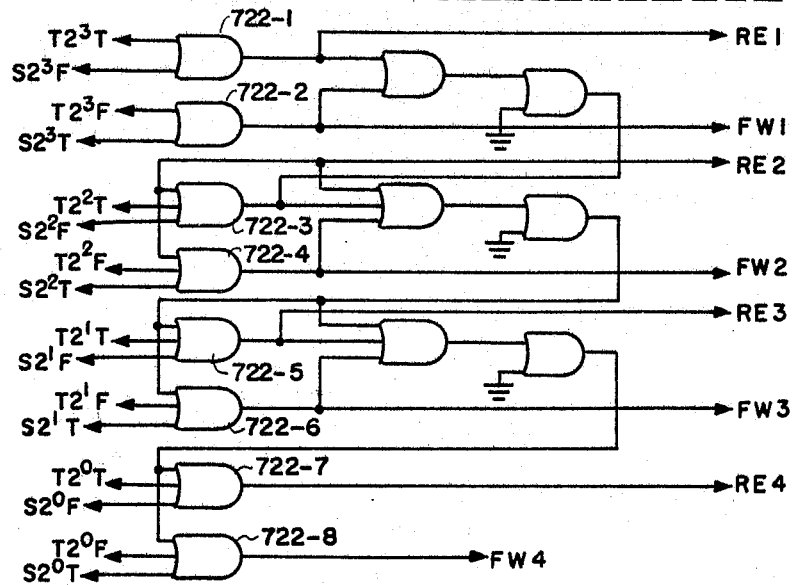

FIG. 36 is a logic diagram of a circuit suitable for use as the variable line length comparator stage in the accumulator section;

FIGS. 37A–37C, taken together as in FIG. 37D, is an arrangement suitable for use as several of the stages of the unload control section of the system;

FIGS. 38A and 38B, taken together as in FIG. 38C, is a diagram of an arrangement suitable for use as the remaining stages of the unload control section;

FIGS. 39A and 39B, taken together as in FIG. 39C, comprise a diagram of an arrangement for effecting a character comparison between a character in position to be flashed from the wheel and a character in a line to be composed which is being unloaded from memory;

FIG. 40 shows a circuit for generating a character ready signal;

FIG. 41 shows an arrangement suitable for use in the character comparator section for providing a picket fence count;

FIGS. 42A and 42B, taken together as in FIG. 42C, is a diagram of an arrangement suitable for use as the spaceband width counter and the gate for entering the contents of the quad counter or the spaceband width counter into the parallel counter of the accumulator, the spaceband width counter and gate being in the number comparator section of the system;

FIGS. 43A–43D, taken together as in FIG. 43E, comprise a diagram of an arrangement suitable for use as the picket fence counter and position number comparator stages in the number comparator section;

FIGS. 44A and 44B, taken together as in FIG. 44C, comprise a diagram of a circuit suitable for use as the quad counter in the number comparator section;

FIGS. 45A–45G, taken together as in FIG. 45H, comprise a diagram of an arrangement suitable for use as the mask control section of the system;

FIGS. 46, 46a and 47, taken together, is a logic diagram of an arrangement suitable for use as the UM/LM control and zero detect circuits of the track control section;

FIG. 48 is a logic diagram of an arrangement suitable for use as the magazine gate stage in the track control section;

FIG. 49 is a diagram of a circuit suitable for use for the track encoder and gate logic stages of the track control section;

FIG. 50 is a diagram of an arrangement suitable for use as the track clock, the section drive logic, the section drive control, the leading track gate stages and part of the Step and Drive Logic stage of the track control section;

FIG. 51 is a diagram of an arrangement suitable for use as the track encoder stage of the track control section;

FIG. 52 is a diagram of a circuit suitable for use to form the track stepper motor logic stage of the track control section;

FIG. 53 is a diagram of a circuit suitable for use to provide the leading clock, leading logic and leading stepper motor logic of the track control section;

FIG. 54 is a diagram of a circuit for producing the inhibit reader signal; and

Figure 1:
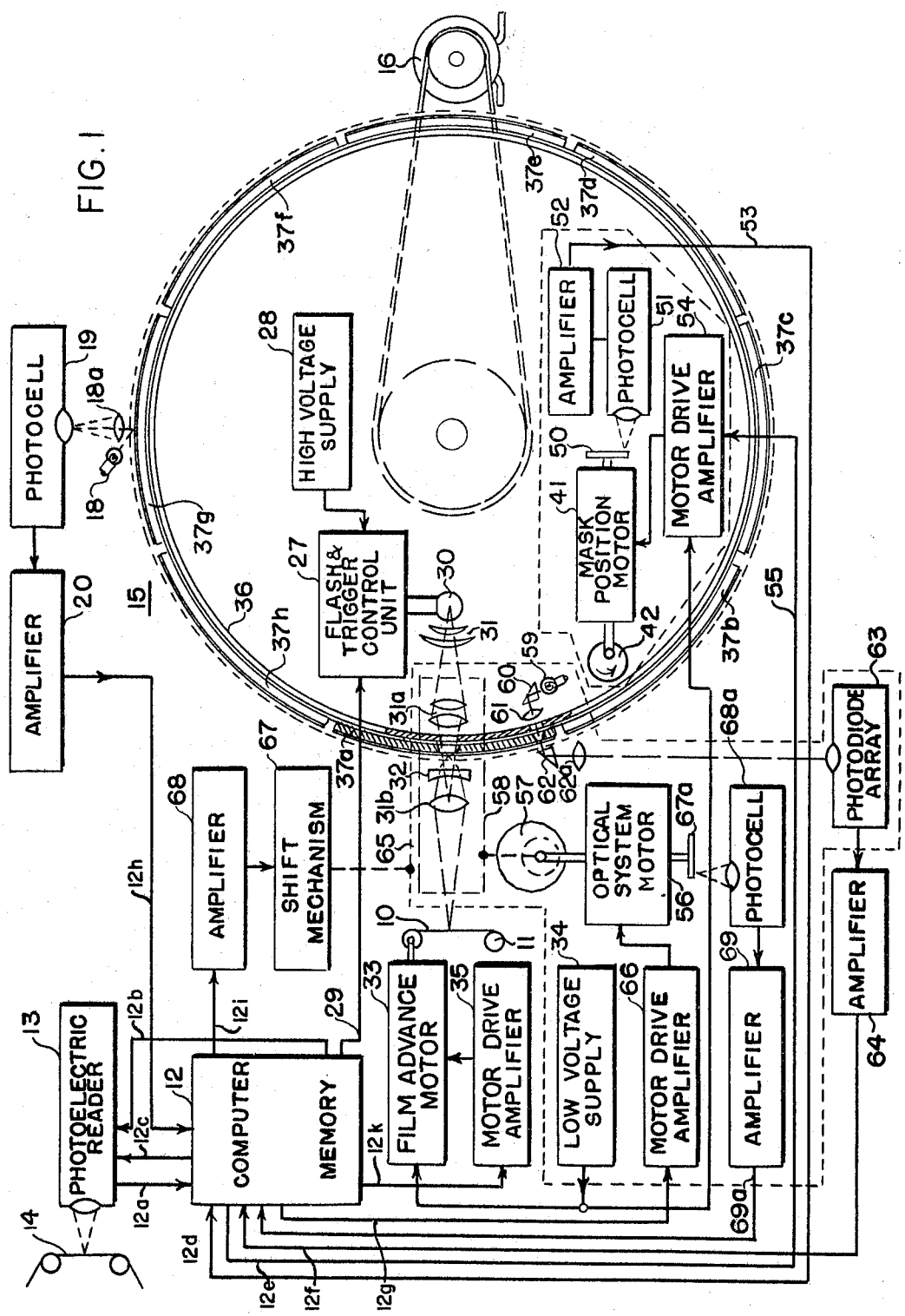

FIG. 55 is a diagram of a circuit for producing the system reset signal;

Referring now to FIG. 1 of the drawing, there is shown therein a diagram of an apparatus for composing line-by-line text on a photosensitive medium such as a film 10 disposed on an associated film transport 11, as disclosed in the aforesaid copending application Ser. No. 605,749. The text is composed on the medium in accordance with received coded input electrical signals representative of the characters of the text to be composed from a digital information and processing computer 12 which is the subject of this invention. Computer 12 receives basic information from a photoelectric reader 13 which scans a perforated tape 14. Tape 14 is of the type which has multi-channel code perforations representative of the character of the text to be composed, as well as auxiliary functions such as end-of-line signals, etc. As will be further explained in greater detail hereinbelow, computer 12, fed by reader 13, receives the character representative signals, stores them in a memory, processes them and employs the ensuing signal to control the several operations of the photocomposing apparatus.

The photocomposing apparatus of FIG. 1 includes a font drum 15 which is driven by a motor 16 and which is continuously rotated by motor 16 at a substantially uniform velocity. Drum 15 has thereon, a series of peripheral precisely and equally spaced position-representative indicia 17 in the form of alternate light and dark lines shown in FIG. 2, referred to as a "picket fence." The indicia 17 are scanned by a photoelectric system including a light source 18, an optical lens 18a, a photocell unit 19, and an amplifier 20 which feeds constant-frequency position-representative signals where they are counted to obtain a continuous and accurate representation of the position of drum 15 with respect to some arbitrary reference position.

Mounted on drum 15 is an endless strip of material having a plurality of axially spaced, longitudinally arranged, interlaced fonts of characters and position-representative indicia, the characters of each font style or type being effectively spaced by approximately the length of a composed line by means of a slotted mask. This endless font strip is in the form of two axially adjacent rings of font segments 22 and 23, the font segment of each ring being secured to a supporting drum segment and as so supported, abutting one another as closely as permitted by mechanical considerations.

A portion of one of the segments 22, 23 is shown in detail in FIG. 3. It is seen in FIG. 3 that each row of font characters, such as row 24, has associated therewith a series of character-representative indicia or character code holes 25 in axial alignment therewith, a character ready hole 25a, and a single narrow position-representative slit 26 also being in axial alignment therewith. Slit 26, also termed a strobe mark, has a longitudinal width which is a minor fraction of that of its character-representative holes. The characters, such as the row of characters 24, the coded character-representative holes 25, the character-ready hole 25a, and the slit 26, are of one extreme of optical density, and the surrounding field of the font segment is of the opposite extreme of optical density. Thus, for example, it is preferred to make the font segments 22, 23 opaque with the characters, holes and slit transparent, as by photographic printing. As shown in FIG. 3, each font segment includes a plurality of tracks or peripheral groups of characters in axial alignment, all of the characters in any axial row being the same except for size, type, style, etc. Each character is accompanied by a group of code holes identifying that particular character. Suitably, there may be two rings of type font segments, each ring comprising eight sements with each segment having eight character tracks of six groups of interlaced characters for a total of 4,608 font characters.

The photocomposing apparatus of FIG. 1 further comprises means for illuminating a single selected character from a single one of the fonts during its travel over approximately a line length, the image of the character, when illuminated, being projected onto a photosensitive medium cooperatively associated therewith, such as film 10 disposed on a film transport 11. This illuminating means includes a flash and trigger control circuit 27 which is energized from a high-voltage supply circuit 28 and is controlled from computer 12 through a connection 29 and the energizing of a flash lamp 30. The light from lamp 30 is projected onto film 10 by a conventional optical system, schematically indicated by designating numeral 31, which includes a collimating lens assembly 31a, an objective lens 31b and a plano-concave field-flattening lens 32 to compensate for the curvature of the font segments 22, 23.

In accordance with usual practice, film 10 is held stationary while a transverse line is composed thereon and then advanced line-by-line for successive line compositions. Such line-by-line advance is effected by a film-advance motor 33 which is energized from a low voltage supply source 34 and is controlled by computer 12, under the control of the input signals thereto from reader 13 through an amplifier 35. Motor 33 is operative to advance film transport 11 a predetermined leading increment upon the receipt of an end-of-line signal from computer 12, as represented by the storage of a line of text in the memory of computer 12. Film 10 is shown as disposed by FIG. 1 for convenience of explanation. Actually, it is rotated 90° in the equipment.

Figure 2:
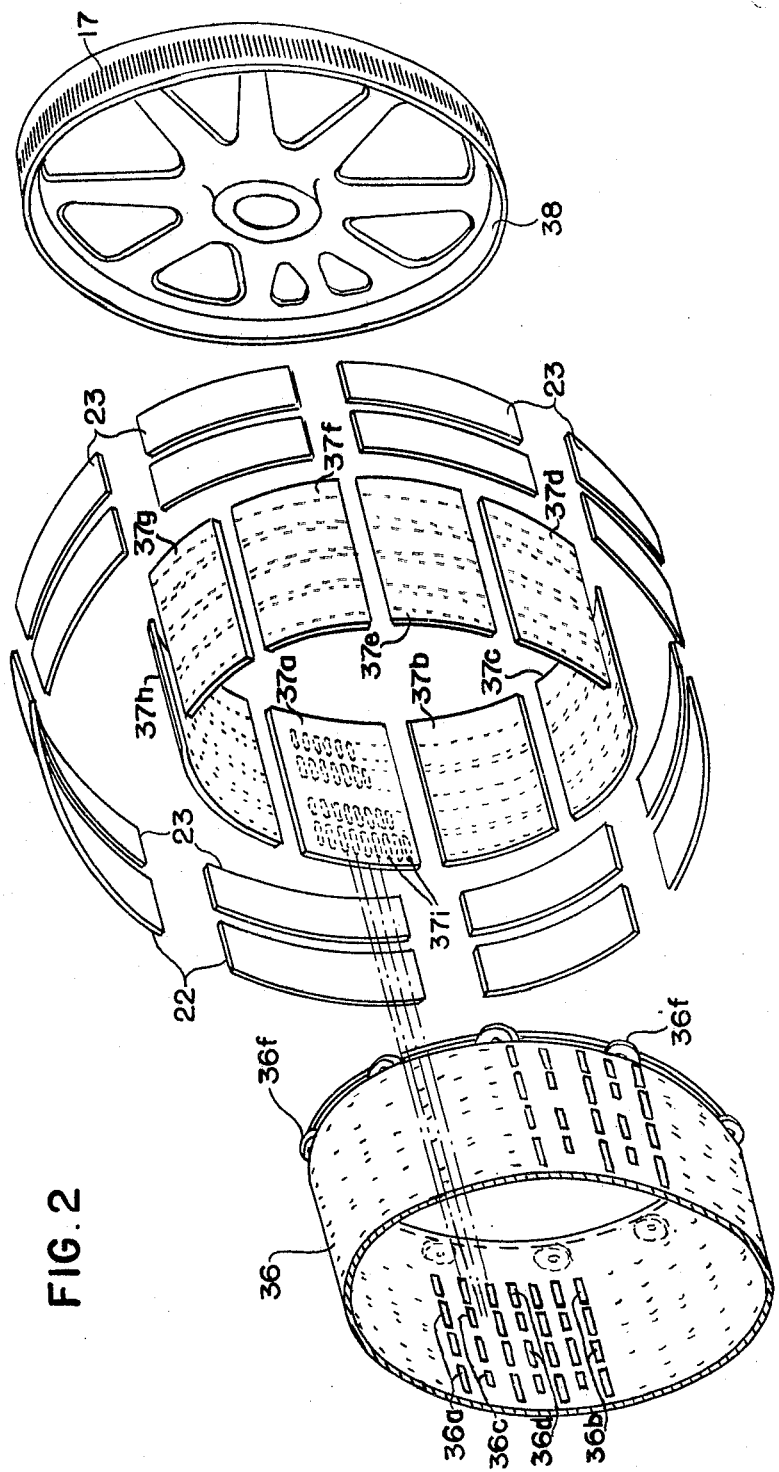
FIG. 2 is an exploded perspective view of the character fonts, their supporting drum and associated mask embodied in the apparatus of FIG. 1.

The supporting drum 15 for the font segments 22, 23 comprises a group of cylindrical segments 37a–37h secured to a spoked wheel or disc 38 (FIG. 2) on which the timing indicia 17 are disposed in accurate registration with the font strobe marks 26. Cooperating with drum 15 is a mask 36 which includes a plurality of peripheral groups or tracks of axially extending slots 36a (FIG. 2). There are two peripheral tracks of slots 36a, one for the font characters of each font and two peripheral tracks of slots 36b, one for the character code, character ready and strobe marks of each font. Each peripheral track of slots 36a, 36b includes one slot for each group of interlaced characters in the corresponding peripheral channel or track of one of the font segments 22, 23.

The apparatus is shown in FIG. 1 in the position in which a character of font segment 22a is being illuminated through one of the axial slots 36a in mask 36. As is shown in FIG. 2, type font segments 22, 23 are individually mounted on the drum segments 37a–37h, each having a series of peripheral groups or tracks of slots 37i, each group of slots registering with a group of character tracks of one of the fonts 22, 23 or with their associated code holes. Two axially adjacent font segments are mounted on each drum segment. The mask 36 is rotatable with font segments 22, 23 and their supporting drum segments 37a–

37h, but it is adjustable angularly relative thereto to permit illumination of only a single character, from a selected track of characters on one of the font segments 22, 23.

A code disc 50 (FIG. 1) is driven in unison with mask 36 for generating a mask-position representative signal, disc 50 cooperating with a photocell 51 and an amplifier 52 for supplying position-representative signals to computer 12 through a lead 53. There is also provided an amplifier 54, amplifier 54 being controlled by computer 12 by a lead 55 to actuate mask position motor 41.

The photocomposing apparatus of FIG. 1 also comprises an optical system 31, 31a, 31b, 32 which is capable of illuminating collectively one interlaced group of six characters of any of the peripheral tracks of font characters as indicated by track 31C, FIG. 3 from the flash lamp 30. To this end, there is provided an optical system motor 56 which drives a sixteen-sided cam 57 which in turn drives a carriage indicated schematically at 58 on which there is mounted the optical system 31, 31a, 31b, 32.

Sensing means is provided for deriving from either of endless font strips 22, 23 a position signal continuously representative of the instantaneous position of a given character during movement of the strips. Such sensing means comprises an optical system for responding to the character-code and character-ready holes 25, 25a and the strobe slits 26 in the type fonts 22, 23 (FIG. 3). This sensing means comprises a source of constant illumination 59 and an optical system 60, 61, 62, 62a for projecting light beams from such holes and slits onto an array 63 of photosensitive elements such as photosensitive semiconductor diodes or phototransistors. Signals developed in array 63 are fed to computer 12 through an amplifier 64, thus supplying computer 12 with an identification of the font character in position to be illuminated, together with an accurately timed strobe signal to start the counting of the signals from indicia 17 and the character-ready signals to initiate comparison of the character-representative signals from the character code holes 25 with the desired character signals from reader 13. The devices 59–63 are disposed on a carriage 65 on which there is adjustably mounted the carriage 58 for the optical system 31a, 31b, 32. Carriage 58 is adjusted with respect to carriage 65 by motor 56 and cam 57 in response to signals from computer 12 through amplifier 66. Carriage 65 is actuated by a shift mechanism 67 energized from computer 12 through an amplifier 68.

A disc 67a is included which is disposed on the shaft of motor 56 and which provided with a group of position representative holes which are illuminated by a light source (not shown), coded light impulses being picked up by a photocell, 68a coupled to an amplifier 69 for generating a position-representative signal and applying it to computer 12 through a lead 69a. Computer 12 includes means jointly responsive to the position-representative signal fed thereto on lead 69a and to the input signals from reader 13 for actuating carriages 58 and 65 for optical systems 31a, 31b, 32 and 59–63 to preselected axial track positions.

Thus, shift mechanism 67 is effective to actuate carriage 65 to shift both of the optical systems to a selected one of the type font rings 22, 23 while motor 56 operates to adjust carriage 58 with respect to carriage 65 to position optical system 31a, 31b, 32 to a selected track of font characters of the selected font ring.

The timing of the momentary energization of flash lamp 30 is effected by computer 12, which responds to the timing signals derived from the position-representative slits or strobe marks 26 in the font segments 22, 23, the drum position-representative signals from the pickup system 17, 18, 19, the character-representative signals for each of the characters derived from the character-representative code holes 25, the character-ready signals from the holes 25a, the accurate character position signals from the strobe slits 26 and coded position signals derived from the input signals from reader 13 for momentarily exciting flash lamp 30 wherever and whenever the selected character in position to be illuminated appears in the line of text being composed.

In explaining the operation of the above-described apparatus, it is to be realized that an important object thereof is to project onto film 10, during the composition of each line, each character as many times as it occurs in the line and during a single scanning of the line location on film 10 by such character, i.e., during one flash mode cycling of the memory as will hereinafter be described. The several characters occurring in the line of text being composed are illuminated in succession under the control of computer 12 in the order in which they occur on font sectors 22, 23 during rotation of drum 15, usually in the order of statistical frequency of occurrence. Thus, each time a strobe slit of a font character is sensed by the devices 59–63, there is supplied to computer 12 a character-position signal which initiates operation of a counter therein responsive to signals from the position indica 17. Each time the reading of the counter corresponds to the position of the character to be illuminated in the line being scanned, lamp 30 is momentarily illuminated by flash unit 27 under the control of computer 12 and the selected character is projected onto film 10. At the end of the line, the counter of computer 12 is reset to zero and thereby conditioned to respond to a signal from the strobe slit of the next character selected by the computer.

Let it be assumed that, initially, it is desired to compose a line of text in which all of the characters are of the same font style such as, for example, lower case characters of a given type size. Under these conditions, mask 36 and the optical systems on carriages 58 and 65 respectively remain in the same positions throughout the composing of the line.

Next, let it be assumed that the line of text to be compared includes one or more letters of different type style, or other characters such as punctuation marks, which are found in another of the peripheral rows of characters from that being exposed in the example described above, requiring an angular shift of mask 36. The mask control section of computer 12 is capable of determining in which mask positions the remaining characters to be flashed may be found. When all the characters available in the instant mask position have been flashed, the computer generates a signal indicating the nearest mask position having required characters which have not been flashed. This signal is compared with the position signal supplied to it by the optical system position-sensing units 50, 51 and supplies a signal to the motor 41 through amplifier 54 to advance cam 42 in a number of discrete steps until the two-position signals are in coincidence. Computer 12, through unit 27, then momentarily excites lamp 30 when the selected character is in proper position or positions during scanning of film 10, as described above.

Similarly, interlace control section 272 of computer 12 has the capability of determining when all the characters in a particular track have been flashed. When all the characters available in the instant track have been flashed, provided the line has not been completely composed, a signal is generated by the computer 12 which is compared with the actual track position signal supplied to it by the position sensing units 27a and 28a. In the absence of coincidence between these signals there will be supplied, from computer 12, to the optical signaling position motor 56, through amplifier 66, a signal to advance cam 57 a number of discrete steps. This signal will persist until the two position signals are in coincidence. It is well to note, when a 5-inch line is being composed, characters can be mixed between a maximum of two tracks and when a 2½-inch line is being composed, characters can be mixed between a maximum of four tracks. This is due to the fact that in a 5-inch line the upper and lower rails are formed on a single track, whereas in a 2½-inch line the upper and lower rails are on separate tracks. In other words, when composing a 5-inch line each magazine comprises a single track and when composing a 2½-inch line each magazine comprises two separate tracks.

Stepping of motor 56 is effective to move carriage 58 and the optical system axially of the type fonts and into position to illuminate the desired track of interlaced font characters. Computer 12, through unit 27, will then momentarily excite lamp 30 each time the selected character is in proper position or positions during the scanning of a line on film 10.

The control panel for the photocomposing apparatus is equipped with switches which allow the operator to select which track or tracks will comprise the upper magazine and which track or tracks will comprise the lower magazine. If the operator selects all tracks within a particular font, specifically either section 22 or 23, then it will be unnecessary for the shift mechanism 67 (FIG. 1) to be actuated. However, if the operator selects tracks located in both fonts 22, 23, shift mechanism 67 must be utilized. In the latter case, when the signals generated in the computer 12 indicate that both upper and lower rails in a particular section, specifically either upper magazine or lower magazine, have been flashed, it will supply a signal which is effective to cause a shift of carriage 65 to its opposite extreme position, concurrently carrying with it, carriage 58. If the operator has set the track selector switches such that a track movement is required as well as a section shift, this track movement may occur simultaneously with the section shift. Therefore, the combined movement is operative to move both the optical systems from registration with one type font to registration with a pre-selected track in the other type font.

Figure 4A:
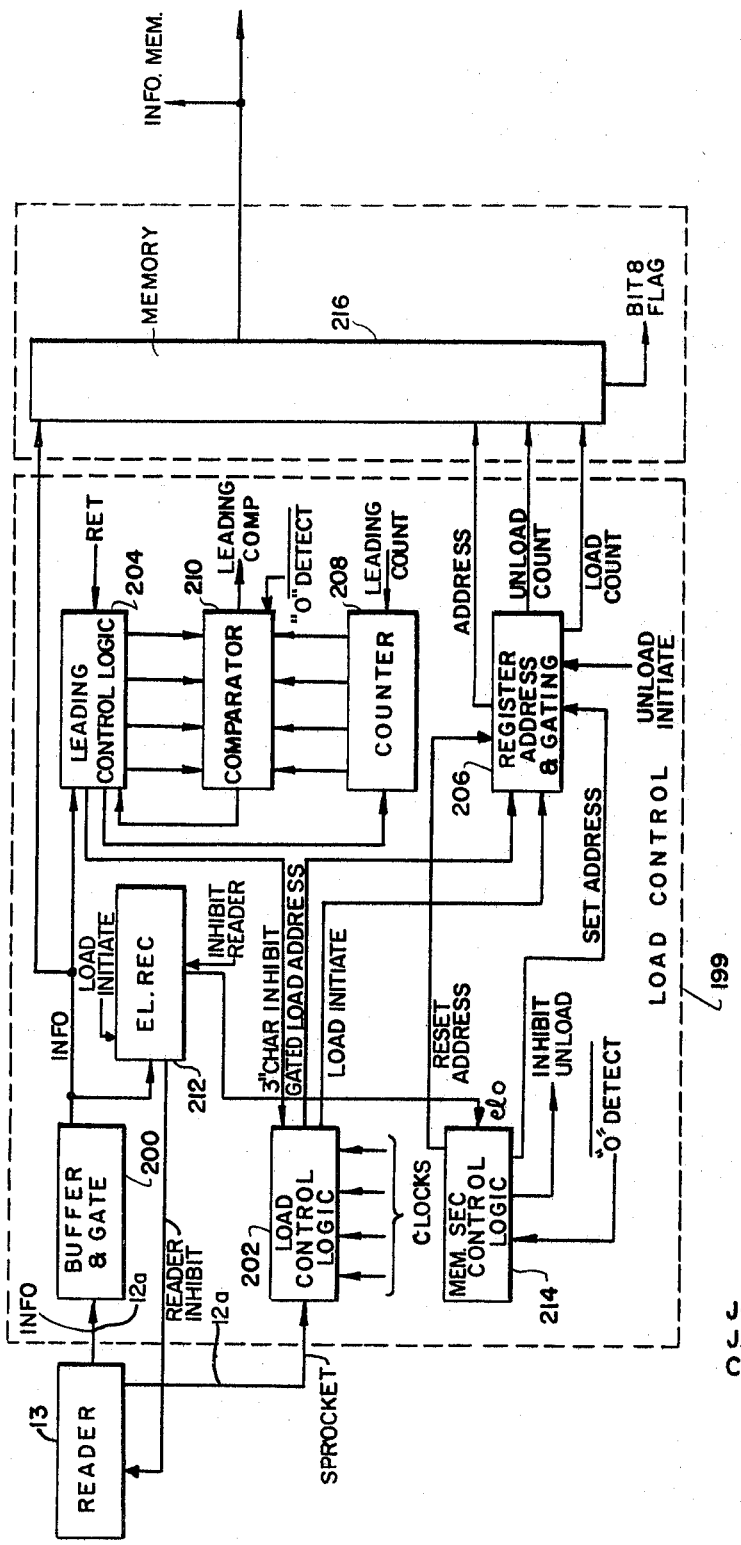
FIG. 4A is a block diagram of the load control and memory sections of the system according to the invention.

Referring now to FIG. 4A, there is shown a block diagram of the load control section 199 of computer 12. In this section, reader 13, which is not part of the computer, per se, as is also demonstrated in FIG. 1, is suitably of the photoelectric type and is adapted to sense punched holes in a perforated tape and produce respective signals in response to such sensing.

The tape is suitably of the type which contains seven hole positions on each line thereof, the center position being always punched to produce a sprocket pulse which functions as a load signal. The other six positions in a tape line enable the generation of a six-bit code, i.e., $2^6$ combinations. These latter combinations are utilized to provide character, function, and leading information, a line of type to be composed being followed on the tape by an end-of-line or "elevate" code.

The term "leading" has the same significance as it has in the graphic and printing arts and the term "leading information" therefore refers to information as to spacing between lines, paragraphs, etc., that the tape preparer wishes to make use of in the photocomposing of the type line. In the operation of the computer, a first given number of tape lines at the beginning of a tape contain the leading information codes. Suitably, the computer may be designed to handle any number of different increments of type line spacing, three increments being practicable. Consequently, the given number of first tape line codes may be three. Also, to enable the selection of the proper increment, the tape preparer, at the completion of his punching of a line of type on the tape but prior to his punching a code to indicate the end of line, suitably termed the "elevate" code, punches a return code once, twice, or three times to indicate whether the increments of line spacing represented by the codes in the first, second or third lines on the tape are to be employed.

The tape as prepared for use with the computer is the so-called "justified" tape. In this connection, the term "justified" is employed in the same context as it is used in the type-setting art, i.e. that each line of type material in a given line length extends fully from the left to the right ends of the lines with the spaces between words in the line being relatively uniform in width. The computer, as will be further explained, automatically effects such justification by various counting and other digital techniques. The term "justified tape" is intended to signify that the amount of actual printable characters, punctuation, word spaces, etc. punched into a line of tape is such that the remaining spaces within a line to be handled by the computer in its effecting typeline justification is within the computer's capabilities.

The lowest unit of width in a line is herein defined as the unit set. Eighteen of such unit sets constitute a point and twelve points are equal to a pica. Accordingly, some of the counters in the computer are suitably coded to count these unit sets, ½ points and picas as will be further shown hereinbelow.

As shown in FIG. 4A, the tape information is transferred line by line into the load control section 199 from tape reader 13 on lead 12a as also shown in FIG. 1. In this section, a buffer and gate stage 200 receives the line-by-line information from reader 13, voltage levels of the signals resulting from the sensing of punched holes in reader 13 being converted therein to the logic levels for which the computer is designed. Thus, in a particular design application, a sensed punched hole may produce a signal of minus 12 volts in reader 13. Such signal is converted to plus 3 volts in the buffer portion of stage 200 and the gate portion of stage 200 may then invert the plus 3 volts signal to a ground or zero volt signal. Thus, the logic levels employed in the operation of the computer may be zero volt to represent a binary one and plus three volts to represent a binary zero. The information as it is received in stage 200, line by line, is loaded into the memory 216 line by line.

Prior to proceeding with the description of load control stage 199, it is, at this point, convenient to state that memory 216 may suitably be of the coincident core type. A suitable embodiment of such memory is the Random Access memory made by Fabri-Tek Incorporated of Amery, Wis. and disclosed in their publication "Bulletin No. 6211." This latter memory is a 512-word by 8-bit coincident magnetic core memory having a 10-microsecond cycle time and a 5-microsecond access time. The random access full cycle is a read-restore and clear-write cycle. This memory includes the necessary ancillary circuit structures such as data and address registers, control flip-flops etc.

Since such memory is capable of storing 512 eight bit codes and since a line of type will include at most a total of 256 characters, punctuation and word space codes, etc., the memory is efficiently used in two sections, i.e., load and unload sections to effect time sharing whereby, while one section of the memory is being loaded, the other section is unloaded. Then, the unloaded section becomes available as a section for loading while the loaded section is unloaded. Thus, the information from buffer and gate stage 200 is loaded into the load section of the particular moment in memory 216.

It is seen in FIG. 4A that the sprocket pulse output of reader 13 which occurs at every punched line in the tape is applied to a load control logic stage 202 on lead 12a as shown also in FIG. 1. In stage 202, there are shown clock inputs which are provided from a suitable clock generator. These clocks which are pulse trains comprising pulses which occur at different points in a unit of a timing cycle, function to synchronize the relatively slow sprocket pulses with the greater speed of operation of the computer. The outputs of load control logic stage 202 are a load initiate signal which is applied to a register address and gating stage 206 and a gated load address signal which is also applied to stage 206.

Prior to describing the 3″ character inhibit input to stage 202, which inhibits the load initiate signal while the first three characters on the tape are decoded; it is convenient to first discuss the operation of the leading control logic stage 204, comparator 210 and a counter 208.

The leading control logic effectively includes logic of the load control logic stage 202, the gated load address signal produced in stage 202 also suitably being utilized to effect the leading operation. The gating arrangement for stages 202 and 204 includes logic for counting the sprocket pulses, logic for decoding a return code to provide the leading increment return (RET) signal input to stage 204 and a counter for providing the 3″ character inhibit signal input to load control logic stage 202 whereby the first three characters on the tape which represent leading information are not loaded into the memory.

Figure 4G:
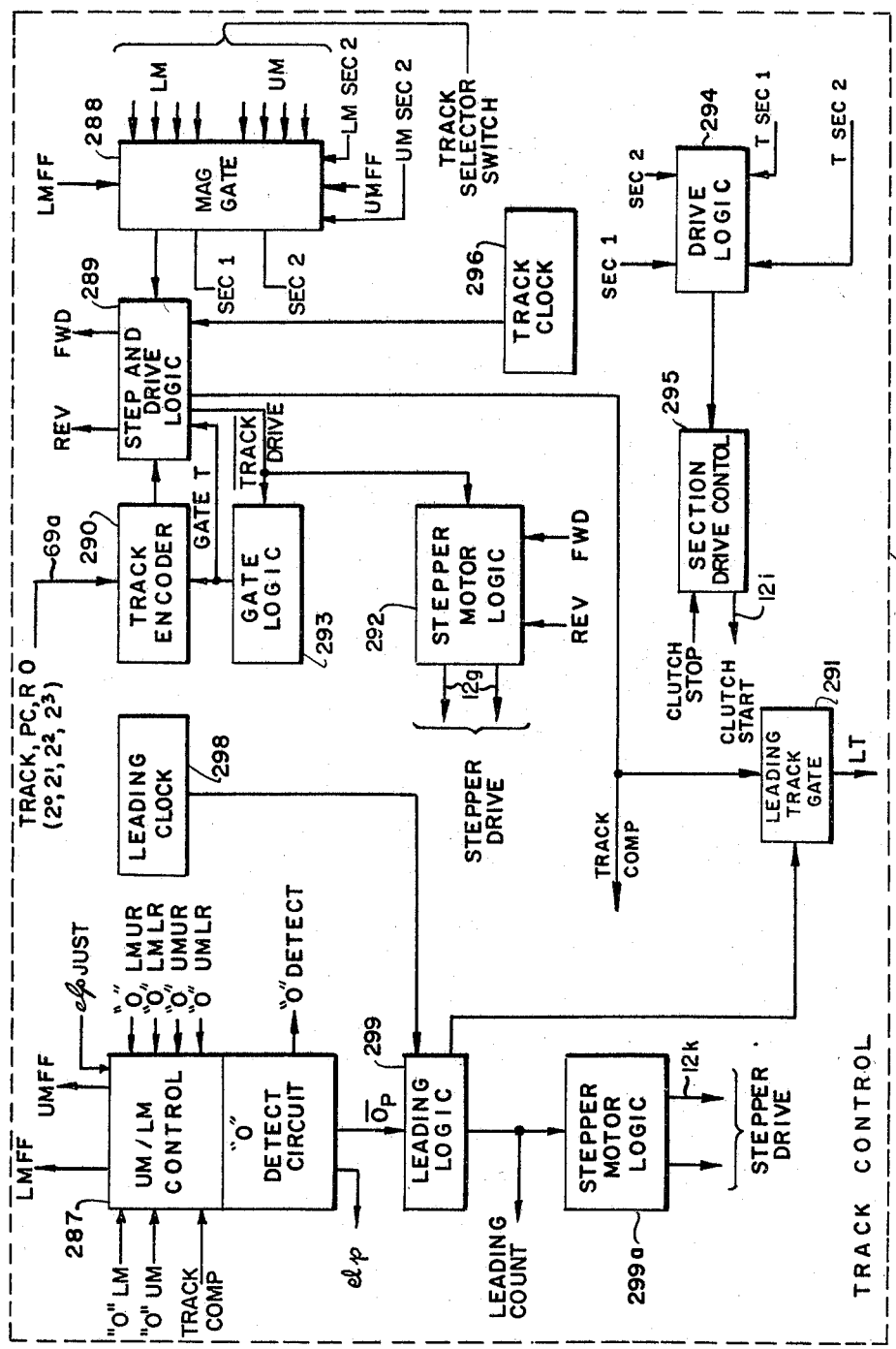
FIG. 4G is a block diagram of the track control section.

The leading control logic stage 204 in response to the return code input thereto and the buffer input thereto provides a signal to counter 208 which counts in suitable representative units such as half points, the latter counter counting the steps that film advance motor 33 (FIG. 1) is stepped via amplifier 35 and lead 12K, FIGS. 1 and 4G, as indicated by the leading count signal input into counter 208. Such count is compared in comparator stage 210 with the proper leading increment count in leading control logic stage 204. When the coincidence occurs in comparator 210 between the two counts, a signal issues from comparator 210, i.e., the leading comp signal to reset the leading control logic indicating that the proper degree of advance of the film by film advance motor 33 has been effected.

As has been mentioned, the load count signal and the gated load address outputs of logic control stage 202 are applied as inputs to a stage 206 legended register address and gating. This stage suitably includes a load address counter, an unload address counter and a gating arrangement for time sharing the outputs of these counters with the address circuitry in memory 216. Both of these counters suitably have a capacity of 512 words i.e., they can count the characters and functions in a line up to a total of 512. The load count signal also functions to effect the loading of the information from buffer and gate stage 200 character by character into the memory in accordance with a given clock timing.

In the elevate recognition stage 212, there is employed a given coding arrangement for recognizing the end of line or elevate code to produce the el signal at the end of the loading operation of the tape contents into the buffer and gate stage 200. An output of the elevate recognition stage 212 is an input to a section control logic stage 214. This stage determines the proper selection of the respective sections of the memory for loading thereunto by means of the reset address and set address signals. Assuming that the sections into which the memory is divided are designated as sections 1 and 2, then the elevate signals respectively occurring at the end of each line can be utilized to effect the alternate actuation and deactuation of the loading into section 1, for example. Then the "0" (zero) detect signal which signifies that no more characters remain to be flashed in a line being unloaded can be correspondingly used to alternately actuate and deactuate the unloading of section 2. It is seen that stage 212 produces a reader signal on command of the inhibit reader signal which is applied to reader inhibit 13 on lead 12b, c, FIG. 49, leads 12a and 12b, FIG. 1, its significance being explained below. There also issues an inhibit unload signal from stage 214, as is explained in conjunction hereinbelow with the explanation of operation of section control logic stage 214.

Thus, summarizing the load operation, the line of type information from the tape reader is loaded into the load section of the memory for a given line. The film advance motor 33 is stepped after a line has been fully flashed to bring the proper film line into position. In load control section 199, buffer and gate stage 200 functions to convert the output of the tape reader to the logic levels employed in the computer, and load control logic stage 202 effects the loading of the information from the buffer into the memory and advance the load address register. Section control logic stage 214, in response to the elevate recognition signals, actuates one or the other sections of the memory for loading thereinto when all the necessary conditions therefor are attained, and loading control logic stage 204, comparator stage 210 and counter stage 208 achieved the desired spacing between lines in the stepping of the film advance motor 33 through its associated amplifier 35.

It is to be noted from memory 216 that there are provided eight outputs, six, of course, being the information output, one output not been utilized and the other output being legended "bit 8 flag." In this connection, it is recalled that the memory is of the 8-bit type. Six bits are taken up by a character code, the seventh bit is not employed. The eighth bit is utilized in the unload control section and at a given state (binary one or zero, as chosen) indicates that a character in memory has or has not been flashed.

Once the line of type has been loaded into the proper section in memory 216 and with film 10 in its proper position, the unload operation commences. To this end, there is first entered into what may be conveniently termed phase 1 of the unload operation or cycle.

In this phase 1 of the unload cycle, the character codes in the memory locations in the loaded sections are sequentially transferred under the control of the unload address register counter in stage 206 into a decoder section 219 shown in FIG. 4B. It is recalled that further loading into the section of the memory now to be unloaded is inhibited by either the elevate recognition signal or the zero detect signal and that the other section correspondingly has been actuated for loading by either the zero detect signal or the elevate recognition signal.

As shown in FIG. 4B, the information from memory 216 is applied to a character decoder stage 218 from which there are produced a plurality of discrete outputs, such as 49, the latter 49 outputs representing forty nine characters which require width on a type line. In addition, logic is included as shown by stage 224, legended functions to produce signals representing functions used in the type setting art. The functions shown by way of example as outputs of stage 224 are:

| Symbol: | Definition |
|---|---|
| Stop | Stop. |
| QC | Quad Center. |
| QR | Quad Right. |
| QL | Quad Left. |
| UM | Upper Magazine. |
| SH | Shift. |
| R*et* | Return. |
| UR | Upper Rail. |
| EL | Elevate. |
| SB | Spaceband. |

The arrow designated "etc," adjacent to stage 224 is used to indicate that there are many more functions such as em space, en space, lower rail, lower magazine and the like.

With regard to the interlace grouping encoder stage 226 shown in decoder section 219, it will be recalled further that angularly along each circumferential section of the font wheel, there occur respective groups of six interlace positions. Logic is provided in stage 219 to decode the interlaces, the output interlace signals being used in the mask control section of the computer. It is noted that the interlace sections are shown as being only three whereas there are six interlace positions. Actually, interlace position signals 1, 2 and 3 may be chosen to represent one of the rails (lower or upper) and then interlace position signals 4, 5 and 6 respectively correspond to signals 1, 2 and 3 except that they may represent upper rail, for example.

The characters and other elements of a line which actually require width, i.e., the aforesaid 49 outputs, for example, are applied to a font family stage 220 which is an encoder which translates the inputs therein into any one of fifteen outputs representing different widths in accordance with the font style to be selected. Since the font style selection permits of a great multiplicity of alternatives, for each particular style, a width gating card may be provided to select the various families of 15 widths, such selection being made by the operator of the system in accordance with a particular desired kind of type font.

Thus, summarizing the decoding operation, the characters in the load section of the memory are decoded to provide signals representing each one thereof and are gated with width information in accordance with the selection of a given font style to be grouped into up to 15 width groups. In addition, functions and interlace positions are also decoded to provide respective representative signals therefor. It is to be noted that Bell or $\overline{\text{II}}$ characters punched on the input tage are also decoded in decoder section 219, the terms Bell and $\overline{\text{II}}$ having the same signification herein as they have in the typesetting art.

At this point, the outputs of character decoder section 219 are applied to font family stage 220, the stage of accumulator section 223 shown in FIG. 4C.

In this phase 1 of the unload operation, the accumulator function is essentially to effect justification of a line of type. As will be shown, in subsequent phases of the unload operation, it also functions to provide information for effecting the flashing of a character.

As may be seen in accumulator section 223, the fifteen font family width outputs are applied to a binary and gating stage 222. The binary portion of stage 222 provides ten binary outputs representative of given widths to be assigned to a character. The gating portion of stage 222 effects the gating of these outputs into parallel counter 228. These ten gated outputs are in an OR arrangement with the spaceband, SB and quad count, QD inputs. The spaceband and quad count inputs are utilized in the line justification operation and they are entered after the binary width outputs are entered as is further explained hereinbelow.

Thus, the ten binary outputs from stage 222 are applied to parallel counter 228 which is a unit set, point, pica coded counter and wherein the total width of all of the space occupying characters in a line are cumulatively entered. On the console of the system, there are suitably provided switches which provide in point, pica code, the length of the line to be set. The output of parallel counter 228 and the console switch settings are applied to a comparator 230 legended variable comp. At this point phase 1 of the unload operation is completed and phase 2 thereof begins.

It is, of course, realized that with the mere insertion into parallel counter 228 of the cumulative widths of the width occupying characters, substantial unoccupied width still exists in the line so that at this point the count setting in the console switches must exceed the setting in parallel counter 228 and the next step required is to effect justification of the line, i.e., to increment counter 228 to the point where its setting matches the setting in the console switches. To understand the justification operation, reference now is made to the unload control section 231 in FIG. 4D and to the number comparator section 253 in FIG. 4E.

Unload control section 231 has numerous functions. In the line justification operation, after all of the widths of the width occupying characters have been entered into parallel counter 228 of accumulator 223, memory 216 is repeatedly cycled for word space codes, i.e., each line is completely cycled, until the elevate code in the memory is recognized, i.e., the *elp* signal. In this connection, in considering the entering of the character widths into the accumulator, the first phase of the unload operation was completed with the recognition of the *elp* signal from the memory. Thus, in the second phase, the significant *elp* pulses are those beginning with the *elp* pulse produced at the first cycling of the memory after the first phase is completed, i.e., the second *elp* pulse which is produced.

In unload control section, 231, there is shown a quad control stage 232 which may be passed over at this point with the observation that it functions when a quad operation is to be performed on a line, i.e., a line beginning from the left margin which ends before the right margin (quad left), a line which ends at the right margin and begins a distance from the left margin (quad right), and a line whose respective ends are each spaced like distances from the left and right margins (quad center). In these type of quad operations, line justification takes place in a different manner or not at all, i.e. automatically (quad left) and as such they have to be inhibited when an ordinary line justification is to be effected, whereby a quad inhibit pulse issues from stage 232 during such ordinary justification.

In unload control section 231, the stage 234, legended computer control logic, has applied thereto the elevate, i.e. el signal encountered in each cycling of the memory in phase 2 of the unload operation, the elevate signals being sampled in stage 234 to produce the *elp* pulses. There are also applied to stage 234 the spaceband, i.e., SB signals to provide a train of output spaceband pulses legended SB Just. The latter train is applied as an input to a stage 238 in unload control section 231 legended Mode II. The spaceband signals sensed in the phase 2 cycling of the memory are also serially entered in parallel counter 228 in accumulator section 223 through the gating portion of binary and gating stage 222.

The term spaceband as used in this system is analagous to the use of the same term in the typesetting art, i.e., an increment of width of a wedge, such increment being the amount that the portion of the wedge is increased by as it is pushed further between adjacent characters. In this system, each spaceband signal encountered in the phase 2 cycling of the memory is entered into parallel counter 228 to increment its contents by one, such incrementing continuing until variable comp stage 230 in accumulator section 223 indicates that the total contents of the accumulator, i.e., the sum of the widths of the line space occupying characters and the unit spacebands entered thereinto equals the setting on the console switches. At this point the line comparison i.e., the LL comp signal issues from variable comp stage 230.

Let it be assumed, for example, that there are 10 spacebands in each line whereby 10 spacebands, i.e., SB signals are encountered in each phase 2 cycling of the memory. Let it be further assumed that 197 spaceband units are required in counter 228 to effect a line comparison. Consequently, at the encountering of the seventh spaceband signal in the twentieth cycling of the memory, line comparison is effected. As seen in unload control section 231, the line comparison signal LL comp and the *elp* pulse are applied to a gate stage 246. At the occurrence of the twentieth cycling in this example and the LL comp signal, the just (justify) signal issues, the use of which is explained further hereinbelow.

It was mentioned that the SB Just output of computer control logic 234 is entered into mode II counter 238. The SB Just signals are entered into a mode III counter 236.

In mode II counter 238, each spaceband encountered in a phase 2 cycling of the memory is entered and the counter is reset at the occurrence of *elp* $\overline{\text{just}}$ pulse. The $\overline{\text{just}}$ signal, which exists only until justification of a line occurs, has the opposite binary state to that of the Just signal. While the phase 2 cycling proceeds each *elp* $\overline{\text{just}}$ pulse is entered into stage 254 legended SB width in the number comparator section 253, FIG. 4E. Mode III counter 236 is inhibited until the justify signal issues at line comparison time, i.e. LL comp. When the just signal issues, Mode II counter 238 is inhibited from any further counting and at the next *elp* time, the *elp* $\overline{\text{just}}$ signal cannot ssue so that the Mode II counter has locked therein the remainder odd number of spacebands encountered in the last phase 2 cycle required to effect justification. The Mode III counter 236 at this time has entered therein, the spacebands encountered in the last cycle after justification until the next *elp* pulse at which point it is cleared. Thus, at the *elp* just pulse after justification, there is contained in SB width counter 254 a count of all of the *elp just* pulses, i.e., a count of all of the phase 2 cyclings required to effect justification; there is contained in Mode II counter 238, the remainder number of spacebands required in the last phase 2 cycling to effect justification, and a zero count in Mode III counter 236. However, Mode II counter 238 is now inhibited and Mode III counter 236 is conditioned to count.

During phase 3 of the unload operation, each time a spaceband is encountered in a cycling of the memory, the contents of the SB width counter are entered into the parallel counter of the accumulator. There is the remainder in the Mode II counter. Each spaceband is also entered into the Mode III counter. While an agreement does not exist between the contents of the Mode II and III counters in the phase 3 cycling, the SB width counter contents are augmented by one at each spaceband occurrence until a comparison is reached between the contents of the Mode II and III counters at which point the Mode III counter is inhibited and the remaining spacebands in a line received the unaugmented SB width counter value.

Gate 237 represents the gating arrangement wherein the contents of the Mode II and Mode III counters are compared in each phase 3 cycle, the gate producing an output to augment by one the contents of the SB width counter at each spaceband occurrence until an agreement is reached.

The justify, i.e., just signal is present throughout the third phase of the unload operation. Consequently, parallel counter 228 of the accumulator is cleared at every occurrence of a succeeding elevate pulse.

Phase 3 of the unload operation is conveniently referred to as the flash mode. In this mode of operation, it is necessary to discretely flash a particular character each time it occurs in a line in its proper position therein prior to a like flashing of a next character.

In considering this phase 3 operation, reference is first made to the character comparator section 260, FIG. 4F. A clock generator is provided in the system which is operative to provide a plurality of like pulse trains respectively equally displaced in phase for a given period such as eight respectively designated as $TC_0$ to $TC_7$. In addition, there are produced from the clock generator, several other pulse trains such as a sample clock, an unload clock, etc. as will be further explained hereinbelow.

At the end of the phase 2 of the unload operation, i.e., there issues from track control section 286, FIG. 4G, a signal indicating the coincidence of the elevate, justified non-zero detect condition. It has been mentioned that in each interlace position on a font, there is a character ready hole. When this hole comes into coincidence with the light beam between a photocell and its associated light, a character ready signal issues from amplifier 20. This character ready signal is used to provide in the computer the character ready pulse CR(G).

At given recurring clock times, initiate signal from unload logic stage 242, FIG. 4D, in the unload control section is sequentially presented to the memory. In the phase 3 of the unload operation, respective unloaded characters are compared with the character that the font wheel, i.e. the track has presented, the character code from the wheel being generated through the photocell array 63 (FIG. 1), through amplifier 64. This is illustrated in character comparison section 260, FIG. 4F, wherein there is shown a stage 264 legended comp in which the inputs are the information from the memory, the information from the photocell array 63, through the amplifier 64 and lead 12*f*, FIG. 1 the CR(G) pulse, the functions signals, etc. When the character unloaded from the memory coincides with that presented from the wheel, a character coincidence signal issues, further unloading from the memory is momentarily inhibited and the bit 8 flag is switched in state.

With the incidence of the picket fence slit, a picket fence count is also initiated by the state of the inhibit P.F. (picket fence) output signals from CR logic stage 244, FIG. 4D, determined by the picket fence signals produced from photocell 19 through amplifier 20 and lead 12*h*, FIG. 1, the count being effected in the stage 266 legended P.F. timing and being entered into a counter 255 in number comparator section 253, FIG. 4E, the count suitably being multiplied by a predetermined factor to bring it into synchronism with the clock times in the computer.

It is recalled that in load control section 199, FIG. 4A, register address and gating section 206 therein contains an unload register. In phase 3 of the unload cycle, when stage 206 receives an initiate signal, it first unloads the first character in the memory 216 into decoder section 219 and then into the parallel counter of the accumulator. Sequentially thereafter the next occurring characters in the memory 216 are unloaded in the same manner, the unload register being gated with the load register, each character as it is unloaded passes through the font family and binary stages to have its width determined. The parallel counter in the accumulator section which is reset upon the coincidence of occurrence of the *elp* and justify signals at the end of the phase 2 cycling at a given clock time and is then set by the latter signals at a subsequent clock time whereby it is now conditioned to have inserted therein the widths of the space occupying elements in the line being composed in synchronism with the cycling of the memory 216.

Thus, as characters are sequentially unloaded from memory, their widths are accumulated in the accumulator in unit set, point, pica code. When a spaceband is encountered in this unloading from memory, the setting in the SB width counter is gated into the accumulator.

Thus, when a character comparison occurs between a character presented by the font wheel and one unloaded from the memory, it becomes necessary to determine the position in the line that such presented character is to be flashed onto film 10.

With the further unloading of the memory inhibited, once a character comparison occurs, the count in the accumulator is compared with the picket fence count. When the picket fence count matches the count in the accumulator, a comparison is achieved and the No. comp signal issues from comp stage 256 in the number comparator section 253, FIG. 4E.

On the issuance of both the character comparison and the number comparison signals, the comp logic stage 248 in unload control section 231 produces a character comp inhibit signal, the flash logic stage 249 is enabled through lead 29, FIG. 1 and the compared character is flashed by flash and trigger control unit 27 onto film 10 in its proper position in the line. The changing of the state of the eighth bit of the memory code of a flashed character, functions to prevent its being doubly exposed when it is presented by the font wheel to determine when all characters in a line have been flashed.

The unloading of the memory proceeds. If the character already flashed in the line again occurs, i.e., a character comparison occurs, then the picket fence count comparison with accumulator count at that point again causes it to be flashed. Thus, in each scan of a line through memory, the first character to be encountered which compares with a character presented by the font wheel is flashed at every position in which it occurs in the line. When character coincidence issues, all of the eighth level bits of this character in the memory are switched in their states to prevent their again being flashed in the flashing of a complete line. Once a character has been so flashed for all its occurrences, and a complete line is unloaded from the memory, the recognition of an elevate signal will inhibit further issuance of unload initiate pulses to the memory until the next CR, i.e., character ready pulse is received from the font wheel.

Thus summarizing the unload operation, in the first phase, widths are assigned to all of the space occupying characters in a line and these widths are cumulatively summed in parallel counter 228. In the second phase, the memory is repeatedly cycled and a "unit set" width is added to the count obtained in phase one for each of the space bands encountered during this cycling until justification is obtained. After justification, the first elevate pulse to occur clears parallel counter 228 and the third phase commences. The third phase is known as the "flash mode" and is initiated by a character ready pulse from the font. Upon receipt of the character ready pulse, three things occur simultaneously: first, the memory is cycled to determine if the particular character in position is required in the line being unloaded (stage 264, FIGURE 7F); second, the picket fence count is started (stage 266, FIGURE 7F); and third, the parallel counter 228, in synchronism with the cycling of the memory, sums the widths of all characters, space bands, etc. (state 228, FIGURE 7C). If during this cycling, a character comparison occurs in state 264, FIGURE 7F, then the Char Comp signal issues and partially enables stage 248, FIGURE 7D. At the same time further cycling of the memory is inhibited by means of the Char Comp Inhibit Signal into stage 242, FIGURE 7D.

At this point, in order to flash this particular character, two other conditions are required to completely enable stages 248 and 249: first, the bit from memory 216 for this particular character must be true; and second, the No Comp Signal must issue from stage 256, FIGURE 7E. If the 8 bit is false, indicating that this character has already been flashed, it will not be flashed again. The No Comp Signal will issue when the Picket Fence Count equals the No Accumulator count stored in Parallel counter 228, FIGURE 7C. As was previously noted, parallel counter 228 has stored the summation of all the width elements from the beginning of the line being composed to the point where the character comparison occurs, therefore, this count indicates the position on the film at which the character is to be flashed. However, the cycling of the computer being considerably faster than the actual turning of the font wheel, flashing normally must be delayed until the P.F. Count, which indicates the position of the font character with reference to the film, corresponds to the No Accumulator Count. This comparison is made in stage 256, FIGURE 7E. The No Comp output of unit 256 is applied to stage 249, FIGURE 7D. At this point all the conditions required for flashing are present and the character is flashed on the film.

When the character is flashed, the 8 bit is inverted and the memory begins to cycle to determine if the particular character again occurs in any other positions in this same line. In the event that a subsequent character comparison is made, the character is flashed as hereinabove described. This procedure is repeated until the particular character is flashed at all the required locations on that line. On issuance of the end of line signal, both parallel counter 228 and picket fence counter 255 are cleared. The above procedure is repeated for each character ready signal that is presented to the computer.

There remain now to be explained the operations of the Mask and Track control sections. As has been explained hereinabove, the characters are arranged circumferentially about the wheel in segment groups to enable ease in fabrication of the fonts. The wheel suitably comprises two sections, each section of the wheel comprising eight circumferential tracks. Tracks 1 to 4 of each section may advantageously comprise complete fonts nad thus be rendered suitable for photocomposing 5-inch lines. Tracks 5 to 8 of each section respectively may essentially be made to be suitable for use in photocomposing 2½" lines and two of these tracks would therefore be required to form a complete font. Where the two tracks are employed to provide a complete font in the composing of 2½" lines, such tracks would have twice the amount of positions as compared to the single respective tracks 1 to 4 for composing a 5-inch line at which characters may be etched or otherwise graphically provided. This need not signify that the 2½" line composing double tracks contain additional character symbols. However, since a given character would appear twice as frequently in the use of two tracks, the system would thereby be rendered capable of operating in photocomposing 2½" lines at a speed which would be substantially twice that in the photocomposing of 5-inch lines, speed, of course, being number of lines per unit of time.

The use of two tracks for photocomposing 2½" lines in the system stems from the fact that the spacing of the individual symbols on a track may be so chosen that, with a given rotational velocity of the font wheel, and the mask in any position thereon, a character in the flash position sweeps the entire line before the next character to be flashed attains the flash position whereby a flash tube can be fired without the need of a shutter therefor. In setting a 2½" line in a given mask position every third character position is chosen to be open. In setting a 5-inch line in a given mask position, every sixth character position is chosen to be open.

Referring now to mask control section 270, shown in FIG. 4H, it is seen that there are entered thereinto in an interlace control stage 272, the interlace signal outputs from interlace grouping encoder stage 226 in decoder section 219 and the UM (upper magazine), LM (lower magazine), UR (upper rail) and LR (lower rail) signals outputs from functions stage 224 in decoder section 219, FIG. 4B. In interlace control stage 272, the interlace position signals are gated with the UM and LM signals to provide 12 signals, viz., interlace positions 1–6 (UM) and positions 1–6 (LM), which are stored in stage 272. Gating is also provided in stage 272 to produce when appropriate the "0" LMLR, "0" LMUR, "0" UMLR and "0" UMUR signals which respectively indicate zero characters remaining to be flashed in these positions and the $0_1$ through $0_6$ signals which respectively indicate zero characters remaining to be flashed in any of interlace positions 1 to 6. The first four "0" signals mentioned above are used in the track control section. The remaining six, i.e. those representing zero characters in the six interlace positions, are applied to a step logic stage 274 wherein they are gated with position 1 to 6 signals. The latter signals represent the actual position of the mask and are produced from an encoder stage 276 to which there are applied the outputs of code disc 50 and photocell 51 through amplifier 52 (FIG. 1) on lead 12d and which are supplied to stage 276 via FIG. 1. It is noted that a stage 278 is included in mask control section legended gate logic to which there is applied the gate PC input from the mask and from which the Gate M signal issues. The position 1 through position 6 signals, the $0_1$ to $0_6$ signals and the gate M signal are applied to a step logic stage 274.

In understanding the mask control logic as described thus far, let it be assumed that the mask is in a given position, i.e., one of the six positions resulting from the six interlace positions and the upper and lower magazine positions and there are characters to be flashed in such given position during phase 1 of the unload operation when character widths are being accumulated in the parallel counter. At this point, the signal representing this position would have been stored in interlace control stage 272. As long as this given position signal persists, the M gate is inoperative. However, when the M gate signal issues upon, i.e. when the given position signal ceases, then an output is produced from stage 274, i.e., the step mask signal which is applied to a stage 280 legended step gating and stop logic. Stage 280 has applied thereto the output of a mask clock stage 282 which may suitably be a free running multivibrator whereby a mask drive signal issues from stage 280. The mask drive signal is applied to a stage 281 legended stepped motor logic whose output is applied to mask position motor 41 through lead 12e, FIG. 1 and FIG. 4H and amplifier 54. The $0_1$ to $0_6$ and the position 1 to position 6 signals are also applied to a direction control logic stage 284 wherein they are decoded to provide forward and reverse signals to stepper motor logic stage 281 to determine what direction the stepper mask position motor 41 is to take.

When the mask, as moved by the stepper FIG. 1, attains a position as read by code disc 50 through photocell 51 and amplifier 52 at which there is character to be flashed, gate M is inhibited, the mask drive signal ceases and mask movement is halted.

In the track control section 286, FIG. 4E, the "0" LMLR, "0" LMUR, "0" UMLR and "0" UMUR signals provided from mask control section 270 (FIG. 4H) are applied to UM/LM control and "0" detect circuit stage 287. In this stage, assuming that all of the "0" magazine, rail signals are true, then the "0" detect signal issues. With the "0" detect signal, the $O_p$ pulse is present and a stage 299 legended leading logic is enabled thereby. A leading clock 298 is provided which may suitably be a free-running multivibrator. With leading logic stage 299, enabled a stepper motor logic stage 299a is caused to produce signals for stepping the film advance motor 33 through amplifier 35 (FIG. 1), the required distance as determined by the leading increment to move the film into position to have the next line of type to be photocomposed thereon. The output of leading logic stage 299 is applied to a gate stage 291 where, if film advance motor 33 is to be stepped, the L portion of the LT signal and representing a leading movement issues. Thus, upon the issuance of the "0" detect signal, the film is advanced to receive thereon the next line to be photocomposed.

A stage 290 legended track encoder has applied thereto the PC, R, 0 ($2^0$, $2^1$, $2^2$, $2^3$) signals supplied from photocells 68a through amplifier 69 and lead 69a (FIG. 1) and FIG. 4G which in particular coded states indicate the actual track position of the optical system 58 (FIG. 1). A stage 288 legended mag gate receives as inputs thereto the LM, UM, LM sec. 2 and UM sec. 2 signals provided from track selector switches, a system operator determining by the settings in the latter switches which of the tracks in either section in a given photocomposing are to function as lower and upper magazine respectively. The LMFF and UMFF signal inputs to gate stage 288 are produced in stage 287 and are utilized in mag gate stage 288 to decode the aforementioned track selector switch commands.

The outputs of track encoder stage 290 and mag gate stage 288 are applied to a stage 289 legended step and drive logic which determines whether the optical system is to be moved to a different track by optical system motor 56 through amplifier 66 (FIG. 1) and whether motor 56 is to be stepped in a forward or reverse direction. A track clock 296 is provided which may suitably be a free running multivibrator.

A stage 293 legended gate logic receives the track drive output signal from stage 289 and provides the gate T (track) input to stage 289, the latter signal indicating the optical system position to stage 289. The track drive signal output from stage 289 is also applied to a stage 292 legended stepper motor logic and which also has applied thereto the FWD and REV signal outputs from stage 289. If an optical system movement is called for to a different track, stepper motor logic stage 292 is actuated to step motor 56 (FIG. 1) through amplifier 66 and lead 12g, FIGS. 1 and 4G in the forward or reverse direction as required.

A drive logic stage 294 receives as inputs thereto the sec. 1 and sec. 2 signals to indicate which section of the two sections of the font wheel is required by the computer 12. It also receives the actual section 1 and section 2 position signals from the font wheel, specifically, the T sec. 1 and T sec. 2 signals. In response to a disagreement between the aforesaid required position signals and the actual position signals, a stage 295 legended section drive control is actuated, to cause optical system movement from one to the other sections of the wheel through lead 12i, amplifier 68 and shift mechanism 67, FIGS. 1 and 4G so that coincidence between the signals occurs.

It is well to note that the photocell readout signals, specifically T sec. 1 and T sec. 2, shown as inputs to stage 294 indicate the actual section with which the shift mechanism is in registration.

Thus, track control section 286 functions to select the proper track in the proper section as commanded by the operator.

The circuits used in the ensuing detailed description are basically of four types, i.e., a NOR gate, a JK type flip-flop, a flip-flop comprised of two NOR gates whose respective outputs and inputs are interconnected and an inverter driver.

FIGS. 5A and 5B show a two-input and a three-input NOR gate respectively, such gates being manufactured by the Fairchild Camera and Instrument Corp. under the designations 914 and 915 respectively. The gate of FIG. 5A is described in the publication of the above corporation entitled Fairchild Planar Epitaxial Logic, December 1963.

The gate shown in FIG. 5A which is the two-input NOR gate, produces a binary one-output (zero volt) if either input A or B is at a binary zero level (plus 3 volts). A binary zero (3 volts) is produced from the gate of FIG. 7A provided that both of inputs A and B are at a binary one (zero volt levels).

The gate of FIG. 5B functions similarly to that of FIG. 5A. Thus, if any of inputs A, B or C is at a binary zero level, the output of the gate is a binary one. A binary zero is produced from gate 5B only if inputs A, B and C thereto are all at a binary one level.

FIG. 6 shows a flip-flop which results from the use of two gates such as shown in FIG. 5A. To switch the flip-flop of FIG. 6 to the set state, the set input S thereto has to be a binary zero. Similarly, to switch the flip-flop to the reset state, the reset input R thereto also has to be a binary zero.

The set state of the flip-flop results in a binary one at its set output terminal and a binary zero at its reset output terminal. The reset state of the flip-flop results in a binary one at its reset output terminal and a binary zero at its set output terminal.

FIG. 7 shows an example of a JK type flip-flop, a suitable example of such flip-flop being the one manufactured by the Fairchild Camera and Instrument Corporation, designated by the numeral 923 and described in their publication "Fairchild Industrial Planar Epitaxial Micrologic," May 1965. The following is a truth table for the operation of this flip-flop. It is to be realized that the flip-flop is set by a negative going transition from plus 3 volts to zero volt; at pin 2 thereof and is reset by a positive going transition from zero volt to plus 3 volts at pin 6 thereof. In the table that follows hereinbelow, the numeral headings of the columns are the pin numbers and the outputs at pins 7 and 5 indicate the action which occurs when a negative going transition is applied to pin 2. The states at pins 1 and 3 and the outputs at pins 5 and 7 are set forth in binary one (zero volt) and binary zero (3 volt) terms.

| 1 | 3 | 7 | 5 |
|---|---|---|---|
| Zero | One | Zero | One |
| One | Zero | One | Zero |
| One | One | | Toggle |
| Zero | Zero | | No change |

By the term toggle, it is meant that the outputs of pins 5 and 7 are switched in their logic levels.

The set state of the JK flip-flop of FIG. 7 produces a binary zero at pin 7 and a binary one at pin 5 and the reset state produces the reverse.

FIG. 8 shows a low impedance driver circuit, an example thereof being one designated by the numeral 900 manufactured by the Fairchild Camera and Instrument Corporation and described in the abovementioned December 1963 publication. It is, of course, realized that if in a gate such as shown in FIG. 5A, one input is at zero volt, then it also functions as an inverter. Similarly, if two inputs of the gate of FIG. 5B are at zero volt, it also operates as an inverter.

CLOCK GENERATOR, FIGS. 9A–9C

A suitable embodiment of a clock generator for use in the system is shown in FIGS. 9A and 9B taken together as in FIG. 9C.

In this embodiment, a free-running multivibrator 300 provides at its outputs two like pulse trains 180° displaced in phase. The pulse train produced at output 304 is applied as the set inputs to JK flip-flops 301, 303 and 305 which, with suitable associated gating of their outputs, produce the pulse trains $TC_0$–$TC_7$, the latter trains being shown in the timing diagram of their waveforms in FIGS. 17–19 in lines 1–8 respectively thereof. The width of the pulses in each of these trains may suitably be designed to be 4 microseconds.

The pulse train output at terminal 304 is also used to provide the $CI_0$ pulse train which is employed in the flash mode of operation.

The pulse train output appearing at terminal 302 is appropriately gated with the output from terminal 304 and the $TC_0$ to $TC_7$ pulse trains to produce the load clock pulse train shown on line 9 of FIGS. 17–19 and other clocks used in the system such as the unload clock, the sample clock, the $TC_2$ lag, the $TC_4$ lag clock and the $TC_6$ lag clock, the function of these other clocks being described hereinbelow at the points wherein they are employed.

LOAD CONTROL SECTION 199

As mentioned hereinabove, the load control section operates to convert the information transferred thereinto from tape reader 13 to the logic levels employed in the computer, decodes the leading increment on the input tape, selects the section of the memory which is to be employed for the present loading operation and determines the address register count for selecting the locations of the selected section in the memory into which a line of type is to be stored. The information from reader 13 is entered into load control section 199 by being transferred sequentially character code by character code into buffer and gate stage 200.

BUFFER AND GATE STAGE 200, FIG. 10

A circuit sutiable for use as this stage is shown in FIG. 10. The inputs thereto designated 1–6 respectively are minus 12 volts if a punched hole is sensed by reader 13 and zero volt otherwise. The outputs shown as arrows and designated 1A–6A respectively are at zero volt if the corresponding inputs are minus 12 volts, i.e., the binary one level of the system and are at plus 3 volts if the corresponding inputs are zero volt, i.e., the binary zero level of the system.

The outputs designated $\overline{1-6}$ are the complements respectively of outputs 1A–6A. Thus a minus 12 volts input 1–6 respectively results in a plus 3 volts output $\overline{1-6}$. A zero volt input 1–6 results in a zero output $\overline{1-6}$.

It is seen that only six inputs are applied to stage 200, these representing the character code bits on a line of tape. The seventh and center bit of a line of tape which is employed to produce a sprocket pulse, is not entered into buffer and gate stage 200. The sprocket pulse is applied to the load control logic stage 202. There may be provided an eighth hole in a row of tape which is always punched as a binary one to provide a number 8 bit flag.

LOAD CONTROL LOGIC STAGE 202

In FIG. 11 wherein there is shown an embodiment suitable for use as this stage, the sprocket pulse which results from the sensing of the center punched hole in each line of tape (the sprocket hole punched on every line, is converted to a zero volt level) is applied thereto. The waveform of a sprocket pulse as so converted is shown in line 10 of FIGS. 17–19. The zero volt sprocket pulse level is gated at $TC_3$ time, i.e., with the $TC_3$ clock, and the reset output of a flip-flop 306 (a binary one) whereby gate 307 performs an AND operation when flip-flop 306 is reset and the output of gate 308 is consequently positive for the width of a $TC_3$ clock pulse as shown on line 11 of FIGS. 17–19. Consequently, a flip-flop 309 is switched to its set state by a binary zero output from gate 308 at the leading edge of a pulse $TC_3$ whereby its set output goes to a binary one and is gated at load clock time through gate 310 for the width of a load clock pulse. The set output of flip-flop 309 and the output of gate 310 are shown on lines 12 and 13 respectively of FIGS. 17–19.

This output of gate 310 is employed to switch flip-flop 306 to its set state whereby flip-flop 306 remains in its set state until the sprocket pulse (line 10, FIGS. 17–19) makes a positive transition when it ends to switch flip-flop 306 to its reset state. The waveform of the set output terminal of flip-flop 306 is shown on line 14 of FIGS. 17–19. The output of gate 310 is inverted in an inverter 311 and is employed in the leading control logic stage 204. The latter output, reinverted again by a gate 312, is employed to switch a flip-flop 313 to its set state and is further reinverted by a gate 314 to produce the load initiate pulse which is used to effect loading into the memory as is further explained, the waveform of the output of gate 314 being shown in line 15 of FIGS. 17–19. The outputs at the reset output and set output terminals of flip-flop 313 are employed to cycle the load address and unload address register counters and in a gating arrangement for enabling the time sharing of the memory address circuitry with the load address and unload address register counters.

It is noted that flip-flops 309 and 313 are switched to their reset states by the $\overline{TC_0}$ pulse, i.e. at the leading edge of $\overline{TC_0}$ time (lines 12 and 16, FIGS. 17–19). The output at the reset output terminal of flip-flop 309 is used in the leading control logic as is shown hereinbelow.

In understanding the operation of load control logic stage 202, it is seen that the sprocket pulse is gated with the $TC_3$ pulse but that the set output of flip-flop 309 which is the load control flip-flop is gated with the load clock pulse which is the first half of the $TC_4$ pulse. Such operation ensures that the $TC_4$ pulse is available from its beginning for loading which might not be the case if the sprocket pulse were gated directly with the $TC_4$ pulse. Flip-flop 306 functions, when switched to its set state, to inhibit gate 307 whereby there is only one load initiate signal produced for each sprocket pulse and whereby the sprocket pulse is rendered synchronous with computer operation.

Provision is made to enable erasures and blanks to be entered on tapes in given codes. Arrangement 315 generally shows a gating arrangement for recognizing erasure and blank codes, the inputs designated 1–6 in this arrangement are the 1–6 outputs of buffer and gate stage 200 and the inputs designated 1A–6A are the 1A–6A outputs of the latter stage. In the event that a blank code is recognized, point 316 goes to a binary zero whereby gate 308 is disabled and load flip-flop 309 is not set whereby no load-initiate signal issues for the accompanying sprocket pulse nor does the leading control signal issue. Where an erase code is recognized, load flip-flop 309 is set and the leading control signal does issue. However, upon such recognition, point 317 goes positive (binary zero) to disable gate 312 whereby the load initiate signal does not issue and flip-flop 313 is not switched to its set state.

The three character inhibit input to gate 312 is produced in leading control logic stage 204 and is a binary zero when the first three characters on the tape are decoded to determine the leading increment. Such binary zero state disables gate 312 whereby no load initiate signals issue for the leading code characters read from the beginning of the tape.

ELEVATE RECOGNITION STAGE 212 AND MEMORY SECTION CONTROL LOGIC STAGE 214, FIG. 12

The elevate recognition stage 212, shown in FIG. 12, suitably is a gating arrangement for recognizing a chosen code selected for the end of line signal punched on the tape. The inputs thereto are the outputs of buffer and gate stage 200. In addition, there is gated with the elevate code, the output of gate 314 in load control logic stage 202, i.e., the gate which produces the load initiate signal.

When the load initiate signal issues for the elevate code character transferred from tape, point 320 goes to a binary zero, this being the elevate recognition signal elo, shown on line 17 of FIGS. 17–19, this signal occurring at load clock time and being applied to the load section control logic stage 214.

Prior to describing the latter stage, it is recalled that the memory being used is one which has 512 positions and is time shared whereby one half is used for loading while the other half is used for unloading. Thus, section 1 of the memory may be considered as comprising positions 1 to 256 and section 2 as comprising positions 257 to 512.

In FIG. 12, a JK flip-flop 324 is the load section control flip-flop and a JK flip-flop 325 is the unload section control flip-flop. At the commencement of operation, the reset signal from the console provided through a gate 326 is employed to reset both JK flip-flops 324 and 325. Thereafter, each sequentially occurring elevate signal that issues switches JK flip-flop 324 alternately to its set and reset states and each sequentially occurring zero detect signal switches JK flip-flop 325 alternately to its set and reset states, the zero detect signal issuing in the track control section and representing the fact that no more characters in a line remain to be flashed. When JK flip-flops 324 and 325 are reset at the initiation of operation, they are both placed in their section one output states.

Let it be assumed that a first line has been loaded into the memory and the elevate signal elo issues at terminal 320 which is a binary zero. The negative going trailing edge of this signal switches JK flip-flop 324 to its set state whereby it is changed from its section 1 to its section 2 output state. The leading edge of the elevate recognition signal switches a flip-flop 322 to its set state, flip-flop 322 being switched to its reset state at the leading edge of TC$_3$ time. The waveform at the set output terminal of flip-flop 322 is shown on line 18 of FIGS. 17–19. The waveform at terminal 5 of flip-flop 324 is shown on line 20 of FIGS. 17–19.

With flip-flop 322 in its set state, gate 331 produces a binary zero output which provides the reset load address pulse having the width of the TC$_1$ pulse and shown on line 19 of FIGS. 17–19. The trailing edge of this pulse is applied to the reset terminals of the JK flip-flops of the load address register clearing them. At the occurrence of the TC$_2$ pulse, a gate 331a is enabled to provide an AND operation, to provide the set load address pulse shown on line 21 of FIGS. 17–19, the trailing edge of the latter pulse being used to switch the ninth flip-flop in the address register counter to its set state.

In this latter connection, each address register, viz., load and unload, contains 9 JK flip-flops to enable a count of up to 512 therein respectively. Thus, when the set load adress pulse is used to switch the ninth JK flip-flop to its set state, i.e., binary one, the load address register is initially incremented by 256 whereby any loading into the memory of the second line will commence with position 257.

The unload section control logic operates similarly to that of the load section control logic. Thus, when the first zero detect signal issues after the start of operation, JK flip-flop 325 is switched to its set-state. The initial reset signal had switched a flip-flop 335 to its state. Consequently, at the leading edge of TC$_3$ time, the unload address register is cleared by the output of gate 336. It is noted that initially, the unload register is cleared by the reset pulse through gate 337. At load clock time with JK flip-flop 325 and flip-flop 335 both in their set states, the set unload signal issues from gate 338, the trailing edge of which sets the ninth JK flip-flop in the unload address register whereby the unload address register is incremented by 256 to control the unloading of the section 2 contents of the memory.

It is clear that at the initiation of operation and on occasion during the operation, both control JK flip-flops 324 and 325 may be in the same output states, viz section 1 or section 2. Such condition may occur in the absence of a zero detect signal. In such case, gates 329, 339 and 341 operate to produce a binary one signal at the output of gate 342. If the zero detect signal is not present then the output of gate 327 is a binary zero, the output of gate 340 is a binary one, the output of gate 331b is a binary zero and the load operation is inhibited. If the zero detect signal is present, the output of gate 330 is a binary one pulse whose leading edge is used to inhibit unloading as is explained on connection with the unload control section. As is shown in line 22 of FIG. 19, the output of gate 330 is at a binary zero level and makes a transition to a binary one level at the trailing edge of the elevate recognition point whereby unloading is inhibited. When the inhibit reader signal issues as is further explained, gate 331b produces a signal which results in the reader inhibit signal to tapereader 13.

REGISTER ADDRESS AND GATING STAGE 206

In FIGS. 13A and 13B, taken together as in FIG. 13C, there is shown an arrangement suitable for use as the above stage. The stage comprises two nine JK flip-flop straight binary counters I and II, each thereby capable of being cycled up to a count of 512, counter I being the load address register counter and counter II being the unload address register counter. As has been mentioned, the pulses counted in load address register I are those in the inverted pulse train output of the reset output terminal of flip-flop 313 (inverted inverter 313b), in load control logic stage 202 shown in FIG. 11. The ninth JK flip-flop is preset depending upon whether the set load output signal in the section control logic stage calls for a loading into section 2 of the memory. The counter is initially reset by the reset pulse from the console and thereafter is reset at the trailing edge of a TC$_1$ pulse during the time that flip-flop 322 is in its set state after the recognition of an elevate signal.

The unload address register is cycled by pulses produced in the unload control section 231, FIG. 4D. Its ninth JK flip-flop is also preset in the event that the unload operation is to take place in section 2 whereby it initially has a count of 256 therein. Unload address counter II is reset initially by the reset signal from the console and thereafter is reset at the trailing edge of the TC$_3$ pulse after flip-flop 335 in the section control logic stage 214, FIG. 12, has been set by the unload signal.

The load address counter I and the unload address counter II serve to respectively identify the memory locations in which a line taken from reader 13 is being stored and a line which is to be taken for operations resulting in the proper photocomposing of a line has been stored.

The outputs of the JK flip-flops of each counter respectively are combined in a gating arrangement. In this arrangement, the outputs of the respective JK flip-flops of counter I are gated with inverted output of the reset output terminal of flip-flop 313 in the load control logic stage (FIG. 11), in the gates in row III to produce a pulse train output therefrom indicative of the state of the JK flip-flops. The inverted output from the set output terminal of flip-flop 313 is gated with the outputs of the respective JK flip-flops in counter II in the gates of row IV. The pairs of gates of row V function to either gate through the load or unload address information to provide either a true or false output for each JK flip-flop in the respective counters.

LEADING CONTROL LOGIC STAGE 204, COMPARATOR 210, AND COUNTER 208, FIGS. 14A–14I

As has been mentioned hereinabove, the initial three characters on the tape contain leading information since the system is designed to handle any of three of the different increments of available line spacing. Thus, when the tape preparer punches a line, but prior to punching the elevate code to indicate the end of a line, he punches the return code once, twice or three times to indicate which of the first, second or third punched line spacing increments are to be used.

In FIGS. 14A–14H, taken together as in FIG. 14I, there is shown a suitable embodiment of the comparator stage 210, counter stage 208 and leading control logic stage 204 in load control section 199.

Consistent with the depiction in FIG. 4A, the leading control logic stage in FIGS. 14A to 14Z may be considered as comprising a leading information counter generally designated by the numeral 350 and row of gates VI.

Counter 350 which comprises two JK flip-flops 350a and 350b and which is capable of counting to four, is reset initially by the reset signal from the console. The input thereto is from the reset output terminal of flip-flop 309 in load control logic stage 202, FIG. 11. While the count in counter 350 is less than three, the output of gate 351 is a binary one whereby the binary zero output of gate 352 applied as an input to gate 312 in load control logic stage 202, FIG. 11, inhibits gate 312. When the count in counter 350 reaches 3, the output of the gate 352 is a binary one and the inhibiting action of this output is removed from gate 312.

The leading code employs the 1A to 6A outputs of buffer stage 200. The leading unit is chosen to be ½ point since the film advance motor is capable of being stepped by such units. Since a six-stage register or counter can contain a count of 64 and since 64 half-points, i.e. 32 points equal about two and two-thirds picas, three registers, each comprising six flip-flops are provided to respectively contain the leading count.

Thus, row VI comprises eighteen gates, each being associated with one of the flip-flops of the three leading registers. Counting from the top, the first, seventh and thirteenth gates of this row have applied as an inout thereto the 1A output of buffer stage 200 (FIG. 10) the second, eighth and fourteenth gates have applied as an inout thereto the 2A output of buffer stage 200, etc. Also, applied as input to each of the gates is the inverted output of gate 353. One input to gate 353 is the leading control signal from gate 311 in load control logic stage 202. The other input to gate 353 is the output of gate 351.

For determining the commanded leading increment, there are provided three flip-flop registers, each consisting of six flip-flops. The film advance motor is suitably designed to be step in one-half point increments. Since a six-stage counter can count up to 64, the registers, accordingly, when filled can represent a line spacing of 32 points, i.e. 2⅔ picas.

In the rows designated VII and VIII in FIGS. 14A–14I, the upper three flip-flops of rows VII and VIII together constitute a 6 flip-flop register for containing the first leading amount, the middle three flip-flops of rows VII and VIII together constitute a 6 flip-flop register for containing the second leading amount, and the lower three flip-flops of rows VII and VIII together constitute a flip-flop register for containing the third leading amount.

Row VI comprises eighteen gates whose outputs are the set inputs to the register flip-flops, the upper six gates of row VI being associated with the first register, the middle six gates being associated with the second register and the lower six gates being associated with the third register.

The 1A to 6A outputs of buffer and gate stage 200 are applied to the gates of row VI whereby the 1A output is applied to the first gate of each of the three registers, the 2A output is applied to the second gate of the three registers etc. up to the 6A output which is applied to the sixth gate of each register.

The inverted output of gates 353 is applied as an input to each of the gates in row VI. In addition, the inverted output of gate 354 which has applied thereto the pin 7 outputs of JK flip-flops 350a and 350b, is applied to the upper six gates of row VI; the inverted output of gate 355, which has applied thereto the pin 5 output of JK flip-flop 350b and the pin 7 output of JK flip-flop 350A, is applied as an input to the middle six gates of row VI; and the inverted output of gate 356 which has applied thereto the pin 7 output of JK flip-flop 350a and the pin 5 output of JK flip-flop 350b is applied as an input to the lower six gates of row six.

It is clear that gate 354 performs an AND function when there is a zero count in counter 350 to produce a binary zero output, gate 355 produces a binary zero output when counter 350 contains one, and gate 356 produces a binary zero output when counter 350 contains two. Gate 353 produces a binary zero output at counts of zero, one and two in counter 350.

Thus, at zero count in counter 350, at the arrival of the first leading control pulse at gate 353, depending upon the code in the first leading character, the appropriate flip-flops in the upper register are switched to their set states. With the joint presence of the next leading control pulse and a count of one in counter 350, the middle flip-flop register is correspondingly set depending upon the code of the second leading character. With the joint presence of the next leading control pulse and a count of two in counter 350, the lower flip-flop register is correspondingly set depending upon the code of the third leading increment character.

When counter 350 goes to three, gate 353 is disabled and counter 350 is also disabled by the connection of the output of gate 351 to pin 1 of flip-flop 305a.

It is recalled that the selection of the first, second, or third leading increments is determined by the amount of times that the return code was punched in the tape at the end of the line prior to the punching of the elevate signal.

These return codes are decoded in a decoder arrangement to produce a return signal. The return signals are suitably counted in a modulo three counter as shown in FIG. 15 which comprises two JK flip-flops. The outputs of these two JK flip-flops are decoded in the arrangement as shown in FIG. 16.

In row IX of FIGS. 14A to 14I, there is shown a row of eighteen gates, the upper six having as applied inputs respectfully, the set terminal outputs of the corresponding flip-flops of the upper register and the decoded return 1 of FIG. 16. The middle six gates of row IX have as inputs applied thereto, the set terminal outputs of the respective flip-flops of the middle register and the decided return 2 in FIG. 16. The lower six gates of row IX have as inputs, the set terminal outputs of the six lower register flip-flops and the decoded return 3 in FIG. 16. The gates of the row IX are enabled when their outputs are binary zeros, i.e. when they perform AND operations. The gates of row X are utilized to perform the OR operation of gating therethrough the contents of either the 1, 2 or 3 registers.

A counter comprising six JK flip-flops is provided to count the steps of the film advance motor and the count in this counter is compared with the outputs of the gates of row X in the gates of rows XI, XII and XIII to produce a leading comparison signal which is chosen to be a binary one when such comparison shows equality.

It is clear that initially, with the film stationary and the film advance motor unenergized and with a given count at the outputs of the gates of row IX, no comparison is achieved. The leading comparator signal is employed in the track control section to actuate leading logic which produces a pulse train output for stepping the film advance motor. This pulse train output is also applied as the leading count signal.

Thus, in FIGS. 14A to 14I, it is seen that the leading count pulse train is employed to produce the V pulse train, the pulses of which are counted in counter 360. In row of gates XIII, gate 362 has applied thereto the V pulse train to synchronize the outputs of these gates with the count in counter 360.

The output of the gates of row XIII is applied to a coincidence circuit which also has applied thereto the inverted output of gate 327a in the section control logic, FIG. 12, which indicates the presence of a zero detect signal. When the output of gate 363 goes to a binary one, comparison is achieved whereby the leading count pulses cease to issue to further step the film advance motor.

During the count, gate 364 had had applied thereto the $\overline{V}$ signal, i.e. the complement of the leading count pulse train. When the generation of leading count pulses ceases, $\overline{V}$ goes to a binary one whereby gate 364 produces the reset leading signal to reset the flip-flops of counter 360 and those of the modulo counter in FIG. 15.

DECODER SECTION 219

With a line of type to be photocomposed entered into the appropriate section in memory 216 and the addresses of each character in such line contained under the control of the load address register, phase 1 of the unload operation begins. In this phase 1, it is desired to assign widths to all of the space occupying characters in a line and to cumulatively enter such widths into parallel counter 228 in accumulator section 223, FIG. 4C. It is also desired to derive signals representing interlaces, bell characters and functions.

CHARACTER DECODER STAGE 218

The character decoder stage 218 in decoder section 219 functions to produce output lines representing a chosen number of space-occupying characters, a suitable system design permitting such representation of forty-nine characters. To enable such production, suitable true and false representations of the six bits of each character in memory are used whereby there are provided twelve bits for decoding the various characters. These bits may also be encoded to provide several function representing signals as binary zeros. FIGS. 20 and 21, taken together as in FIG. 22, depict an embodiment suitable for use as such character decoder.

FUNCTIONS STAGE 224

Stage 224 is shown in decoder section 219 in FIG. 4B as producing the several functions utilized in type composing. In connection therewith, in character decoder stage 218, there are produced the signals representing the quad left, quad center and quad right operations and are suitably sampled therein to provide the QL$p$, QC$p$ and QR$p$ pulses. Signals provided in decoder 218 stage are also used to produce other functions.

Thus the shift and unshift function-representing signals may be produced by using the shift and unshift signals produced in decoder 218 as shown in FIG. 23 to set or reset a flip-flop, the set output state thereof providing the shift signal, the reset output state thereof providing the unshift signal. The reset input R, is to initially condition the flip-flop for producing the shift signal.

FIG. 24 shows the derivation of the upper and lower rail signals produced with the use of the U.R. and L.R. signals produced in decoder stage 218. When the flip-flop is set, the upper rail signal is produced and when it is reset the lower rail signal is produced. The Reset or O$p$ input to the set terminal of the flip-flop represents the presence of the reset or the zero detect signal.

The QR$_p$, the quad right pulse and the stop signal are obtained by the circuit shown in FIG. 25. It is seen therein that the stop signal is provided by the coincidence of the shift and Q.R. signals and that the QR$_p$ pulse (the Q.R. signal is suitably sampled in decoder 218) is produced at the coincidence of the unshift and Q.R. signals.

The Bell Control signal is produced in the circuit shown in FIG. 26 wherein the sampled Bell signal produced in decoder 218 alternately sets and resets a JK flip-flop. The flip-flop is reset initially by the reset signal. The output of this flip-flop is applied to a gate in the interlace decoding circuit as is shown further hereinbelow.

The circuit shown in FIG. 27 is an OR arrangement for providing either the spaceband, SPBD or their space functions.

FIG. 28 shows a circuit for providing the E$n$ S$p$ or the Quad spaceband, i.e. Quad SPBD signals.

FIGS. 32, 33 and 34 show arrangements for using the true and false bits from memory and the shift signal produced in FIG. 23 to provide various signals REF #'s 5, 6, 7, 11, 12 and 13 which are used in decoding the interlace signals, the use of the shift signals being based on the selection of the font arrangements and upper or lower case locations, etc.

FIG. 31 shows a circuit using the 4, 5 and 6 bits of the memory, the signals representing the digits 0–7 and 9 and the semicolon, dollar sign and hyphen produced in decoder 218, the shift and the unshift signals produced in the circuit of FIG. 29 to provide the REF 8, 14 and 15 signals, and the use of the en lead signal produced from decoder 218 and the $\overline{\text{Bell Char}}$ signal produced in the circuit of FIG. 32 to provide the interlace 3 or 6 signal which also functions as the Bell signal.

FIG. 30 shows a circuit in which various signals representing punctuation marks, and other characters and produced in decoder 218 are codedly combined with the shift, unshift and chosen REF signals to produce the interlace 1 or 4 signal and the interlace 2 or 5 signal and to provide the $\overline{\text{Bell Char}}$ signal using the output of the Bell flip-flop (FIG. 26) and the two interlace signals 1 or 4 and 2 or 5.

FIG. 29 depicts a circuit for providing other function representing signals. Thus, gating is provided therein to provide the EM S$p$ signals, the EM S$p$ signal resulting from gating with the shift signal and the V.R. signal resulting from gating with the unshift signal.

The UM and LM signals produced in decoder 218 are gated with the shift signal to produce the set input to the magazine control flip-flop 375 and is gated with the unshift signal to produce the reset input to flip-flop 375, the set state of flip-flop 375 calling for the upper magazine and the reset state of this flip-flop being a command for the lower magazine. The set output of flip-flop 375 is separately gated with the shift and unshift signals to provide the UM SHIFT and UM UNSHIFT signals and the reset output of flip-flop 375 is separately gated with the shift and unshift signals to produce the LM SHIFT and LM UNSHIFT signals.

The elevate signal produced in decoder 218 is employed as the set input to a return control flip-flop 376. The return signal produced in decoder 218 is gated with the reset terminal output of flip-flop 376. It is recalled that the return signal is used in the leading operation to cycle the modulo 3 counter therein, the decoding of the contents of this counter determining which return code register contents is to be compared with the film advance motor counter. The return signal inverted to a binary one in gate 377 appears as a binary zero pulse at the output of gate 388 only when flip-flop 376 is in its reset state. Since the return code is punched into the tape prior to the punching of the elevate code, at the appearance of the elevate signal in decoder 218, gate 388 is disabled. Flip-flop 376 is placed in its reset state after it has been set to enable the gating through of return pulses on a succeeding line by the RO$p$ signal.

ACCUMULATOR SECTION 223, FIG. 4C

The font family stage 220 in accumulator section 223, FIG. 4C receives the inputs from a width and gating card selected by the operator of the system and is an arrangement for sorting the characters being photocomposed into a given number of groups, suitably fiteen. Thus, the output of font family stage may be fifteen discrete outputs where fifteen groupings are used, each of the space-occupying characters in a line falling into one of these groupings in accordance with a particular font style. Each width card is arranged in accordance with a given font so that when it is stated that fifteen groups are produced, it is meant to signify such number for any given font style, larger or smaller. The font family stage outputs are applied to the binary portion of stage 222, to provide a ten level binary output. Such ten level output is a unit set, point, pica coded output. Since 18 unit sets equal a point, and since 12 points equal a pica, the first five levels of the binary stage output contain the number of unit sets, the next four levels contain the number of points and the tenth level contains the pica. Thus, with such ten level output, there can be represented character widths ranging from one unit set to almost two picas. The width and gating cards, the font family grouping arrangement, and the binary stage are believed to be well known to those skilled in the art and, accordingly, further detailed description thereof is deemed unnecessary.

The accumulator section 223 which essentially comprises a font family stage 220, a binary and gating arrangement 222, a parallel counter 228 and a variable counter stage 230, is time shared for three operations. The first operation takes place in phase 1 of the unload cycle when the widths of each character are cumulatively entered into counter 228 through the gating portion of stage 222. The second operation takes place during phase 2 of the unload cycle when the spacebands encountered in the repeated cycling of the memory are entered through the gating portion of stage 222 as units to augment the count therein resulting from the widths of the characters entered thereinto until justification is attained. Alternatively in phase 2, a quad count is entered into counter 228 through the gating portion of stage 222. When justification and the first elevate pulse thereafter occurs and, at a given clock time, parallel counter 228 is cleared. Then, in the third phase of the unload cycle, i.e., the flash mode of operation, parallel counter 228 has entered thereinto the widths of the characters and the proper spaceband widths as determined in the spaceband width counter in stage 254 in section 253. FIG. 4E and the number therein is compared with the picket fence count upon the presentation of a character from the wheel, an agreement between the picket fence count and the contents of parallel counter 228 at that point providing a comparison which is a requisite to determining the position on the line which the presented character is to be flashed. In the variable count stage 230 in accumulator section 223, there is compared a given setting as set on console switches which represents a justified line length and the count in parallel counter 228 during the first and second phases of operation and an agreement comparison signal, LL comp, issues when the justification is attained.

BINARY AND GATING STAGE 222 AND PARALLEL COUNTER 228

In FIGS. 35A to 35E, taken together as in FIG. 35F, there are shown suitable embodiments of these stages. The portion of the assembled FIGS. 35A to 35F to the left of the row of JK flip-flops may be considered to be gating stage 222 and the flip-flops and the output gating associated therewith may be considered to be parallel counter 228. The counter is reset when the reset or zero detect signal is present and at the end of the second phase of the unload operation by the *elp* Just signal at the leading edge of next $TC_2$ lag pulse as produced in the clock generator FIGS. 9A–9C.

The ten inputs in binary and gating stage 222 at the left, designated binary $2^0$ to binary $2^9$, are the ones which respectively receive the ten outputs from the binary stage during the phase 1 and phase 3 operations, these latter outputs representing character width information. These binary inputs when present are at the positive level, i.e. binary zero. Accordingly, each input is inverted by a gate provided therefor. The outputs of these inverter gates are applied to ten two input gates respectively which also have an input designated Z, the latter input indicating a $TC_1$ clock pulse time as derived in FIG. 35E and the gate data pulse provided in the unload control section. The outputs of the latter two input gates are each in turn respectively applied through third and fourth gates to the pin 2 terminals of the upper ten JK flip-flops in the JK flip-flop row.

Thus, for example, an input appearing at a binary $2^n$ terminal, i.e., a plus 3 volt signal, is inverted, gated with the gate pulse data to produce a binary zero and then twice inverted whereby the setting of the associated flip-flop is switched at the trailing edge of the TC1 pulse.

In parallel counter stage 228, the outputs respectively appearing at the pins 7 of the upper 13 JK flip-flops are passed through like RC circuits and an inverter gate, the outputs of the latter gates being designated $C2^0$–$C2^{12}$ respectively. The pin 7 outputs of the two lowest JK flip-flops directly furnish the $C2^{13}$ and $C2^{14}$ outputs.

The use of the RC circuits and the $C2^n$ outputs as respectively applied in the gating stage greatly simplifies parallel counter 228 in that it eliminates the need for complex timing and gating circuitry to cycle the counter, i.e. the counter can be used both to receive information in series and in parallel.

It is further seen that except for the first JK flip-flop, in all of the other JK flip-flops in the counter, the pin 5 outputs are respectively inverted to produce the $2^1$ BF to $2^{-14}$ BF outputs, these outputs being used in the third phase of the unload cycle to compare their count with the picket fence count in determining the position of a character in a line. Only one $2^1$ BF to $2^{14}$ BF outputs are used to effectively multiply the picket fence count by a further factor of 2 as is shown hereinbelow.

It is noted that there are fifteen flip-flops in the flip-flop row. This number is chosen to enable the operation of the counter as a unit set, points, picas coded counter. Since there are eighteen units set to a point, the upper five flip-flops contain unit set count increments. As there are 12 points to a pica, the next four flip-flops contain the point count increments. The next four flip-flops contain pica increments, and the lowest two flip-flops contain ten pica increments.

Since the first five flip-flops (unit set counter) have a capacity of 32 and there are only 18 unit sets to a point, provision is made when the count in these flip-flops reaches 18 or more whereby a quantity of 14 is added thereto. This is accomplished by gating the $2^1$ BF, $2^2$ BF and $2^3$ BF outputs through a gate 380, gating the output of gate 380 with the pin 5 output of the fifth flip-flop through a gate 381 and using the output of gate 381 as the set input to a flip-flop 382.

Thus, let it be assumed that the second and fifth flip-flops are set whereby the count is 18. Thereby, the $2^1$ BF output is a binary zero and the pin 5 output of the fifth flip is a binary one. Consequently, flip-flop 382 is switched to its set state and its set output is gated through gate 383 at TC2 lag time to provide a binary zero "add 14" output. The latter output is applied to the second, third and fourth flip-flops to augment the setting of the first five flip-flops by 14. The same effect occurs whenever any or all of the $2^1$ BF, $2^2$ BF or $2^3$ BF outputs are binary zeros and the fifth flip-flop is set. The $C2^4$ output will also set flip-flop 382 when it goes to a binary one since a transition occurs in the fifth JK flip-flop only when the unit set counter goes from 31 to zero.

Similarly, since the 6–9th flip-flops can contain a count of 16 and there are only 12 points to a pica, the pin 5 outputs of the eighth and ninth JK flip-flops (the third and fourth flip-flops of the points counter) are gated together through a gate 384. When both of the inputs to gate 384 are binary ones indicating that the count in the points counter is 12, a flip-flop 385 is set and its set output is gated through a gate 386 at the leading edge of the TC4 clock to produce the "add 4" output. The latter output is applied to the eigth flip-flop to augment the count in the points counter 4. The $C2^8$ output when it makes a transition, i.e., when the ninth JK flip-flop goes from the set to the reset state, also switches flip-flop 385 to its set state since such transition can only occur when the points counter goes from 15 to zero.

Gate 387 has applied thereto the spaceband signals, i.e. ser count, as they are encountered in the repeated cycling of the memory during phase 2 of the unload operation. At this time the counter contains therein the cumulated widths of space-occupying characters and each spaceband signal encountered in the phase 2 memory cycling is entered as a unit set increment until line justification is attained.

The QD count is similarly applied to the counter when a quad operation is performed during the phase 2 operation, through a gate 388.

In the third phase of the unload operation, the spaceband count from the spaceband width counter or the quad width from the quad counter is entered into the parallel counter 228 through those gates having respective input terminals designated A to O. Actually, as it will be shown, the spaceband width counter requires a binary level only up to K, whereas the quad width counter requires a level up to O. Accordingly, a gating scheme is employed to gate either the A to K outputs of the quad or the spaceband width counters, and the L to O outputs of the quad counter are directly applied to the L to O gates of gating section 222.

As an arrangement for increasing the contents of the tenth to the thirteenth flip-flops by six, similar to the other like arrangements described in connection with the unit set and point counters, when either the $2^{10}$ BF output or the $2^{11}$ BF output goes to a primary zero indicating that their respective associated JK flip-flops are in the set state and provided that the thirteenth JK flip-flop is in its set state, a binary zero output is produced from gate 389 to set a flip-flop 390a whose set output is gated through a gate 391a at TC6 log time to produce the "add 6" output, the latter output being applied to the eleventh and twelfth flip-flops to increase the count in the counter comprising the tenth to the thirteenth flip-flops by 6 whereby these flip-flops are effectively forming a decade. The fourteenth and fifteenth JK flip-flops count in 10 pica increments.

The set acc. signal, produced from gate 390 at TC4 log time when the elpjust signal has issued to set flip-flop 391, is used in the quad operation as is further explained hereinbelow.

VARIABLE COUNTER STAGE 230

The console switches in which the line length is preset provides such line length in points, picas, of coded binary representation. This representation is compared with the points and picas, setting of parallel counter 228 in FIGS. 35A to 35F in variable counter stage 230. A suitable embodiment of such variable counter stage 230 or comparator is shown in FIG. 36.

In the circuit of FIG. 36, the left row of gates are used to invert the $2^5$ BF to $2^{14}$ BF outputs of parallel counter 228. The next adjacent row of gates has applied thereto the inverted BF outputs and the corresponding bit console switch settings. It is to be recalled that the BF outputs are binary zeros when their corresponding counter flip-flops are set. The bits of the console switches settings are presented as binary ones when they are true. Thus, a bit match occurs, i.e. a binary one at the output of the third gate in a line when the counter bit is a binary zero and the corresponding switch bit is a binary 1. It also occurs when a counter bit is a binary one and a corresponding switch bit is a binary zero. Thus, when each third gate in a line produces a binary 1 output, a match occurs between the count in parallel counter 228 and the setting of the console switches whereby the LL comp signal indicating such match or agreement issues as a binary one.

UNLOAD CONTROL SECTION 231

After a line has been loaded into the appropriate section in the memory, the unload operation is effected by this section. While the line had been so loaded, the other section of the memory had been unloaded. It is recalled that an unloading operation is completed with the issuance of the zero detect signal and that when this signal is present and the memory section control flip-flops are in the same section output states, an unload operation is inhibited by the issuance of the unload inhibit signal. Consequently, to initiate the unload operation, it is necessary that the latter unload inhibit signal be absent. The zero detect signal causes the issuance of the $\overline{\text{CR INH}}$ $\overline{\text{UNLOAD}}$ signal as a binary one resets the three i.e., quad left, quad center and quad right control JK flip-flops whereby a $\overline{\text{QD INH UNLOAD}}$ signal issues as a binary one. With these conditions present, the unload initiate pulses issue to effect a count in the unload address register counter and thereby with each pulse, a character is fed through decoder section 219 into parallel counter 228 of accumulator section 223 as has been described until the elevate signal is recognized from the decoder. The unload initiate pulses are generated in unload logic stage 242 of unload control section 231.

UNLOAD LOGIC STAGE 242, FIGS. 38A–38C

In this stage, shown in FIGS. 38A and 38B, taken together as in FIG. 38C, a gate 400 produces a binary one output when the initial required conditions are met as has been described. With the inhibit unload card signal not issuing and with a JK flip-flop 473 set by the RO$p$ signal to place its pin 5 at a binary one, the binary zero output of gate 403 produces a binary one output from gate 401 which is the unload initiate pulse, such pulse effectively being the unload clock pulse. The output of gate 403 when it is a binary zero, also sets a flip-flop 404, the set output thereof being gated with the sample clock from the clock generator to generate the sample signal. Flip-flop 404 is reset at the leading edge of TC7 time.

Unloading now proceeds through the unload address register and the decoder section into the parallel counter of the accumulator. When the elevate signal is recognized from the decoder, it is sampled as is shown in computer control logic stage 234. At this point, to enable the description of the unload operation sequentially, reference is made to the latter computer logic stage.

COMPUTER CONTROL LOGIC STAGE 234

Referring now to FIGS. 37A–37C, taken together as in FIG. 37D, the elevate signal from the decoder is sampled in a gate 405 and the trailing edge of the resulting pulse, elp, sets a JK flip-flop 406 in a two flip-flop counter which also comprises a JK flip-flop 407. The elp pulse also resets the row of flip-flops of stage 236 which together comprise the mode III counter, i.e. the counter which counts spacebands after justification has been attained.

Each spaceband that is recognized is sampled in a gate 408 to provide the SB$p$ pulses. However, these pulses are not counted in counter 236 until justification is attained since, until that point, gate 409 is inhibited by the absence of the just (justify) signal.

Thus, after the first elevate signal is recognized and the el signal appears at the pin 5 output of flip-flop 406, the memory is cycled searching for spacebands. With the presence of the elp signal, and the quad flip-flops in their reset states, the inhibit serial count (prevention of the spaceband pulse count) signal does not issue from gate 410. Thus, in the absence of the set state of a quad flip-flop, and the absence of the justify signal, the elevate signal is gated through and inverted in a gate 411. The consequent binary one output of gate 412, the like output from gate 410 and the SB$p$ pulses from driver 408$a$, produce binary one pulses from gate 414 and binary zero pulses from gate 415 since the $\overline{\text{just}}$ signal is at a binary one at this time. Thus, with the presence of the $el$ signal after the loading operation, the output of gate 415 is employed to cycle the mode II counter, i.e. the flip-flops of stage 238, this counter counting all of the spacebands being recognized until the next elevate signal issues. At this point, binary zero $elp$ $\overline{\text{just}}$ signal produced from gate 416$a$ resets counter 238. Therefore, at the completion of each cycling of the memory after the load operation, counter 238 is at zero. The output of gate 414 is applied to gate 387 in the gating portion of stage 222 of the accumulator whereby all spacebands are entered into parallel counter 228 as a unit set to supplement the cumulative count therein produced by the entering thereinto of the space-occupying character widths.

The gate data pulses which issue in response to the enabling of gate 416, are used as the inputs in the gating portion of stage 222 to gate the outputs of the font family stage 220 into parallel counter 228. These pulses issue before the $el$ signal issues. Thus, when the $el$ input to gate 411 goes to a binary one, gate 416 is inhibited and the gate data pulse does not issue. When signal $el$ goes to a binary one, the spaceband pulse output of gate 414 is thereafter entered into the parallel counter of the accumulator. Thus, with the issuing of the $el$ signal, the first phase of the unload operation is completed.

During the second phase of the unload cycle, each spaceband pulse is entered into counter 238 by the trailing edges of the pulses from gate 415, counter 238 being reset by the $elp$ $\overline{\text{just}}$ signal at the end of each cycling. Because of the absence of the just signal, the output of gate 409 is maintained at a binary one and counter 236 is inhibited.

When the LL comp binary one signal issues from variable count stage 230 in the accumulator, at TC$o$ time, the justify flip-flop 417 is set and the justify signal issues.

CR LOGIC STAGE 244

In this stage, shown in FIGS. 37A to 37D, the ROP pulse sets flip-flop 420 and resets flip-flop 430. Consequently, the pin 7 output from flip-flop 420 to gate 421 goes to a binary zero whereby gate 421 is disabled. The pin 5 output of flip-flop 420, upon the setting of flip-flop 420, goes to a binary one whereby gate 400 in unload logic stage 242, FIG. 38B, is enabled to gate through the unload clock pulses to generate the unload initiate pulses for entering the contents of the memory through counter and the decoder into parallel counter 228 of the accumulator.

It can be observed at this time that flip-flop 420 is reset by the $elp$ just pulse, i.e. the first $elp$ pulse after the occurrence of justification and is thereafter set at the trailing edge of each CR($g$) pulse and reset at each $elp$ just pulse. Flip-flop 430 is set by each CR($g$) pulse and thereafter, after being set is reset by each $elp$ pulse. Thus flip-flop 420 is set during the non-justified phases, i.e., phase 1 and 2 of the unload cycle and also during phase three, whereas flip-flop 430 is only set during phase 3.

The MLT signal which is derived in the mask and track control sections represents either a track motor, leading motor or mask motor movement and when such movement is occurring, the MLT signal is at a binary zero. If the MLT signal is present representing such movement then at TC$_4$ time, a binary zero issues from gate 422 and flip-flops 420 and 430 are set at the trailing edge of the TC$_4$ pulse.

With pin 7 of flip-flop 420 at a binary one upon the resetting of flip-flop 420 by the $elp$ just pulse, the next character-ready pulse is presented from the wheel to produce the CR(G) pulse. This pulse causes gate 431 to produce the binary one inhibit picket fence signal to inhibit the picket fence count and then sets flip-flop 420 at its trailing edge whereby pin 7 goes to a binary zero and gate 421 is disabled to again enable the issuing of unload initiate pulses in section 242. The trailing edge of the CR($g$) pulse also sets flip-flop 430 to permit number and character comparisons to be made. The character ready inhibit signal input to gate 421 is produced in the track control section, and when it goes to a binary zero, it inhibits the issuance of the CR(G) signal.

CHARACTER COMPARISON SECTION 260

The character comparison stage 264 of this section is first described.

CHARACTER COMPARISON STAGE 264, FIGS. 39A–39C, FIG. 40

A suitable circuit for generating the character ready input to gate 421 in the CR ready logic stage 244 is shown in FIG. 40. In this circuit, the CR PC pulses presented from the wheel, i.e. array 63 through amplifier 64, enable the setting of a pair of JK flip-flops 423 and 424 by the TC2 and TC7 pulses respectively. It is seen that at TC$_2$ time, pin 5 of JK flip-flop 423 goes to a one and pin 7 goes to a zero. Consequently, at TC$_7$ time, pins 7 and 5 of JK flip-flop 424 also respectively go to a zero and one. Thus, the CR, i.e., character ready pulse issues at TC2 time and lasts until TC7 time. During the time that the character ready signal is present, a flip-flop 425 is set whose set output generates the REF #1 signal which is used in the picket fence count. The set output of flip-flop 425 enables the picket fence count which takes place to compare the track position of a recognized track character with its line position, if it is in the memory, as determined by the accumulator parallel counter. The slit PC comes into position during the set state of flip-flop 425.

FIGS. 39A and 39B, taken together as in FIG. 39C, comprise an arrangement suitable for use as the character comparator. In the upper portion of FIGS. 39A–39C, alternate gates in the left row receive the code bits produced from the photocell array associated with the font wheel, specifically the 1PC through 6PC signals. The outputs of these gates and the photocell 1PC through 6PC signals themselves are respectively applied to the 1 and 3 pins of associated JK flip-flops whereby if a photocell bit is present, the 1 pin of the associated flip-flop goes to binary zero and the three pin goes to binary one. With this arrangement, the flip-flops function as a buffer to store the character photocell array information as to the character presented from the wheel. Each CR(G) pulse, which is synchronized with each character ready pulse then switches these flip-flops at its leading edge whereby the binary state of their pins 1 correspond to that of their pins 7, and the binary state of their pins 3 correspond to that of their pins 5. The gates in the JK flip-flop row receive the unloaded character codes from the memory. The gates to the right of the JK flip-flop row are the comparison gates.

The lower portion of the FIGS. 39A to 39C entails the comparison of the shift code from the track photocell array and from the memory to determine whether an upper or lower case is called for whereby a JK flip-flop similar in operation to the flip-flops of the upper portion are employed. The remaining logic in the lower portion of FIGS. 39A to 39C is to determine other functions. A character comparison exists when the character comp signal issues as a binary one.

The arrangement for providing the picket fence pulse train for producing the picket fence count, is shown in FIG. 41. This arrangement includes stages 266 and 267 of comparator section 260.

In this figure, a free running multivibrator 440 produces a clock for the picket fence count. The picket fence PC pulses from the wheel (photocell 19 and amplifier 20, FIG. 1), are applied to gate 441. The Ref #1 signal output, generated in the circuit shown in FIG. 40, sets a flip-flop 442a whereby its set output terminal goes to a binary one.

To pin 1 of a flip-flop 442, there is applied the doubly inverted output of gate 441 and to pin 3 of this flip-flop there is applied the inverted output of gate 441. The inverted output of multivibrator 440 is applied as a set input to flip-flop 442.

The X16 logic stage 267 comprises a counter and a gating arrangement for multiplying the picket fence, PC count by 16. In this connection, the inverted output of multivibrator 440 is applied as a set input to the first and second rows of flip-flops in stage 443 through gates 444 and 445 respectively. Each of the JK flip-flops of a row comprises a straight scale of 16 binary counters. When the sixteenth count is reached, all of the JK flip-flops in a row go to their reset states. The Ref #2 signal issues as a binary one when the upper three JK flip-flops of each row has a count of eight therein. At a sixteen count in each row, of course, pins 7 of the lowest JK flip-flops in each row also go to a binary one.

Let it be assumed that each pin 7 of the JK flip-flops of stage 443 is at a binary one whereby the Ref #2 signal is also a binary one. Now when the leading edge of the negative half of a picket fence PC pulse arrives at gate 441, pins 1 and 3 of a flip-flop 442 go to a binary zero and a binary one respectively. When the leading edge of the negative going multivibrator pulse arrives at pin 2 of JK flip-flop 442, pins 7 and 5 of this JK flip-flop go to a binary zero and a binary one respectively, whereby the output of gate 445 goes to a binary one and the output of gate 444 goes to a binary zero to set the first JK flip-flop in the first row in stage 443 at the trailing edge of the multivibrator pulse. Provided that flip-flop 442a has been set by the Ref #1 signal and the inhibit picket fence signal is not true, the first picket fence count pulse is produced from gate 441a.

When the first JK flip-flop in the first row in stage 443 is set, the Ref #2 signal goes to a binary zero whereby pins 1 and 3 of JK flip-flop 442 both go to a binary zero whereby flip-flop 442 is inhibited. With pin 5 of JK flip-flop 442 frozen at a binary one, the next seven pulses from multivibrator 440 also appear at the output of gate 444 and cycle the upper three JK flip-flops until a count of eight is attained therein whereby pins 7 of these JK flip-flops go to a binary one and pin 7 of the lowest JK flip-flop of this row goes to a binary zero. In such situation the Ref #2 signal goes to a binary one. However, because the pin 7 of the lowest JK flip-flop is at a binary zero, gate 444 is disabled from performing an AND function.

When after the first eight multivibrator pulse, the Ref #2 signal issues, pins 1 and 3 of JK flip-flop 442 go to a binary zero and one respectively whereby at the ninth multivibrator pulse pins 7 and 5 of JK flip-flop 442 remain at a binary zero and one respectively. At this point, both of gates 444 and 445 are disabled from performing an AND function.

A further cycling of the JK flip-flops in stage 443 and further multivibrator pulse output cannot be applied until the picket fence PC pulse makes a transition from its negative going half to its positive going half. When this occurs, pins 1 and 3 of JK flip-flop 442 go to a binary one and a binary zero respectively. The next pulse thereafter from multivibrator 440 sets a binary one and a binary zero at pins 7 and 5 of JK flip-flop 442 whereby gate 445 is enabled to perform an AND function and the first JK flip-flop in the second row is set at the trailing edge of the multivibrator pulse. This latter pulse causes the issuance of the Ref #2 signal as a binary zero.

When the Ref #2 signal issues as a binary zero in this positive half of the PC pulse, pins 1 and 3 of JK flip-flop 442 both go to binary zeros whereby pin 7 thereof is frozen at a binary one. Consequently, the next seven pulses cycle the JK flip-flops in the second row of stage 443 until the eighth count places the pins 7 of the upper three JK flip-flops in the second row at binary ones whereby the Ref #2 signal goes to a binary one and places the pin 7 of the lowest JK flip-flop of the second row at a binary zero to disable gate 445 whereby no pulses can be produced until the negative going half of the next picket fence PC pulse arrives at gate 441.

It is seen that when gate 445 produces a binary zero output, gates 445a and 445b provide a reset pulse to clear the JK flip-flops of the first row and correspondingly when gate 444 produces a binary zero, gates 444a and 444b clear the second row of JK flip-flops.

With this arrangement, accordingly, each picket fence pulse is multiplied by sixteen at the output of gate 441a independently of the frequency of the picket fence PC pulses and the frequency of multivibrator 440, provided that the frequency of multivibrator 440 is at least 16 times that of the picket fence pc frequency. The JK flip-flops in stage 443 are also reset by either the reset or zero detect pulses.

The picket fence clock pulse train output from gate 441a is counted in the picket fence counter in number comparator section 253.

NUMBER COMPARATOR SECTION 253

In this section, the spaceband widths, i.e., the elp $\overline{just}$ signals are counted in the SB width counter, the quad count is counted in the quad counter, these operations taking place during the second phase, i.e., the justify or quad phase of operation. The picket fence clock pulses which are counted in the third phase of operation are counted in a picket fence counter and compared with the count in the accumulator at the point where a comparison occurs between a character unloaded from memory and a character presented from the font wheel as has been explained in connection with stage 264 in FIGS. 39A to 39C.

SB WIDTH COUNTER 254

A suitable embodiment of such counter is shown in FIGS. 42A and 42B taken together as in FIG. 42C. The explanation of its operation is made in conjunction with reference to the mode III counter 236, the mode II counter 238, gate 237 in unload control section 231, as shown in FIGS. 37A to 37D.

In FIGS. 42A to 42C, in the row of JK flip-flops, there are counted each elp $\overline{just}$ pulse, i.e., the pulses which issue at the end of each cycling of the memory during the justify or second phase of unload operation. JK flip-flop 450 is included to prevent the entering of the elevate pulse which issues at the end of the load operation, i.e., the first elevate signal which is recognized. The counter herein, as is the parallel counter in the accumulator, is coded in unit sets, points and picas.

Flip-flop 451 and its associated gates are included as are like flip-flops in parallel counter 228 for adding 14 to the unit sets counter (the upper five JK flip-flops) when the count therein reaches 18, the eighteenth count automatically resetting the first five JK flip-flops and setting the sixth. Similarly, flip-flop 452 and the gates associated therewith is set when the count in the sixth to ninth flip-flops, i.e., the points counter attains 12. At the twelfth count, flip-flop 452 is set whereby the points counter JK flip-flops are reset and the first pica JK flip-flop, i.e. the tenth flip-flop is set. Flip-flops 451 and 452 are reset at $\overline{TC0}$ time. The sixth JK flip-flop in the JK flip-flop row is set at $TC_2$ log time and the tenth JK flip-flop in this row is set at $TC_4$ time. The pin 5 output of each JK flip-flop in the row is applied respectively as one input to a corresponding respective gate in a row of gates 453. A second input to each of these gates is the gate SB width pulse which is derived as shown in FIGS. 37A to 37D in unload control section 231. It is seen in the latter figures that gate 405 has applied thereto the spaceband pulses and the just signal. If no quad operation is called for whereby the QD signal is at a binary zero, gate 405 is enabled to produce the GATE SB width signal which occurs at sample time after justification.

Reference is again made to counters 238 and 236 and gate 237 in the unload control section in FIGS. 37A to 37D. It is recalled that after justification, the counter 238 contains therein, the remainder of spacebands, required after the last full second phase cycling of the memory and that counter 236 has been cleared by the first *elp* pulse which occurred after justification. During the third phase of the unload operation, as the character widths are being again cumulatively counted in parallel counter 228 of the accumulator, as each spaceband pulse occurs, it is entered into counter 236 until a comparison is reached between its count and that in counter 238. While no comparison exists, the output of N–1 gate 237 is at a binary zero and goes to a binary one when comparison is attained at which point the $\overline{comp}$ $\overline{SB\ count}$ signal goes to a binary zero and gate 409 is disabled from entering further SB$p$ pulses into counter 236.

Referring back to the spaceband width counter in FIGS. 42A to 42C, it is seen that when the (N–1) signal is positive a flip-flop 458 is set, the latter flip-flop being reset at $\overline{TC_0}$ time.

The row of gates 453 through the pin 5 outputs of the SB width counter JK flip-flops at sample times. The row 454 of gates comprises OR gates which gate through in parallel either the A to K levels of the spaceband width counter or the quad counter into the accumulator parallel counter 228 during the third phase of the unload operation. When the N–1 signal is positive to set flip-flop 458, SB width count gated into parallel counter 228 of the accumulator is augmented by one.

To understand the latter, let it be assumed that there are ten spacebands in a line and that it required seven in the cycle after the last complete cycling of memory to effect justification, whereby counter 238 retained a count of seven once justification was attained. Therefore, in the third phase, because of the operation of N–1 gate, the first seven spacebands that are encountered are assigned an additional unit set width, their widths being entered into the accumulator from gates 454 as they are recognized.

PICKET FENCE COUNTER 255 AND COMPARATOR 256

In FIGS. 43A–43D, taken together as in FIG. 43E, there is shown an embodiment suitable for use as these stages. The row of JK flip-flops 460 therein comprises a unit set, points, picas, and 10 picas coded counter. This counter receives the picket fence count generated in the arrangement shown in FIG. 41. The line position setting in the accumulator for a character from memory which has compared with a character presented from the wheel, is represented by $2^1$ to $2^{14}$ BF outputs of the accumulator which are entered in parallel into their associated gates in a row of gates 461. The picket fence count continues until it is halted by the inhibit picket fence count signal, the contents of the picket fence counter being compared with the outputs of the gates in row 461. When a number comparison agreement exists, the output of gate 462 goes to a binary zero.

It is noted that the first bit $2^0$ BF i.e., the unit bit of the accumulator, is not included in the picket fence count comparison whereby effectively a further multiplication of two is effected, i.e., the count in the accumulator is compared with 32 times the *pc* count.

Flip-flops 463, 464 and 465 are respectively included to clear the first four JK flip-flops when a count of nine is attained therein, to clear the next four JK flip-flops when a count of twelve is attained therein and to clear the following four JK flip-flops when a count of ten is attained therein. Flip-flops 463, 464 and 465, after they are set are reset by the next picket fence count pulse. The trailing edge of the CR(G) pulse resets all of the JK flip-flops in row 460 to condition them for the picket fence count.

Referring back to FIGS. 37A to 37D of the unload control section, it can be seen that the reset or zero detect pulse sets JK flip-flop 420 whereby its pin 7 goes to a binary zero and gate 421 is inhibited. Its pin 5 output goes to a binary one whereby unload clock pulses can be passed through gate 401, FIGS. 38A to 38C as unload initate pulses. The reset or zero detect pulses also reset JK flip-flop 430 whereby the Ref #1 output thereof goes to a binary zero. JK flip-flop 420 remains set throughout the first and second phases of the unload cycle until it is reset by the *elp* just pulse whereby unload initiated pulses can be generated throughout these phases and CR($g$) pulses cannot. JK flip-flop 430 remains reset during the first two phases.

At the appearance of the next character ready pulse, with JK flip-flop 420 now reset, gate 421 is enabled to generate the CR(G) pulse which enables get 431, i.e., the inhibit picket fence count signal issues, and sets JK flip-flop 420 at its trailing edge to again inhibit gate 421 and to again permit the generation of unload initiate pulses. JK flip-flop 430 is also set at the trailing edge of the CR(G) pulse and Ref #1 goes to a binary one. Thus, at the trailing edge of the CR(G) pulse in the third phase, both JK flip-flops 420 and 430 are set and will remain so until the next *elp* pulse arrives.

In FIGS. 38A–38C, it is seen that flip-flop 474 is set by the unload clock pulse as is flip-flop 404 when the unload initiate pulses can be generated. Flip-flop 404 is reset at TC7 time. During the time that unload initiate pulses are generated and flip-flop 404 is set, $\overline{sample}$ pulses issue and they reset flip-flop 474. Up to that time the trailing edge of the CR(G) pulse sets JK flip-flop 420, i.e., while the latter is in its reset state flip-flop 404 stays reset whereby the sample pulse issuance is inhibited and flip-flop 474 cannot be reset.

A monostable multivibrator 478 is switched to its reset state by the Ref #1 zero signal when JK flip-flop 430 is in its reset state whereby pins 1 and 3 of a JK flip-flop 471 go to a binary zero and one respectively. The set input to JF flip-flop 471 is the $CL_0$ clock pulse train from the clock generator. The next $CL_0$ pulse places a binary zero at pin 7 and a binary one at pin 5 of JK flip-flop 471 whereby pin 5 undergoes a negative transition to switch the state of JK flip-flop 472. Thus, let it be assumed that flip-flops 471 and 472 are both in their set states whereby pin 5 of JK flip-flop 471 is at a binary one. At the generation of the character comp signal, with the Ref #1 signal at binary one, i.e., JK flip-flop 430 has been set, and the eighth memory bit is true (indicating that the character compared has not been flashed), the gate data pulse appears through a gate 482 to reset a JK flip-flop 473 at its leading edge whereby pin 7 of JK flip-flop 473 goes to a binary one. With a binary one output at this time from inverter 476, gate 477 produces the binary zero set input to monostable multivibrator 478 whereby pin 5 of JK flip-flop 471 goes to a binary zero at the next $CL_0$ pulse to inhibit the switching of JK flip-flop 472 and to set flip-flop 473 through gate 483. The binary zero reset output of multivibrator 478 appears as a binary one input to gate 480. With pin 5 of JK flip-flop 472 frozen at a binary one, gate 480 is enabled to provide the multivibrator pulse to flash tube 1.

The Ref #1 signal which goes to a binary zero when JK flip-flop 430 is reset by the *elp* pulses after justification now places a binary zero and a binary one on pins 1 and 3 respectively of JK flip-flop 471, whereby at the leading edge of the next $CL_0$ pulse, pins 7 and 5 of JK flip-flop 471 also respectively go to a zero and a one whereby JK flip-flop 472 is switched in its state and pin 7 thereof goes to a binary one, at the next character and number comparison and with the Ref #1 signal at a binary one JK flip-flop 473 is reset to enable gate 477 to switch multivibrator 478 whereby with gate 479 now enabled, flash tube #2 is energized. When JK flip-flop 473 is reset, it indicates that a character is being flashed and, consequently, at this time, the 8F, i.e., the false output of the eighth memory bit of a character code issues through inverter 470.

It is thus understood that each successive unload initiate pulse unloads another character and generates the $\overline{\text{sample}}$ pulse to reset flip-flop 474 and thereby disable number comparison gate 475 until a character comparison is made. In this connection, since JK flip-flops 420 and 430 will not be reset until the next $elp$ pulse occurs, and since the code of the character which has been flashed is stored in the JK flip-flop buffer in the character comparison stage and cannot be changed until the issuance of the next CR(G) pulse, and since such pulse cannot issue until JK flip-flop 420 is reset, if the character which has been flashed is again unload before the next $elp$ time, it will again be flashed. Therefore, with this arrangement, on each cycling of the memory, the first character which is encounted in memory which compares with the character presented from te wheel is flashed each time it occurs in a line at its proper positions. Since only one CR(G) pulse occurs in each memory cycling in the third phase, only one character is handled in each cycle but that character is flashed as many times as it occurs.

There are three quad operations, QL (quad left), QC (quad center) and QR (quad right). The quad left operation is for a line which begins at the left margin but is less than the length of a full line. The quad center operation is for positioning a line of less than full length symmetrically between the right and left margins. The quad right operation is for a line of less than full length which ends at the right margin. As will be shown, the quad left operation does not require justification whereas the Quad Center and Quad Left operations do.

The Quad signals are recognized from the decoder section and are applied as set inputs to flip-flops 501, 502, 503 FIGS. 37A to 37D. The terms $QLp$, $QCp$, and $QRp$ indicate that these signals are pulses which signifies that they are the results of the sampling of the corresponding signals.

Assuming that a $QL_p$ signal is recognized, then it sets flip-flop 501. When the elevate $el$ signal arrives, it is gated with the set, i.e., binary one output of flip-flop 501 to produce a binary zero output from gate 504a. This output inverted in gate 504 gates the TCO pulse through gate 505a whereby the justification flip-flop 417 is set and the justify signal issues.

It may be mentioned at this point that every spaceband read after the $el$ signal occurs, i.e., in the first cycling of the memory after the load operation, and which is recognized in the decoder is gated with an en space as a fixed width.

With a Quad, i.e. QD signal at a binary one indicating a quad operation, a binary zero signal issues from gate 506 whereby gate 405 is disabled and the gate SB width pulse does not issue to gate the spaceband width count from the spaceband width counter to parallel 228 counter in the accumulator.

If a quad center, i.e., $QCp$ is recognized, flip-flop 502 is set and QD goes to a binary one. The output of a gate 507 also goes to a binary one. In addition, as in the quad left operation, the output of gate 505 goes to a binary zero when the $el$ signal issues during a quad operation. When the $el_1$ signal issues from JK flip-flop 406, the output of gate 410 goes to a binary zero and inhibits the addition of spacebands to the accumulator during the time of $el_1$. At the output of gate 505, each spaceband that is recognized is a binary zero quad spaceband signal which is inverted in gate 411 and gates with sample in gate 416 to generate the gate data signal which gates an en space from the decoder into the accumulator. At the end of a line of the first cycle of the second phase of the unload operation, all the spacebands which have to be recognized have had the width of an en space inserted into the parallel counter of the accumulator. Now, when the next $el$ signal arrives to set JK flip-flop 407 and thereby generate the $el_2$ signal, this signal is applied together with the output of gate 507 and the $\overline{\text{just}}$ signal to a gate 508 which thereby produces a binary zero from gate 508. The output of gate 508 is applied to gate 490 as shown. FIGS. 38A to 38C to inhibit the generation of unload initiate pulses, i.e., inhibit unloading. The presence of the $el_2$ and $\overline{\text{just}}$ signals enables a $QCel_2$ count pulse train to issue at TCO pulse time and this pulse train is entered into the quad count input terminal of parallel counter 228 in the accumulator and into the Quad counter until justification is attained. At the latter juncture, the quad count ceases because of the inhibiting of gate 509 through the issuance of the just signal and the output of gate 508 goes to a binary one to permit the resumption of the generation of unload initiate pulses.

The quad right signal sets flip-flop 503 to inhibit the serial count of spacebands into the accumulator after the $el$ signal issues. When the signal $el_2$ issues and justification as yet has not been attained, the $QRel_2$ count pulse train is produced from gate 510 at $TC_0$ times which is entered into the accumulator. At justification, gate 510 is disabled and the Quad count halts. The presence of the QD signal inhibits the gate SB width signal.

Thus, to summarize the foregoing, each of the three quad operations inhibits the gate SB width signals and the serial count of spacebands. In a quad left operation, the line is automatically justified. Each quad spaceband is gated as an en space width into the accumulator. In the quad center and quad right operation, the quad count is made up to the attainment of justification.

QUAD COUNTER 252, FIGS. 44A TO 44C

In FIGS. 44A and 44B, taken together as in FIG. 44C, there is shown an embodiment suitable for use as the quad counter stage 252 in number comparator section 253.

This counter comprises a row 520 of 16 JK flip-flops coded in unit sets, points, picas, and tens of picas and has a capacity of eighty picas. The quad center count is applied to the first JK flip-flop in row 520 to cycle the counter. The quad right count is applied to the second JK flip-flop in row 520 to cycle the counter. Flip-flops 521, 522 and 523 are used, as in the spaceband width counter, to clear the unit sets counter at the eighteenth count therein, the points counter at the twelfth count therein and the picas counter at the tenth count therein.

The QC $2^0$ to QC $2^{10}$ outputs are applied to the corresponding input terminals of the appropriate gates in the SB width counter. The L to O outputs are applied to the L to O input terminals of the appropriate gates in the parallel counter of the accumulator. Row of gates 523a are enabled by the set accumulator signal which issues at TC4 log time at $elp$ just time when the QD signal is present as shown in the accumulator section. The JK flip-flops of row 520 are reset by the reset or zero detect signals.

The reason for using the additional JK flip-flop in the quad center count is to enable the gating of only half of its contents into the accumulator. Thus, with no output from the first JK flip-flop in row 520, there are gated into the accumulator only half the content of the JK flip-flops in row 520 when the quad center count is made. With such arrangement, therefore, during the third phase of unload operation, since only the left portion quad count is needed in a quad center operation to determine the position of a character, this is all that is entered into the accumulator.

MASK CONTROL SECTION 270

A suitable embodiment of this section is shown in FIGS. 45A to 45G taken together as in FIG. 45H.

The purpose of this section is to position the mask in a given commanded interlace position on a chosen track. The code disc 50 which is driven in unison with the mask photocell 51 and amplifier 52, provide mask-position representative signals. These position signals are received in the encoder stage 276 of mask control section 270.

ENCODER SECTION 276

In this section, the three bit positions of code disc 50 are respectively applied to the three gates in row 600. The gate PC signal which issues when the mask is trued on a given interlace position, is applied directly to pin 3 of a JK flip-flop 601 and through an inverter to pin 1 of this flip-flop. Should a mask drive signal appear calling for a movement of the mask stepper motor, then flip-flop 601 is actuated to place a binary zero at pin 7 thereof whereby the gates of row 600 are enabled to produce binary zero outputs if a *pc* code bit is present. The outputs of the gates of row 600, as inverted by the gates of row 602, are decoded in the six gates comprising row 603 to provide at the outputs of the gates of row 604 the six different interlace positions which the mask may be in, the position of a gate in row 604 representing the like numbered interlace position.

The outputs of the third and sixth gates of row 603 are applied to a gate 605. The output of gate 605 is directly applied to pin 1 of a JK flip-flop 606 and invertedly applied to pin 3 of this flip-flop. Thus, when the mask is either in interlace position 3 or 6, pin 1 of JK flip-flop 606 goes to a binary 1 and pin 3 goes to a binary zero. Consequently, if the mask drive signal appears, JK flip-flop 606 is actuated to place a binary zero at pin 5 of flip-flop 606, the pin 5 output being inverted to produce the binary one BELL M signal which indicates that the machine is in the Bell mode, i.e., the Bell character is found in interlaces 3 and 6.

Similarly, the outputs of the fourth, fifth and sixth gates in row 603 are applied to a gate 607 whereby a binary one is placed at pin 1 of a JK flip-flop 609 and a binary zero is placed at pin 3 of flip-flop 609. Now, if JK flip-flop 609 is actuated by a mask drive pulse, a binary zero is placed at pin 5 thereof whereby the binary one URM signal issues through gate 608 which indicates that the system is in upper rail. If the G signal issues which indicates that the System is in upper rail for a 2½″ line, then, the URM signal also issues from gate 608.

The actual positions of the mask, i.e., interlace positions 1 to 6, are applied as inputs both to step logic stage 274 and direction control logic stage 284. FIG. 4H, however, since these latter stages also require as inputs the $0_1$–$0_6$ positions signals to determine whether characters remain to be flashed in a given position, attention is first directed to interlace control stage 272.

INTERLACE CONTROL STAGE 272

At the left of this stage those signals which have the term DEC therein are those derived in decoder section 219. The UMFF signal is derived from upper magazine flip-flop 375 in the decoder section as are interlaces #1, #2 and #3. The 2½″ LM and UM signals represent that a 2½″ line is being composed. The zero detect signal is provided from the track control section and represents the condition that no characters remain to be flashed in a line being unloaded from the memory.

In stage 272, it is seen that the doubly inverted UR DEC signal, the upper rail signal from the decoder is applied as an input to gates 610–2, 610–4 and 610–8 of a row of gates 610. The inverted UR DEC signal is applied as an input to gates 610–1, 610–3 and 610–7 of this row. The interlace #1 signal, provided from the decoder, is applied to gates 610–1 and 610–2. The interlace #2 signal is applied to gates 610–3 and 610–4. The interlace gate signal provided from the unload control section (where the 8BT pulse is gated with the set output of flip-flop 404) is invertedly applied to gates 610–5 and 610–6 and the Bell or interlace #3 signal from the decoder is also invertedly applied to gate 610–5 and directly applied to gate 610–6.

In the operation of these 610–n gates, when the UR DEC signal is absent, i.e., at binary zero, the output of inverter driver 611 is a binary one. In such situation, provided that the interlace gate signal, a binary zero, is present which indicates that a particular character has not been flashed and with the interlace #1 signal present, gate 610–1 is enabled to indicate that the machine is operating in lower rail, interlace 1. Similarly, in the presence of the interlace #2 signal and #3 signals, gates 610–3 and 610–7 are respectively enabled.

When the upper rail signal UR is present whereby the output of 611 is a binary one, gate 610–2 is enabled to provide the upper rail, interlace 4 signal when the interlace #1 signal is true. Gate 610–4 is enabled to provide the upper rail interlace 5 signal when the interlace #2 signal is true. Gate 610–8 is enabled to provide the upper rail interlace #6 signal when the interlace #3 signal is true.

In row of gates 612, the output of inverter 613 is applied as an input to gates 612–1, 612–3, 612–5, 612–7, 612–9 and 612–11. When the output of inverter 613 is a binary one, it indicates that the UM signal is not present and that the machine is operating in lower magazine. Consequently, the output of inverter 614 which is a binary one when the UM signal is present, is applied as an input to gates 612–2, 612–4, 612–6, 612–8, 612–10 and 612–12. Applied as an input to gates 612–1 and 612–2 is the inverted output of gate 610–1. Similarly, the inverted outputs of gates 610–2 to 610–8 are applied as inputs to gates 612–3, 4 to 612–11, 12 respectively. Consequently, gate 612–1, when enabled, produces the interlace 1, lower rail, lower magazine signal. Gate 612–2 produces the interlace 1, lower rail upper magazine signal. Gate 612–3 produces the interlace 1, upper rail, lower magazine signal and gate 612–4 produces the interlace 1, upper rail, upper magazine signal. Gates 612–5 to 612–8 produce the corresponding respective signals for interlace 2 and gates 612–9 to 612–12 produce the corresponding signals for interlace 3.

The twelve flip-flops in row 615 receive as set inputs thereto the respective outputs of gates 612–1 to 612–12 whereby each flip-flop set output state represents a particular rail, magazine, interlace combinational state of operation. The flip-flops of row 615 are reset by the output of gate 620 as when the latter is a binary zero. It is to be noted that the outputs of gates 612 are set inputs to flip-flops 615 as follows: 612–1 to 613–1, 612–2 to 615–12, 612–3 to 615–4, 612–4 to 615–9, 612–5 to 615–2, 612–6 to 615–11, 612–7 to 615–5, 612–8 to 615–8, 612–9 to 615–3, 612–10 to 615–10, 612–11 to 615–6 and 612–12 to 615–7. The set state of a given flip-flop in row 615 indicates that characters are present to be flashed in the combinational operational position represented by the set state of such flip-flop. The reset state of such flip-flop indicates that no characters remain to be flashed in such position.

It is noted that the reset outputs of flip-flops 615–1, 615–2 and 615–3 are applied as inputs to a gate 616–1. Gates 616–2, 616–4 and 616–6 receive as an input the inverted 2½″ LM signal which, when a binary zero, indicates that a 5-inch line is being set. When the inverted signal is a binary zero, it indicates that a 2½″ line is being set. The doubly inverted 2½″ LM signal is applied as an input to gates 616–3, 616–5 and 616–7. The set output of flip-flop 615–4 is applied as an input to gates 616–2 and 616–3, the set output of flip-flop 615–5 is applied as an input to gates 616–4 and 616–5 and the set output of flip-flop 615–6 is applied as input to gates 616–6 and 616–7. The outputs of gates 616–2, 616–4 and 616–6 are applied as inputs to a gate 617–1. Consequently, when gates 616–1 and 617–1 are both enabled, i.e., they function as a six-input AND gate, the OLR/LM signal issues which indicates that zero characters remain to be flashed in the lower rail, lower magazine position. Similarly, when the output of gate 617-2, to which there are applied as inputs the outputs of gates 616-3, 616-5 and 616-7, goes to a binary zero, the OUR/LM signal issues which represents that zero characters to be flashed in the upper rail lower magazine position. In a corresponding fashion, the OUR/LM signal which represents zero characters in upper rail, lower magazine, and the OUR/UM signal which represents zero characters in upper rail, upper magazine positions are derived from gates 617-3, 4.

It is to be noted that since the OLR/LM signal is derived from the gating together of the outputs of gates 616-2, 616-4 and 616-6, and since these gates all have as inputs the inversion of the 2½″ LM signal, gate 617-1 produces a binary zero output only when the 2½″ LM signal is present or when flop-flops 616-2, 616-4 and 616-6 are all reset. The OLR/LM signal therefore represents either that no characters remain to be flashed in the lower rail lower magazine position in a 2½″ line or that a 5-inch line is being composed. By the same reasoning, the output of gate 617-2, when a binary zero, represents that no more characters remain to be flashed in the upper rail, lower magazine positions or that a 2½″ line is being composed.

In row of gates 618, there is applied as input to gates 618-1 to 618-9, the inverted UMFF signal from the magazine flip-flop in the decoder section. The doubly inverted UMFF signal is applied as input to gates 618-10 to 618-18. Gates 618-1 to 618-3 directly receive the reset outputs of flip-flops 615-1 to 615-3 respectively, gates 618-4 to 618-15 receive the outputs of gates 616-2 to 616-13 respectively. Gate groupings 618-4, 5, 618-6, 7, 618-8, 9, 618-10, 11, 618-12, 13, 618-14, 15, receive the inverted set outputs of flip-flops 615-4 to 615-9 respectively. Gates 618-16 to 618-18 receive the outputs of flip-flops 615-10 to 615-12. The G signal, derived in the track control section and representing the 2½″ upper rail position, is inverted and, as inverted, is applied as an input to gates 618-1 to 618-3 and gates 618-16 to 618-18. The G signal, as singly inverted and as doubly inverted is applied as an input to gates 618-n as shown.

The gates of row 619 function as OR gates to produce a binary one at their outputs when zero characters to be flashed is the state of one of the interlaces. Thus, the inputs to gate 619-1 are either the interlace 1 for the lower or upper magazine, etc. The six gates 619-1 to 619-6 produce the respective six zero character signals for each of the six interlaces. Gates 619-7, 619-8 and 619-9 together with gates 619-1 to 619-3, operate to insure that the machine is not in a 2½″ line upper rail position since it is in interlaces 4, 5 and 6 when it is in upper rail.

With regard to gates 616-8 to 616-13, it is noted that the 2½″ UM signal as singly inverted, is applied as an input to gates 616-9, 616-11 and 616-13 and, as doubly inverted, is applied as an input to gates 616-8, 616-10 and 616-12. Therefore gates 616-8, 10 and 12 provide the 2½″ line UM signals and gates 616-9, 11 and 13 provide the 5-inch line UM signals.

The flip-flop 620 to which the elp $\overline{\text{just}}$ signal is applied as a set input, is reset at TC₀ time. When flip-flop 620 is set and at TC₂ time, the TC₂ elp just signal issues. Also when flip-flop 620 is set, when the ODET (zero detect indicating that no more characters in a line remain to be flashed and obtained from the track control section), signal appears at TC₃ time, the TC₃ elp just $\overline{\text{ODET}}$ signal issues which employed in the mask motor step logic.

If the MLT signal is present, i.e., a binary zero representing either a mask, leading or track motor movement, at elp just time, flip-flop 615-12 is reset. With flip-flop 615-12 reset, the absence of a G signal, i.e., a 5-inch line is being set and the presence of the UMFF signal, gate 618-18 is enabled. If the ROp signal is present, flip-flop 615-12 cannot be reset.

The gates of row 621 have applied as one input thereto, the respective actual interlace positions of the mask as sensed from the mask code disc 50 as derived from the respective gates in row 604. The other inputs to these gates are the corresponding commanded interlace position outputs from gates 619-1 to 619-6. A binary one output from a gate 619-1 to 619-6 represents zero characters in the corresponding interlace. Thus, the particular gate 621 produces a binary one when the interlace position that the mask is in is still retains characters to be flashed and a binary zero when zero characters remain. The outputs of gates 621-1 to 621-3 and 621-4 to 621-6 are respectively applied to gates 622-1 and 622-2. When the gate PC JK flip-flop 601 is set whereby its pin 7 goes to a binary zero, a binary zero is produced at the output of gate 622-3.

When gate 622-1 has a binary zero output, it indicates that characters remain to be flashed in the position that the mask is in or that the mask is in none of the 1, 2, 3 interlace positions. Similarly, gate 622-2 produces a binary zero output when either the mask is in an interlace position 4, 5 or 6, and characters remain to be flashed in the position that it is in or that the mask is in none of these three positions. Gate 623 produces a binary zero output at the presence of the gate pc signal. Consequently, at gate pc time, if the mask is in a position where no characters remain to be flashed and characters remain to be flashed in another interlace position at elp just TC₃ $\overline{\text{ODET}}$ time, gate 623 produces a binary zero output, i.e., the step mask pulse.

A JK flip-flop 624 is set when gate 622 produces a binary one output to place its pin 5 at a binary one to produce the MLT signal and is reset by the step mask pulse. The LT signal which represents either a leading or track motor movement also causes production of the MLT signal. When the MLT signal is true, i.e., a binary zero, the resetting of flip-flops 615-1 to 615-12 is inhibited.

A free running multivibrator 630, the mask motor clock, provides a binary one to pin 1 and a binary zero to pin 3 of a JK flip-flop 632 during its negative half cycles. These pin 1 and 3 settings are transferred to pins 7 and 5 respectively at each TC6 pulse. Similarly, a JK flip-flop 634 whose 1 and 3 pins are connected to pins 7 and 5 respectively of JK flip-flop 632, receives the TC₆ pulses as set inputs whereby pin 7 of JK flip-flop 634 assumes the same level as pin 1 of JK flip-flop 632 at the trailing edges of the TC6 pulses. Thus, assuming that pin 7 of JK flip-flop 632 goes to a binary one with the leading edge a given TC6 pulse applied thereto, pin 7 of JK flip-flop 634 will go to a binary one at the trailing edge of the TC₆ pulse.

When pin 7 of flip-flop 634 goes to a binary one and JK flip-flop 624 has been reset, the mask drive signal issues from gate 635 such, signal being the multivibrator 630 output synchronized with each TC₆ pulse. This mask drive output of gate 635 which is a binary one when a stepping of the mask motor is called for, is applied to a gate 637 to be used as a set input to JK flip-flops 606 and 609 to generate the BELL M and the URM signals (actual mask positions for these functions). The mask drive signal is also applied as an input to the mask motor drive as will be shown hereinbelow.

When the combined outputs of gates 622-1, 622-2 and 622-3 are a binary one, the output from pin 7 of JK flip-flop 601 set in accordance with PC gate is a binary zero, its inversion being applied together with the outputs of gates 622-1 to 622-3 as inputs to a gate 638. The third input to gate 638 is the output of gate 639 which is a binary one when JK flip-flop 624 is in its reset state and pin 7 of JK flip-flop 634 is at a binary one, due to the negative half cycle of multivibrator 630. At this point, a binary zero output is produced from gate 638 which is inverted in a gate 640 to set a JK flip-flop 641.

The pin 1 setting of JK flip-flop 641 results from the combined outputs of gates 642 and 643. The pin 3 setting of JK flip-flop 641 results from the combined outputs of gates 644 and 645. In the gating arrangement terminating in gates 642–645, there are decoded the interlace positions to which the mask motor is to be stepped. If the outputs of gates 642 and 643 is a binary one and those of gates 644 and 645 is a binary zero, then it indicates that the mask is in a higher interlace position than the one to which it is to be stepped. When the output of gates 644 and 645 is a binary one and the output of gates 642 and 643 is a binary zero, then the mask is in a lower interlace position than the one to which it is to be stepped. When the output of gate 640 sets JK flip-flop 641, if the pin 7 output thereof is a binary one then pins 1 and 3 of JK flip-flop 646 both go to a binary one whereby when the mask drive pulse sets JK flip-flop 646 its pin 7 goes to a binary zero and the mask motor drive B, i.e., the reverse drive is actuated. Consequently, when pin 5 of JK flip-flop 641 goes to binary 1, pins 1 and 3 of flip-flop 647 go to a binary one to activate the mask motor drive A, i.e., the forward drive.

The same and $\overline{same}$ signals indicate whether JK flip-flop 647 and 646 are in the same or different states and are respectively applied to gates 648 and 649. If they are in the same states, and pin 7 of JK flip-flop 641 is at a binary one, then JK flip-flop 646 is the first to be actuated to in turn activate mask motor drive terminal B. JK flip-flop 647 and consequently terminal A is the first to be actuated if they are not the same.

When a mask motor stepping takes place, terminals A and B are alternately actuated until the mask movement halts. Whether the movement commences with the actuation of terminal A or B determines, according to the logic chosen for the motor, which direction the motor will take.

TRACK CONTROL SECTION 286

Prior to considering this section, it is well to consider the construction of a particular design of the font wheel.

An embodiment of the font wheel suitably comprises two sections, each section comprising eight tracks. Advantageously, tracks 1 to 4 of each of these sections comprise complete fonts and are designed to be suitable for photocomposing 5-inch lines. Tracks 5 to 8 of each section are designed for use in the setting of 2½″ lines and there are required two of the latter tracks to make up a complete font. With such use of two tracks in the 2½″ line setting, there are provided twice as many positions as in the single track setting of a 5-inch line at which characters may be etched or otherwise drawn. The complete font constituted by the two tracks used in the 2½″ line setting, does not contain more characters than that found in the single track for a 5-inch setting, but the number of times that a particular character occurs is twice as frequent. Consequently, the system is rendered capable of operating in a 2½″ line setting at a speed which is substantially twice the speed that it operates in 5-inch line setting, such speed being in terms of number of lines per unit time.

Two tracks are necessary in setting 2½″ lines as a result of the spacing which has been chosen between individual units on a track whereby, with a given rotational velocity of the font wheel and with the mask in any position, a chraracter in the flash position will sweep an entire line before the next chraracter is handled. With such arrangement, the flash tubes can be operated without the need for a shutter therefor.

In the description of the track control section 286, stage 287 which comprises the UM/IM (upper magazine/lower magazine) control and the zero detect circuit is first considered.

STAGE 287, UM/LM CONTROL AND ZERO DETECT, FIGS. 46, 46A AND 47

A suitable embodiment of the UM/LM control portion of this stage is shown in FIGS. 46 and 46a. An example of a circuit suitable for use as the "0" detect arrangement is shown in FIG. 47.

Referring now to FIG. 47, the OURLM, OURIM, OLRUM and OURUM signals derived in the mask control section are applied to gates 700–1, 700–2, 700–3 and 700–4 as shown. At the output of gate 700–1, there is produced the $\overline{OLM}$ signal which is a binary zero when no characters remain to be flashed in the lower magazine and at the output of gate 701 there is produced the OLM signal which is a binary one when no characters remain to be flashed in the lower magazine. The $\overline{OUM}$ and OUM signals are similarly produced at the outputs of gates 700–4 and 702 respectively. From gates 700–6, 700–2, 700–3 and 700–5 there are respectively produced the $\overline{OLRLM}$, $\overline{OURLM}$, $\overline{OLRUM}$ and $\overline{OURUM}$ signals. When the OLM and OUM signals are binary ones at elp just time, a flip-flop 704 is set whereby its reset output goes to binary zero which is inverted to provide the "0" detect signal. Flip-flop 704 is reset at $\overline{elp\ just}$ time or by the binary zero state of the $\overline{Reader\ el}$ signal indicating that a line has been fully loaded into the memory at which time the "0" detect signal ceases to be present. The reset Op (either the reset or the zero detect pulse) results from an "OR" arrangement of the "0" detect and the reset pulse. The elp just $\overline{ODET}$ TC$_2$ (the elp just TC$_2$ signal when the zero detect signal is not present) results from the AND gating together of the elp just TC$_2$ pulse and the reset output of flip-flop 704 when flip-flop 704 is in its reset, i.e., not zero detect state.

Referring now to FIGS. 46 and 46a wherein there is shown the LM/UM control, the $\overline{OLM}$, OLM, OUM and $\overline{OUM}$ signals are applied to gates 709–1 and 709–2 as shown. In the event that there remain characters to be flashed, for example, only in the upper magazine whereby the OUM signal is a binary zero, then pin 1 of a JK flip-flop 710 goes to a binary one and pin 3 thereof goes to a binary zero whereby on the occurrence of the next elp just pulse, pin 5 goes to a binary zero and the UMFF signal issues as a binary one. If zero characters remain only in the lower magazine, then the reverse would occur and the LMFF signal would issue as a binary one. In the event that zero characters to be flashed remain in both magazines, then both of pins 1 and 3 go to binary zeros and flip-flop 710 is inhibited.

As shown in FIG. 46, the OLRLM, $\overline{OLRLM}$, OLRUM, $\overline{OLRUM}$, OURLM, $\overline{OURLM}$, OURUM and $\overline{OURUM}$ signals and the LMFF and UMFF signals are combined as shown in gates 706–1 to 706–4. If, for example, no characters remain to be flashed in the lower magazine lower rail position, and if characters remain to be flashed in the upper rail lower magazine position, or if no characters remain to be flashed in the lower rail upper magazine position but characters remain to be flashed in the upper rail upper magazine position, then pin 3 of a flip-flop 708 goes to a binary one. The trailing edge of the $\overline{elp\ just}$ pulse sets JK flip-flop 708 whereby pin 7 thereof goes to a binary zero and the G signal issues indicating the unloading of a 2½″ line. With the inversion of the G signal, i.e. $\overline{G}$ is a binary one, then a 5-inch line is being unloaded.

The UMFF and LMFF signals are utilized as inputs to a gate stage 288 in track control section 288 which is employed to decode which tracks have been designated as upper and lower magazine.

The actual track position is provided by the photocell array 68a, FIG. 1. The signals provided by this array are used to provide comparison sginals as shown in FIG. 4G wherein the track encoder stage is shown.

TRACK ENCODER STAGE 290 AND GATE LOGIC STAGE 293, FIG. 49

In FIG. 49, the outputs of the photocell array which comprises 4 binary bits and the gate which indicates that the track position is situated to be read by the photocells of the array are applied as inputs to gates 714–1 to 714–5 respectively. When the gate signal is present (binary one), pins 1 and 3 of a JK flip-flop 715 go to zero and one respectively. Either the reset pulse or the presence of the track drive signal, which indicates a movement to a different track thereby, causes pin 7 of JK flip-flop 715 to go to a binary zero whereby the track gate binary one signal issues, the latter signal being applied to gates 714–1 to 714–4. The T2⁰T to T2³T signals are the actual signals from the photocell array. The T2⁰F to T2³F signals are the inverse of the T2⁰T to T2³T signals and are binary zeros at the presence of T2 signals and the presence of the track gate FF signal.

GATE STAGE 288, FIG. 48

In this stage, a suitable embodiment of which is shown in FIG. 48, the LM2⁰–LM2³ and the UM2⁰–UM2³ inputs are the respective settings on a pair of 4 bit switches at the console and which are set by the operator to indicate which track is to be upper and which track is to be lower magazine. The LM Sec. 2 and UM Sec. 2 signals are also provided from the console to provide the Sec. 1 and Sec. 2 signals for determining which sections of the wheel are to be used. Gates 713–1 to 5 have applied thereto the respective bit outputs of the programmed LM console switch and the LMFF signal. Gates 713–6 to 713–10 have applied thereto the respective bit outputs of the programmed UM console switch and the UMFF signal.

Gates 713 require enabling to provide an AND function to determine the proper selected magazine and the switch setting therefor.

If either or both gates 713–1 and 713–6 produce a binary zero output, then, provided that the G signal (representing the setting of a 2½″ line) is absent then the S2⁰F and S2⁰T signals issue, i.e., the false and true representation of the console switch 0⁰ bit. If either or both of the outputs of gates 713–2 and 713–7 are binary zeros, then the 2¹T and 2¹F signals issue. Similarly, if the outputs of either or both of gates 713–3 and 713–8 are binary zeros then the 2²T signal issues.

If a 2½″ line is called for and the 2¹F and 2²T signals are true, then the output of a gate 717–1 is a binary one and the S2¹T signal issues, S2¹F being the inversion of S2¹T and being a binary one when the S2¹T signal does not issue. Similarly, when either the G signal calling for a 2½″ line, the 2¹F or the 2²T signals are binary, the S2¹T signal issues. This logic is all concerned with the console switch programming and determines the conditions when the S2¹T signal should go true.

For the S2²T signal to issue, it is required that either the output of gate 717–1 be a binary zero or that the outputs of gates 713–3 and 713–8 both be binary ones. For the S2³T signal to issue, there is required a binary zero output from either gate 717–1, gate 713–4 or gate 713–9. When a binary one issues from gate 719 indicating that either the output of gate 713–5 or 713–10 is at a binary zero, the SEC 2 signal issues. If both of the outputs of gates 713–5 and 713–10 are binary ones, the Sec. 1 signal issues. The signals produced in the arrangement shown in FIG. 48 are utilized in the step and drive 1 logic stage 289.

STEP AND DRIVE LOGIC STAGE 289, FIG. 51

In this stage which includes the arrangement shown in FIG. 51, the track position photocell array outputs as decoded in track encoder 290 and the track section signals as decoded in gate 288, FIG. 48, are applied to comparison gates 722–1 to 722–8. The arrangement shown in FIG. 51 may be termed a "trickle down" type comparator. Thus, if the No. 3 bit of the track position and the corresponding bit of the section switch agree, then the RE1 and FW1 signals are both binary ones. If they do not agree and the output of gate 721–1 is a binary zero, then a reverse movement is called for. If the RE1 or the FW1 signal is a binary zero, then all lower order comparisons are inhibited. With this arrangement, the highest order bits at which no agreement exists inhibits the next lower order comparisons.

The RE1–RE4 and the FW1–FW4 signals are employed as inputs to the circuit shown in FIG. 50 and are applied to gates 725–1 to 725–4 therein as shown. The track gate FF signal produced in stage 293 is applied to gate 730.

If no track movement is called for, i.e., all of the RE1 to RE4 and FW1 to FW4 signals are binary ones, then a binary one issues from gate 727–1 and 727–2. If the track gate FF signal is present, the binary zero output of gate 728 is inverted in gate 729 to produce the binary one TRACK comp signal.

If, for example, one of the RE signals is a binary zero indicating a reverse movement, then a binary one is placed at pin 1 of a JK flip-flop 726 and a binary zero is placed at pin 3 of the JK flip-flop. As will be shown, at the trailing edge of a TC6 pulse in the negative half cycle of the track clock provided that the track gate signal FF is present, JK flip-flop 726 is actuated whereby pin 7 thereof goes to a binary one and the REV signal issues. A similar set of opposite circumstances causes the FWD signal to issue. In the situation where a REV or FWD signal issues, it is seen that the track comp signal goes to a binary zero provided that the reset pulse is not present as an input to gate 729, the latter pulse also causing the track comp signal to issue. When the REV and FWD signals are not all binary ones at the appearance of the *elp* just TC₃ $\overline{ODET}$ signal, a binary zero issues from a gate 732 which sets JK flip-flop 726, after being inverted in gate 731. Thus JK flip-flop 726 is actuated either by the presence at the trailing edge of TC6 time or at *elp* just TC₃ $\overline{ODET}$ time when no track comp signal exists.

The actual determining of the stepping of the track stepper motor is effected with the track clock stage 296 and the stepper motor logic stage 292.

TRACK CLOCK 296 AND STEPPER MOTOR LOGIC STAGE 292, FIGS. 50 AND 52

The track clock 296 shown in FIG. 50 is a free-running multivibrator. Referring to stage 292 in FIG. 50 wherein there is shown a suitable embodiment of the stepper motor stage 292, it is seen that at the negative half cycle output of the track clock, a binary one is placed at pin 1 of a JK flip-flop 735 and a binary zero is placed at pin 3. At the leading edge of the TC6 pulse, pins 7 and 5 of JK flip-flop 735 at this time go to a binary one and a binary zero respectively do pins 1 and 3 of a JK flip-flop 736. Now, at the trailing edge of the TC₆ pulse, pin 7 of JK flip-flop 736 goes to a binary one, such pin 7 output being applied as an input to gate 730 to permit the actuation of JK flip-flop 726 and to gate 737. If the track comp signal exists because of a track comparison, or at reset time, gate 729 produces a binary one output whereby JK flip-flop 738 is set, its pin 5 going to a binary one and its pin 7 going to a binary zero. In such case the track drive signal does not issue and the $\overline{track\ drive}$ signal issues as a binary one. JK flip-flop 738 is reset at *elp* just TC₃ $\overline{ODET}$ time provided that no track comp exists. Once JK flip-flop 738 is so reset, it cannot be set until the track comp signal issues as a binary one, whereby pin 7 of JK flip-flop 738 remain at a binary zero. In such case, with pin 7 of JK flip-flop 735 at a binary one, the track drive pulse issues as a binary one. The track drive signal is applied to gate logic stage 293. The track drive signal is applied to the arrangement shown in FIG. 52.

In this latter figure, a pair of JK flip-flops 740 and 741 are provided to which the track drive pulse is applied as a set input. If at a given point of operation JK flip-flops 740 and 741 are in like states and a REV signal, for example, issues (calling for a reverse movement), then a binary zero is placed at pins 1 and 3 of JK flip-flop 740 and a binary one is placed at pins 1 and 3 at JK flip-flop 741 whereby when the track drive signal appears, pin 7 of flip-flop 741 goes to a binary zero and a binary one track stepper signal issues from gate 742. At this point the state of both JK flip-flops is no longer the same so that at the next track drive pulse JK flip-flop 740 is actuated to produce the binary one track stepper pulse at which point the states of the JK flip-flops again becomes the same. With this arrangement, a stepper pulse is alternately produced from each of the JK flip-flops. The logic of the track stepper motor is such if the first stepper pulse issues from JK flip-flop 741, then a reverse motor stepping is effected and if the first pulse issues from JK flip-flops 740, a forward motor stepping is effected.

SECTION DRIVE LOGIC STAGE 234 AND SECTION DRIVE CONTROL STAGE 295, FIG. 50

In FIG. 50, there are shown these two stages. In the drive logic stage, the T Sec. 1 and T Sec. 2 signals are provided from the section photo cells. The Sec. 1 and Sec. 2 signals are decoded from the track selector switches as described in gate 288, FIG. 48. Thus, in FIG. 50, let it be assumed that the actual track position is in section 2 but a move to section 1 is called for, then the T Sec. 1 signal will be at a binary one. In such case, the output of gate 740a is a binary zero, the output of gate 742a is a binary one, the output of gate 741a is a binary one and the output of gate 743a is a binary zero. Consequently, the output of gate 744a is a binary one to place a binary one and a binary zero at pins 1 and 3 respectively of a JK flip-flop 746a. When such binary one exists at the output of gate 744a, a gate 745a is enabled at $elp$ just $TC_2$ $\overline{ODET}$ time, the binary zero output of gate 745a being inverted in a gate 748a to actuate JK flip-flop 746a whereby its pin 7 goes to a binary one and its pin 5 goes to a binary zero to issue the ZZ signal representing a section movement. With pin 7 of JK flip-flop 746a at a binary one, at $elp$ just $TC_3$ $\overline{ODET}$ time, a flip-flop 747 is set to issue the clutch start signal which causes the section movement. The clutch stop signal is provided from the wheel after a suitable interval to reset flip-flop 747.

After the movement to the proper section whereby the output of gate 744a goes to a binary zero, gate 745a produces a binary one output. At $TC_6$ time, JK flip-flop 746a is actuated thereby through gate 748a whereby pin 7 of JK flip-flop 746a goes to a binary zero and flip-flop 747 cannot be again set.

LEADING CLOCK 298, LEADING LOGIC 299 AND STEPPER MOTOR LOGIC 299a, FIG. 53

It is recalled that the leading operation moves film 10 after a line has been potocomposed thereon the proper spacing amount to place the film in position to receive the next line. Such moving takes place after the zero detect signal issues for the composed line indicating that no more characters remain to be flashed.

Referring now to FIG. 53, the leading clock 298 comprises a free-running multivibrator. The leading logic stage 299 comprises a pair of JK flip-flops 751 and 752. At the negative half cycle of output from multivibrator 298, pins 1 and 3 JK flip-flop 751 go to a binary zero and a binary one respectively whereby at the leading edge of the $TC_6{*}$ pulse, pin 5 of JK flip-flop 751 goes to a binary one. The leading comparator signal taken from leading comparator stage 210 in the load control section is a binary zero before comparison is attained between the film line position and the commanded position.

JK flip-flop 725 is reset by the zero detect pulse whereby pin 7 goes to binary one and pin 5 goes to a binary zero. With the leading comparison absent, i.e., the leading comp signal at a binary zero and in the absence of the reset pulse, JK flip-flop 752 is inhibited. With flip-flop 752 in its reset state, the ZZZ signal issues as a binary zero indicating a leading movement. At the leading edge of the $TC_6{*}$ pulse when pin 5 of JK flip-flop 751 goes to a binary one and with JK flip-flop 752 in its reset state, gate 754 produces a binary zero output which issues as the binary one leading count pulse at the output of a gate 755. The output of gate 754 is applied to the leading stepper motor logic stage 299a through a gate 756.

LEADING STEPPER MOTOR LOGIC STAGE 299a

This stage, shown in FIG. 53, is similar to the track stepper motor logic stage 292. It comprises a pair of JK flip-flops 761 and 762. The states of these JK flip-flops are compared in gates 763 and 764. If they are in the same state, a binary zero issues from gate 765 to place a binary one at pins 1 and 3 of JK flip-flop 761 and a binary zero at pins 1 and 3 of flip-flop 762. Thus, in such situation JF flip-flop 761 is first actuated by the leading count output of gate 756 followed by the setting of JK flip-flop 762 by such output. The leading stepper motor is thus stepped until the leading comp signal goes to a binary one, at which point JK flip-flop 752 is set, whereby its pin 7 goes to a binary zero and the leading count pulses cease to issue. At the leading edge of $TC_6{*}$ time when the output of clock 298 is in its positive half cycle, pin 5 of JK flip-flop 751 goes to a binary zero. With pin 7 of JK flip-flop 752 at a binary zero, the output of gate 756 goes to a binary zero and JK flip-flops 761 and 762 are inhibited.

FIG. 45 shows an arrangement for generating the inhibit reader signal used in the load control section. In this arrangement, the $el$ (end of line) signal which appears when a full line is loaded into memory is the $\overline{\text{reader } el}$ signal.

Either a stop button signal produced from the console or the stop signal decoded in the decoder section sets a flip-flop 780. Flip-flop 780 is reset by either the reset pulse or a signal produce from a start button on the console. When flip-flop 780 is set, a stop-light is illuminated. The start button signal is used to set a flip-flop 781 at which point the inhibit reader signal goes to a binary one. When the $el$ end of line signal is not present, flip-flop 781 is reset and the inhibit reader signal goes to a binary zero. The latter event also occurs at the appearance of a reset pulse.

FIG. 55 shows the arrangement for generating the reset pulses. In this arrangement, a signal produced by depressing the clear button at the console is sampled by the $TC_6{*}$ pulse in a gate 783. The output of gate 783 is gated with the output of a free running multivibrator 782 in a gate 784 to produce a series of binary zero reset pulses during the time the clear button is depressed.

While there has been described what is at present considered to be a preferred embodiment of the invention, it will be obvious to those skilled in the art that various changes and modifications may be made therein, without departing from the invention, and it is, therefore, aimed in the appended claims to cover all such changes and modifications as fall within the time spirit and scope of the invention.

What is claimed:

1. In an apparatus for composing text line-by-line on a photosensitive medium from coded input electrical signals predeterminedly individually representative of the characters of said text to be composed and including an endless strip of material having a longitudinally arranged font of characters and continually moved at a substantially uniform velocity, means capable of illuminating no more than one given character from said strip during the interval its image is effectively traversing the area of said photosensitive medium upon which a line of text is being composed, the light through said last-named character when illuminated being effective to act upon said photosensitive medium which is cooperatively associated therewith, sensing means for developing a position signal which is continuously representative of the instantaneous position of said character during movement of said strip, means jointly responsive to a position comparison signal representative of an agreement between said instantaneous position and the line position of a like character and a character comparison signal representative of an agreement of said given character with said like character for exciting said illuminating means: means for providing said comparison signals comprising memory means for receiving and storing said coded input electrical signals in the order that their respective characters occur on a line to be composed; means for storing said given character to produce its predetermined coded signal; means for comparing said last-named coded signal with said input coded signals to produce said character comparison signal; means for deriving a signal from said coded input signals representative of the position of said character on said line; and means for comparing said instantaneous position representative signal with said derived signal to produce said position comparison signal whereby said given character is successively illuminated in each assigned position wherein it occurs in said line during one scan of the image of said given character over an area of said photosensitive medium upon which area a line of text is being composed before another character of said text to be composed is illuminated.

2. In an apparatus for composing text line-by-line on a photosensitive medium from coded input electrical signals individually representative of the characters of said text, and the spacings between said characters and including an endless strip of material having at least one longitudinal front of characters and continually moved at a substantially uniform velocity, character storage means for providing a coded electrical signal individually representative of each of the strip characters, means capable of illuminating no more than one given character from said strip during the interval its image is effectively traversing the area of said photosensitive medium upon which a line of text is being composed, the light through said last-named character when illuminated being effective to act upon said photosensitive medium which is cooperatively associated therewith, sensing means for developing a position signal continuously representative of the instantaneous position of said character during movement of said strip, and flashing means jointly responsive to a position comparison signal and a character comparison signal for momentarily exciting said illumnating means when said two signals are in time coincidence: data processing means for controlling the operation of said apparatus comprising: memory means for receiving and storing said coded input electrical signals in the order that their respective characters occur on a line to be composed; means responsive to said last-named signals for determining the cumulative width of the width occupying characters in said line, for assigning chosen widths to said spacings to justify said line, and for thereafter receiving said memory stored coded input electrical signals in their assigned positions in a line; means responsive to the effecting of a justified line for the storing of a coded signal representative of one of said characters; means for successively comparing said last-named coded signal with each of said coded signals stored in said memory means; said flashing means being jointly responsive to an agreement between a memory stored coded signal and said last-named coded signal to produce said character comparison signal and an agreement between said position signal for said last-named coded signal and the assigned line position of said memory stored coded signal to produce said position comparison signal for momentarily exciting said illuminating means, said last-named coded signal being stored throughout the period required to compare it with each of said memory stored coded signals whereby a single given character is successively illuminated at each assigned position wherein it occurs in said justified line during one scan of the image of said given character over an area of said photosensitive medium upon which area a line of text is being composed before another character of said text to be composed is illuminated.

3. In an apparatus for composing text line-by-line on a photosensitive medium from coded input electrical signals individually representative of the characters of said text, and the spacings between said characters and including an endless strip of material comprising a plurality of interlaced, longitudinally disposed groups of characters and which is continually moved at substantially uniform velocity, character storage means for providing a coded electrical signal individually representative of each of the strip characters, means capable of illuminating no more than one given character from said strip during the interval its image is effectively traversing the area of said photosensitive medium upon which a line of text is being composed, the light through said last-named character when illuminated being effective to act upon said photosensitive medium which is cooperatively associated therewith, sensing means for developing a position signal continuously representative of the instantaneous position of said character during movement of said strip, flashing means jointly responsive to a position comparison signal and a character comparison for momentarily exciting said illuminating means when said two signals are in time coincidence, and a mask movable with said strip and angularly adjustable relative thereto to permit illumination only of characters of a selected one of said groups: data processing means for controlling the operations of said apparatus comprising memory means for receiving and storing said coded input electrical signals in the order that their respective characters occur on a line to be composed; means responsive to said last-named signals for determining the cumulative width of the width occupying characters in said line, for assigning chosen widths to said spacings to justify said line, and for thereafter receiving said memory stored coded input electrical signals in their assigned positions in a line; means responsive to the effecting of a justified line for storing of coded signal representative of one of said characters; means for successively comparing said last-named coded signal with each said coded signals stored in said memory means; said flashing means being jointly responsive to an agreement between a memory stored coded signal and said last-named coded signal to produce said character comparison signal and an agreement between said position signal for said last-named coded signal and the assigned line position of said memory stored coded signal to produce said position comparison signal for momentarily exciting said illuminating means, said last-named coded signal being stored throughout the period required to compare it with each of said memory stored coded signals whereby a single given character is successively illuminated at each assigned position wherein it occurs in said justified line during one scan of the image of said given character over an area of said photosensitive medium upon which area a line of text is being composed before another character of said text to be composed is illuminated; and means for comparing the actual position of said mask with a commanded position for said mask to produce a signal for causing said mask to be moved to said commanded position in response to said comparison.

4. In an apparatus as defined in claim 3 wherein said means for storing said coded signal representing a character comprises means responsive to the effecting of said justification and the presenting of said character coded signal for generating a signal for enabling the storing of said last-named representation, and a register for storing said representing signal in response to said enabling signal.

5. In an apparatus for composing text line-by-line on a photosensitive medium from coded input electrical signals individually representative of the characters of said text, and the spacings between said characters and including an endless strip of material comprising a plurality of interlaced, longitudinally disposed groups of characters and which is continually moved at a substantially uniform velocity, character storage means for providing a coded electrical signal individually representative of each of the strip characters, means capable of illuminating each character during the travel of its image effectively over an area of said photosensitive medium upon which area a line of text is being composed, the light through said last-named character when illuminated being effective to act upon said photosensitive medium which is cooperatively associated therewith; sensing means for developing a position signal continuously representative of the instantaneous position of said character during movement of said strip, flashing means jointly responsive to a position comparison signal and a character comparison for momentarily exciting said illuminating means when said two signals are in time coincidence, a mask movable with said strip and angularly adjustable relative thereto to permit illumination only of characters of a selected one of said strips, and means for effecting relative axial movement between said strip and said illuminating means to illuminate a given preselected group of characters: data processing means for controlling the operations of said apparatus comprising: memory means for receiving and storing said coded input electrical signals in the order that their respective characters occur on a line to be composed; means responsive to said last-named signals for determining the cumulative width of the width occupying characters in said line, for assigning chosen widths to said spacings to justify said line, and for thereafter receiving said memory stored coded input electrical signals in their assigned positions in a line; means responsive to the effecting of a justified line for storing a coded signal representative of one of said characters; means for successively comparing said last-named coded signal with each of said coded signals stored in said memory means; said flashing means being jointly responsive to an agreement between a memory stored coded signal and said last-named coded signal to produce said character comparison signal and an agreement between said position signal for said last-named coded signal and the assigned line position of said memory stored coded signal to produce said position comparison signal for momentarily exciting said illuminating means, said last-named coded signal being stored throughout the period required to compare it with each of said memory stored coded signals whereby a single given character is illuminated at each succeeding assigned position wherein it occurs in said justified line during one scan of the image of said given character over an area of said photosensitive medium upon which area a line of text is being composed; means for comparing the actual position of said mask with a commanded position for said mask to produce a signal for causing said mask to be moved to said commanded position in response to said comparison; and means for comparing the position of said strip relative to said illuminating means and a commanded position for said strip to produce an electrical signal for causing said illumination of said strip in said commanded position.

6. An apparatus for composing text line-by-line on a photosensitive medium from coded input electrical signals individually representative of the characters of said text, and the spacings between said characters and including an endless strip of material comprising a plurality of interlaced, longitudinally disposed groups of characters and which is continually moved at a substantially uniform velocity, character storage means for providing a coded electrical signal individually representative of each of the strip characters, means capable of illuminating each character during the travel of its image effectively over an area of said photosensitive medium upon which area a line of text is being composed, the light through said last-named character being effective to act upon said photosensitive medium which is cooperatively associated therewith, sensing means for developing a position signal continuously representative of the instantaneous position of said character during movement of said strip, flashing means jointly responsive to a position comparison signal and a character comparison signal for momentarily exciting said illuminating means when said two signals are in time coincidence, a mask movable with said strip and angularly adjustable relative thereto to permit illumination only of characters of a selected one of said strips, and means for effecting relative axial movement between said strip and said illuminating means to illuminate a given preselected group of characters: data processing means for controlling the operations of said apparatus comprising: memory means for receiving and storing said coded input electrical signals in the order that their respective characters occur on a line to be compared; time-shared means for storing the addresses of said coded input electrical signals as they are stored in said memory means; means responsive to said last-named signals for determining the cumulative width of the width occupying characters in said line, for assigning chosen widths to said spacings to justify said line, and for thereafter receiving said memory stored coded input electrical signals in their assigned positions in a line; means responsive to the effecting of a justified line for storing a coded signal representative of one of said characters; means for successively comparing said last-named coded signal with each of said coded signals stored in said memory means; said flashing means being jointly responsive to an agreement between a memory stored coded signal and said last-named coded signal and to produce said character comparison signal and an agreement between said position signal for said last-named coded signal and the assigned line position of said memory stored coded signal to produce said position comparison signal for momentarily exciting said illuminating means, said last-named coded signal being stored throughout the period required to compare it with each of said memory stored coded signals whereby a single given character is illuminated at each succeeding assigned position wherein it occurs in said justified line; means for comparing the actual position of said mask with a commanded position for said mask to produce a signal for causing said mask to be moved to said commanded position in response to said comparison; and means for comparing the position on said strip relative to said illuminating means and a commanded position for said strip to produce an electrical signal for causing said illumination of said strip at said commanded position.

7. In an apparatus for composing text line-by-line on a photosensitive medium from coded input electrical signals individually representative of the characters of said text, and the spacings between said characters and including an endless strip of material comprising a plurality of interlaced, longitudinally disposed groups of characters and which is continually moved at a substantially uniform velocity, character storage means for providing a coded electrical signal individually representative of each of the strip characters, means capable of illuminating each character during the travel of its image effectively over an area of said photosensitive medium upon which area a line of text is being composed, the light through said last-named character when illuminated being effective to act upon said photosensitive medium which is cooperatively associated therewith, sensing means for developing a position signal continuously representative of the instantaneous position of said character during movement of said strip; means jointly responsive to a position comparison signal and a character comparison signal for momentarily exciting said illuminating means when said two signals are in time coincidence, and a mask movable with said strip and angularly adjustable relative thereto to permit illumination only of character of a selected one of said groups: data processing means for controlling the operations of said apparatus comprising: memory means for receiving and storing said coded input electrical signals in the order that their respective characters occur on a line to be composed, said memory means comprising two sections, one of said sections sequentially receiving said coded input electrical signals representative of one line of said text for storage therein, the other of said sections containing therein the coded input electrical signals representative of the line of text immediately preceding said one line, said last-named line being operated on for recording on said photosensitive medium concurrently with the storing of said one line in said one section; means responsive to coded input signals representing the characters of said one line for determining the cumulative width of the width-occupying characters in said line, for assigning chosen widths to said spacings to justify said line, and for thereafter receiving said memory stored coded input electrical signals in their positions in a line; means responsive to the effecting of a justified line for storing a coded signal representative of one of said characters; means for successively comparing said last-named coded signal with each of said coded signals stored in said memory means; said flashing means being jointly responsive to an agreement between a memory stored coded signal and said last-named coded signal to produce said character comparison signal and an agreement between said position signal for said last-named coded signal and the assigned line position of said memory stored coded signal to produce said position comparison signal for momentarily exciting said illuminating means, said last-named coded signal being stored throughout the period required to compare it with each of said memory stored coded signals whereby a single given character is illuminated at each succeeding assigned position wherein it occurs in said justified line during one scan of the image of said given character over an area of said photosensitive medium upon which area a line of text is being composed; and means for comparing the actual position of said mask with a commanded position for said mask to produce a signal for causing said mask to be moved to said commanded position in response to said comparison.

8. In an apparatus for composing text line-by-line on a photosensitive medium from coded input electrical signals individually representative of the characters of said text, and the spacings between said characters and including an endless strip of material comprising a plurality of interlaced, longitudinally disposed groups of characters and which is continually moved at a substantially uniform velocity, character storage means for providing a coded electrical signal individually representative of each of the strip characters, means capable of illuminating each character during the travel of its image effectively over an area of said photosensitive medium upon which area a line of text is being composed, the light through said last-named character when illuminated being effective to act upon said photosensitive medium which is cooperatively associated therewith, sensing means for developing a position signal continuously representative of the instantaneous position of said character during movement of said strip, means jointly responsive to a position comparison signal and a character comparison signal for momentarily exciting said illuminating means when said two signals are in time coincidence, and a mask movable with said strip and angularly adjustable relative thereto to permit illumination only of characters of a selected one of said groups: data processing means for controlling the operations of said apparatus comprising: memory means for receiving and storing said coded input electrical signals in the order that their respective characters occur on a line to be composed, said memory means comprising two sections, one of said sections sequentially receiving said coded input electrical signals representative of one line of said text for storage therein, the other of said sections containing therein the coded input electrical signals representative of the line of text immediately preceding said one line, said last-named line being operated on for recording on said photosensitive medium concurrently with the storing of said one line in said one section; means responsive to the state of said memory means for selecting the proper section in which a line of text is to be stored; means responsive to coded input signals representing the characters of said one line for determining the cumulative width of the width-occupying characters in said line, for assigning chosen widths to said spacings to justify said line, and for thereafter receiving said memory stored coded input electrical signals in their assigned positions in a line; means responsive to the effecting of a justified line for storing a coded signal representative of said characters; means for successively comparing said last-named coded signal with each of said coded signals stored in said memory means; said flashing means being jointly responsive to an agreement between a memory stored coded signal and said last-named coded signal to produce said character comparison signal and an agreement between said position signal for said last-named coded signal and the assigned line position of said memory stored coded signal to produce said position comparison signal for momentarily exciting said illuminating means, said last-named coded signal being stored throughout the period required to compare it with each of said memory stored coded signals whereby a single given character is illuminated at each succeeding assigned position wherein it occurs in said justified line during one scan of the image of said given character over an area of said photosensitive medium upon which area a line of text is being composed; and means for comparing the actual position of said mask with a commanded position for said mask to produce a signal for causing said mask to be moved to said commanded position in response to said comparison.

9. In an apparatus for composing text line-by-line on a photosensitive medium from coded input electrical signals comprising signals individually representative of the characters of said text, and the spacings between said characters, and commands for selecting a chosen spacing distance between said lines, and including an endless strip of material having at least one longitudinal font of characters and continually moved at a substantially uniform velocity, font storage means for providing a coded electrical signal individually representative of each of the strip characters, means capable of illuminating each character during the travel of its image effectively over an area of said photosensitive medium upon which area a line of text is being composed, the light through said last-named character when illuminated being effective to act upon said photosensitive medium which is cooperatively associated therewith, sensing means for developing a position signal continuously representative of the instantaneous position of said character during movement of said strip, means jointly responsive to a position comparison signal and a character comparison signal for momentarily exciting said illuminating means when said two signals are in time coincidence and means for moving said photosensitive medium said chosen one of a prescribed plurality of line spacings distances: data processing means for controlling the operations of said apparatus comprising: memory means for receiving and storing said coded input electrical signals in the order that their respective characters on a line to be composed; means responsive to said last-named signals for determining the cumulative width of the width-occupying characters in said line, for assigning chosen widths to said spacings to justify said line, and for thereafter receiving said memory stored coded input electrical signals in their assigned positions in a line; means responsive to the effecting of a justified line for storing a coded signal representative of one of said characters; means for successively comparing said last-named coded signal with each of said coded signals stored in said memory means; said flashing means being jointly responsive to an agreement between a memory stored coded signal and said last-named coded signal to produce said character comparison signal and an agreement between said position signal for said last-named coded signal to produce said character comparison signal and an agreement between said position signal for said last-named coded signal and the assigned lined position of said memory stored coded signal to produce said position comparison signal for momentarily exciting said illuminating means, said last-named coded signal being stored throughout the period required to compare it with each of said memory stored coded signals whereby a single given character is illuminated at each succeeding assigned position wherein it occurs in a justified line during one scan of the image of said given character over an area of said photosensitive medium upon which area a line of text is being composed; and means for comparing a commanded spacing distance included in said coded input signals and the actual position of said photosensitive medium for producing an electrical signal to actuate said photosensitive medium moving means to move said photosensitive medium said commanded distance.

10. In an apparatus as defined in claim 9 wherein said data processing means further includes means for producing a signal representing the completion of the illumination of all characters in a line and means responsive to the production of said last-named signal for causing said photosensitive medium to be moved said chosen line spacing distance.

11. In an apparatus for composing text line-by-line on a photosensitive medium from coded input electrical signals individually representative of the characters of said text, and the spacings between said characters and including an endless strip of material comprising a plurality of interlaced, longitudinally disposed groups of characters and which is continually moved at a substantially uniform velocity, character storage means for providing a coded electrical signal individually representative of each of the strip characters, means capable of illuminating each character during the travel of its image effectively over an area of said photosensitive medium upon which area a line of text is being composed, the light through said last-named character being effective to act upon said photosensitive medium which is cooperatively associated therewith, sensing means for developing a position signal continuously representative of the instantaneous position of said character during movement of said strip, flashing means jointly responsive to a position comparison signal and a character comparison signal for momentarily exciting said illuminating means when said two signals are in time coincidence, a mask movable with said strip and angularly adjustable relative thereto to permit illumination only of characters of a selected one of said groups, and means for effecting relative axial movement between said strip and said illuminating means to illuminate a given preselected group of characters: data processing means for controlling the operations of said apparatus comprising: memory means for receiving and storing said coded input electrical signals in the order that their respective characters occur on a line to be composed; time-shared means for storing the addresses of said coded input electrical signals as they are stored in said memory means; means for decoding said coded input signals into discrete respective character and function representative signals and for further decoding selected combinations of said decoded signals to determine commanded interlace positions for said mask; means for assigning given width to said decoded character signals in accordance with a chosen font size; means for sequentially entering said coded input signals into said decoding means through said time shared storing means; means responsive to said decoded signals for determining the cumulative width of the width-occupying characters in said line, for assigning chosen widths to said spacings to justify said line, and for thereafter receiving said memory stored coded input electrical signals in their assigned positions in a line; means responsive to the effecting of a justified line for storing a coded signal representative of one of said characters; means for successively comparing said last-named coded signal with each of said coded signals stored in said memory means; said flashing means being jointly responsive to an agreement between a memory stored coded signal and said last-named coded signa to produce said character signal comparison and an greement between said position signal for said last-named coded signal and the assigned line position of said memory stored coded signal to produce said position comparison signal for momentarily exciting said illuminating means, said last-named coded signal being stored throughout the period required to compare it with each of said memory stored coded signals whereby a single given character is illuminated at each succeeding assigned position wherein it occurs in said justified line; means for comparing the actual position of said mask with a commanded position for said mask to produce a signal for causing said mask to be moved to said commanded position in response to said comparison; and means for comparing the position on said strip relative to said illuminating means and a commanded position on said strip to produce an electrical signal for causing illumination of said strip by said illuminating means at said commanded position.

12. In an apparatus as defined in claim 11 wherein said coded input signal further include Bell characters and wherein said Bell characters are decoded in said decoding means to provide signals respectively representative thereof.

13. In an apparatus for composing text line-by-line on a photosensitive medium from coded input electrical signals individually representative of the characters of said text, and the spacings between said characters and including an endless strip of material comprising a plurality of interlaced, longitudinally disposed groups of characters and which is continually moved at a substantially uniform velocity, character storage means for providing a coded electrical signal individually representative of each of the strip characters, means capable of illuminating each character during the travel of its image effectively over an area of said photosensitive medium upon which area a line of text is being composed, the light through said last-named character being effective to act upon said photosensitive medium which is cooperatively associated therewith, sensing means for developing a position signal continuously representative of the instantaneous position of said character during movement of said strip, flashing means jointly responsive to a position comparison signal and a character comparison signal for momentarily exciting said illuminating means when said two signals are in time coincidence, a mask movable with said strip and angularly adjustable relative thereto to permit illumination only of characters of a selected one of said groups, and means for effecting relative axial movement between said strip and said illuminating means to illuminate a given preselected group of characters: data processing means for controlling the operations of said apparatus comprising: memory means for receiving and storing said coded input electrical signals in the order that their respective characters occur on a line to be composed; time-shared means for storing the addresses of said coded input electrical signals as they are stored in said memory means; means for decoding said coded input signals into discrete respective character and function representative signals and for further decoding selected combinations of said coded signals to determine commanded interlaced positions for said mask; means for assigning given widths to said decoded character signals in accordance with a chosen font size; means responsive to said decoded signals for determining the cumulative width of the width-occupying characters in said line, for assigning chosen widths to said spacings to justify said line and for thereafter receiving said memory stored coded input electrical signals in their assigned positions in a line, said last-named means comprising accumulator means including a counter, means for entering said decoded signals into said counter through said width-assigning means to cause said counter to register the sum of the widths of the space-occupying characters in said line, means for providing a commanded width total for a justified line, means responsive to the signals derived in said decoding means for said spacing distances for variably assigning a given width to each of said spacing distances and for augmenting the value in said counter with the cumulative total of said assigned spacing distances, means for comparing the contents of said counter with said commanded width total, said assigned width for each of said spacing distances being determined by the effecting of an agreement between said counter contents and said commanded width total whereby the effecting of such agreement results in a justified line to be composed on said photosensitive medium; means responsive to the effecting of a justified line for storing a coded signal representative of one of said characters; means for successively comparing said last-named coded signal with each of said coded signals stored in said memory means; said flashing means being jointly responsive to an agreement between a memory stored coded signal and said last-named coded signal to produce said character comparison signal and an agreement between said position signal for said last-named coded signal and the assigned line position of said memory stored coded signal to produce said position comparison signal for momentarily exciting said illuminating means, said last-named coded signal being stored throughout the period required to compare it with each of said memory stored coded signals whereby a single given character is illuminated at each succeeding assigned position wherein it occurs in said justified line; means for comparing the actual position for said mask with a commanded position for said mask to produce a signal for causing said mask to be moved to said commanded position in response to said comparison; and means for comparing the position on said strip relative to said illuminating means and a commanded position on said strip to produce an electrical signal for causing illumination of said strip by said illuminating means at said commanded position.

14. In an apparatus as defined in claim 13 wherein said counter comprises a plurality of binary switching stages capable of having information entered thereinto in parallel and wherein like timing circuits are respectively provided between the output of one of said stages and the input to a succeeding stage, to enable said counter to function both as a parallel and a serial counter.

15. In an apparatus as defined in claim 13 wherein said means for assigning said widths to said spacing distances comprises a counter for entering a whole number representing the multiple of a given unit width for each of said spacing distances present in a line and a counter for entering the amount of units in excess of the product of said multiple and the number of spacing distances in a line required to affect justification, and means for incrementing by one of said units, the width of the spacing distance in said line for the number of spacing distances equal to said amount of units.

16. In an apparatus as defined in claim 13 wherein means are further included in said data processing means which in response to a signal derived from the decoding of a quad command in said input coded signals effects a quad operation.

17. In an apparatus as defined in claim 16 wherein said quad commands are respectively quad left, quad right and quad center and wherein said data processing means further include means for automatically affecting said justification in response to a quad left command.

18. In an apparatus for composing text line-by-line on a photosensitive medium from coded input electrical signals individually representative of the characters of said text, and the spacings between said characters and including an endless strip of material comprising a plurality of interlaced, longitudinally disposed groups of characters and which is continually moved at a substantially uniform velocity, character storage means for providing a coded electrical signal individually representative of each of the strip characters, means capable of illuminating each character during the travel of its image effectively over an area of said photosensitive medium upon which area a line of text is being composed, the light through said last-named character being effective to act upon said photosensitive medium which is cooperatively associated therewith, sensing means for developing a position signal continuously representative of the instantaneous position of said character during movement of said strip, flashing means jointly responsive to a position comparison signal and a character comparison signal for momentarily exciting said illuminating means when said two signals are in time coincidence, a mask movable with said strip and angularly adjustable relative thereto to permit illumination of characters of a selected one of said strips, and means for effecting relative axial movement between said strip and said illuminating means to illuminate a given preselected group of characters: data processing means for controlling the operations of said apparatus comprising: memory means for receiving and storing said coded input electrical signals in the order that their respective characters occur on a line to be composed; time-shared means for storing the addresses of said coded input electrical signals as they are stored in said memory means; means for decoding said coded input signals into discrete respective character and function representative signals and for further decoding selected combinations of said decoded signals to determine commanded interlace positions for said mask; means for assigning given widths to said decoded character signals in accordance with a chosen font size; means responsive to said decoded signals for determining the cumulative width of the width-occupying characters in said line, for assigning chosen widths to said spacings and for thereafter receiving said memory stored coded input electrical signals in their assigned positions in a line, said last-named means comprising accumulator means including a first counter, means for entering said decoded signals into said first counter through said width assigning means to cause said counter to register the sum of the widths of the space-occupying characters in said line, means for providing a commanded width total for a justified line, means responsive to the signals derived in said decoding means for said spacing distances for variably assigning a given width to each of said spacing distances and for augmenting the value in said counter with the cumulative total of said assigned spacing distances, means for comparing the contents of said first counter with said commanded width total, said assigned width for each of said spacing distances being determined by the effecting of an agreement between said counter contents and said commanded width total whereby the effecting of such agreement results in a justified line to be composed on said photosensitive medium; means responsive to the effecting of said line justification for clearing said counter and for sequentially re-entering the contents of said memory into said first counter through said time-shared means, said decoding means and said width assigning means, said spacing distances being concurrently entered into said first counter at the positions that they occur in a line with their assigned widths; a second counter; means for entering a chosen multiple of said position signal into said second counter; means responsive to the effecting of a justified line for storing a coded signal representative of one of said characters; means for successively comparing said last-named coded signal with each of said coded signals stored in said memory means to produce said character comparison signal; means for comparing the contents of said first and second counters to produce said position comparison signal whereby upon the agreement between the contents of said first and second counters and an agreement between a memory stored coded signal and said last-named stored coded signal, the character represented by said last-named signal is in the proper position to be recorded on said medium, said flashing means being jointly responsive to said agreements for momentarily exciting said illuminating means, said last-named coded signal being stored throughout the period required to compare it with each of said memory stored coded signals whereby a single given character is illuminated at each succeeding assigned position wherein it occurs in said justified line; means for comparing the actual position of said mask with a commanded position for said mask to produce a signal for causing said mask to be moved to said commanded position in response to said comparison; and means for comparing the position on said strip relative to said illuminating means and a commanded position on said strip to produce an electrical signal for causing illumination of said strip by said illuminating means at said commanded position.

19. In an apparatus for composing text line-by-line on a photosensitive medium from coded input electrical signals individually representative of the characters of said text, and the spacings between said characters and including an endless strip of material comprising a plurality of interlaced, longitudinally disposed groups of characters and which is continually moved at a substantially uniformed velocity, character storage means for providing a coded electrical signal individually representative of each of the strip characters, means capable of illuminating each character during the travel of its image effectively over an area of said photosensitive medium upon which area a line of text is being composed, the light through said last-named character being effective to act upon said photosensitive medium which is cooperatively associated therewith, sensing means for developing a position signal continuously representative of the instantaneous position of said character during movement of said strip, flashing means jointly responsive to a position comparison signal and a character comparison signal for momentarily exciting said illuminating means when said two signals are in time coincidence a mask movable with said strip and angularly adjustable relative thereto to permit illumination only of characters of a selected one of said strips, means for providing a signal representative of the actual position of said mask, and means for effecting relative axial movement between said strip and said illuminating means to illuminate a given preselected group of characters: data processing means for controlling the operations of said apparatus comprising memory means for receiving and storing said coded input electrical signals in the order that their respective characters occur on a line to be compared; time-shared means for storing the addresses of said coded input electrical signals as they are stored in said memory means; means for decoding said coded input signals into discrete character and function representative signals and for further decoding selected combinations of said decoded signals to determine commanded interlace positions for said mask; means for assigning given widths to said decoded character signals in accordance with a chosen font size; means for sequentially entering said coded input signals into said decoding means through said time-shared storing means; means responsive to said decoded signals for determining the cumulative width of the width-occupying characters in said lines, for assigning chosen widths to said spacings to justify said line, and for thereafter receiving said memory-stored coded input electrical signals in their assigned positions in a line; means responsive to the effecting of a justified line for storing a coded signal representative of one of said characters; means for successively comparing said last-named coded signal with each of said coded signals in said memory means; said flashing means being jointly responsive to an agreement between a memory-stored coded signals and said last-named coded signal to produce said character comparison signal and an agreement between said position signal for said last-named coded signal and the assigned line position of said memory-stored coded signal to produce said position comparison signal for momentarily exciting said illuminating means, said last-named coded signal being stored throughout the period required to compare it with each of said memory-stored coded signals whereby a single given character is illuminated at each succeeding assigned position wherein it occurs in said justified line; means for comparing the actual position of said mask with a commanded position for said mask comprising means responsive to said signals produced in said decoding means representative of said interlace positions wherein characters in a line remain to be illuminated and means responsive to said last-named signals and said actual mask position representative signal for causing said mask to be moved from an interlace position wherein no characters in the line remain to be illuminated to an interlace position where characters in the line still remain to be illuminated; and means for comparing the position on said strip relative to said illuminating means and a commanded position on said strip to produce an electrical signal for causing illumination of said strip by said illuminating means at said commanded position.

20. In an apparatus for composing text line-by-line on a photosensitive medium from coded input electrical signals individually representative of the characters of said text, and the spacings between said characters and including an endless strip of material having at least one longitudinal font of characters and continually moved at a substantially uniform velocity, character storage means for providing a coded electrical signal individually representative of each of the strip characters, means capable of illuminating each character during the travel of its image effectively over an area of said photosensitive medium upon which area a line of text is being composed, the light through said last-named character being effective to act upon said photosensitive medium which is cooperatively associated therewith, sensing means for developing a position signal continuously representative of the instantaneous position of said character during movement of said strip, flashing means jointly responsive to a position comparison signal and a character comparison signal for momentarily exciting said illuminating means when said two signals are in time coincidence, and means for providing a signal representation of the actual position of one of said fonts relative to said illuminating means: data processing means for controlling the operations of said apparatus comprising: memory means for receiving and storing said coded input electrical signals in the order that their respective characters occur on a line to be compared; means responsive to said last-named signals for determining the cumulative width of the width-occupying characters in said line, for assigning chosen widths to said spacings to justify said line, and for thereafter receiving said memory-stored coded input electrical signals in their assigned positions in a line; means responsive to the effecting of a justified line for storing a coded signal for successively comparing said last-named coded signal with each of said coded signals stored in said memory means; said flashing means being jointly responsive to an agreement between a memory-stored coded signal and said last-named coded signal to produce said character comparison signal and an agreement between said position signal for said last-named coded signal and the assigned line position of said memory-stored coded signal to produce said position comparison signal for momentarily exciting said illuminating means, said last-named coded signal being stored throughout the period required to compare it with each of said memory-stored coded signals whereby a single given character is illuminated at each succeeding assigned position wherein it occurs in said justified line, during one scan of the image of said given character over an area of said photosensitive medium upon which area a line of text is being composed; means for comparing the actual position of said mask with a commanded position for said mask to produce a signal for causing said mask to be moved to said commanded position in response to said comparison; means for providing a command signal representative of a character group on said strip from which characters are to be illuminated for recording on said photosensitive medium; means for comparing said actual strip position representative signal with said last-named command signal to produce a signal for causing said strip to be placed in position whereby said last-named character group is illuminable by said illuminating means.

21. In an apparatus as defined in claim 20 wherein said strip comprises two like sections, each of said sections comprising a like plurality of corresponding fonts and wherein said apparatus further comprises means for providing a signal representation of the actual section position relative to said illuminating means and wherein said data processing means further includes means for providing a signal representing a command section to be illuminated by said illuminating means; means for comparing said actual position signal and said commanded section signal to produce a signal for causing said commanded section to be illuminable by said illuminating means.

References Cited

UNITED STATES PATENTS

| | | | |
|---|---|---|---|
| 3,188,929 | 6/1965 | Higonnet | 95—4.5 |
| 2,846,932 | 8/1958 | Hooven | 95—4.5 |
| 3,017,811 | 1/1962 | O'Brien | 95—4.5 |
| 3,204,540 | 9/1965 | Blakely | 95—4.5 |
| 3,291,015 | 12/1966 | Moyroud | 95—4.5 |

JOHN M. HORAN, Primary Examiner

LEO H. McCORMICK, Jr., Assistant Examiner